US012543201B2

United States Patent
Rastegardoost et al.

(10) Patent No.: US 12,543,201 B2
(45) Date of Patent: Feb. 3, 2026

(54) ACCESS PROCEDURE RESOURCE CONFIGURATION

(71) Applicant: Comcast Cable Communications, LLC, Philadelphia, PA (US)

(72) Inventors: Nazanin Rastegardoost, McLean, VA (US); Esmael Hejazi Dinan, McLean, VA (US); Hyoungsuk Jeon, Centreville, VA (US); Yunjung Yi, Vienna, VA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 51 days.

(21) Appl. No.: 16/994,288

(22) Filed: Aug. 14, 2020

(65) Prior Publication Data

US 2021/0051672 A1 Feb. 18, 2021

Related U.S. Application Data

(60) Provisional application No. 62/886,656, filed on Aug. 14, 2019.

(51) Int. Cl.
*H04W 72/1263* (2023.01)
*H04W 72/0446* (2023.01)
(Continued)

(52) U.S. Cl.
CPC ....... *H04W 72/53* (2023.01); *H04W 72/0446* (2013.01); *H04W 72/1263* (2013.01);
(Continued)

(58) Field of Classification Search
CPC ......... H04W 72/0493; H04W 72/0413; H04W 72/0446; H04W 72/1263; H04W 72/1289;
(Continued)

(56) References Cited

U.S. PATENT DOCUMENTS 11,902,028 B2 * 2/2024 Xiong ............... H04W 74/0833
12,095,683 B2 * 9/2024 Takeda .................. H04L 5/0012
(Continued)

FOREIGN PATENT DOCUMENTS

| KR | 20200054086 A | 5/2020 |
| WO | 2020032745 A1 | 2/2020 |

(Continued)

OTHER PUBLICATIONS

Intel Corporation: "Channel structure for two-step RACH", 3GPP Draft; R1-1902466 Intel Channel Structure, 3rd Generation Partnership Project (3GPP), Mobile Competence Centre ; 650, Oute Des Lucioles ; F-06921 Sophia-Antipolis Cedex ; France (Year: 2019).*
(Continued)

*Primary Examiner* — Thinh D Tran
(74) *Attorney, Agent, or Firm* — Banner & Witcoff, Ltd.

(57) ABSTRACT

A base station and/or a wireless device may communicate for an access procedure. One or more uplink channel resources of an access procedure of a first type may be reserved and/or guaranteed for one or more uplink transmissions. One or more downlink symbols may not be configured for the one or more uplink channel resources.

24 Claims, 43 Drawing Sheets

(51) Int. Cl.
  *H04W 72/21* (2023.01)
  *H04W 72/23* (2023.01)
  *H04W 72/53* (2023.01)
  *H04W 74/0833* (2024.01)
  *H04W 74/0836* (2024.01)
  *H04W 74/0838* (2024.01)

(52) U.S. Cl.
  CPC ........... *H04W 72/21* (2023.01); *H04W 72/23* (2023.01); *H04W 74/0833* (2013.01); *H04W 74/0836* (2024.01); *H04W 74/0838* (2024.01)

(58) Field of Classification Search
  CPC ........... H04W 74/0833; H04W 74/006; H04W 72/53; H04W 72/21; H04W 72/23; H04W 74/0836; H04W 74/0838
  See application file for complete search history.

(56) References Cited

U.S. PATENT DOCUMENTS

| | | | | |
|---|---|---|---|---|
| 12,150,117 | B2* | 11/2024 | Liu | H04W 72/23 |
| 2019/0223223 | A1* | 7/2019 | Ko | H04L 5/0053 |
| 2020/0092777 | A1 | 3/2020 | Agiwal et al. | |
| 2020/0374875 | A1* | 11/2020 | Li | H04L 5/0064 |
| 2021/0022058 | A1* | 1/2021 | Islam | H04W 56/001 |
| 2021/0320833 | A1* | 10/2021 | Kim | H04J 11/0073 |
| 2022/0015156 | A1* | 1/2022 | Xu | H04W 72/0453 |
| 2022/0095283 | A1* | 3/2022 | Wei | H04L 5/0003 |
| 2022/0174744 | A1* | 6/2022 | Lin | H04W 8/26 |
| 2022/0191937 | A1* | 6/2022 | Lei | H04L 5/0044 |
| 2022/0191949 | A1* | 6/2022 | Zhang | H04W 72/23 |
| 2022/0287107 | A1* | 9/2022 | Kim | H04W 72/0446 |
| 2023/0015550 | A1* | 1/2023 | Lin | H04B 1/7143 |
| 2023/0300864 | A1* | 9/2023 | Tang | H04W 72/0446 370/329 |
| 2025/0220725 | A1* | 7/2025 | Wu | H04W 72/23 |

FOREIGN PATENT DOCUMENTS

| | | | |
|---|---|---|---|
| WO | 2020033660 | A1 | 2/2020 |
| WO | 2020060371 | A1 | 3/2020 |
| WO | 2020076953 | A1 | 4/2020 |

OTHER PUBLICATIONS

Islam et al., "Handover and RRC Re-Establishment Delay in 2-Step RACH", U.S. Appl. No. 62/876,417, filed Jul. 19, 2019 (Year: 2019).*
3GPP TS 36.321 V15.4.0 (Dec. 2018), Technical Specification, 3rd Generation Partnership Project; Technical Specification Group Radio Access Network; Evolved Universal Terrestrial Radio Access (E-UTRA); Medium Access Control (MAC) protocol specification (Release 15).
3GPP TS 36.331 V15.4.0 (Dec. 2018), Technical Specification, 3rd Generation Partnership Project; Technical Specification Group Radio Access Network; Evolved Universal Terrestrial Radio Access (E-UTRA); Radio Resource Control (RRC); Protocol specification (Release 15).
3GPP TSG RAN WG1 Meeting #96bis, Xi'an, China, Apr. 8-12, 2019, Title: RAN1 Chairman's Notes.
R1-1905793 3GPP TSG RAN WG1 Meeting #96bis, Xi'an, China, Apr. 8-12, 2019, Source: ZTE, Title: Updated summary of 7.2.1.1 Channel Structure for Two-step RACH.
3GPP TS 38.213 V15.6.0 (Jun. 2019), Technical Specification, 3rd Generation Partnership Project; Technical Specification Group Radio Access Network; NR; Physical layer procedures for control (Release 15).
3GPP TS 38.214 V15.6.0 (Jun. 2019), Technical Specification, 3rd Generation Partnership Project; Technical Specification Group Radio Access Network; NR; Physical layer procedures for data (Release 15).
3GPP TS 38.321 V15.6.0 (Jun. 2019), Technical Specification, 3rd Generation Partnership Project; Technical Specification Group Radio Access Network; NR; Medium Access Control (MAC) protocol specification (Release 15).
3GPP TS 38.331 V15.6.0 (Jun. 2019), Technical Specification, 3rd Generation Partnership Project; Technical Specification Group Radio Access Network; NR; Radio Resource Control (RRC) protocol specification (Release 15).
3GPP TSG RAN WG1 Meeting #97, Reno, USA, May 13-17, 2019, Title: RAN1 Chairman's Notes.
R1-1721702 3GPP TSG RAN WG1 #91, Reno, USA, Nov. 27-Dec. 1, 2017, Source: Qualcomm Incorporated, Title: Offline discussion on GC-PDCCH carrying SFI.
R1-1803336 3GPP TSG RAN WG1 #92, Athens, Greece, Mar. 2, 2018, Source: Qualcomm Incorporated, Title: Offline discussion summary on remaining issues on GC-PDCCH carrying SFI.
R1-1905989 3GPP TSG RAN WG1 Meeting #97, Reno, USA, May 13-17, 2019, Source: ZTE, Sanechips, Title: Further discussions on the channel structure of msgA.
R1-1905990 3GPP TSG RAN WG1 Meeting #97, Reno, USA, May 13-17, 2019, Source: ZTE, Sanechips, Title: Further discussions on 2-step RACH procedures.
R1-1906050 3GPP TSG RAN WG1 Meeting #97, Reno, USA, May 13-17, 2019, Source: Huawei, HiSilicon, Title: Discussion on channel structure of 2-step RACH.
R1-1906124 3GPP TSG RAN WG1 Meeting #97, Reno, USA, May 13-17, 2019, Source: vivo, Title: Discussion on channel structure of 2-step RACH.
R1-1906192 3GPP TSG RAN WG1 #97, Reno, USA, May 13-17, 2019, Source: NTT Docomo, Inc., Title: Discussion on Channel Structure of Two-Step RACH.
R1-1906366 3GPP TSG RAN WG1 Meeting #97, Reno, USA, May 13-17, 2019, Source: Spreadtrum communications Title: Considerations on the channel structure of 2-step RACH.
R1-1906746 3GPP TSG RAN WG1 #97, Reno, USA, May 13-17, 2019, Source: Nokia, Nokia Shanghai Bell, Title: On 2-step RACH Channel Structure.
R1-1906779 3GPP TSG RAN WG1 #97, Reno, USA, May 13-17, 2019, Source: Intel Corporation, Title: Discussion on channel structure for 2-step RACH.
R1-1906858 3GPP TSG RAN WG1 Meeting #97, Reno, USA, May 13-17, 2019, Source: InterDigital Inc. Title: On preamble and PUSCH mapping.
R1-1907196 3GPP TSG RAN WG1 Meeting #97, Reno, USA, May 13-17, 2019, Source: CAICT, Title: Considerations on Channel Structure for Two-step RACH.
R1-1907255 3GPP TSG RAN WG1 Meeting #97, Reno, USA, May 13-17, 2019, Source: Qualcomm Incorporated, Title: Channel Structure for Two-step RACH.
R1-1907830 3GPP TSG RAN WG1 #97, Reno, USA, May 13-17, 2019, Source: ZTE, Title: Feature Lead Summary #2 of 7.2.1.1 Two-step RACH Channel Structure.
R2-1907633 3GPP TSG RAN WG2 Meeting #106, Reno, USA, May 13-17, 2019, Source: Samsung, Title: Handling of configured grants in TDD.
R2-1908014 3GPP TSG RAN WG2 Meeting #106, Reno, USA, May 13-17, 2019, Source: Ericsson, Title: Configured grants overlapping with DL symbols in TDD operation.
3GPP TSG RAN WG2 Meeting #105bis, Xi'an, China, Apr. 8-12, 2019, Source: RAN2 Chairman (Intel), Title: Chair hotes.
3GPP TSG RAN WG2 Meeting #106, Reno, USA, May 13-17, 2019, Source: RAN2 Chairman (Intel), Title: Chair notes.
RP-190xxx 3GPP TSG RAN Meeting #84, Newport Beach, USA, Jun. 3-6, 2019, Source: ZTW Corporation, Title: Status Report to TSG.
Intel Corporation: "Channel structure for two-step RACH", 3GPP Draft; R1-1902466 Intel Channel Structure, 3rd Generation Partnership Project (3GPP), Mobile Competence Centre ; 650, Route Des Lucioles ; F-06921 Sophia-Antipolis Cedex ; France.
Ericsson: "Procedure for Two-step RACH", 3GPP Draft; R1-1907181 Procedure for Two-Step RACH, 3rd Generation Partnership Project (3GPP), Mobile Competence Centre ; 650, Route Des Lucioles ; F-06921 Sophia-Antipolis Cedex ; France.

(56) References Cited

OTHER PUBLICATIONS

Dec. 9, 2020—European Search Report—EP 20191054.4.
R1-1904280 3GPP TSG RAN WG1 #96bis, Xi'an, China, Apr. 8-12, 2019, Source: Intel Corporation, Title: Channel structure for 2-step RACH.
Mar. 13, 2023—European Office Action—EP App. No. 20191054.4.

* cited by examiner

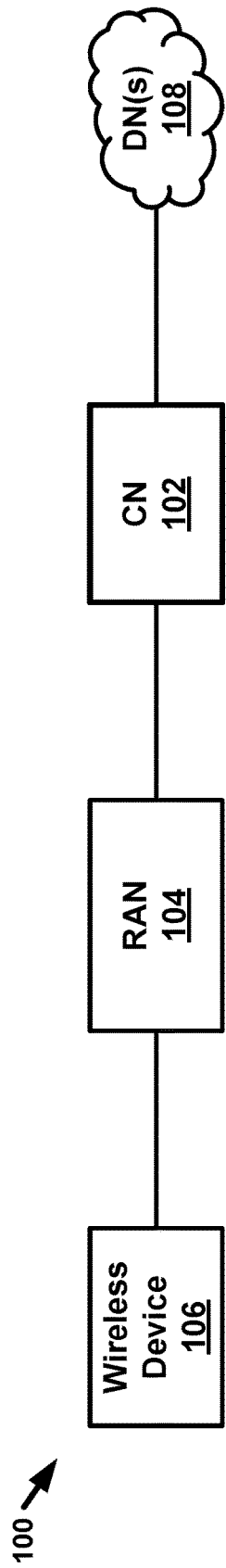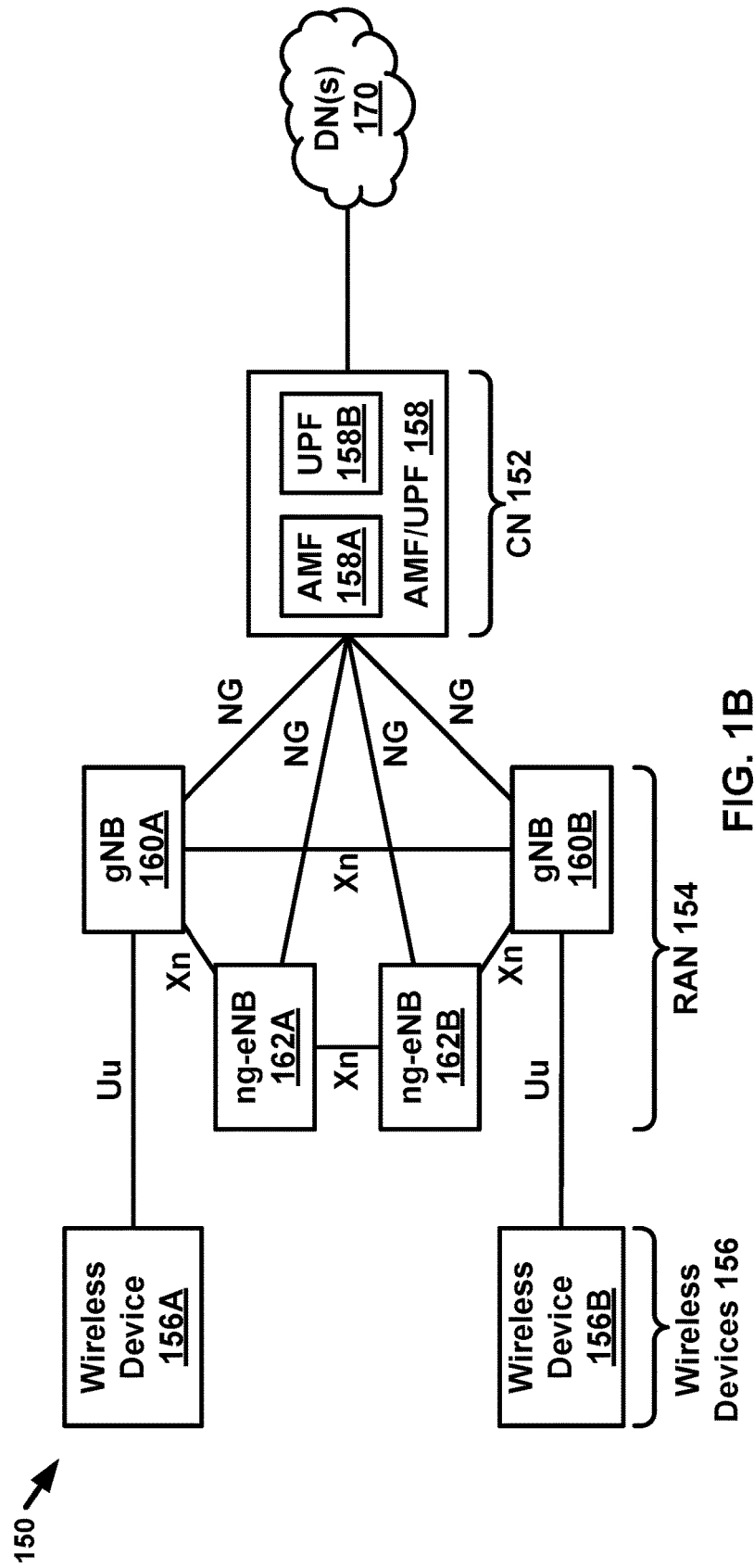

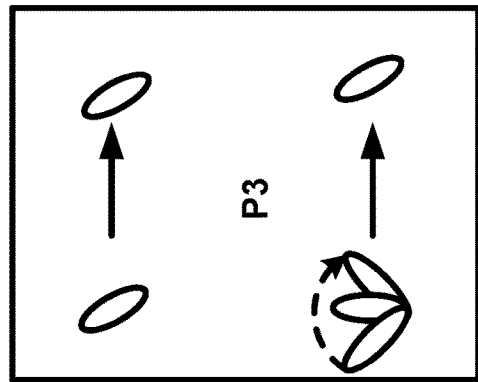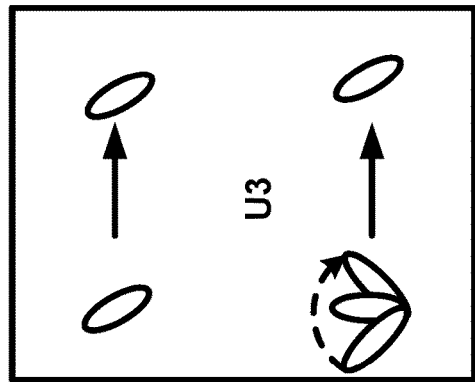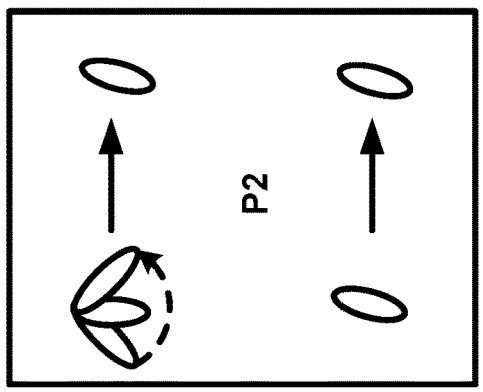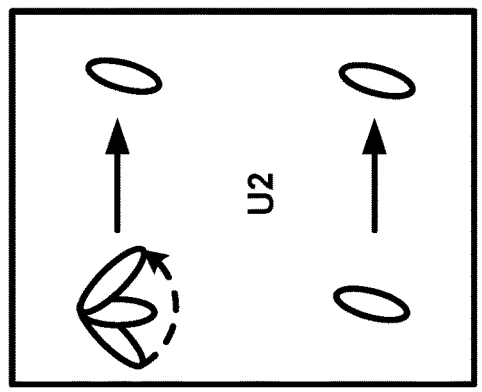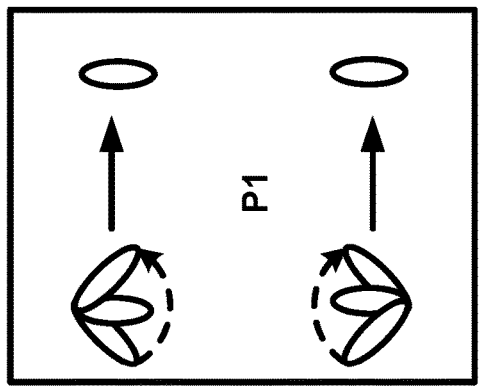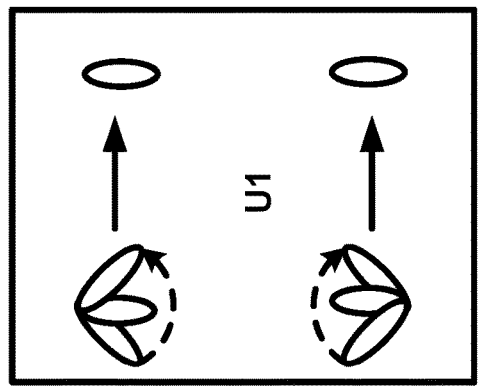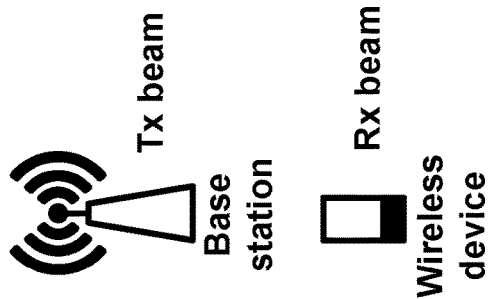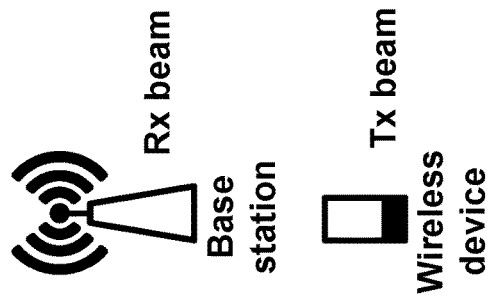
FIG. 12A
FIG. 12B

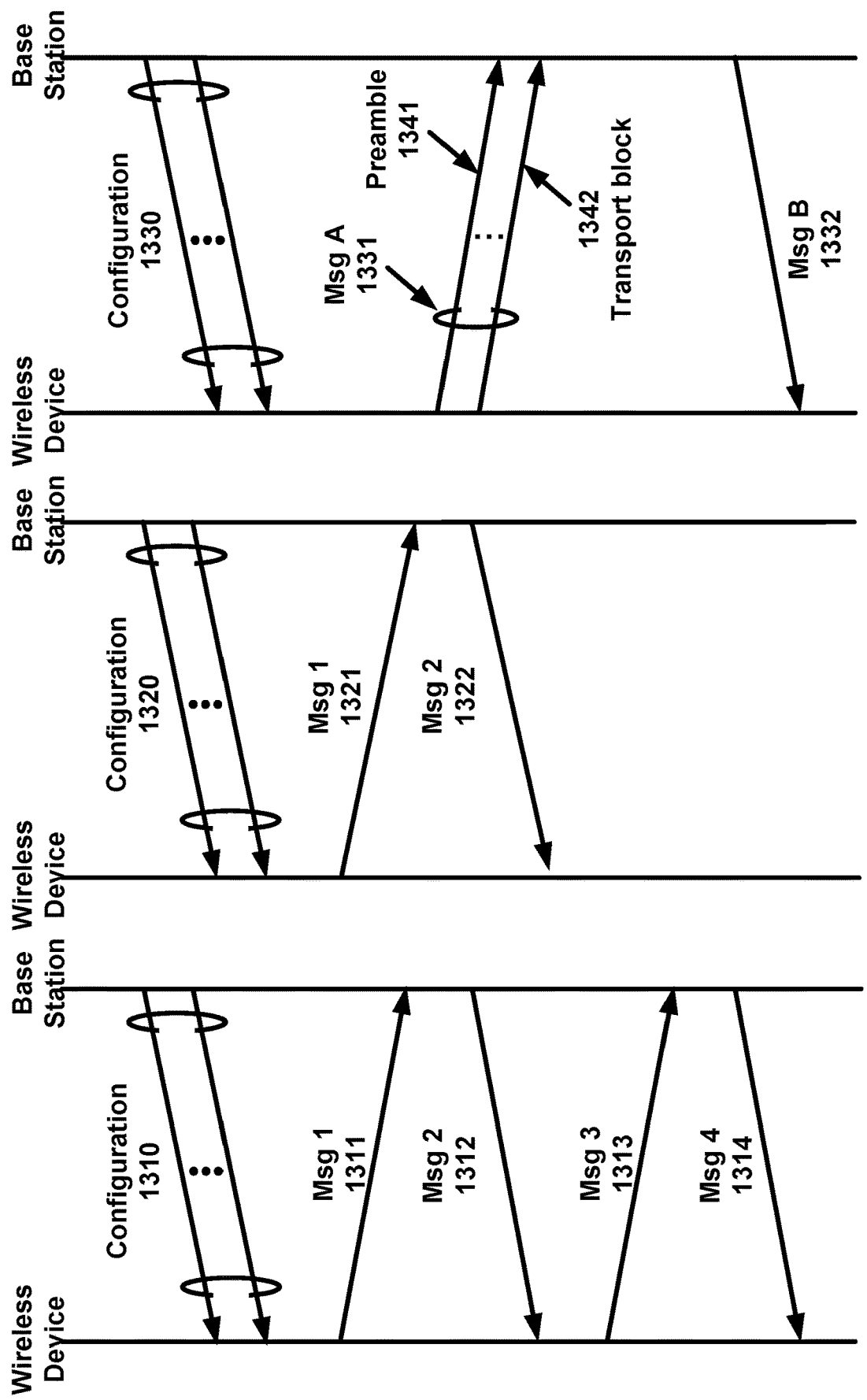

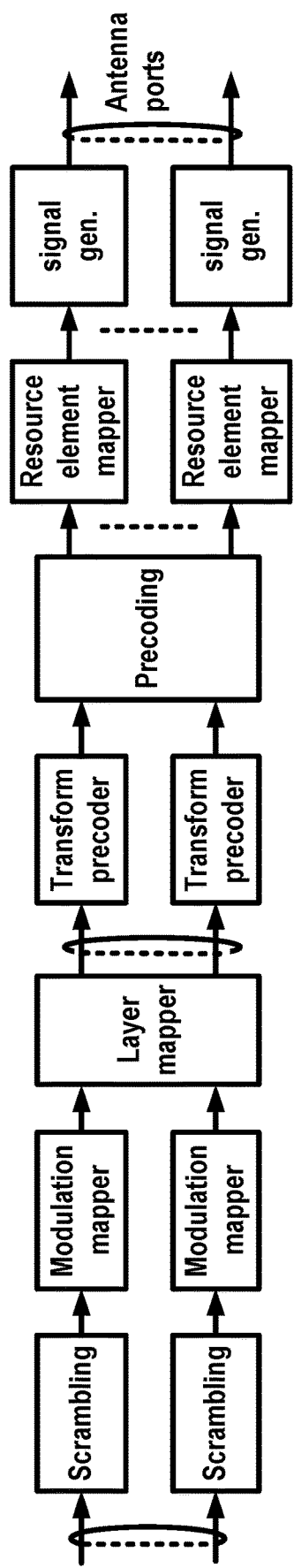
FIG. 16A
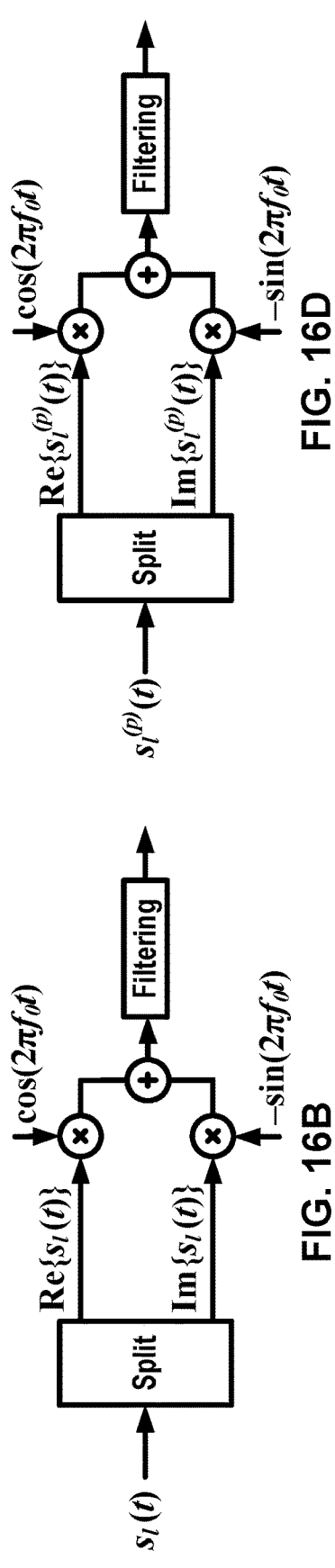
FIG. 16B
FIG. 16D
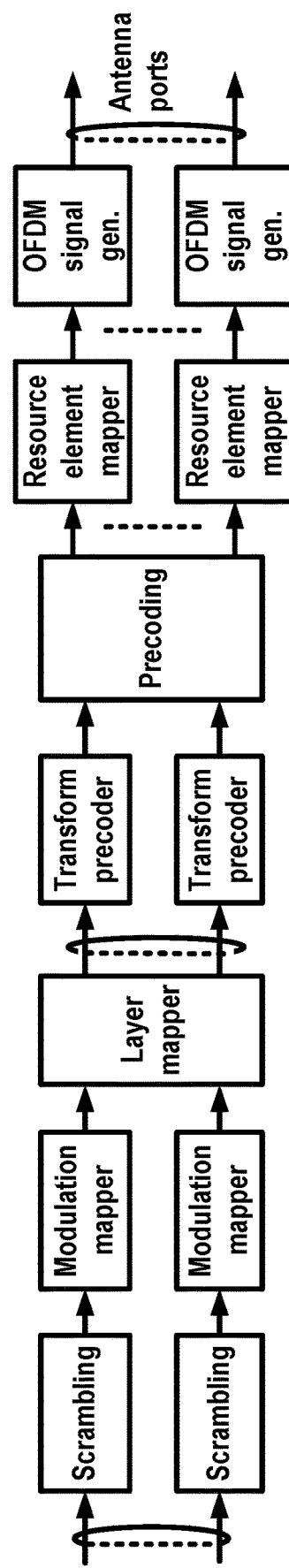
FIG. 16C

Slot Format 1

Slot Format 2

Slot Format 3

Slot formats

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | D | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

FIG. 23

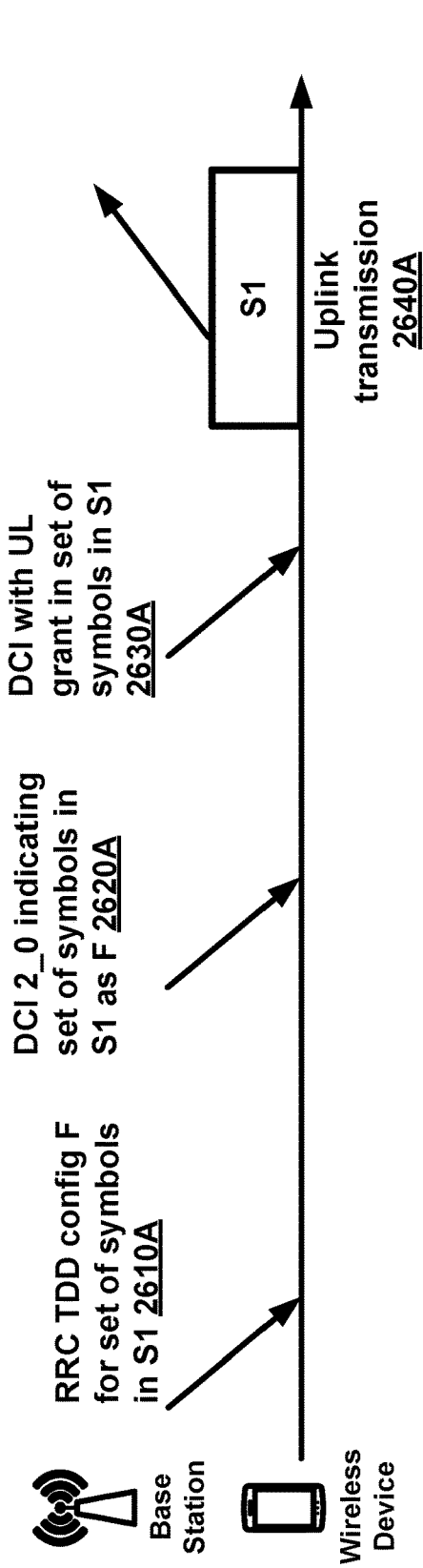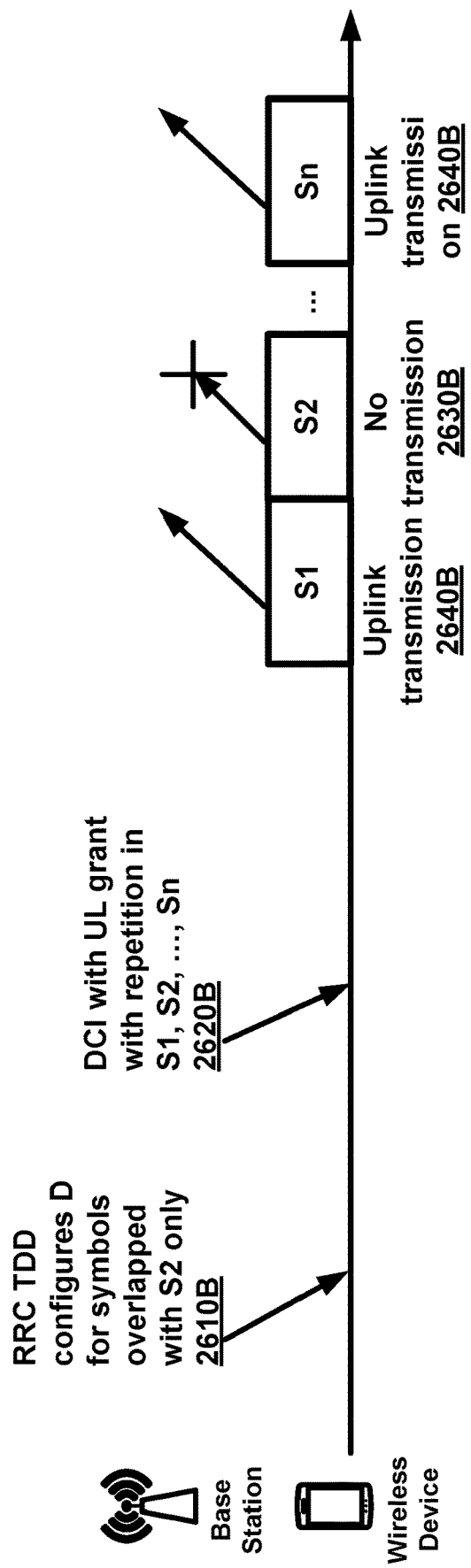
FIG. 26A
FIG. 26B

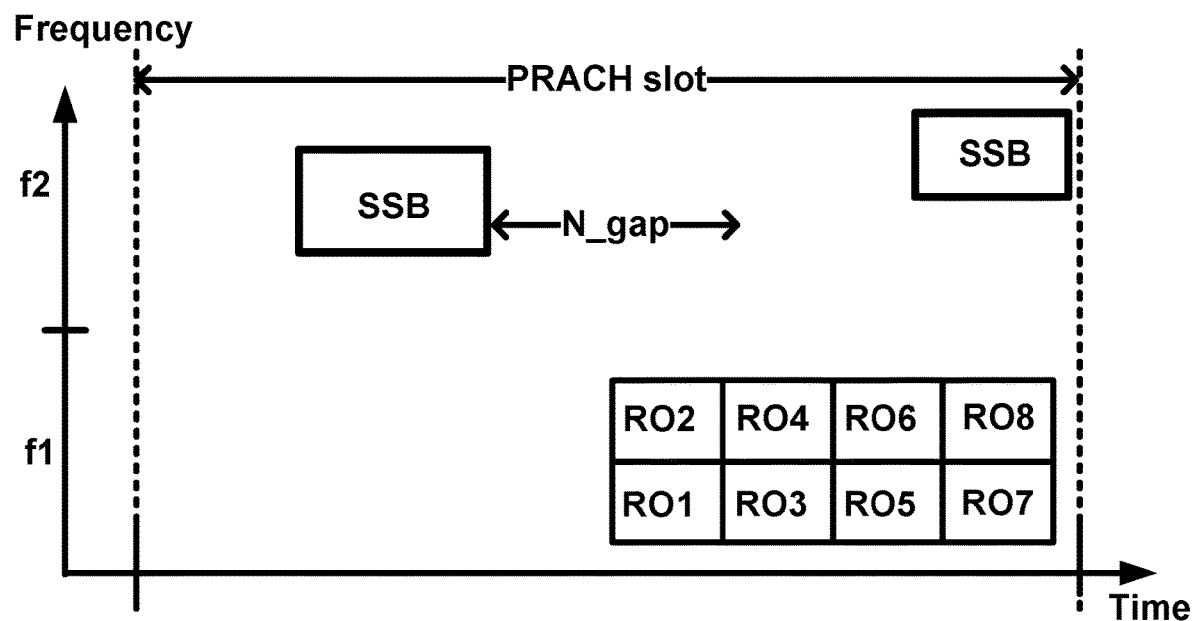
FIG. 27

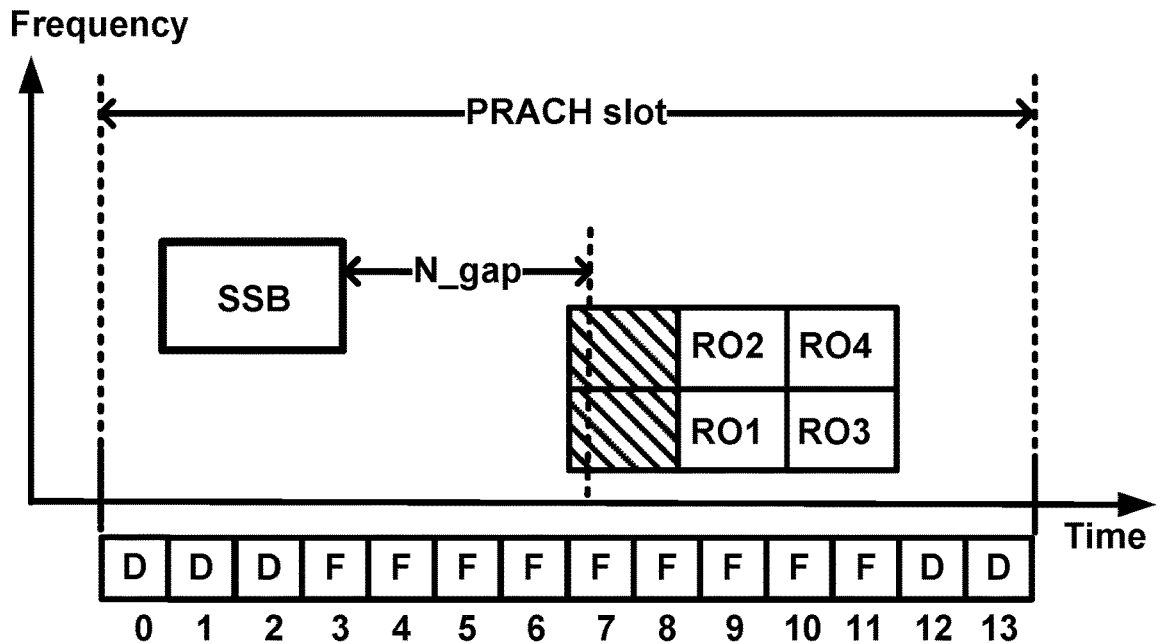
FIG. 28A
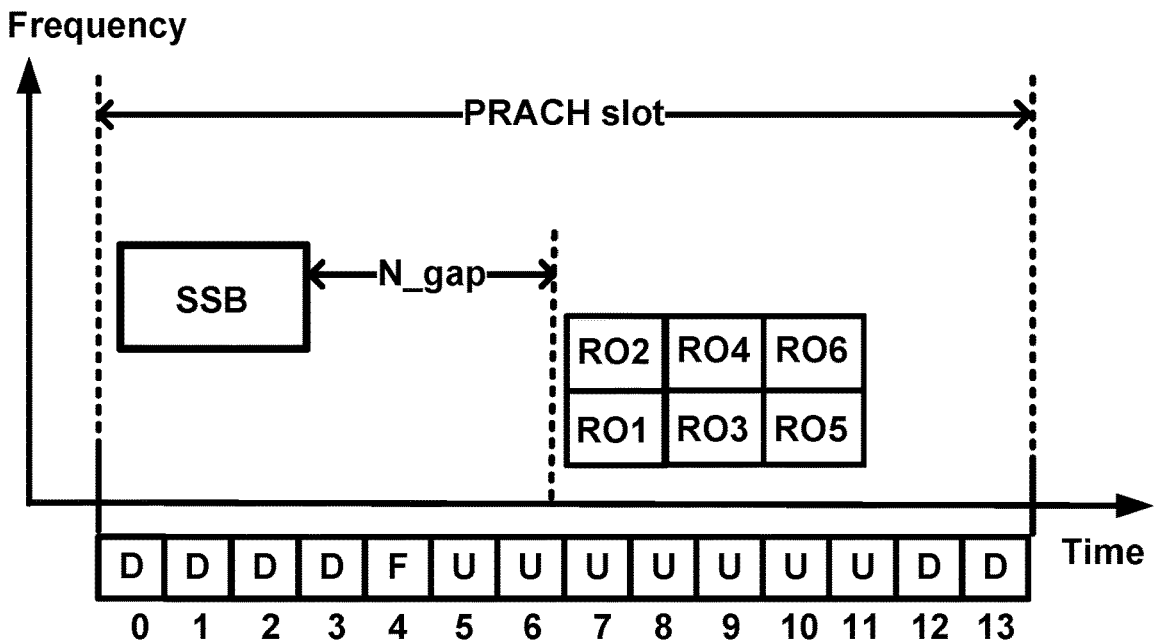
FIG. 28B

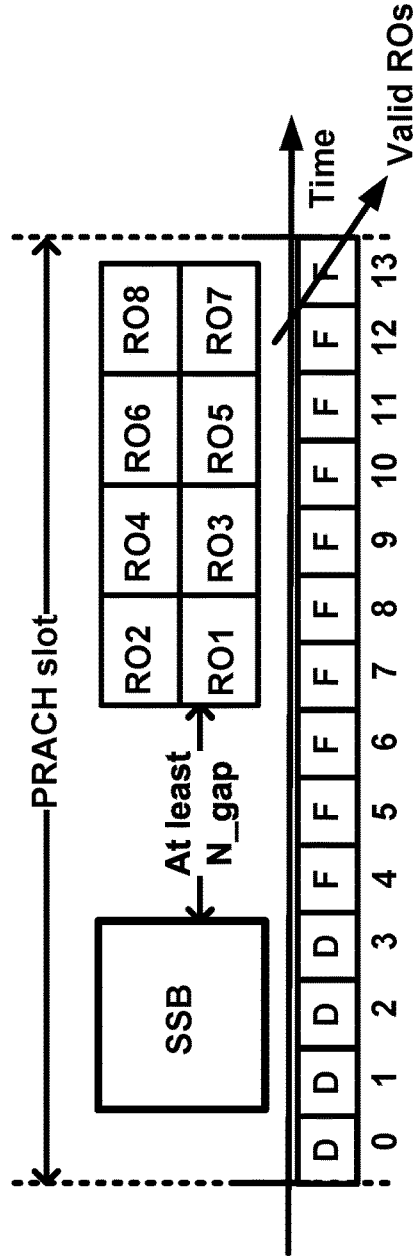
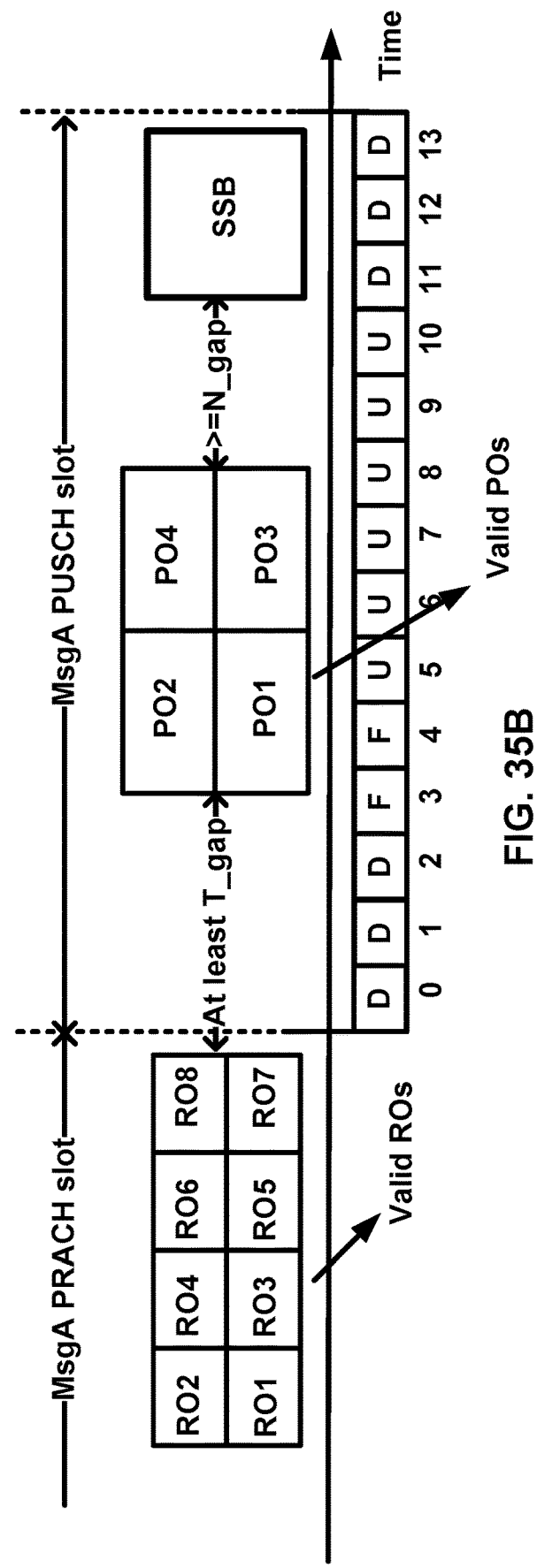
FIG. 35A
FIG. 35B

ACCESS PROCEDURE RESOURCE CONFIGURATION

CROSS-REFERENCE TO RELATED APPLICATIONS

This application claims the benefit of U.S. Provisional Application No. 62/886,656, filed on Aug. 14, 2019. The above-referenced application is hereby incorporated by reference in its entirety.

BACKGROUND

A random access procedure is used to set up a connection between a wireless device and a base station. The base station and the wireless device exchange communications for the random access procedure.

SUMMARY

The following summary presents a simplified summary of certain features. The summary is not an extensive overview and is not intended to identify key or critical elements.

A wireless device and a base station may communicate for an access procedure. An access procedure of a first type may be configured to expedite the access process in comparison with an access procedure of a second type. The access procedure of the first type may transmit one or more uplink channel data messages earlier than the access procedure of the second type. The transmission of the one or more uplink channel data may fail, for example, if one or more uplink channel resources are not guaranteed. The failure of the transmission of the one or more uplink channel data may cause a fallback to the access procedure of the second type and/or may lead to undesirable results such as increased latency, battery power overuse, misalignment, etc. The one or more uplink channel resources may be reserved/guaranteed by preventing downlink symbols. At least a portion of a plurality of uplink channel resources may be reserved and/or guaranteed (e.g., based on one or more criteria), for example, in order to avoid resource configuration inflexibility that may be caused by reserving and/or guaranteeing more than an adequate amount of uplink channel resources. Various examples described herein may enable efficient control signaling and/or efficient resource management for one or more access procedures.

These and other features and advantages are described in greater detail below.

BRIEF DESCRIPTION OF THE DRAWINGS

Some features are shown by way of example, and not by limitation, in the accompanying drawings. In the drawings, like numerals reference similar elements.

FIG. 1A and FIG. 1B show example communication networks.

FIG. 12A shows examples of downlink beam management procedures.

FIG. 12B shows examples of uplink beam management procedures.

FIG. 13A shows an example four-step random access procedure.

FIG. 13B shows an example two-step random access procedure.

FIG. 13C shows an example two-step random access procedure.

FIG. 16A, FIG. 16B, FIG. 16C, and FIG. 16D show examples of uplink and downlink signal transmission.

FIG. 23 shows example slot formats for a slot.

FIG. 26A and FIG. 26B show example communications based on a slot format determination.

FIG. 27 shows an example PRACH resource configuration in a paired spectrum.

FIG. 28A and FIG. 28B show example PRACH configuration in an unpaired spectrum.

FIG. 35A shows an example of resource allocation for PRACH occasions.

FIG. 35B shows an example of resource allocation for PRACH occasions and PUSCH occasions.

DETAILED DESCRIPTION

Figure 2A:
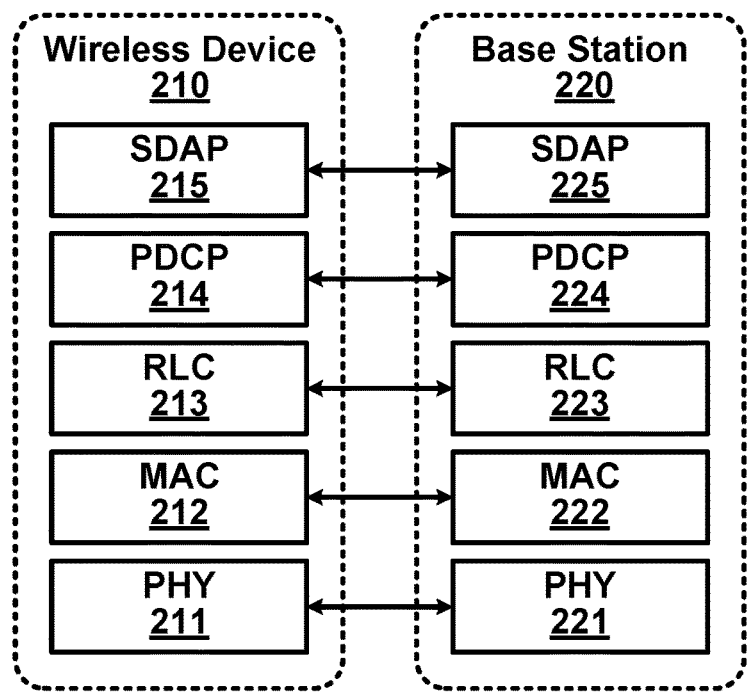
FIG. 2A shows an example user plane.

The accompanying drawings and descriptions provide examples. It is to be understood that the examples shown in the drawings and/or described are non-exclusive, and that features shown and described may be practiced in other examples. Examples are provided for operation of wireless communication systems, which may be used in the technical field of multicarrier communication systems. More particularly, the technology disclosed herein may relate to one or more access procedures.

FIG. 1A shows an example communication network 100. The communication network 100 may comprise a mobile communication network). The communication network 100 may comprise, for example, a public land mobile network (PLMN) operated/managed/run by a network operator. The communication network 100 may comprise one or more of a core network (CN) 102, a radio access network (RAN) 104, and/or a wireless device 106. The communication network 100 may comprise, and/or a device within the communication network 100 may communicate with (e.g., via CN 102), one or more data networks (DN(s)) 108. The wireless device 106 may communicate with one or more DNs 108, such as public DNs (e.g., the Internet), private DNs, and/or intra-operator DNs. The wireless device 106 may communicate with the one or more DNs 108 via the RAN 104 and/or via the CN 102. The CN 102 may provide/configure the wireless device 106 with one or more interfaces to the one or more DNs 108. As part of the interface functionality, the CN 102 may set up end-to-end connections between the wireless device 106 and the one or more DNs 108, authenticate the wireless device 106, provide/configure charging functionality, etc.

The wireless device 106 may communicate with the RAN 104 via radio communications over an air interface. The RAN 104 may communicate with the CN 102 via various communications (e.g., wired communications and/or wireless communications). The wireless device 106 may establish a connection with the CN 102 via the RAN 104. The RAN 104 may provide/configure scheduling, radio resource management, and/or retransmission protocols, for example, as part of the radio communications. The communication direction from the RAN 104 to the wireless device 106 over/via the air interface may be referred to as the downlink and/or downlink communication direction. The communication direction from the wireless device 106 to the RAN 104 over/via the air interface may be referred to as the uplink and/or uplink communication direction. Downlink transmissions may be separated and/or distinguished from uplink transmissions, for example, based on at least one of: frequency division duplexing (FDD), time-division duplexing (TDD), any other duplexing schemes, and/or one or more combinations thereof.

As used throughout, the term "wireless device" may comprise one or more of: a mobile device, a fixed (e.g., non-mobile) device for which wireless communication is configured or usable, a computing device, a node, a device capable of wirelessly communicating, or any other device capable of sending and/or receiving signals. As non-limiting examples, a wireless device may comprise, for example: a telephone, a cellular phone, a Wi-Fi phone, a smartphone, a tablet, a computer, a laptop, a sensor, a meter, a wearable device, an Internet of Things (IoT) device, a hotspot, a cellular repeater, a vehicle road side unit (RSU), a relay node, an automobile, a wireless user device (e.g., user equipment (UE), a user terminal (UT), etc.), an access terminal (AT), a mobile station, a handset, a wireless transmit and receive unit (WTRU), a wireless communication device, and/or any combination thereof.

The RAN 104 may comprise one or more base stations (not shown). As used throughout, the term "base station" may comprise one or more of: a base station, a node, a Node B (NB), an evolved NodeB (eNB), a gNB, an ng-eNB, a relay node (e.g., an integrated access and backhaul (IAB) node), a donor node (e.g., a donor eNB, a donor gNB, etc.), an access point (e.g., a Wi-Fi access point), a transmission and reception point (TRP), a computing device, a device capable of wirelessly communicating, or any other device capable of sending and/or receiving signals. A base station may comprise one or more of each element listed above. For example, a base station may comprise one or more TRPs. As other non-limiting examples, a base station may comprise for example, one or more of: a Node B (e.g., associated with Universal Mobile Telecommunications System (UMTS) and/or third-generation (3G) standards), an Evolved Node B (eNB) (e.g., associated with Evolved-Universal Terrestrial Radio Access (E-UTRA) and/or fourth-generation (4G) standards), a remote radio head (RRH), a baseband processing unit coupled to one or more remote radio heads (RRHs), a repeater node or relay node used to extend the coverage area of a donor node, a Next Generation Evolved Node B (ng-eNB), a Generation Node B (gNB) (e.g., associated with NR and/or fifth-generation (5G) standards), an access point (AP) (e.g., associated with, for example, Wi-Fi or any other suitable wireless communication standard), any other generation base station, and/or any combination thereof. A base station may comprise one or more devices, such as at least one base station central device (e.g., a gNB Central Unit (gNB-CU)) and at least one base station distributed device (e.g., a gNB Distributed Unit (gNB-DU)).

A base station (e.g., in the RAN 104) may comprise one or more sets of antennas for communicating with the wireless device 106 wirelessly (e.g., via an over the air interface). One or more base stations may comprise sets (e.g., three sets or any other quantity of sets) of antennas to respectively control multiple cells or sectors (e.g., three cells, three sectors, any other quantity of cells, or any other quantity of sectors). The size of a cell may be determined by a range at which a receiver (e.g., a base station receiver) may successfully receive transmissions from a transmitter (e.g., a wireless device transmitter) operating in the cell. One or more cells of base stations (e.g., by alone or in combination with other cells) may provide/configure a radio coverage to the wireless device 106 over a wide geographic area to support wireless device mobility. A base station comprising three sectors (e.g., or n-sector, where n refers to any quantity n) may be referred to as a three-sector site (e.g., or an n-sector site) or a three-sector base station (e.g., an n-sector base station).

One or more base stations (e.g., in the RAN 104) may be implemented as a sectored site with more or less than three sectors. One or more base stations of the RAN 104 may be implemented as an access point, as a baseband processing device/unit coupled to several RRHs, and/or as a repeater or relay node used to extend the coverage area of a node (e.g., a donor node). A baseband processing device/unit coupled to RRHs may be part of a centralized or cloud RAN architecture, for example, where the baseband processing device/unit may be centralized in a pool of baseband processing devices/units or virtualized. A repeater node may amplify and send (e.g., transmit, retransmit, rebroadcast, etc.) a radio signal received from a donor node. A relay node may perform the substantially the same/similar functions as a repeater node. The relay node may decode the radio signal received from the donor node, for example, to remove noise before amplifying and sending the radio signal.

The RAN 104 may be deployed as a homogenous network of base stations (e.g., macrocell base stations) that have similar antenna patterns and/or similar high-level transmit powers. The RAN 104 may be deployed as a heterogeneous network of base stations (e.g., different base stations that have different antenna patterns). In heterogeneous networks, small cell base stations may be used to provide/configure small coverage areas, for example, coverage areas that overlap with comparatively larger coverage areas provided/configured by other base stations (e.g., macrocell base stations). The small coverage areas may be provided/configured in areas with high data traffic (or so-called "hotspots") or in areas with a weak macrocell coverage. Examples of small cell base stations may comprise, in order of decreasing coverage area, microcell base stations, picocell base stations, and femtocell base stations or home base stations.

Examples described herein may be used in a variety of types of communications. For example, communications may be in accordance with the Third-Generation Partnership Project (3GPP) (e.g., one or more network elements similar to those of the communication network 100), communications in accordance with Institute of Electrical and Electronics Engineers (IEEE), communications in accordance with International Telecommunication Union (ITU), communications in accordance with International Organization for Standardization (ISO), etc. The 3GPP has produced specifications for multiple generations of mobile networks: a 3G network known as UMTS, a 4G network known as Long-Term Evolution (LTE) and LTE Advanced (LTE-A), and a 5G network known as 5G System (5GS) and NR system. 3GPP may produce specifications for additional generations of communication networks (e.g., 6G and/or any other generation of communication network). Examples may be described with reference to one or more elements (e.g., the RAN) of a 3GPP 5G network, referred to as a next-generation RAN (NG-RAN), or any other communication network, such as a 3GPP network and/or a non-3GPP network. Examples described herein may be applicable to other communication networks, such as 3G and/or 4G networks, and communication networks that may not yet be finalized/specified (e.g., a 3GPP 6G network), satellite communication networks, and/or any other communication network. NG-RAN implements and updates 5G radio access technology referred to as NR and may be provisioned to implement 4G radio access technology and/or other radio access technologies, such as other 3GPP and/or non-3GPP radio access technologies.

FIG. 1B shows an example communication network 150. The communication network may comprise a mobile communication network. The communication network 150 may comprise, for example, a PLMN operated/managed/run by a network operator. The communication network 150 may comprise one or more of: a CN 152 (e.g., a 5G core network (5G-CN)), a RAN 154 (e.g., an NG-RAN), and/or wireless devices 156A and 156B (collectively wireless device(s) 156). The communication network 150 may comprise, and/or a device within the communication network 150 may communicate with (e.g., via CN 152), one or more data networks (DN(s)) 170. These components may be implemented and operate in substantially the same or similar manner as corresponding components described with respect to FIG. 1A.

The CN 152 (e.g., 5G-CN) may provide/configure the wireless device(s) 156 with one or more interfaces to one or more DNs 170, such as public DNs (e.g., the Internet), private DNs, and/or intra-operator DNs. As part of the interface functionality, the CN 152 (e.g., 5G-CN) may set up end-to-end connections between the wireless device(s) 156 and the one or more DNs, authenticate the wireless device(s) 156, and/or provide/configure charging functionality. The CN 152 (e.g., the 5G-CN) may be a service-based architecture, which may differ from other CNs (e.g., such as a 3GPP 4G CN). The architecture of nodes of the CN 152 (e.g., 5G-CN) may be defined as network functions that offer services via interfaces to other network functions. The network functions of the CN 152 (e.g., 5G CN) may be implemented in several ways, for example, as network elements on dedicated or shared hardware, as software instances running on dedicated or shared hardware, and/or as virtualized functions instantiated on a platform (e.g., a cloud-based platform).

The CN 152 (e.g., 5G-CN) may comprise an Access and Mobility Management Function (AMF) device 158A and/or a User Plane Function (UPF) device 158B, which may be separate components or one component AMF/UPF device 158. The UPF device 158B may serve as a gateway between a RAN 154 (e.g., NG-RAN) and the one or more DNs 170. The UPF device 158B may perform functions, such as: packet routing and forwarding, packet inspection and user plane policy rule enforcement, traffic usage reporting, uplink classification to support routing of traffic flows to the one or more DNs 170, quality of service (QoS) handling for the user plane (e.g., packet filtering, gating, uplink/downlink rate enforcement, and uplink traffic verification), downlink packet buffering, and/or downlink data notification triggering. The UPF device 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The wireless device(s) 156 may be configured to receive services via a PDU session, which may be a logical connection between a wireless device and a DN.

The AMF device 158A may perform functions, such as: Non-Access Stratum (NAS) signaling termination, NAS signaling security, Access Stratum (AS) security control, inter-CN node signaling for mobility between access networks (e.g., 3GPP access networks and/or non-3GPP networks), idle mode wireless device reachability (e.g., idle mode UE reachability for control and execution of paging retransmission), registration area management, intra-system and inter-system mobility support, access authentication, access authorization including checking of roaming rights, mobility management control (e.g., subscription and policies), network slicing support, and/or session management function (SMF) selection. NAS may refer to the functionality operating between a CN and a wireless device, and AS may refer to the functionality operating between a wireless device and a RAN.

The CN 152 (e.g., 5G-CN) may comprise one or more additional network functions that may not be shown in FIG. 1B. The CN 152 (e.g., 5G-CN) may comprise one or more devices implementing at least one of: a Session Management Function (SMF), an NR Repository Function (NRF), a Policy Control Function (PCF), a Network Exposure Function (NEF), a Unified Data Management (UDM), an Application Function (AF), an Authentication Server Function (AUSF), and/or any other function.

The RAN 154 (e.g., NG-RAN) may communicate with the wireless device(s) 156 via radio communications (e.g., an over the air interface). The wireless device(s) 156 may communicate with the CN 152 via the RAN 154. The RAN 154 (e.g., NG-RAN) may comprise one or more first-type base stations (e.g., gNBs comprising a gNB 160A and a gNB 160B (collectively gNBs 160)) and/or one or more second-type base stations (e.g., ng eNBs comprising an ng-eNB 162A and an ng-eNB 162B (collectively ng eNBs 162)). The RAN 154 may comprise one or more of any quantity of types of base station. The gNBs 160 and ng eNBs 162 may be referred to as base stations. The base stations (e.g., the gNBs 160 and ng eNBs 162) may comprise one or more sets of antennas for communicating with the wireless device(s) 156 wirelessly (e.g., an over an air interface). One or more base stations (e.g., the gNBs 160 and/or the ng eNBs 162) may comprise multiple sets of antennas to respectively control multiple cells (or sectors). The cells of the base stations (e.g., the gNBs 160 and the ng-eNBs 162) may provide a radio coverage to the wireless device(s) 156 over a wide geographic area to support wireless device mobility.

The base stations (e.g., the gNBs 160 and/or the ng-eNBs 162) may be connected to the CN 152 (e.g., 5G CN) via a first interface (e.g., an NG interface) and to other base stations via a second interface (e.g., an Xn interface). The NG and Xn interfaces may be established using direct physical connections and/or indirect connections over an underlying transport network, such as an internet protocol (IP) transport network. The base stations (e.g., the gNBs 160 and/or the ng-eNBs 162) may communicate with the wireless device(s) 156 via a third interface (e.g., a Uu interface). A base station (e.g., the gNB 160A) may communicate with the wireless device 156A via a Uu interface. The NG, Xn, and Uu interfaces may be associated with a protocol stack. The protocol stacks associated with the interfaces may be used by the network elements shown in FIG. 1B to exchange data and signaling messages. The protocol stacks may comprise two planes: a user plane and a control plane. Any other quantity of planes may be used (e.g., in a protocol stack). The user plane may handle data of interest to a user. The control plane may handle signaling messages of interest to the network elements.

One or more base stations (e.g., the gNBs 160 and/or the ng-eNBs 162) may communicate with one or more AMF/UPF devices, such as the AMF/UPF 158, via one or more interfaces (e.g., NG interfaces). A base station (e.g., the gNB 160A) may be in communication with, and/or connected to, the UPF 158B of the AMF/UPF 158 via an NG-User plane (NG-U) interface. The NG-U interface may provide/perform delivery (e.g., non-guaranteed delivery) of user plane PDUs between a base station (e.g., the gNB 160A) and a UPF device (e.g., the UPF 158B). The base station (e.g., the gNB 160A) may be in communication with, and/or connected to, an AMF device (e.g., the AMF 158A) via an NG-Control plane (NG-C) interface. The NG-C interface may provide/perform, for example, NG interface management, wireless device context management (e.g., UE context management), wireless device mobility management (e.g., UE mobility management), transport of NAS messages, paging, PDU session management, configuration transfer, and/or warning message transmission.

A wireless device may access the base station, via an interface (e.g., Uu interface), for the user plane configuration and the control plane configuration. The base stations (e.g., gNBs 160) may provide user plane and control plane protocol terminations towards the wireless device(s) 156 via the Uu interface. A base station (e.g., the gNB 160A) may provide user plane and control plane protocol terminations toward the wireless device 156A over a Uu interface associated with a first protocol stack. A base station (e.g., the ng-eNBs 162) may provide Evolved UMTS Terrestrial Radio Access (E UTRA) user plane and control plane protocol terminations towards the wireless device(s) 156 via a Uu interface (e.g., where E UTRA may refer to the 3GPP 4G radio-access technology). A base station (e.g., the ng-eNB 162B) may provide E UTRA user plane and control plane protocol terminations towards the wireless device 156B via a Uu interface associated with a second protocol stack. The user plane and control plane protocol terminations may comprise, for example, NR user plane and control plane protocol terminations, 4G user plane and control plane protocol terminations, etc.

The CN 152 (e.g., 5G-CN) may be configured to handle one or more radio accesses (e.g., NR, 4G, and/or any other radio accesses). It may also be possible for an NR network/device (or any first network/device) to connect to a 4G core network/device (or any second network/device) in a non-standalone mode (e.g., non-standalone operation). In a non-standalone mode/operation, a 4G core network may be used to provide (or at least support) control-plane functionality (e.g., initial access, mobility, and/or paging). Although only one AMF/UPF 158 is shown in FIG. 1B, one or more base stations (e.g., one or more gNBs and/or one or more ng-eNBs) may be connected to multiple AMF/UPF nodes, for example, to provide redundancy and/or to load share across the multiple AMF/UPF nodes.

An interface (e.g., Uu, Xn, and/or NG interfaces) between network elements (e.g., the network elements shown in FIG. 1B) may be associated with a protocol stack that the network elements may use to exchange data and signaling messages. A protocol stack may comprise two planes: a user plane and a control plane. Any other quantity of planes may be used (e.g., in a protocol stack). The user plane may handle data associated with a user (e.g., data of interest to a user). The control plane may handle data associated with one or more network elements (e.g., signaling messages of interest to the network elements).

The communication network 100 in FIG. 1A and/or the communication network 150 in FIG. 1B may comprise any quantity/number and/or type of devices, such as, for example, computing devices, wireless devices, mobile devices, handsets, tablets, laptops, internet of things (IoT) devices, hotspots, cellular repeaters, computing devices, and/or, more generally, user equipment (e.g., UE). Although one or more of the above types of devices may be referenced herein (e.g., UE, wireless device, computing device, etc.), it should be understood that any device herein may comprise any one or more of the above types of devices or similar devices. The communication network, and any other network referenced herein, may comprise an LTE network, a 5G network, a satellite network, and/or any other network for wireless communications (e.g., any 3GPP network and/or any non-3GPP network). Apparatuses, systems, and/or methods described herein may generally be described as implemented on one or more devices (e.g., wireless device, base station, eNB, gNB, computing device, etc.), in one or more networks, but it will be understood that one or more features and steps may be implemented on any device and/or in any network.

Figure 2B:
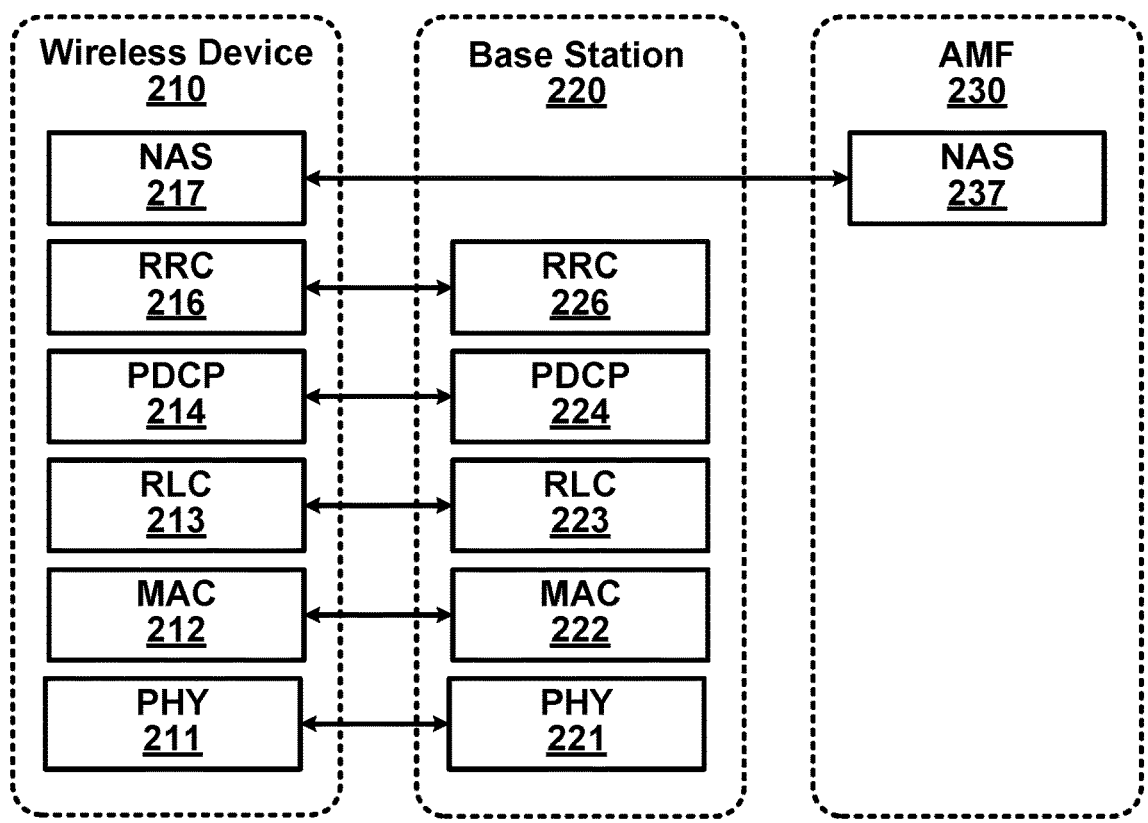
FIG. 2B shows an example control plane configuration.

FIG. 2A shows an example user plane configuration. The user plane configuration may comprise, for example, an NR user plane protocol stack. FIG. 2B shows an example control plane configuration. The control plane configuration may comprise, for example, an NR control plane protocol stack. One or more of the user plane configuration and/or the control plane configuration may use a Uu interface that may be between a wireless device 210 and a base station 220. The protocol stacks shown in FIG. 2A and FIG. 2B may be substantially the same or similar to those used for the Uu interface between, for example, the wireless device 156A and the base station 160A shown in FIG. 1B.

A user plane configuration (e.g., an NR user plane protocol stack) may comprise multiple layers (e.g., five layers or any other quantity of layers) implemented in the wireless device 210 and the base station 220 (e.g., as shown in FIG. 2A). At the bottom of the protocol stack, physical layers (PHYs) 211 and 221 may provide transport services to the higher layers of the protocol stack and may correspond to layer 1 of the Open Systems Interconnection (OSI) model. The protocol layers above PHY 211 may comprise a medium access control layer (MAC) 212, a radio link control layer (RLC) 213, a packet data convergence protocol layer (PDCP) 214, and/or a service data application protocol layer (SDAP) 215. The protocol layers above PHY 221 may comprise a medium access control layer (MAC) 222, a radio link control layer (RLC) 223, a packet data convergence protocol layer (PDCP) 224, and/or a service data application protocol layer (SDAP) 225. One or more of the four protocol layers above PHY 211 may correspond to layer 2, or the data link layer, of the OSI model. One or more of the four protocol layers above PHY 221 may correspond to layer 2, or the data link layer, of the OSI model.

Figure 3:
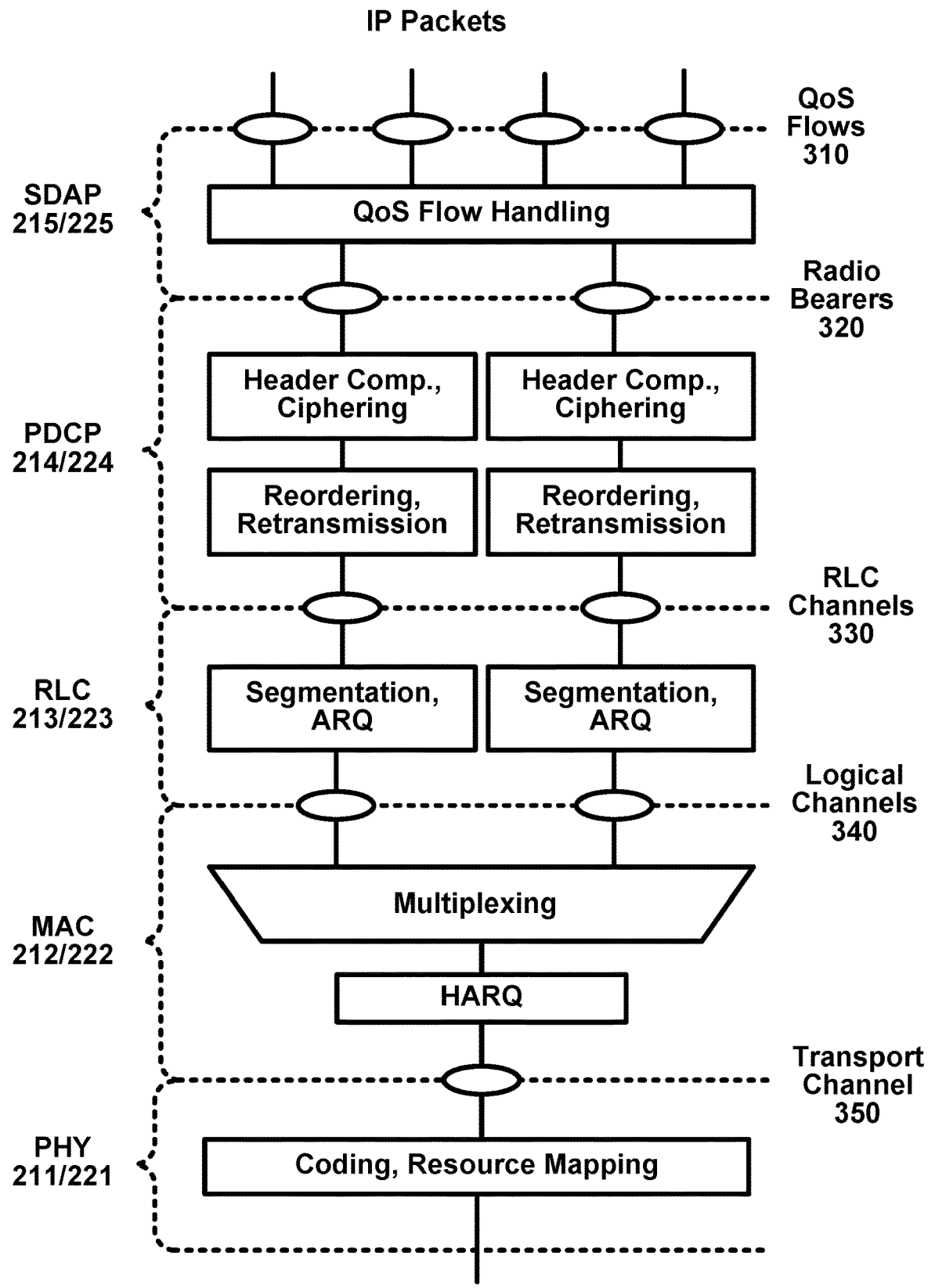
FIG. 3 shows example of protocol layers.

FIG. 3 shows an example of protocol layers. The protocol layers may comprise, for example, protocol layers of the NR user plane protocol stack. One or more services may be provided between protocol layers. SDAPs (e.g., SDAPS 215 and 225 shown in FIG. 2A and FIG. 3) may perform Quality of Service (QoS) flow handling. A wireless device (e.g., the wireless devices 106, 156A, 156B, and 210) may receive services through/via a PDU session, which may be a logical connection between the wireless device and a DN. The PDU session may have one or more QoS flows 310. A UPF (e.g., the UPF 158B) of a CN may map IP packets to the one or more QoS flows of the PDU session, for example, based on one or more QoS requirements (e.g., in terms of delay, data rate, error rate, and/or any other quality/service requirement). The SDAPs 215 and 225 may perform mapping/de-mapping between the one or more QoS flows 310 and one or more radio bearers 320 (e.g., data radio bearers). The mapping/de-mapping between the one or more QoS flows 310 and the radio bearers 320 may be determined by the SDAP 225 of the base station 220. The SDAP 215 of the wireless device 210 may be informed of the mapping between the QoS flows 310 and the radio bearers 320 via reflective mapping and/or control signaling received from the base station 220. For reflective mapping, the SDAP 225 of the base station 220 may mark the downlink packets with a QoS flow indicator (QFI), which may be monitored/detected/identified/indicated/observed by the SDAP 215 of the wireless device 210 to determine the mapping/de-mapping between the one or more QoS flows 310 and the radio bearers 320.

PDCPs (e.g., the PDCPs 214 and 224 shown in FIG. 2A and FIG. 3) may perform header compression/decompression, for example, to reduce the amount of data that may need to be transmitted over the air interface, ciphering/deciphering to prevent unauthorized decoding of data transmitted over the air interface, and/or integrity protection (e.g., to ensure control messages originate from intended sources). The PDCPs 214 and 224 may perform retransmissions of undelivered packets, in-sequence delivery and reordering of packets, and/or removal of packets received in duplicate due to, for example, a handover (e.g., an intra-gNB handover). The PDCPs 214 and 224 may perform packet duplication, for example, to improve the likelihood of the packet being received. A receiver may receive the packet in duplicate and may remove any duplicate packets. Packet duplication may be useful for certain services, such as services that require high reliability.

The PDCP layers (e.g., PDCPs 214 and 224) may perform mapping/de-mapping between a split radio bearer and RLC channels (e.g., RLC channels 330) (e.g., in a dual connectivity scenario/configuration). Dual connectivity may refer to a technique that allows a wireless device to communicate with multiple cells (e.g., two cells) or, more generally, multiple cell groups comprising: a master cell group (MCG) and a secondary cell group (SCG). A split bearer may be configured and/or used, for example, if a single radio bearer (e.g., such as one of the radio bearers provided/configured by the PDCPs 214 and 224 as a service to the SDAPs 215 and 225) is handled by cell groups in dual connectivity. The PDCPs 214 and 224 may map/de-map between the split radio bearer and RLC channels 330 belonging to the cell groups.

RLC layers (e.g., RLCs 213 and 223) may perform segmentation, retransmission via Automatic Repeat Request (ARQ), and/or removal of duplicate data units received from MAC layers (e.g., MACs 212 and 222, respectively). The RLC layers (e.g., RLCs 213 and 223) may support multiple transmission modes (e.g., three transmission modes: transparent mode (TM); unacknowledged mode (UM); and acknowledged mode (AM)). The RLC layers may perform one or more of the noted functions, for example, based on the transmission mode an RLC layer is operating. The RLC configuration may be per logical channel. The RLC configuration may not depend on numerologies and/or Transmission Time Interval (TTI) durations (or other durations). The RLC layers (e.g., RLCs 213 and 223) may provide/configure RLC channels as a service to the PDCP layers (e.g., PDCPs 214 and 224, respectively), such as shown in FIG. 3.

The MAC layers (e.g., MACs 212 and 222) may perform multiplexing/demultiplexing of logical channels and/or mapping between logical channels and transport channels. The multiplexing/demultiplexing may comprise multiplexing/demultiplexing of data units/data portions, belonging to the one or more logical channels, into/from Transport Blocks (TBs) delivered to/from the PHY layers (e.g., PHYs 211 and 221, respectively). The MAC layer of a base station (e.g., MAC 222) may be configured to perform scheduling, scheduling information reporting, and/or priority handling between wireless devices via dynamic scheduling. Scheduling may be performed by a base station (e.g., the base station 220 at the MAC 222) for downlink/or and uplink. The MAC layers (e.g., MACs 212 and 222) may be configured to perform error correction(s) via Hybrid Automatic Repeat Request (HARQ) (e.g., one HARQ entity per carrier in case of Carrier Aggregation (CA)), priority handling between logical channels of the wireless device 210 via logical channel prioritization and/or padding. The MAC layers (e.g., MACs 212 and 222) may support one or more numerologies and/or transmission timings. Mapping restrictions in a logical channel prioritization may control which numerology and/or transmission timing a logical channel may use. The MAC layers (e.g., the MACs 212 and 222) may provide/configure logical channels 340 as a service to the RLC layers (e.g., the RLCs 213 and 223).

The PHY layers (e.g., PHYs 211 and 221) may perform mapping of transport channels to physical channels and/or digital and analog signal processing functions, for example, for sending and/or receiving information (e.g., via an over the air interface). The digital and/or analog signal processing functions may comprise, for example, coding/decoding and/or modulation/demodulation. The PHY layers (e.g., PHYs 211 and 221) may perform multi-antenna mapping. The PHY layers (e.g., the PHYs 211 and 221) may provide/configure one or more transport channels (e.g., transport channels 350) as a service to the MAC layers (e.g., the MACs 212 and 222, respectively).

Figures 4A, 4B:
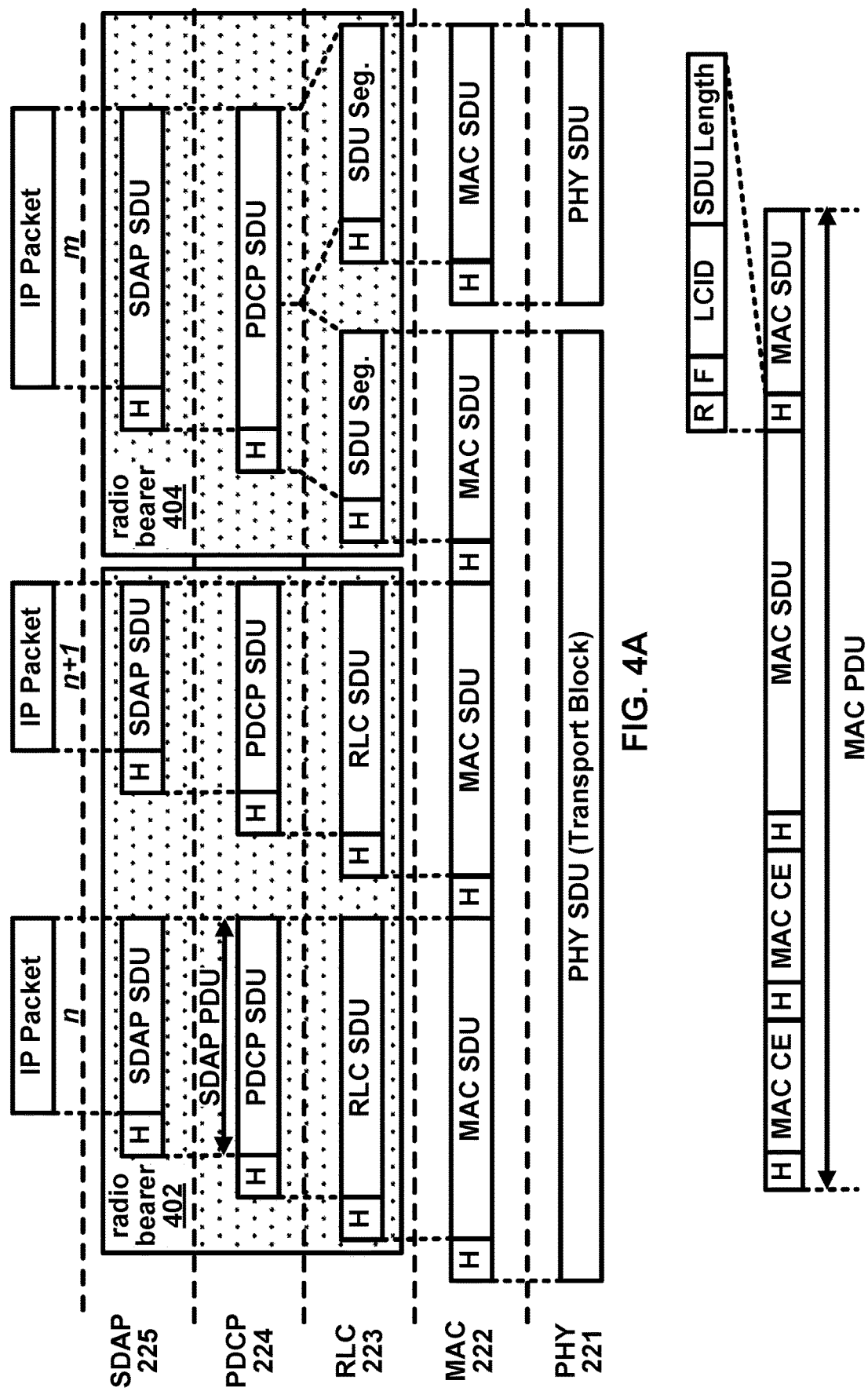
FIG. 4A shows an example downlink data flow for a user plane configuration.
FIG. 4B shows an example format of a Medium Access Control (MAC) subheader in a MAC Protocol Data Unit (PDU).

FIG. 4A shows an example downlink data flow for a user plane configuration. The user plane configuration may comprise, for example, the NR user plane protocol stack shown in FIG. 2A. One or more TBs may be generated, for example, based on a data flow via a user plane protocol stack. As shown in FIG. 4A, a downlink data flow of three IP packets (n, n+1, and m) via the NR user plane protocol stack may generate two TBs (e.g., at the base station 220). An uplink data flow via the NR user plane protocol stack may be similar to the downlink data flow shown in FIG. 4A. The three IP packets (n, n+1, and m) may be determined from the two TBs, for example, based on the uplink data flow via an NR user plane protocol stack. A first quantity of packets (e.g., three or any other quantity) may be determined from a second quantity of TBs (e.g., two or another quantity).

The downlink data flow may begin, for example, if the SDAP 225 receives the three IP packets (or other quantity of IP packets) from one or more QoS flows and maps the three packets (or other quantity of packets) to radio bearers (e.g., radio bearers 402 and 404). The SDAP 225 may map the IP packets n and n+1 to a first radio bearer 402 and map the IP packet m to a second radio bearer 404. An SDAP header (labeled with "H" preceding each SDAP SDU shown in FIG. 4A) may be added to an IP packet to generate an SDAP PDU, which may be referred to as a PDCP SDU. The data unit transferred from/to a higher protocol layer may be referred to as a service data unit (SDU) of the lower protocol layer, and the data unit transferred to/from a lower protocol layer may be referred to as a protocol data unit (PDU) of the higher protocol layer. As shown in FIG. 4A, the data unit from the SDAP 225 may be an SDU of lower protocol layer PDCP 224 (e.g., PDCP SDU) and may be a PDU of the SDAP 225 (e.g., SDAP PDU).

Each protocol layer (e.g., protocol layers shown in FIG. 4A) or at least some protocol layers may: perform its own function(s) (e.g., one or more functions of each protocol layer described with respect to FIG. 3), add a corresponding header, and/or forward a respective output to the next lower layer (e.g., its respective lower layer). The PDCP 224 may perform an IP-header compression and/or ciphering. The PDCP 224 may forward its output (e.g., a PDCP PDU, which is an RLC SDU) to the RLC 223. The RLC 223 may optionally perform segmentation (e.g., as shown for IP packet m in FIG. 4A). The RLC 223 may forward its outputs (e.g., two RLC PDUs, which are two MAC SDUs, generated by adding respective subheaders to two SDU segments (SDU Segs)) to the MAC 222. The MAC 222 may multiplex a number of RLC PDUs (MAC SDUs). The MAC 222 may attach a MAC subheader to an RLC PDU (MAC SDU) to form a TB. The MAC subheaders may be distributed across the MAC PDU (e.g., in an NR configuration as shown in FIG. 4A). The MAC subheaders may be entirely located at the beginning of a MAC PDU (e.g., in an LTE configuration). The NR MAC PDU structure may reduce a processing time and/or associated latency, for example, if the MAC PDU subheaders are computed before assembling the full MAC PDU.

FIG. 4B shows an example format of a MAC subheader in a MAC PDU. A MAC PDU may comprise a MAC subheader (H) and a MAC SDU. Each of one or more MAC subheaders may comprise an SDU length field for indicating the length (e.g., in bytes) of the MAC SDU to which the MAC subheader corresponds; a logical channel identifier (LCID) field for identifying/indicating the logical channel from which the MAC SDU originated to aid in the demultiplexing process; a flag (F) for indicating the size of the SDU length field; and a reserved bit (R) field for future use.

One or more MAC control elements (CEs) may be added to, or inserted into, the MAC PDU by a MAC layer, such as MAC 223 or MAC 222. As shown in FIG. 4B, two MAC CEs may be inserted/added before two MAC PDUs. The MAC CEs may be inserted/added at the beginning of a MAC PDU for downlink transmissions (as shown in FIG. 4B). One or more MAC CEs may be inserted/added at the end of a MAC PDU for uplink transmissions. MAC CEs may be used for in band control signaling. Example MAC CEs may comprise scheduling-related MAC CEs, such as buffer status reports and power headroom reports; activation/deactivation MAC CEs (e.g., MAC CEs for activation/deactivation of PDCP duplication detection, channel state information (CSI) reporting, sounding reference signal (SRS) transmission, and prior configured components); discontinuous reception (DRX)-related MAC CEs; timing advance MAC CEs; and random access-related MAC CEs. A MAC CE may be preceded by a MAC subheader with a similar format as described for the MAC subheader for MAC SDUs and may be identified with a reserved value in the LCID field that indicates the type of control information included in the corresponding MAC CE.

Figures 5A, 5B:
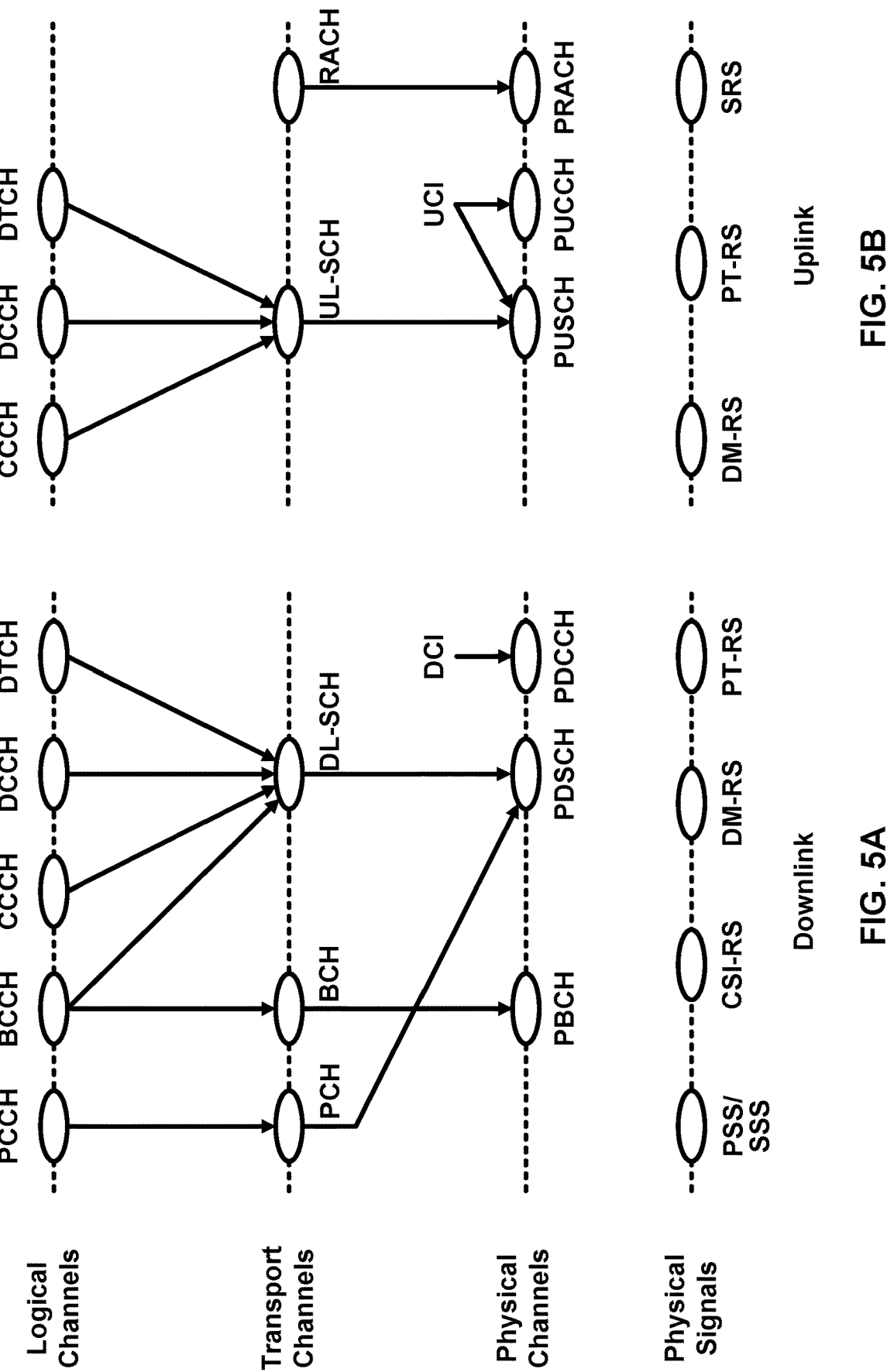
FIG. 5A shows an example mapping for downlink channels.
FIG. 5B shows an example mapping for uplink channels.

FIG. 5A shows an example mapping for downlink channels. The mapping for uplink channels may comprise mapping between channels (e.g., logical channels, transport channels, and physical channels) for downlink. FIG. 5B shows an example mapping for uplink channels. The mapping for uplink channels may comprise mapping between channels (e.g., logical channels, transport channels, and physical channels) for uplink. Information may be passed through/via channels between the RLC, the MAC, and the PHY layers of a protocol stack (e.g., the NR protocol stack). A logical channel may be used between the RLC and the MAC layers. The logical channel may be classified/indicated as a control channel that may carry control and/or configuration information (e.g., in the NR control plane), or as a traffic channel that may carry data (e.g., in the NR user plane). A logical channel may be classified/indicated as a dedicated logical channel that may be dedicated to a specific wireless device, and/or as a common logical channel that may be used by more than one wireless device (e.g., a group of wireless device).

A logical channel may be defined by the type of information it carries. The set of logical channels (e.g., in an NR configuration) may comprise one or more channels described below. A paging control channel (PCCH) may comprise/carry one or more paging messages used to page a wireless device whose location is not known to the network on a cell level. A broadcast control channel (BCCH) may comprise/carry system information messages in the form of a master information block (MIB) and several system information blocks (SIBs). The system information messages may be used by wireless devices to obtain information about how a cell is configured and how to operate within the cell. A common control channel (CCCH) may comprise/carry control messages together with random access. A dedicated control channel (DCCH) may comprise/carry control messages to/from a specific wireless device to configure the wireless device with configuration information. A dedicated traffic channel (DTCH) may comprise/carry user data to/from a specific wireless device.

Transport channels may be used between the MAC and PHY layers. Transport channels may be defined by how the information they carry is sent/transmitted (e.g., via an over the air interface). The set of transport channels (e.g., that may be defined by an NR configuration or any other configuration) may comprise one or more of the following channels. A paging channel (PCH) may comprise/carry paging messages that originated from the PCCH. A broadcast channel (BCH) may comprise/carry the MIB from the BCCH. A downlink shared channel (DL-SCH) may comprise/carry downlink data and signaling messages, including the SIBs from the BCCH. An uplink shared channel (UL-SCH) may comprise/carry uplink data and signaling messages. A random access channel (RACH) may provide a wireless device with an access to the network without any prior scheduling.

The PHY layer may use physical channels to pass/transfer information between processing levels of the PHY layer. A physical channel may have an associated set of time-frequency resources for carrying the information of one or more transport channels. The PHY layer may generate control information to support the low-level operation of the PHY layer. The PHY layer may provide/transfer the control information to the lower levels of the PHY layer via physical control channels (e.g., referred to as L1/L2 control channels). The set of physical channels and physical control channels (e.g., that may be defined by an NR configuration or any other configuration) may comprise one or more of the following channels. A physical broadcast channel (PBCH) may comprise/carry the MIB from the BCH. A physical downlink shared channel (PDSCH) may comprise/carry downlink data and signaling messages from the DL-SCH, as well as paging messages from the PCH. A physical downlink control channel (PDCCH) may comprise/carry downlink control information (DCI), which may comprise downlink scheduling commands, uplink scheduling grants, and uplink power control commands A physical uplink shared channel (PUSCH) may comprise/carry uplink data and signaling messages from the UL-SCH and in some instances uplink control information (UCI) as described below. A physical uplink control channel (PUCCH) may comprise/carry UCI, which may comprise HARQ acknowledgments, channel quality indicators (CQI), pre-coding matrix indicators (PMI), rank indicators (RI), and scheduling requests (SR). A physical random access channel (PRACH) may be used for random access.

The physical layer may generate physical signals to support the low-level operation of the physical layer, which may be similar to the physical control channels. As shown in FIG. 5A and FIG. 5B, the physical layer signals (e.g., that may be defined by an NR configuration or any other configuration) may comprise primary synchronization signals (PSS), secondary synchronization signals (SSS), channel state information reference signals (CSI-RS), demodulation reference signals (DM-RS), sounding reference signals (SRS), phase-tracking reference signals (PT RS), and/or any other signals.

One or more of the channels (e.g., logical channels, transport channels, physical channels, etc.) may be used to carry out functions associated with the control plan protocol stack (e.g., NR control plane protocol stack). FIG. 2B shows an example control plane configuration (e.g., an NR control plane protocol stack). As shown in FIG. 2B, the control plane configuration (e.g., the NR control plane protocol stack) may use substantially the same/similar one or more protocol layers (e.g., PHY 211 and 221, MAC 212 and 222, RLC 213 and 223, and PDCP 214 and 224) as the example user plane configuration (e.g., the NR user plane protocol stack). Similar four protocol layers may comprise the PHYs 211 and 221, the MACs 212 and 222, the RLCs 213 and 223, and the PDCPs 214 and 224. The control plane configuration (e.g., the NR control plane stack) may have radio resource controls (RRCs) 216 and 226 and NAS protocols 217 and 237 at the top of the control plane configuration (e.g., the NR control plane protocol stack), for example, instead of having the SDAPs 215 and 225. The control plane configuration may comprise an AMF 230 comprising the NAS protocol 237.

The NAS protocols 217 and 237 may provide control plane functionality between the wireless device 210 and the AMF 230 (e.g., the AMF 158A or any other AMF) and/or, more generally, between the wireless device 210 and a CN (e.g., the CN 152 or any other CN). The NAS protocols 217 and 237 may provide control plane functionality between the wireless device 210 and the AMF 230 via signaling messages, referred to as NAS messages. There may be no direct path between the wireless device 210 and the AMF 230 via which the NAS messages may be transported. The NAS messages may be transported using the AS of the Uu and NG interfaces. The NAS protocols 217 and 237 may provide control plane functionality, such as authentication, security, a connection setup, mobility management, session management, and/or any other functionality.

The RRCs 216 and 226 may provide/configure control plane functionality between the wireless device 210 and the base station 220 and/or, more generally, between the wireless device 210 and the RAN (e.g., the base station 220). The RRC layers 216 and 226 may provide/configure control plane functionality between the wireless device 210 and the base station 220 via signaling messages, which may be referred to as RRC messages. The RRC messages may be transmitted between the wireless device 210 and the RAN (e.g., the base station 220) using signaling radio bearers and the same/similar PDCP, RLC, MAC, and PHY protocol layers. The MAC layer may multiplex control-plane and user-plane data into the same TB. The RRC layers 216 and 226 may provide/configure control plane functionality, such as one or more of the following functionalities: broadcast of system information related to AS and NAS; paging initiated by the CN or the RAN; establishment, maintenance and release of an RRC connection between the wireless device 210 and the RAN (e.g., the base station 220); security functions including key management; establishment, configuration, maintenance and release of signaling radio bearers and data radio bearers; mobility functions; QoS management functions; wireless device measurement reporting (e.g., the wireless device measurement reporting) and control of the reporting; detection of and recovery from radio link failure (RLF); and/or NAS message transfer. As part of establishing an RRC connection, RRC layers 216 and 226 may establish an RRC context, which may involve configuring parameters for communication between the wireless device 210 and the RAN (e.g., the base station 220).

Figure 6:
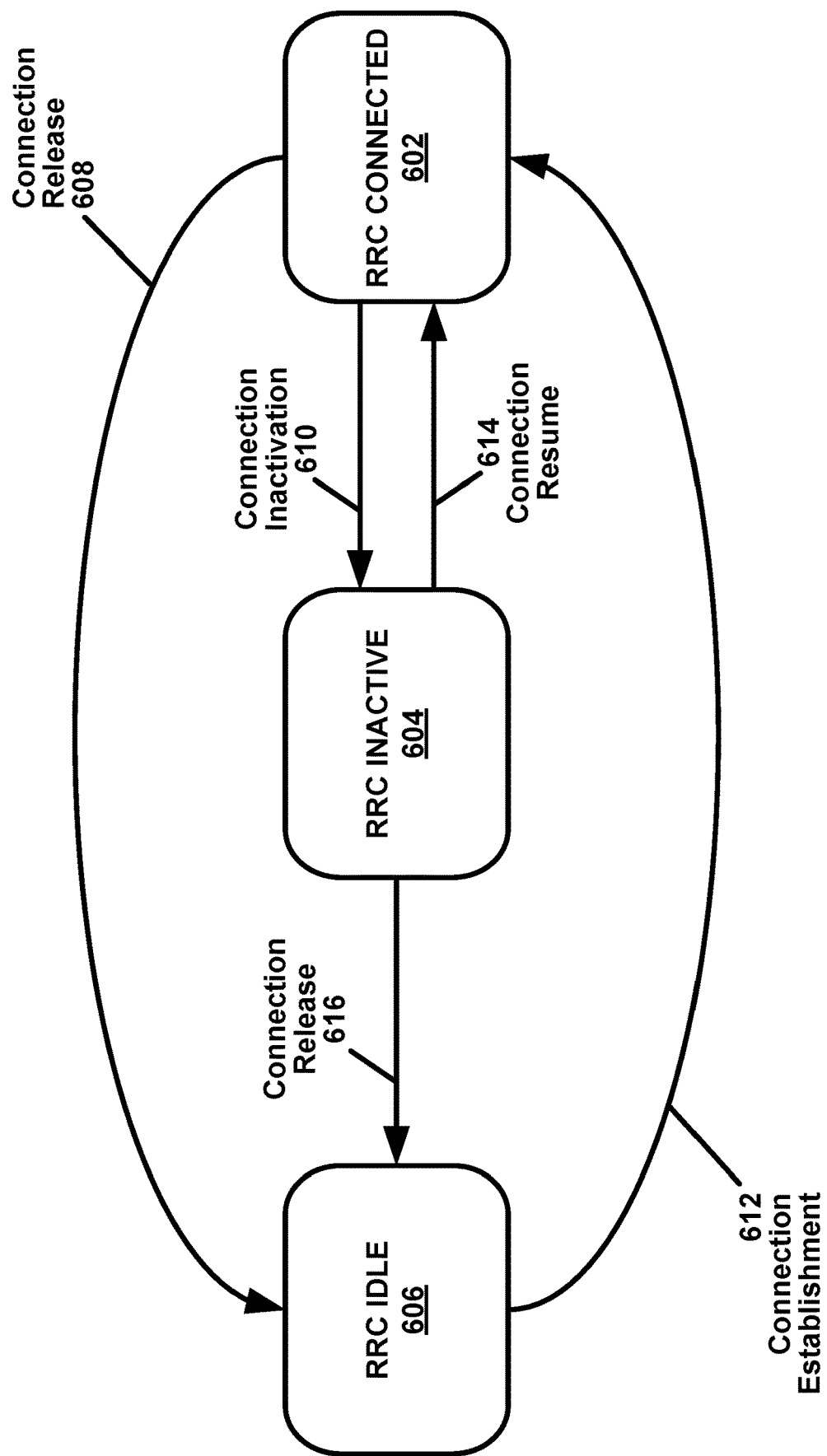
FIG. 6 shows example radio resource control (RRC) states and RRC state transitions.

FIG. 6 shows example RRC states and RRC state transitions. An RRC state of a wireless device may be changed to another RRC state (e.g., RRC state transitions of a wireless device). The wireless device may be substantially the same or similar to the wireless device 106, 210, or any other wireless device. A wireless device may be in at least one of a plurality of states, such as three RRC states comprising RRC connected 602 (e.g., RRC_CONNECTED), RRC idle 606 (e.g., RRC_IDLE), and RRC inactive 604 (e.g., RRC_INACTIVE). The RRC inactive 604 may be RRC connected but inactive.

An RRC connection may be established for the wireless device. For example, this may be during an RRC connected state. During the RRC connected state (e.g., during the RRC connected 602), the wireless device may have an established RRC context and may have at least one RRC connection with a base station. The base station may be similar to one of the one or more base stations (e.g., one or more base stations of the RAN 104 shown in FIG. 1A, one of the gNBs 160 or ng-eNBs 162 shown in FIG. 1B, the base station 220 shown in FIG. 2A and FIG. 2B, or any other base stations). The base station with which the wireless device is connected (e.g., has established an RRC connection) may have the RRC context for the wireless device. The RRC context, which may be referred to as a wireless device context (e.g., the UE context), may comprise parameters for communication between the wireless device and the base station. These parameters may comprise, for example, one or more of: AS contexts; radio link configuration parameters; bearer configuration information (e.g., relating to a data radio bearer, a signaling radio bearer, a logical channel, a QoS flow, and/or a PDU session); security information; and/or layer configuration information (e.g., PHY, MAC, RLC, PDCP, and/or SDAP layer configuration information). During the RRC connected state (e.g., the RRC connected 602), mobility of the wireless device may be managed/controlled by an RAN (e.g., the RAN 104 or the NG RAN 154). The wireless device may measure received signal levels (e.g., reference signal levels, reference signal received power, reference signal received quality, received signal strength indicator, etc.) based on one or more signals sent from a serving cell and neighboring cells. The wireless device may report these measurements to a serving base station (e.g., the base station currently serving the wireless device). The serving base station of the wireless device may request a handover to a cell of one of the neighboring base stations, for example, based on the reported measurements. The RRC state may transition from the RRC connected state (e.g., RRC connected 602) to an RRC idle state (e.g., the RRC idle 606) via a connection release procedure 608. The RRC state may transition from the RRC connected state (e.g., RRC connected 602) to the RRC inactive state (e.g., RRC inactive 604) via a connection inactivation procedure 610.

An RRC context may not be established for the wireless device. For example, this may be during the RRC idle state. During the RRC idle state (e.g., the RRC idle 606), an RRC context may not be established for the wireless device. During the RRC idle state (e.g., the RRC idle 606), the wireless device may not have an RRC connection with the base station. During the RRC idle state (e.g., the RRC idle 606), the wireless device may be in a sleep state for the majority of the time (e.g., to conserve battery power). The wireless device may wake up periodically (e.g., once in every discontinuous reception (DRX) cycle) to monitor for paging messages (e.g., paging messages set from the RAN). Mobility of the wireless device may be managed by the wireless device via a procedure of a cell reselection. The RRC state may transition from the RRC idle state (e.g., the RRC idle 606) to the RRC connected state (e.g., the RRC connected 602) via a connection establishment procedure 612, which may involve a random access procedure.

A previously established RRC context may be maintained for the wireless device. For example, this may be during the RRC inactive state. During the RRC inactive state (e.g., the RRC inactive 604), the RRC context previously established may be maintained in the wireless device and the base station. The maintenance of the RRC context may enable/allow a fast transition to the RRC connected state (e.g., the RRC connected 602) with reduced signaling overhead as compared to the transition from the RRC idle state (e.g., the RRC idle 606) to the RRC connected state (e.g., the RRC connected 602). During the RRC inactive state (e.g., the RRC inactive 604), the wireless device may be in a sleep state and mobility of the wireless device may be managed/controlled by the wireless device via a cell reselection. The RRC state may transition from the RRC inactive state (e.g., the RRC inactive 604) to the RRC connected state (e.g., the RRC connected 602) via a connection resume procedure 614. The RRC state may transition from the RRC inactive state (e.g., the RRC inactive 604) to the RRC idle state (e.g., the RRC idle 606) via a connection release procedure 616 that may be the same as or similar to connection release procedure 608.

An RRC state may be associated with a mobility management mechanism. During the RRC idle state (e.g., RRC idle 606) and the RRC inactive state (e.g., the RRC inactive 604), mobility may be managed/controlled by the wireless device via a cell reselection. The purpose of mobility management during the RRC idle state (e.g., the RRC idle 606) or during the RRC inactive state (e.g., the RRC inactive 604) may be to enable/allow the network to be able to notify the wireless device of an event via a paging message without having to broadcast the paging message over the entire mobile communications network. The mobility management mechanism used during the RRC idle state (e.g., the RRC idle 606) or during the RRC idle state (e.g., the RRC inactive 604) may enable/allow the network to track the wireless device on a cell-group level, for example, so that the paging message may be broadcast over the cells of the cell group that the wireless device currently resides within (e.g., instead of sending the paging message over the entire mobile communication network). The mobility management mechanisms for the RRC idle state (e.g., the RRC idle 606) and the RRC inactive state (e.g., the RRC inactive 604) may track the wireless device on a cell-group level. The mobility management mechanisms may do the tracking, for example, using different granularities of grouping. There may be a plurality of levels of cell-grouping granularity (e.g., three levels of cell-grouping granularity: individual cells; cells within a RAN area identified by a RAN area identifier (RAI); and cells within a group of RAN areas, referred to as a tracking area and identified by a tracking area identifier (TAI)).

Tracking areas may be used to track the wireless device (e.g., tracking the location of the wireless device at the CN level). The CN (e.g., the CN 102, the 5G CN 152, or any other CN) may send to the wireless device a list of TAIs associated with a wireless device registration area (e.g., a UE registration area). A wireless device may perform a registration update with the CN to allow the CN to update the location of the wireless device and provide the wireless device with a new the UE registration area, for example, if the wireless device moves (e.g., via a cell reselection) to a cell associated with a TAI that may not be included in the list of TAIs associated with the UE registration area.

RAN areas may be used to track the wireless device (e.g., the location of the wireless device at the RAN level). For a wireless device in an RRC inactive state (e.g., the RRC inactive 604), the wireless device may be assigned/provided/configured with a RAN notification area. A RAN notification area may comprise one or more cell identities (e.g., a list of RAIs and/or a list of TAIs). A base station may belong to one or more RAN notification areas. A cell may belong to one or more RAN notification areas. A wireless device may perform a notification area update with the RAN to update the RAN notification area of the wireless device, for example, if the wireless device moves (e.g., via a cell reselection) to a cell not included in the RAN notification area assigned/provided/configured to the wireless device.

A base station storing an RRC context for a wireless device or a last serving base station of the wireless device may be referred to as an anchor base station. An anchor base station may maintain an RRC context for the wireless device at least during a period of time that the wireless device stays in a RAN notification area of the anchor base station and/or during a period of time that the wireless device stays in an RRC inactive state (e.g., RRC inactive 604).

A base station (e.g., gNBs 160 in FIG. 1B or any other base station) may be split in two parts: a central unit (e.g., a base station central unit, such as a gNB CU) and one or more distributed units (e.g., a base station distributed unit, such as a gNB DU). A base station central unit (CU) may be coupled to one or more base station distributed units (DUs) using an F1 interface (e.g., an F1 interface defined in an NR configuration). The base station CU may comprise the RRC, the PDCP, and the SDAP layers. A base station distributed unit (DU) may comprise the RLC, the MAC, and the PHY layers.

The physical signals and physical channels (e.g., described with respect to FIG. 5A and FIG. 5B) may be mapped onto one or more symbols (e.g., orthogonal frequency divisional multiplexing (OFDM) symbols in an NR configuration or any other symbols). OFDM is a multicarrier communication scheme that transmits data over F orthogonal subcarriers (or tones). The data may be mapped to a series of complex symbols (e.g., M-quadrature amplitude modulation (M-QAM) symbols or M-phase shift keying (M PSK) symbols or any other modulated symbols), referred to as source symbols, and divided into F parallel symbol streams, for example, before transmission of the data. The F parallel symbol streams may be treated as if they are in the frequency domain. The F parallel symbols may be used as inputs to an Inverse Fast Fourier Transform (IFFT) block that transforms them into the time domain. The IFFT block may take in F source symbols at a time, one from each of the F parallel symbol streams. The IFFT block may use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. An OFDM symbol provided/output by the IFFT block may be sent/transmitted over the air interface on a carrier frequency, for example, after one or more processes (e.g., addition of a cyclic prefix) and up-conversion. The F parallel symbol streams may be mixed, for example, using a Fast Fourier Transform (FFT) block before being processed by the IFFT block. This operation may produce Discrete Fourier Transform (DFT)-precoded OFDM symbols and may be used by one or more wireless devices in the uplink to reduce the peak to average power ratio (PAPR). Inverse processing may be performed on the OFDM symbol at a receiver using an FFT block to recover the data mapped to the source symbols.

Figure 7:
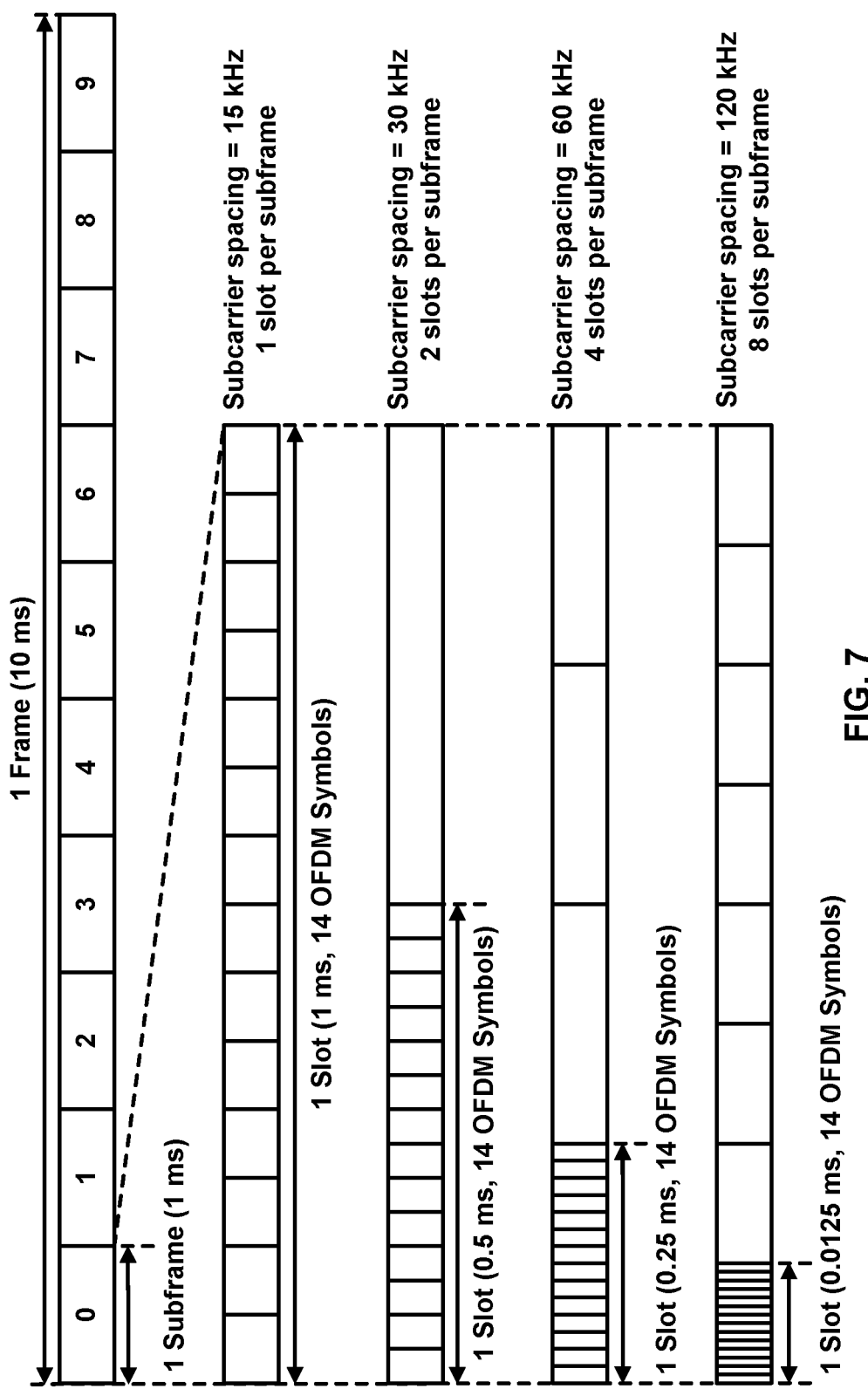
FIG. 7 shows an example configuration of a frame.

FIG. 7 shows an example configuration of a frame. The frame may comprise, for example, an NR radio frame into which OFDM symbols may be grouped. A frame (e.g., an NR radio frame) may be identified/indicated by a system frame number (SFN) or any other value. The SFN may repeat with a period of 1024 frames. One NR frame may be 10 milliseconds (ms) in duration and may comprise 10 subframes that are 1 ms in duration. A subframe may be divided into one or more slots (e.g., depending on numerologies and/or different subcarrier spacings). Each of the one or more slots may comprise, for example, 14 OFDM symbols per slot. Any quantity of symbols, slots, or duration may be used for any time interval.

The duration of a slot may depend on the numerology used for the OFDM symbols of the slot. A flexible numerology may be supported, for example, to accommodate different deployments (e.g., cells with carrier frequencies below 1 GHz up to cells with carrier frequencies in the mm-wave range). A flexible numerology may be supported, for example, in an NR configuration or any other radio configurations. A numerology may be defined in terms of subcarrier spacing and/or cyclic prefix duration. Subcarrier spacings may be scaled up by powers of two from a baseline subcarrier spacing of 15 kHz. Cyclic prefix durations may be scaled down by powers of two from a baseline cyclic prefix duration of 4.7 µs, for example, for a numerology in an NR configuration or any other radio configurations. Numerologies may be defined with the following subcarrier spacing/cyclic prefix duration combinations: 15 kHz/4.7 µs; 30 kHz/2.3 µs; 60 kHz/1.2 µs; 120 kHz/0.59 µs; 240 kHz/0.29 µs, and/or any other subcarrier spacing/cyclic prefix duration combinations.

A slot may have a fixed number/quantity of OFDM symbols (e.g., 14 OFDM symbols). A numerology with a higher subcarrier spacing may have a shorter slot duration and more slots per subframe. Examples of numerology-dependent slot duration and slots-per-subframe transmission structure are shown in FIG. 7 (the numerology with a subcarrier spacing of 240 kHz is not shown in FIG. 7). A subframe (e.g., in an NR configuration) may be used as a numerology-independent time reference. A slot may be used as the unit upon which uplink and downlink transmissions are scheduled. Scheduling (e.g., in an NR configuration) may be decoupled from the slot duration. Scheduling may start at any OFDM symbol. Scheduling may last for as many symbols as needed for a transmission, for example, to support low latency. These partial slot transmissions may be referred to as mini-slot or sub-slot transmissions.

Figure 8:
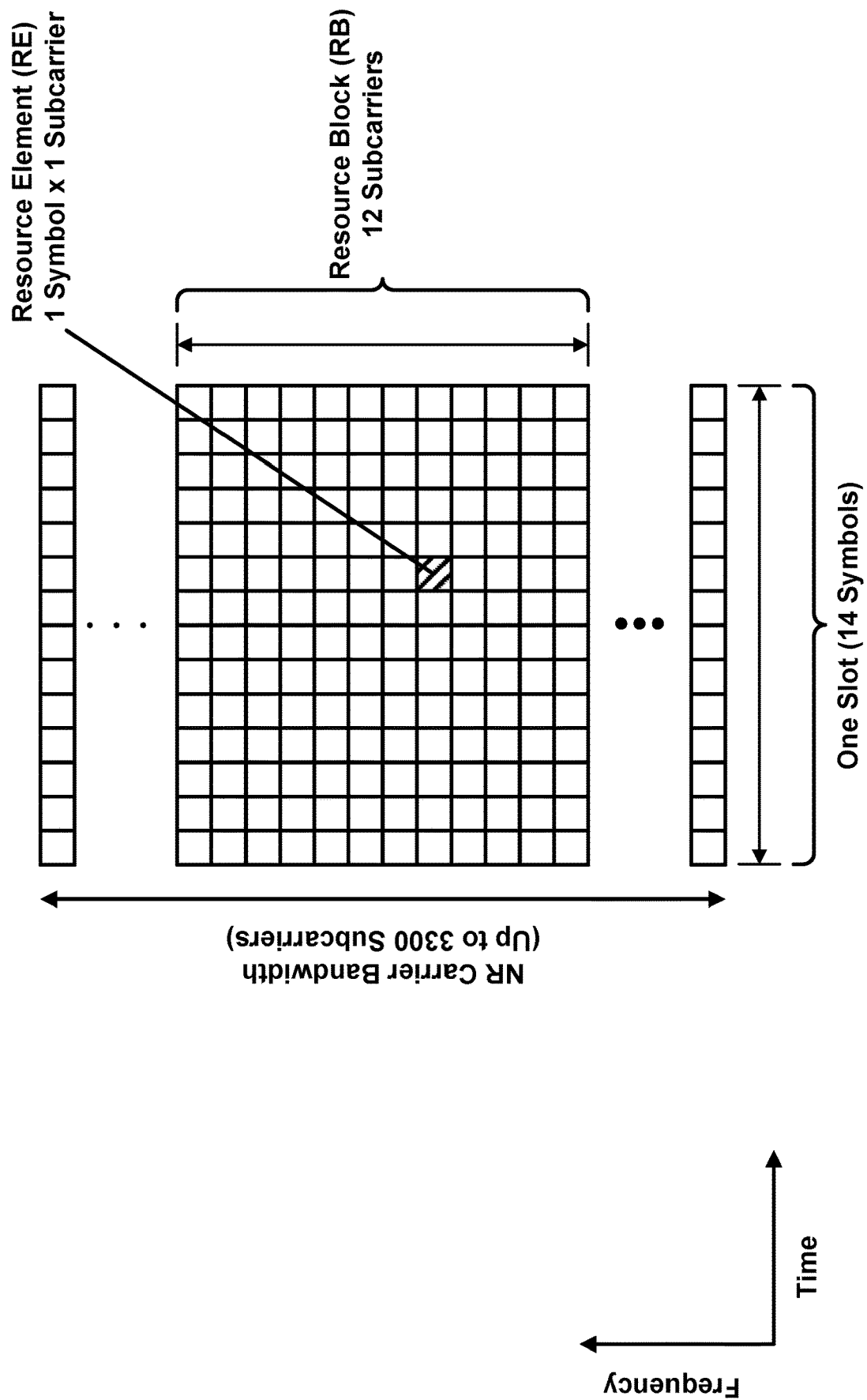
FIG. 8 shows an example resource configuration of one or more carriers.

FIG. 8 shows an example resource configuration of one or more carriers. The resource configuration of may comprise a slot in the time and frequency domain for an NR carrier or any other carrier. The slot may comprise resource elements (REs) and resource blocks (RBs). A resource element (RE) may be the smallest physical resource (e.g., in an NR configuration). An RE may span one OFDM symbol in the time domain by one subcarrier in the frequency domain, such as shown in FIG. 8. An RB may span twelve consecutive REs in the frequency domain, such as shown in FIG. 8. A carrier (e.g., an NR carrier) may be limited to a width of a certain quantity of RBs and/or subcarriers (e.g., 275 RBs or 275×12=3300 subcarriers). Such limitation(s), if used, may limit the carrier (e.g., NR carrier) frequency based on subcarrier spacing (e.g., carrier frequency of 50, 100, 200, and 400 MHz for subcarrier spacings of 15, 30, 60, and 120 kHz, respectively). A 400 MHz bandwidth may be set based on a 400 MHz per carrier bandwidth limit. Any other bandwidth may be set based on a per carrier bandwidth limit.

A single numerology may be used across the entire bandwidth of a carrier (e.g., an NR such as shown in FIG. 8). In other example configurations, multiple numerologies may be supported on the same carrier. NR and/or other access technologies may support wide carrier bandwidths (e.g., up to 400 MHz for a subcarrier spacing of 120 kHz). Not all wireless devices may be able to receive the full carrier bandwidth (e.g., due to hardware limitations and/or different wireless device capabilities). Receiving and/or utilizing the full carrier bandwidth may be prohibitive, for example, in terms of wireless device power consumption. A wireless device may adapt the size of the receive bandwidth of the wireless device, for example, based on the amount of traffic the wireless device is scheduled to receive (e.g., to reduce power consumption and/or for other purposes). Such an adaptation may be referred to as bandwidth adaptation.

Configuration of one or more bandwidth parts (BWPs) may support one or more wireless devices not capable of receiving the full carrier bandwidth. BWPs may support bandwidth adaptation, for example, for such wireless devices not capable of receiving the full carrier bandwidth. A BWP (e.g., a BWP of an NR configuration) may be defined by a subset of contiguous RBs on a carrier. A wireless device may be configured (e.g., via an RRC layer) with one or more downlink BWPs per serving cell and one or more uplink BWPs per serving cell (e.g., up to four downlink BWPs per serving cell and up to four uplink BWPs per serving cell). One or more of the configured BWPs for a serving cell may be active, for example, at a given time. The one or more BWPs may be referred to as active BWPs of the serving cell. A serving cell may have one or more first active BWPs in the uplink carrier and one or more second active BWPs in the secondary uplink carrier, for example, if the serving cell is configured with a secondary uplink carrier.

A downlink BWP from a set of configured downlink BWPs may be linked with an uplink BWP from a set of configured uplink BWPs (e.g., for unpaired spectra). A downlink BWP and an uplink BWP may be linked, for example, if a downlink BWP index of the downlink BWP and an uplink BWP index of the uplink BWP are the same. A wireless device may expect that the center frequency for a downlink BWP is the same as the center frequency for an uplink BWP (e.g., for unpaired spectra).

A base station may configure a wireless device with one or more control resource sets (CORESETs) for at least one search space. The base station may configure the wireless device with one or more CORESTS, for example, for a downlink BWP in a set of configured downlink BWPs on a primary cell (PCell) or on a secondary cell (SCell). A search space may comprise a set of locations in the time and frequency domains where the wireless device may monitor/find/detect/identify control information. The search space may be a wireless device-specific search space (e.g., a UE-specific search space) or a common search space (e.g., potentially usable by a plurality of wireless devices or a group of wireless user devices). A base station may configure a group of wireless devices with a common search space, on a PCell or on a primary secondary cell (PSCell), in an active downlink BWP.

A base station may configure a wireless device with one or more resource sets for one or more PUCCH transmissions, for example, for an uplink BWP in a set of configured uplink BWPs. A wireless device may receive downlink receptions (e.g., PDCCH or PDSCH) in a downlink BWP, for example, according to a configured numerology (e.g., a configured subcarrier spacing and/or a configured cyclic prefix duration) for the downlink BWP. The wireless device may send/transmit uplink transmissions (e.g., PUCCH or PUSCH) in an uplink BWP, for example, according to a configured numerology (e.g., a configured subcarrier spacing and/or a configured cyclic prefix length for the uplink BWP).

One or more BWP indicator fields may be provided/comprised in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a wireless device with a default downlink BWP within a set of configured downlink BWPs associated with a PCell. A default downlink BWP may be an initial active downlink BWP, for example, if the base station does not provide/configure a default downlink BWP to/for the wireless device. The wireless device may determine which BWP is the initial active downlink BWP, for example, based on a CORESET configuration obtained using the PBCH.

A base station may configure a wireless device with a BWP inactivity timer value for a PCell. The wireless device may start or restart a BWP inactivity timer at any appropriate time. The wireless device may start or restart the BWP inactivity timer, for example, if one or more conditions are satisfied. The one or more conditions may comprise at least one of: the wireless device detects DCI indicating an active downlink BWP other than a default downlink BWP for a paired spectra operation; the wireless device detects DCI indicating an active downlink BWP other than a default downlink BWP for an unpaired spectra operation; and/or the wireless device detects DCI indicating an active uplink BWP other than a default uplink BWP for an unpaired spectra operation. The wireless device may start/run the BWP inactivity timer toward expiration (e.g., increment from zero to the BWP inactivity timer value, or decrement from the BWP inactivity timer value to zero), for example, if the wireless device does not detect DCI during a time interval (e.g., 1 ms or 0.5 ms). The wireless device may switch from the active downlink BWP to the default downlink BWP, for example, if the BWP inactivity timer expires.

A base station may semi-statically configure a wireless device with one or more BWPs. A wireless device may switch an active BWP from a first BWP to a second BWP, for example, after or in response to receiving DCI indicating the second BWP as an active BWP. A wireless device may switch an active BWP from a first BWP to a second BWP, for example, after or in response to an expiry of the BWP inactivity timer (e.g., if the second BWP is the default BWP).

A downlink BWP switching may refer to switching an active downlink BWP from a first downlink BWP to a second downlink BWP (e.g., the second downlink BWP is activated and the first downlink BWP is deactivated). An uplink BWP switching may refer to switching an active uplink BWP from a first uplink BWP to a second uplink BWP (e.g., the second uplink BWP is activated and the first uplink BWP is deactivated). Downlink and uplink BWP switching may be performed independently (e.g., in paired spectrum/spectra). Downlink and uplink BWP switching may be performed simultaneously (e.g., in unpaired spectrum/spectra). Switching between configured BWPs may occur, for example, based on RRC signaling, DCI signaling, expiration of a BWP inactivity timer, and/or an initiation of random access.

Figure 9:
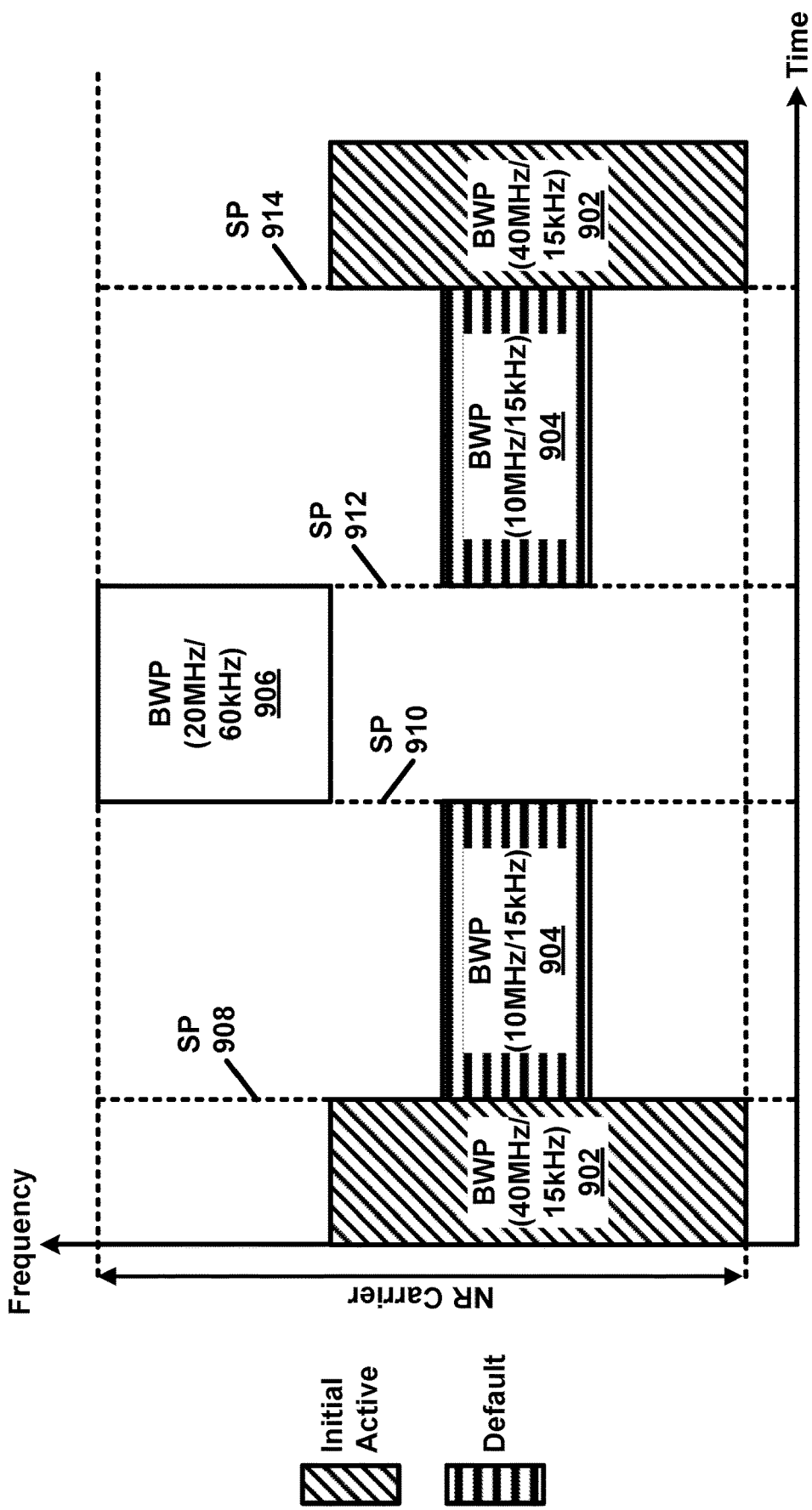
FIG. 9 shows an example configuration of bandwidth parts (BWPs).

FIG. 9 shows an example of configured BWPs. Bandwidth adaptation using multiple BWPs (e.g., three configured BWPs for an NR carrier) may be available. A wireless device configured with multiple BWPs (e.g., the three BWPs) may switch from one BWP to another BWP at a switching point. The BWPs may comprise: a BWP 902 having a bandwidth of 40 MHz and a subcarrier spacing of 15 kHz; a BWP 904 having a bandwidth of 10 MHz and a subcarrier spacing of 15 kHz; and a BWP 906 having a bandwidth of 20 MHz and a subcarrier spacing of 60 kHz. The BWP 902 may be an initial active BWP, and the BWP 904 may be a default BWP. The wireless device may switch between BWPs at switching points. The wireless device may switch from the BWP 902 to the BWP 904 at a switching point 908. The switching at the switching point 908 may occur for any suitable reasons. The switching at a switching point 908 may occur, for example, after or in response to an expiry of a BWP inactivity timer (e.g., indicating switching to the default BWP). The switching at the switching point 908 may occur, for example, after or in response to receiving DCI indicating BWP 904 as the active BWP. The wireless device may switch at a switching point 910 from an active BWP 904 to the BWP 906, for example, after or in response receiving DCI indicating BWP 906 as a new active BWP. The wireless device may switch at a switching point 912 from an active BWP 906 to the BWP 904, for example, after or in response to an expiry of a BWP inactivity timer. The wireless device may switch at the switching point 912 from an active BWP 906 to the BWP 904, for example, after or in response receiving DCI indicating BWP 904 as a new active BWP. The wireless device may switch at a switching point 914 from an active BWP 904 to the BWP 902, for example, after or in response receiving DCI indicating the BWP 902 as a new active BWP.

Wireless device procedures for switching BWPs on a secondary cell may be the same/similar as those on a primary cell, for example, if the wireless device is configured for a secondary cell with a default downlink BWP in a set of configured downlink BWPs and a timer value. The wireless device may use the timer value and the default downlink BWP for the secondary cell in the same/similar manner as the wireless device uses the timer value and/or default BWPs for a primary cell. The timer value (e.g., the BWP inactivity timer) may be configured per cell (e.g., for one or more BWPs), for example, via RRC signaling or any other signaling. One or more active BWPs may switch to another BWP, for example, based on an expiration of the BWP inactivity timer.

Two or more carriers may be aggregated and data may be simultaneously transmitted to/from the same wireless device using carrier aggregation (CA) (e.g., to increase data rates). The aggregated carriers in CA may be referred to as component carriers (CCs). There may be a number/quantity of serving cells for the wireless device (e.g., one serving cell for a CC), for example, if CA is configured/used. The CCs may have multiple configurations in the frequency domain.

Figure 10A:
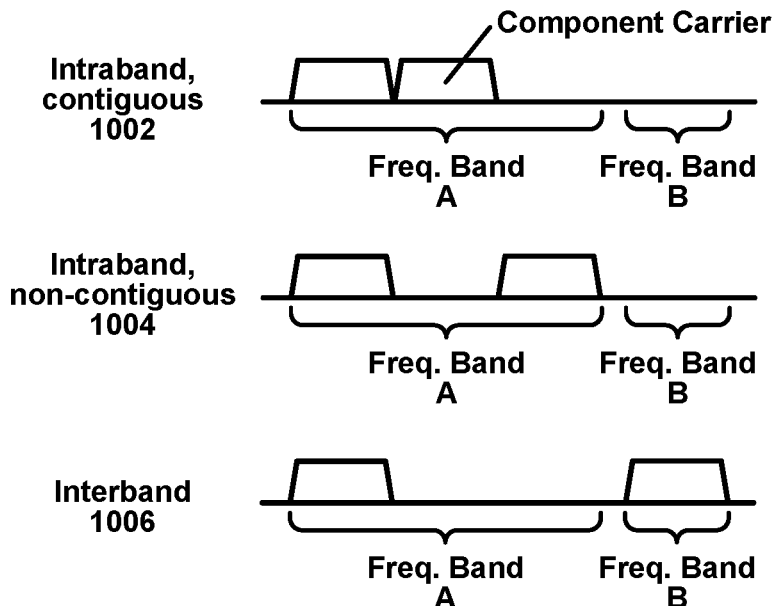
FIG. 10A shows example carrier aggregation configurations based on component carriers.

FIG. 10A shows example CA configurations based on CCs. As shown in FIG. 10A, three types of CA configurations may comprise an intraband (contiguous) configuration 1002, an intraband (non-contiguous) configuration 1004, and/or an interband configuration 1006. In the intraband (contiguous) configuration 1002, two CCs may be aggregated in the same frequency band (frequency band A) and may be located directly adjacent to each other within the frequency band. In the intraband (non-contiguous) configuration 1004, two CCs may be aggregated in the same frequency band (frequency band A) but may be separated from each other in the frequency band by a gap. In the interband configuration 1006, two CCs may be located in different frequency bands (e.g., frequency band A and frequency band B, respectively).

A network may set the maximum quantity of CCs that can be aggregated (e.g., up to 32 CCs may be aggregated in NR, or any other quantity may be aggregated in other systems). The aggregated CCs may have the same or different bandwidths, subcarrier spacing, and/or duplexing schemes (TDD, FDD, or any other duplexing schemes). A serving cell for a wireless device using CA may have a downlink CC. One or more uplink CCs may be optionally configured for a serving cell (e.g., for FDD). The ability to aggregate more downlink carriers than uplink carriers may be useful, for example, if the wireless device has more data traffic in the downlink than in the uplink.

One of the aggregated cells for a wireless device may be referred to as a primary cell (PCell), for example, if a CA is configured. The PCell may be the serving cell that the wireless initially connects to or access to, for example, during or at an RRC connection establishment, an RRC connection reestablishment, and/or a handover. The PCell may provide/configure the wireless device with NAS mobility information and the security input. Wireless device may have different PCells. For the downlink, the carrier corresponding to the PCell may be referred to as the downlink primary CC (DL PCC). For the uplink, the carrier corresponding to the PCell may be referred to as the uplink primary CC (UL PCC). The other aggregated cells (e.g., associated with CCs other than the DL PCC and UL PCC) for the wireless device may be referred to as secondary cells (SCells). The SCells may be configured, for example, after the PCell is configured for the wireless device. An SCell may be configured via an RRC connection reconfiguration procedure. For the downlink, the carrier corresponding to an SCell may be referred to as a downlink secondary CC (DL SCC). For the uplink, the carrier corresponding to the SCell may be referred to as the uplink secondary CC (UL SCC).

Configured SCells for a wireless device may be activated or deactivated, for example, based on traffic and channel conditions. Deactivation of an SCell may cause the wireless device to stop PDCCH and PDSCH reception on the SCell and PUSCH, SRS, and CQI transmissions on the SCell.

Configured SCells may be activated or deactivated, for example, using a MAC CE (e.g., the MAC CE described with respect to FIG. 4B). A MAC CE may use a bitmap (e.g., one bit per SCell) to indicate which SCells (e.g., in a subset of configured SCells) for the wireless device are activated or deactivated. Configured SCells may be deactivated, for example, after or in response to an expiration of an SCell deactivation timer (e.g., one SCell deactivation timer per SCell may be configured).

DCI may comprise control information, such as scheduling assignments and scheduling grants, for a cell. DCI may be sent/transmitted via the cell corresponding to the scheduling assignments and/or scheduling grants, which may be referred to as a self-scheduling. DCI comprising control information for a cell may be sent/transmitted via another cell, which may be referred to as a cross-carrier scheduling. Uplink control information (UCI) may comprise control information, such as HARQ acknowledgments and channel state feedback (e.g., CQI, PMI, and/or RI) for aggregated cells. UCI may be transmitted via an uplink control channel (e.g., a PUCCH) of the PCell or a certain SCell (e.g., an SCell configured with PUCCH). For a larger number of aggregated downlink CCs, the PUCCH of the PCell may become overloaded. Cells may be divided into multiple PUCCH groups.

Figure 10B:
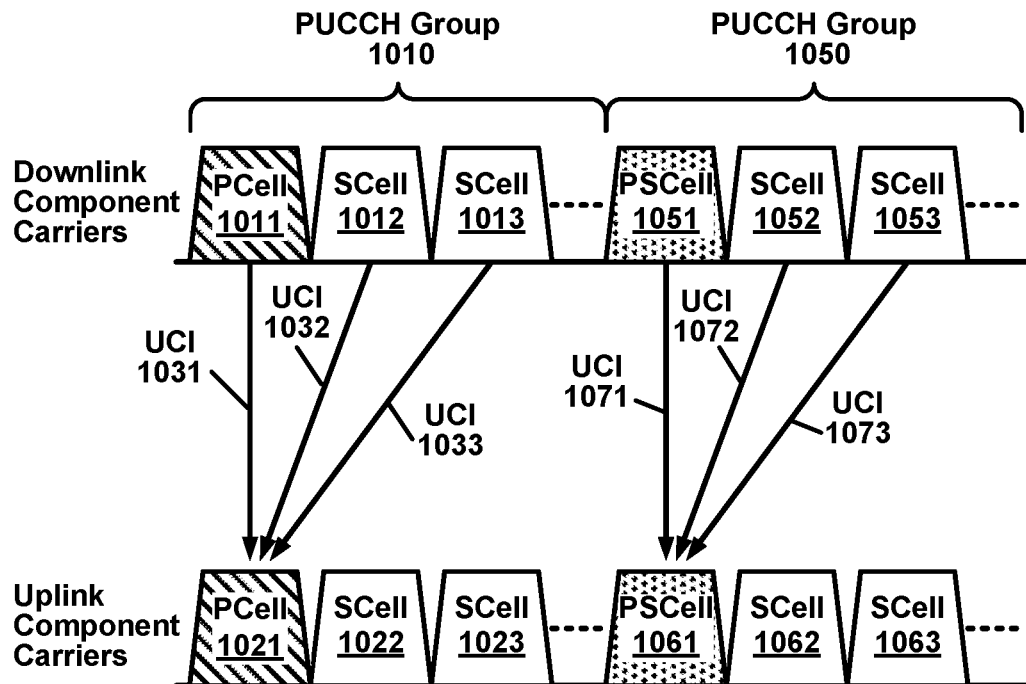
FIG. 10B shows example group of cells.

FIG. 10B shows example group of cells. Aggregated cells may be configured into one or more PUCCH groups (e.g., as shown in FIG. 10B). One or more cell groups or one or more uplink control channel groups (e.g., a PUCCH group 1010 and a PUCCH group 1050) may comprise one or more downlink CCs, respectively. The PUCCH group 1010 may comprise one or more downlink CCs, for example, three downlink CCs: a PCell 1011 (e.g., a DL PCC), an SCell 1012 (e.g., a DL SCC), and an SCell 1013 (e.g., a DL SCC). The PUCCH group 1050 may comprise one or more downlink CCs, for example, three downlink CCs: a PUCCH SCell (or PSCell) 1051 (e.g., a DL SCC), an SCell 1052 (e.g., a DL SCC), and an SCell 1053 (e.g., a DL SCC). One or more uplink CCs of the PUCCH group 1010 may be configured as a PCell 1021 (e.g., a UL PCC), an SCell 1022 (e.g., a UL SCC), and an SCell 1023 (e.g., a UL SCC). One or more uplink CCs of the PUCCH group 1050 may be configured as a PUCCH SCell (or PSCell) 1061 (e.g., a UL SCC), an SCell 1062 (e.g., a UL SCC), and an SCell 1063 (e.g., a UL SCC). UCI related to the downlink CCs of the PUCCH group 1010, shown as UCI 1031, UCI 1032, and UCI 1033, may be transmitted via the uplink of the PCell 1021 (e.g., via the PUCCH of the PCell 1021). UCI related to the downlink CCs of the PUCCH group 1050, shown as UCI 1071, UCI 1072, and UCI 1073, may be sent/transmitted via the uplink of the PUCCH SCell (or PSCell) 1061 (e.g., via the PUCCH of the PUCCH SCell 1061). A single uplink PCell may be configured to send/transmit UCI relating to the six downlink CCs, for example, if the aggregated cells shown in FIG. 10B are not divided into the PUCCH group 1010 and the PUCCH group 1050. The PCell 1021 may become overloaded, for example, if the UCIs 1031, 1032, 1033, 1071, 1072, and 1073 are sent/transmitted via the PCell 1021. By dividing transmissions of UCI between the PCell 1021 and the PUCCH SCell (or PSCell) 1061, overloading may be prevented and/or reduced.

A PCell may comprise a downlink carrier (e.g., the PCell 1011) and an uplink carrier (e.g., the PCell 1021). An SCell may comprise only a downlink carrier. A cell, comprising a downlink carrier and optionally an uplink carrier, may be assigned with a physical cell ID and a cell index. The physical cell ID or the cell index may indicate/identify a downlink carrier and/or an uplink carrier of the cell, for example, depending on the context in which the physical cell ID is used. A physical cell ID may be determined, for example, using a synchronization signal (e.g., PSS and/or SSS) transmitted via a downlink component carrier. A cell index may be determined, for example, using one or more RRC messages. A physical cell ID may be referred to as a carrier ID, and a cell index may be referred to as a carrier index. A first physical cell ID for a first downlink carrier may refer to the first physical cell ID for a cell comprising the first downlink carrier. Substantially the same/similar concept may apply to, for example, a carrier activation. Activation of a first carrier may refer to activation of a cell comprising the first carrier.

A multi-carrier nature of a PHY layer may be exposed/indicated to a MAC layer (e.g., in a CA configuration). A HARQ entity may operate on a serving cell. A transport block may be generated per assignment/grant per serving cell. A transport block and potential HARQ retransmissions of the transport block may be mapped to a serving cell.

For the downlink, a base station may send/transmit (e.g., unicast, multicast, and/or broadcast), to one or more wireless devices, one or more reference signals (RSs) (e.g., PSS, SSS, CSI-RS, DM-RS, and/or PT-RS). For the uplink, the one or more wireless devices may send/transmit one or more RSs to the base station (e.g., DM-RS, PT-RS, and/or SRS). The PSS and the SSS may be sent/transmitted by the base station and used by the one or more wireless devices to synchronize the one or more wireless devices with the base station. A synchronization signal (SS)/physical broadcast channel (PBCH) block may comprise the PSS, the SSS, and the PBCH. The base station may periodically send/transmit a burst of SS/PBCH blocks, which may be referred to as SSBs.

Figure 11A:
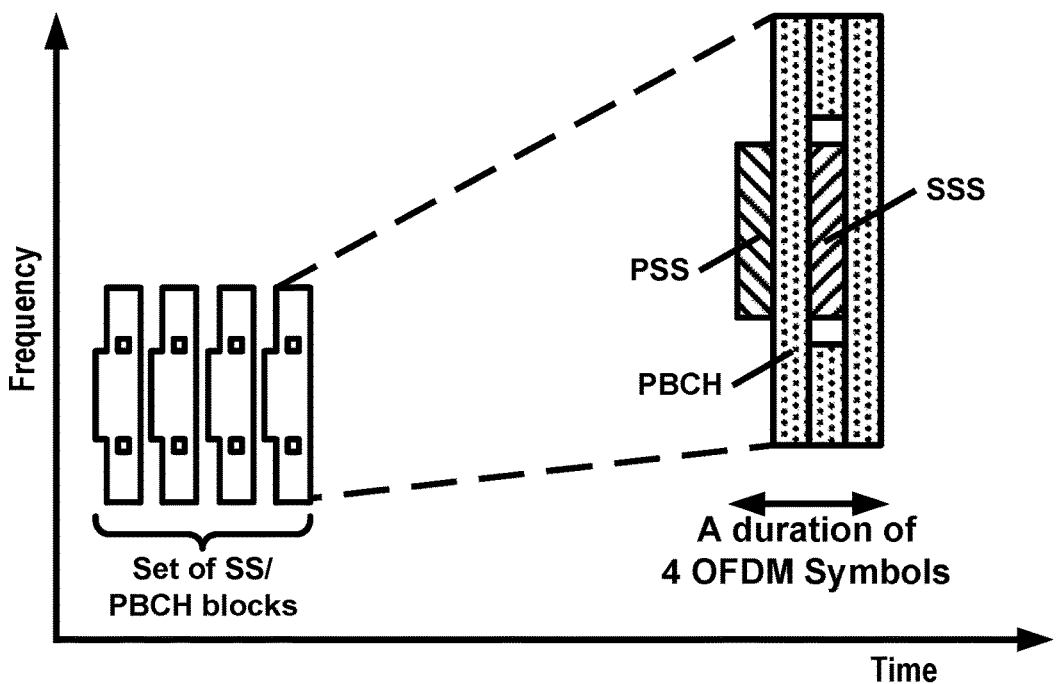
FIG. 11A shows an example mapping of one or more synchronization signal/physical broadcast channel (SS/PBCH) blocks.

FIG. 11A shows an example mapping of one or more SS/PBCH blocks. A burst of SS/PBCH blocks may comprise one or more SS/PBCH blocks (e.g., 4 SS/PBCH blocks, as shown in FIG. 11A). Bursts may be sent/transmitted periodically (e.g., every 2 frames, 20 ms, or any other durations). A burst may be restricted to a half-frame (e.g., a first half-frame having a duration of 5 ms). Such parameters (e.g., the number of SS/PBCH blocks per burst, periodicity of bursts, position of the burst within the frame) may be configured, for example, based on at least one of: a carrier frequency of a cell in which the SS/PBCH block is sent/transmitted; a numerology or subcarrier spacing of the cell; a configuration by the network (e.g., using RRC signaling); and/or any other suitable factor(s). A wireless device may assume a subcarrier spacing for the SS/PBCH block based on the carrier frequency being monitored, for example, unless the radio network configured the wireless device to assume a different subcarrier spacing.

The SS/PBCH block may span one or more OFDM symbols in the time domain (e.g., 4 OFDM symbols, as shown in FIG. 11A or any other quantity/number of symbols) and may span one or more subcarriers in the frequency domain (e.g., 240 contiguous subcarriers or any other quantity/number of subcarriers). The PSS, the SSS, and the PBCH may have a common center frequency. The PSS may be sent/transmitted first and may span, for example, 1 OFDM symbol and 127 subcarriers. The SSS may be sent/transmitted after the PSS (e.g., two symbols later) and may span 1 OFDM symbol and 127 subcarriers. The PBCH may be sent/transmitted after the PSS (e.g., across the next 3 OFDM symbols) and may span 240 subcarriers (e.g., in the second and fourth OFDM symbols as shown in FIG. 11A)

and/or may span fewer than 240 subcarriers (e.g., in the third OFDM symbols as shown in FIG. 11A).

The location of the SS/PBCH block in the time and frequency domains may not be known to the wireless device (e.g., if the wireless device is searching for the cell). The wireless device may monitor a carrier for the PSS, for example, to find and select the cell. The wireless device may monitor a frequency location within the carrier. The wireless device may search for the PSS at a different frequency location within the carrier, for example, if the PSS is not found after a certain duration (e.g., 20 ms). The wireless device may search for the PSS at a different frequency location within the carrier, for example, as indicated by a synchronization raster. The wireless device may determine the locations of the SSS and the PBCH, respectively, for example, based on a known structure of the SS/PBCH block if the PSS is found at a location in the time and frequency domains. The SS/PBCH block may be a cell-defining SS block (CD-SSB). A primary cell may be associated with a CD-SSB. The CD-SSB may be located on a synchronization raster. A cell selection/search and/or reselection may be based on the CD-SSB.

The SS/PBCH block may be used by the wireless device to determine one or more parameters of the cell. The wireless device may determine a physical cell identifier (PCI) of the cell, for example, based on the sequences of the PSS and the SSS, respectively. The wireless device may determine a location of a frame boundary of the cell, for example, based on the location of the SS/PBCH block. The SS/PBCH block may indicate that it has been sent/transmitted in accordance with a transmission pattern. An SS/PBCH block in the transmission pattern may be a known distance from the frame boundary (e.g., a predefined distance for a RAN configuration among one or more networks, one or more base stations, and one or more wireless devices).

The PBCH may use a QPSK modulation and/or forward error correction (FEC). The FEC may use polar coding. One or more symbols spanned by the PBCH may comprise/carry one or more DM-RSs for demodulation of the PBCH. The PBCH may comprise an indication of a current system frame number (SFN) of the cell and/or a SS/PBCH block timing index. These parameters may facilitate time synchronization of the wireless device to the base station. The PBCH may comprise a MIB used to send/transmit to the wireless device one or more parameters. The MIB may be used by the wireless device to locate remaining minimum system information (RMSI) associated with the cell. The RMSI may comprise a System Information Block Type1 (SIB1). The SIB1 may comprise information for the wireless device to access the cell. The wireless device may use one or more parameters of the MIB to monitor a PDCCH, which may be used to schedule a PDSCH. The PDSCH may comprise the SIB1. The SIB1 may be decoded using parameters provided/comprised in the MIB. The PBCH may indicate an absence of SIB1. The wireless device may be pointed to a frequency, for example, based on the PBCH indicating the absence of SIB1. The wireless device may search for an SS/PBCH block at the frequency to which the wireless device is pointed.

The wireless device may assume that one or more SS/PBCH blocks sent/transmitted with a same SS/PBCH block index are quasi co-located (QCLed) (e.g., having substantially the same/similar Doppler spread, Doppler shift, average gain, average delay, and/or spatial Rx parameters). The wireless device may not assume QCL for SS/PBCH block transmissions having different SS/PBCH block indexes. SS/PBCH blocks (e.g., those within a half-frame) may be sent/transmitted in spatial directions (e.g., using different beams that span a coverage area of the cell). A first SS/PBCH block may be sent/transmitted in a first spatial direction using a first beam, a second SS/PBCH block may be sent/transmitted in a second spatial direction using a second beam, a third SS/PBCH block may be sent/transmitted in a third spatial direction using a third beam, a fourth SS/PBCH block may be sent/transmitted in a fourth spatial direction using a fourth beam, etc.

A base station may send/transmit a plurality of SS/PBCH blocks, for example, within a frequency span of a carrier. A first PCI of a first SS/PBCH block of the plurality of SS/PBCH blocks may be different from a second PCI of a second SS/PBCH block of the plurality of SS/PBCH blocks. The PCIs of SS/PBCH blocks sent/transmitted in different frequency locations may be different or substantially the same.

The CSI-RS may be sent/transmitted by the base station and used by the wireless device to acquire/obtain/determine channel state information (CSI). The base station may configure the wireless device with one or more CSI-RSs for channel estimation or any other suitable purpose. The base station may configure a wireless device with one or more of the same/similar CSI-RSs. The wireless device may measure the one or more CSI-RSs. The wireless device may estimate a downlink channel state and/or generate a CSI report, for example, based on the measuring of the one or more downlink CSI-RSs. The wireless device may send/transmit the CSI report to the base station (e.g., based on periodic CSI reporting, semi-persistent CSI reporting, and/or aperiodic CSI reporting). The base station may use feedback provided by the wireless device (e.g., the estimated downlink channel state) to perform a link adaptation.

The base station may semi-statically configure the wireless device with one or more CSI-RS resource sets. A CSI-RS resource may be associated with a location in the time and frequency domains and a periodicity. The base station may selectively activate and/or deactivate a CSI-RS resource. The base station may indicate to the wireless device that a CSI-RS resource in the CSI-RS resource set is activated and/or deactivated.

The base station may configure the wireless device to report CSI measurements. The base station may configure the wireless device to provide CSI reports periodically, aperiodically, or semi-persistently. For periodic CSI reporting, the wireless device may be configured with a timing and/or periodicity of a plurality of CSI reports. For aperiodic CSI reporting, the base station may request a CSI report. The base station may command the wireless device to measure a configured CSI-RS resource and provide a CSI report relating to the measurement(s). For semi-persistent CSI reporting, the base station may configure the wireless device to send/transmit periodically, and selectively activate or deactivate the periodic reporting (e.g., via one or more activation/deactivation MAC CEs and/or one or more DCIs). The base station may configure the wireless device with a CSI-RS resource set and CSI reports, for example, using RRC signaling.

The CSI-RS configuration may comprise one or more parameters indicating, for example, up to 32 antenna ports (or any other quantity of antenna ports). The wireless device may be configured to use/employ the same OFDM symbols for a downlink CSI-RS and a CORESET, for example, if the downlink CSI-RS and CORESET are spatially QCLed and resource elements associated with the downlink CSI-RS are outside of the physical resource blocks (PRBs) configured for the CORESET. The wireless device may be configured to use/employ the same OFDM symbols for a downlink CSI-RS and SS/PBCH blocks, for example, if the downlink CSI-RS and SS/PBCH blocks are spatially QCLed and resource elements associated with the downlink CSI-RS are outside of PRBs configured for the SS/PBCH blocks.

Downlink DM-RSs may be sent/transmitted by a base station and received/used by a wireless device for a channel estimation. The downlink DM-RSs may be used for coherent demodulation of one or more downlink physical channels (e.g., PDSCH). A network (e.g., an NR network) may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., one or two adjacent OFDM symbols). A base station may semi-statically configure the wireless device with a number/quantity (e.g., a maximum number/quantity) of front-loaded DM-RS symbols for a PDSCH. A DM-RS configuration may support one or more DM-RS ports. A DM-RS configuration may support up to eight orthogonal downlink DM-RS ports per wireless device (e.g., for single user-MIMO). A D M-RS configuration may support up to 4 orthogonal downlink DM-RS ports per wireless device (e.g., for multiuser-MIMO). A radio network may support (e.g., at least for CP-OFDM) a common DM-RS structure for downlink and uplink. A DM-RS location, a DM-RS pattern, and/or a scrambling sequence may be the same or different. The base station may send/transmit a downlink DM-RS and a corresponding PDSCH, for example, using the same precoding matrix. The wireless device may use the one or more downlink DM-RSs for coherent demodulation/channel estimation of the PDSCH.

A transmitter (e.g., a transmitter of a base station) may use a precoder matrices for a part of a transmission bandwidth. The transmitter may use a first precoder matrix for a first bandwidth and a second precoder matrix for a second bandwidth. The first precoder matrix and the second precoder matrix may be different, for example, based on the first bandwidth being different from the second bandwidth. The wireless device may assume that a same precoding matrix is used across a set of PRBs. The set of PRBs may be determined/indicated/identified/denoted as a precoding resource block group (PRG).

A PDSCH may comprise one or more layers. The wireless device may assume that at least one symbol with DM-RS is present on a layer of the one or more layers of the PDSCH. A higher layer may configure one or more DM-RSs for a PDSCH (e.g., up to 3 DM-RSs for the PDSCH). Downlink PT-RS may be sent/transmitted by a base station and used by a wireless device, for example, for a phase-noise compensation. Whether a downlink PT-RS is present or not may depend on an RRC configuration. The presence and/or the pattern of the downlink PT-RS may be configured on a wireless device-specific basis, for example, using a combination of RRC signaling and/or an association with one or more parameters used/employed for other purposes (e.g., modulation and coding scheme (MCS)), which may be indicated by DCI. A dynamic presence of a downlink PT-RS, if configured, may be associated with one or more DCI parameters comprising at least MCS. A network (e.g., an NR network) may support a plurality of PT-RS densities defined in the time and/or frequency domains. A frequency domain density (if configured/present) may be associated with at least one configuration of a scheduled bandwidth. The wireless device may assume a same precoding for a DM-RS port and a PT-RS port. The quantity/number of PT-RS ports may be fewer than the quantity/number of DM-RS ports in a scheduled resource. Downlink PT-RS may be configured/allocated/confined in the scheduled time/frequency duration for the wireless device. Downlink PT-RS may be sent/transmitted via symbols, for example, to facilitate a phase tracking at the receiver.

The wireless device may send/transmit an uplink DM-RS to a base station, for example, for a channel estimation. The base station may use the uplink DM-RS for coherent demodulation of one or more uplink physical channels. The wireless device may send/transmit an uplink DM-RS with a PUSCH and/or a PUCCH. The uplink DM-RS may span a range of frequencies that is similar to a range of frequencies associated with the corresponding physical channel. The base station may configure the wireless device with one or more uplink DM-RS configurations. At least one DM-RS configuration may support a front-loaded DM-RS pattern. The front-loaded DM-RS may be mapped over one or more OFDM symbols (e.g., one or two adjacent OFDM symbols). One or more uplink DM-RSs may be configured to send/transmit at one or more symbols of a PUSCH and/or a PUCCH. The base station may semi-statically configure the wireless device with a number/quantity (e.g., the maximum number/quantity) of front-loaded DM-RS symbols for the PUSCH and/or the PUCCH, which the wireless device may use to schedule a single-symbol DM-RS and/or a double-symbol DM-RS. A network (e.g., an NR network) may support (e.g., for cyclic prefix orthogonal frequency division multiplexing (CP-OFDM)) a common DM-RS structure for downlink and uplink. A DM-RS location, a DM-RS pattern, and/or a scrambling sequence for the DM-RS may be substantially the same or different.

A PUSCH may comprise one or more layers. A wireless device may send/transmit at least one symbol with DM-RS present on a layer of the one or more layers of the PUSCH. A higher layer may configure one or more DM-RSs (e.g., up to three DM-RSs) for the PUSCH. Uplink PT-RS (which may be used by a base station for a phase tracking and/or a phase-noise compensation) may or may not be present, for example, depending on an RRC configuration of the wireless device. The presence and/or the pattern of an uplink PT-RS may be configured on a wireless device-specific basis (e.g., a UE-specific basis), for example, by a combination of RRC signaling and/or one or more parameters configured/employed for other purposes (e.g., MCS), which may be indicated by DCI. A dynamic presence of an uplink PT-RS, if configured, may be associated with one or more DCI parameters comprising at least MCS. A radio network may support a plurality of uplink PT-RS densities defined in time/frequency domain. A frequency domain density (if configured/present) may be associated with at least one configuration of a scheduled bandwidth. The wireless device may assume a same precoding for a DM-RS port and a PT-RS port. A quantity/number of PT-RS ports may be less than a quantity/number of DM-RS ports in a scheduled resource. An uplink PT-RS may be configured/allocated/confined in the scheduled time/frequency duration for the wireless device.

One or more SRSs may be sent/transmitted by a wireless device to a base station, for example, for a channel state estimation to support uplink channel dependent scheduling and/or a link adaptation. SRS sent/transmitted by the wireless device may enable/allow a base station to estimate an uplink channel state at one or more frequencies. A scheduler at the base station may use/employ the estimated uplink channel state to assign one or more resource blocks for an uplink PUSCH transmission for the wireless device. The base station may semi-statically configure the wireless device with one or more SRS resource sets. For an SRS resource set, the base station may configure the wireless device with one or more SRS resources. An SRS resource set applicability may be configured, for example, by a higher layer (e.g., RRC) parameter. An SRS resource in a SRS resource set of the one or more SRS resource sets (e.g., with the same/similar time domain behavior, periodic, aperiodic, and/or the like) may be sent/transmitted at a time instant (e.g., simultaneously), for example, if a higher layer parameter indicates beam management. The wireless device may send/transmit one or more SRS resources in SRS resource sets. A network (e.g., an NR network) may support aperiodic, periodic, and/or semi-persistent SRS transmissions. The wireless device may send/transmit SRS resources, for example, based on one or more trigger types. The one or more trigger types may comprise higher layer signaling (e.g., RRC) and/or one or more DCI formats. At least one DCI format may be used/employed for the wireless device to select at least one of one or more configured SRS resource sets. An SRS trigger type 0 may refer to an SRS triggered based on higher layer signaling. An SRS trigger type 1 may refer to an SRS triggered based on one or more DCI formats. The wireless device may be configured to send/transmit an SRS, for example, after a transmission of a PUSCH and a corresponding uplink DM-RS if a PUSCH and an SRS are sent/transmitted in a same slot. A base station may semi-statically configure a wireless device with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; an offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port may be determined/defined such that the channel over which a symbol on the antenna port is conveyed can be inferred from the channel over which another symbol on the same antenna port is conveyed. The receiver may infer/determine the channel (e.g., fading gain, multipath delay, and/or the like) for conveying a second symbol on an antenna port, from the channel for conveying a first symbol on the antenna port, for example, if the first symbol and the second symbol are sent/transmitted on the same antenna port. A first antenna port and a second antenna port may be referred to as quasi co-located (QCLed), for example, if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming may require beam management. Beam management may comprise a beam measurement, a beam selection, and/or a beam indication. A beam may be associated with one or more reference signals. A beam may be identified by one or more beamformed reference signals. The wireless device may perform a downlink beam measurement, for example, based on one or more downlink reference signals (e.g., a CSI-RS) and generate a beam measurement report. The wireless device may perform the downlink beam measurement procedure, for example, after an RRC connection is set up with a base station.

Figure 11B:
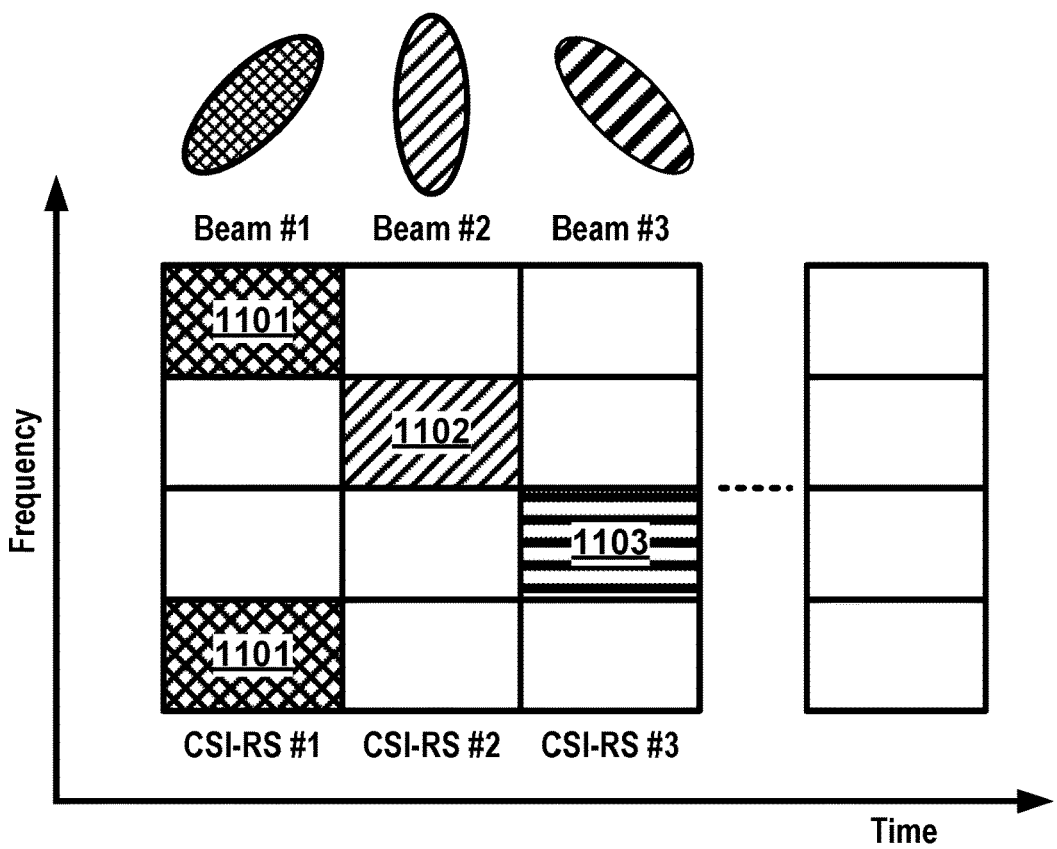
FIG. 11B shows an example mapping of one or more channel state information reference signals (CSI-RSs).

FIG. 11B shows an example mapping of one or more CSI-RSs. The CSI-RSs may be mapped in the time and frequency domains. Each rectangular block shown in FIG. 11B may correspond to a resource block (RB) within a bandwidth of a cell. A base station may send/transmit one or more RRC messages comprising CSI-RS resource configuration parameters indicating one or more CSI-RSs. One or more of parameters may be configured by higher layer signaling (e.g., RRC and/or MAC signaling) for a CSI-RS resource configuration. The one or more of the parameters may comprise at least one of: a CSI-RS resource configuration identity, a number of CSI-RS ports, a CSI-RS configuration (e.g., symbol and resource element (RE) locations in a subframe), a CSI-RS subframe configuration (e.g., a subframe location, an offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

One or more beams may be configured for a wireless device in a wireless device-specific configuration. Three beams are shown in FIG. 11B (beam #1, beam #2, and beam #3), but more or fewer beams may be configured. Beam #1 may be allocated with CSI-RS 1101 that may be sent/transmitted in one or more subcarriers in an RB of a first symbol. Beam #2 may be allocated with CSI-RS 1102 that may be sent/transmitted in one or more subcarriers in an RB of a second symbol. Beam #3 may be allocated with CSI-RS 1103 that may be sent/transmitted in one or more subcarriers in an RB of a third symbol. A base station may use other subcarriers in the same RB (e.g., those that are not used to send/transmit CSI-RS 1101) to transmit another CSI-RS associated with a beam for another wireless device, for example, by using frequency division multiplexing (FDM). Beams used for a wireless device may be configured such that beams for the wireless device use symbols different from symbols used by beams of other wireless devices, for example, by using time domain multiplexing (TDM). A wireless device may be served with beams in orthogonal symbols (e.g., no overlapping symbols), for example, by using the TDM.

CSI-RSs (e.g., CSI-RSs 1101, 1102, 1103) may be sent/transmitted by the base station and used by the wireless device for one or more measurements. The wireless device may measure an RSRP of configured CSI-RS resources. The base station may configure the wireless device with a reporting configuration, and the wireless device may report the RSRP measurements to a network (e.g., via one or more base stations) based on the reporting configuration. The base station may determine, based on the reported measurement results, one or more transmission configuration indication (TCI) states comprising a number of reference signals. The base station may indicate one or more TCI states to the wireless device (e.g., via RRC signaling, a MAC CE, and/or DCI). The wireless device may receive a downlink transmission with an Rx beam determined based on the one or more TCI states. The wireless device may or may not have a capability of beam correspondence. The wireless device may determine a spatial domain filter of a transmit (Tx) beam, for example, based on a spatial domain filter of the corresponding Rx beam, if the wireless device has the capability of beam correspondence. The wireless device may perform an uplink beam selection procedure to determine the spatial domain filter of the Tx beam, for example, if the wireless device does not have the capability of beam correspondence. The wireless device may perform the uplink beam selection procedure, for example, based on one or more sounding reference signal (SRS) resources configured to the wireless device by the base station. The base station may select and indicate uplink beams for the wireless device, for example, based on measurements of the one or more SRS resources sent/transmitted by the wireless device.

A wireless device may determine/assess (e.g., measure) a channel quality of one or more beam pair links, for example, in a beam management procedure. A beam pair link may comprise a Tx beam of a base station and an Rx beam of the wireless device. The Tx beam of the base station may send/transmit a downlink signal, and the Rx beam of the wireless device may receive the downlink signal. The wireless device may send/transmit a beam measurement report, for example, based on the assessment/determination. The beam measurement report may indicate one or more beam pair quality parameters comprising at least one of: one or more beam identifications (e.g., a beam index, a reference signal index, or the like), an RSRP, a precoding matrix indicator (PMI), a channel quality indicator (CQI), and/or a rank indicator (RI).

FIG. 12A shows examples of downlink beam management procedures. One or more downlink beam management procedures (e.g., downlink beam management procedures P1, P2, and P3) may be performed. Procedure P1 may enable a measurement (e.g., a wireless device measurement) on Tx beams of a TRP (or multiple TRPs) (e.g., to support a selection of one or more base station Tx beams and/or wireless device Rx beams). The Tx beams of a base station and the Rx beams of a wireless device are shown as ovals in the top row of P1 and bottom row of P1, respectively. Beamforming (e.g., at a TRP) may comprise a Tx beam sweep for a set of beams (e.g., the beam sweeps shown, in the top rows of P1 and P2, as ovals rotated in a counter-clockwise direction indicated by the dashed arrows). Beamforming (e.g., at a wireless device) may comprise an Rx beam sweep for a set of beams (e.g., the beam sweeps shown, in the bottom rows of P1 and P3, as ovals rotated in a clockwise direction indicated by the dashed arrows). Procedure P2 may be used to enable a measurement (e.g., a wireless device measurement) on Tx beams of a TRP (shown, in the top row of P2, as ovals rotated in a counter-clockwise direction indicated by the dashed arrow). The wireless device and/or the base station may perform procedure P2, for example, using a smaller set of beams than the set of beams used in procedure P1, or using narrower beams than the beams used in procedure P1. Procedure P2 may be referred to as a beam refinement. The wireless device may perform procedure P3 for an Rx beam determination, for example, by using the same Tx beam(s) of the base station and sweeping Rx beam(s) of the wireless device.

FIG. 12B shows examples of uplink beam management procedures. One or more uplink beam management procedures (e.g., uplink beam management procedures U1, U2, and U3) may be performed. Procedure U1 may be used to enable a base station to perform a measurement on Tx beams of a wireless device (e.g., to support a selection of one or more Tx beams of the wireless device and/or Rx beams of the base station). The Tx beams of the wireless device and the Rx beams of the base station are shown as ovals in the top row of U1 and bottom row of U1, respectively). Beamforming (e.g., at the wireless device) may comprise one or more beam sweeps, for example, a Tx beam sweep from a set of beams (shown, in the bottom rows of U1 and U3, as ovals rotated in a clockwise direction indicated by the dashed arrows). Beamforming (e.g., at the base station) may comprise one or more beam sweeps, for example, an Rx beam sweep from a set of beams (shown, in the top rows of U1 and U2, as ovals rotated in a counter-clockwise direction indicated by the dashed arrows). Procedure U2 may be used to enable the base station to adjust its Rx beam, for example, if the UE uses a fixed Tx beam. The wireless device and/or the base station may perform procedure U2, for example, using a smaller set of beams than the set of beams used in procedure P1, or using narrower beams than the beams used in procedure P1. Procedure U2 may be referred to as a beam refinement. The wireless device may perform procedure U3 to adjust its Tx beam, for example, if the base station uses a fixed Rx beam.

A wireless device may initiate/start/perform a beam failure recovery (BFR) procedure, for example, based on detecting a beam failure. The wireless device may send/transmit a BFR request (e.g., a preamble, UCI, an SR, a MAC CE, and/or the like), for example, based on the initiating the BFR procedure. The wireless device may detect the beam failure, for example, based on a determination that a quality of beam pair link(s) of an associated control channel is unsatisfactory (e.g., having an error rate higher than an error rate threshold, a received signal power lower than a received signal power threshold, an expiration of a timer, and/or the like).

The wireless device may measure a quality of a beam pair link, for example, using one or more reference signals (RSs) comprising one or more SS/PBCH blocks, one or more CSI-RS resources, and/or one or more DM-RSs. A quality of the beam pair link may be based on one or more of a block error rate (BLER), an RSRP value, a signal to interference plus noise ratio (SINR) value, an RSRQ value, and/or a CSI value measured on RS resources. The base station may indicate that an RS resource is QCLed with one or more DM-RSs of a channel (e.g., a control channel, a shared data channel, and/or the like). The RS resource and the one or more DM-RSs of the channel may be QCLed, for example, if the channel characteristics (e.g., Doppler shift, Doppler spread, an average delay, delay spread, a spatial Rx parameter, fading, and/or the like) from a transmission via the RS resource to the wireless device are similar or the same as the channel characteristics from a transmission via the channel to the wireless device.

A network (e.g., an NR network comprising a gNB and/or an ng-eNB) and/or the wireless device may initiate/start/perform a random access procedure. A wireless device in an RRC idle (e.g., an RRC_IDLE) state and/or an RRC inactive (e.g., an RRC_INACTIVE) state may initiate/perform the random access procedure to request a connection setup to a network. The wireless device may initiate/start/perform the random access procedure from an RRC connected (e.g., an RRC_CONNECTED) state. The wireless device may initiate/start/perform the random access procedure to request uplink resources (e.g., for uplink transmission of an SR if there is no PUCCH resource available) and/or acquire/obtain/determine an uplink timing (e.g., if an uplink synchronization status is non-synchronized). The wireless device may initiate/start/perform the random access procedure to request one or more system information blocks (SIBs) (e.g., other system information blocks, such as SIB2, SIB3, and/or the like). The wireless device may initiate/start/perform the random access procedure for a beam failure recovery request. A network may initiate/start/perform a random access procedure, for example, for a handover and/or for establishing time alignment for an SCell addition.

FIG. 13A shows an example four-step random access procedure. The four-step random access procedure may comprise a four-step contention-based random access procedure. A base station may send/transmit a configuration message 1310 to a wireless device, for example, before initiating the random access procedure. The four-step random access procedure may comprise transmissions of four messages comprising: a first message (e.g., Msg 1 1311), a second message (e.g., Msg 2 1312), a third message (e.g., Msg 3 1313), and a fourth message (e.g., Msg 4 1314). The first message (e.g., Msg 1 1311) may comprise a preamble (or a random access preamble). The first message (e.g., Msg 1 1311) may be referred to as a preamble. The second message (e.g., Msg 2 1312) may comprise as a random access response (RAR). The second message (e.g., Msg 2 1312) may be referred to as an RAR.

The configuration message 1310 may be sent/transmitted, for example, using one or more RRC messages. The one or more RRC messages may indicate one or more random access channel (RACH) parameters to the wireless device. The one or more RACH parameters may comprise at least one of: general parameters for one or more random access procedures (e.g., RACH-configGeneral); cell-specific parameters (e.g., RACH-ConfigCommon); and/or dedicated parameters (e.g., RACH-configDedicated). The base station may send/transmit (e.g., broadcast or multicast) the one or more RRC messages to one or more wireless devices. The one or more RRC messages may be wireless device-specific. The one or more RRC messages that are wireless device-specific may be, for example, dedicated RRC messages sent/transmitted to a wireless device in an RRC connected (e.g., an RRC_CONNECTED) state and/or in an RRC inactive (e.g., an RRC_INACTIVE) state. The wireless devices may determine, based on the one or more RACH parameters, a time-frequency resource and/or an uplink transmit power for transmission of the first message (e.g., Msg 1 1311) and/or the third message (e.g., Msg 3 1313). The wireless device may determine a reception timing and a downlink channel for receiving the second message (e.g., Msg 2 1312) and the fourth message (e.g., Msg 4 1314), for example, based on the one or more RACH parameters.

The one or more RACH parameters provided/configured/comprised in the configuration message 1310 may indicate one or more Physical RACH (PRACH) occasions available for transmission of the first message (e.g., Msg 1 1311). The one or more PRACH occasions may be predefined (e.g., by a network comprising one or more base stations). The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. The one or more RACH parameters may indicate a quantity/number of SS/PBCH blocks mapped to a PRACH occasion and/or a quantity/number of preambles mapped to a SS/PBCH blocks.

The one or more RACH parameters provided/configured/ comprised in the configuration message 1310 may be used to determine an uplink transmit power of first message (e.g., Msg 1 1311) and/or third message (e.g., Msg 3 1313). The one or more RACH parameters may indicate a reference power for a preamble transmission (e.g., a received target power and/or an initial power of the preamble transmission). There may be one or more power offsets indicated by the one or more RACH parameters. The one or more RACH parameters may indicate: a power ramping step; a power offset between SSB and CSI-RS; a power offset between transmissions of the first message (e.g., Msg 1 1311) and the third message (e.g., Msg 3 1313); and/or a power offset value between preamble groups. The one or more RACH parameters may indicate one or more thresholds, for example, based on which the wireless device may determine at least one reference signal (e.g., an SSB and/or CSI-RS) and/or an uplink carrier (e.g., a normal uplink (NUL) carrier and/or a supplemental uplink (SUL) carrier).

The first message (e.g., Msg 1 1311) may comprise one or more preamble transmissions (e.g., a preamble transmission and one or more preamble retransmissions). An RRC message may be used to configure one or more preamble groups (e.g., group A and/or group B). A preamble group may comprise one or more preambles. The wireless device may determine the preamble group, for example, based on a pathloss measurement and/or a size of the third message (e.g., Msg 3 1313). The wireless device may measure an RSRP of one or more reference signals (e.g., SSBs and/or CSI-RSs) and determine at least one reference signal having an RSRP above an RSRP threshold (e.g., rsrp-ThresholdSSB and/or rsrp-ThresholdCSI-RS). The wireless device may select at least one preamble associated with the one or more reference signals and/or a selected preamble group, for example, if the association between the one or more preambles and the at least one reference signal is configured by an RRC message.

The wireless device may determine the preamble, for example, based on the one or more RACH parameters provided/configured/comprised in the configuration message 1310. The wireless device may determine the preamble, for example, based on a pathloss measurement, an RSRP measurement, and/or a size of the third message (e.g., Msg 3 1313). The one or more RACH parameters may indicate: a preamble format; a maximum quantity/number of preamble transmissions; and/or one or more thresholds for determining one or more preamble groups (e.g., group A and group B). A base station may use the one or more RACH parameters to configure the wireless device with an association between one or more preambles and one or more reference signals (e.g., SSBs and/or CSI-RSs). The wireless device may determine the preamble to be comprised in first message (e.g., Msg 1 1311), for example, based on the association if the association is configured. The first message (e.g., Msg 1 1311) may be sent/transmitted to the base station via one or more PRACH occasions. The wireless device may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The wireless device may perform a preamble retransmission, for example, if no response is received after or in response to a preamble transmission (e.g., for a period of time, such as a monitoring window for monitoring an RAR). The wireless device may increase an uplink transmit power for the preamble retransmission. The wireless device may select an initial preamble transmit power, for example, based on a pathloss measurement and/or a target received preamble power configured by the network. The wireless device may determine to resend/retransmit a preamble and may ramp up the uplink transmit power. The wireless device may receive one or more RACH parameters (e.g., PREAMBLE_POWER_RAMPING_STEP) indicating a ramping step for the preamble retransmission. The ramping step may be an amount of incremental increase in uplink transmit power for a retransmission. The wireless device may ramp up the uplink transmit power, for example, if the wireless device determines a reference signal (e.g., SSB and/or CSI-RS) that is the same as a previous preamble transmission. The wireless device may count the quantity/number of preamble transmissions and/or retransmissions, for example, using a counter parameter (e.g., PREAMBLE_TRANSMISSION_COUNTER). The wireless device may determine that a random access procedure has been completed unsuccessfully, for example, if the quantity/number of preamble transmissions exceeds a threshold configured by the one or more RACH parameters (e.g., preambleTransMax) without receiving a successful response (e.g., an RAR).

The second message (e.g., Msg 2 1312) (e.g., received by the wireless device) may comprise an RAR. The second message (e.g., Msg 2 1312) may comprise multiple RARs corresponding to multiple wireless devices. The second message (e.g., Msg 2 1312) may be received, for example, after or in response to the transmitting of the first message (e.g., Msg 1 1311). The second message (e.g., Msg 2 1312) may be scheduled on the DL-SCH and may be indicated by a PDCCH, for example, using a random access radio network temporary identifier (RA RNTI). The second message (e.g., Msg 2 1312) may indicate that the first message (e.g., Msg 1 1311) was received by the base station. The second message (e.g., Msg 2 1312) may comprise a time-alignment command that may be used by the wireless device to adjust the transmission timing of the wireless device, a scheduling grant for transmission of the third message (e.g., Msg 3 1313), and/or a Temporary Cell RNTI (TC-RNTI). The wireless device may determine/start a time window (e.g., ra-ResponseWindow) to monitor a PDCCH for the second message (e.g., Msg 2 1312), for example, after transmitting the first message (e.g., Msg 1 1311) (e.g., a preamble). The wireless device may determine the start time of the time window, for example, based on a PRACH occasion that the wireless device uses to send/transmit the first message (e.g., Msg 1 1311) (e.g., the preamble). The wireless device may start the time window one or more symbols after the last symbol of the first message (e.g., Msg 1 1311) comprising the preamble (e.g., the symbol in which the first message (e.g., Msg 1 1311) comprising the preamble transmission was completed or at a first PDCCH occasion from an end of a preamble transmission). The one or more symbols may be determined based on a numerology. The PDCCH may be mapped in a common search space (e.g., a Type1-PDCCH common search space) configured by an RRC message. The wireless device may identify/determine the RAR, for example, based on an RNTI. Radio network temporary identifiers (RNTIs) may be used depending on one or more events initiating/starting the random access procedure. The wireless device may use a RA-RNTI, for example, for one or more communications associated with random access or any other purpose. The RA-RNTI may be associated with PRACH occasions in which the wireless device sends/transmits a preamble. The wireless device may determine the RA-RNTI, for example, based on at least one of: an OFDM symbol index; a slot index; a frequency domain index; and/or a UL carrier indicator of the PRACH occasions. An example RA-RNTI may be determined as follows:

$$RA\text{-}RNTI = 1 + s\_id + 14 \times t\_id + 14 \times 80 \times f\_id + 14 \times 80 \times 8 \times ul\_carrier\_id$$

where s_id may be an index of a first OFDM symbol of the PRACH occasion (e.g., 0≤s_id≤14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The wireless device may send/transmit the third message (e.g., Msg 3 1313), for example, after or in response to a successful reception of the second message (e.g., Msg 2 1312) (e.g., using resources identified in the Msg 2 1312). The third message (e.g., Msg 3 1313) may be used, for example, for contention resolution in the contention-based random access procedure. A plurality of wireless devices may send/transmit the same preamble to a base station, and the base station may send/transmit an RAR that corresponds to a wireless device. Collisions may occur, for example, if the plurality of wireless device interpret the RAR as corresponding to themselves. Contention resolution (e.g., using the third message (e.g., Msg 3 1313) and the fourth message (e.g., Msg 4 1314)) may be used to increase the likelihood that the wireless device does not incorrectly use an identity of another the wireless device. The wireless device may comprise a device identifier in the third message (e.g., Msg 3 1313) (e.g., a C-RNTI if assigned, a TC RNTI comprised in the second message (e.g., Msg 2 1312), and/or any other suitable identifier), for example, to perform contention resolution.

The fourth message (e.g., Msg 4 1314) may be received, for example, after or in response to the transmitting of the third message (e.g., Msg 3 1313). The base station may address the wireless on the PDCCH (e.g., the base station may send the PDCCH to the wireless device) using a C-RNTI, for example, If the C-RNTI was included in the third message (e.g., Msg 3 1313). The random access procedure may be determined to be successfully completed, for example, if the unique C RNTI of the wireless device is detected on the PDCCH (e.g., the PDCCH is scrambled by the C-RNTI). fourth message (e.g., Msg 4 1314) may be received using a DL-SCH associated with a TC RNTI, for example, if the TC RNTI is comprised in the third message (e.g., Msg 3 1313) (e.g., if the wireless device is in an RRC idle (e.g., an RRC_IDLE) state or not otherwise connected to the base station). The wireless device may determine that the contention resolution is successful and/or the wireless device may determine that the random access procedure is successfully completed, for example, if a MAC PDU is successfully decoded and a MAC PDU comprises the wireless device contention resolution identity MAC CE that matches or otherwise corresponds with the CCCH SDU sent/transmitted in third message (e.g., Msg 3 1313).

The wireless device may be configured with an SUL carrier and/or an NUL carrier. An initial access (e.g., random access) may be supported via an uplink carrier. A base station may configure the wireless device with multiple RACH configurations (e.g., two separate RACH configurations comprising: one for an SUL carrier and the other for an NUL carrier). For random access in a cell configured with an SUL carrier, the network may indicate which carrier to use (NUL or SUL). The wireless device may determine to use the SUL carrier, for example, if a measured quality of one or more reference signals (e.g., one or more reference signals associated with the NUL carrier) is lower than a broadcast threshold. Uplink transmissions of the random access procedure (e.g., the first message (e.g., Msg 1 1311) and/or the third message (e.g., Msg 3 1313)) may remain on, or may be performed via, the selected carrier. The wireless device may switch an uplink carrier during the random access procedure (e.g., between the Msg 1 1311 and the Msg 3 1313). The wireless device may determine and/or switch an uplink carrier for the first message (e.g., Msg 1 1311) and/or the third message (e.g., Msg 3 1313), for example, based on a channel clear assessment (e.g., a listen-before-talk).

FIG. 13B shows a two-step random access procedure. The two-step random access procedure may comprise a two-step contention-free random access procedure. Similar to the four-step contention-based random access procedure, a base station may, prior to initiation of the procedure, send/transmit a configuration message 1320 to the wireless device. The configuration message 1320 may be analogous in some respects to the configuration message 1310. The procedure shown in FIG. 13B may comprise transmissions of two messages: a first message (e.g., Msg 1 1321) and a second message (e.g., Msg 2 1322). The first message (e.g., Msg 1 1321) and the second message (e.g., Msg 2 1322) may be analogous in some respects to the first message (e.g., Msg 1 1311) and a second message (e.g., Msg 2 1312), respectively. The two-step contention-free random access procedure may not comprise messages analogous to the third message (e.g., Msg 3 1313) and/or the fourth message (e.g., Msg 4 1314).

The two-step (e.g., contention-free) random access procedure may be configured/initiated for a beam failure recovery, other SI request, an SCell addition, and/or a handover. A base station may indicate, or assign to, the wireless device a preamble to be used for the first message (e.g., Msg 1 1321). The wireless device may receive, from the base station via a PDCCH and/or an RRC, an indication of the preamble (e.g., ra-PreambleIndex).

The wireless device may start a time window (e.g., ra-ResponseWindow) to monitor a PDCCH for the RAR, for example, after or in response to sending/transmitting the preamble. The base station may configure the wireless device with one or more beam failure recovery parameters, such as a separate time window and/or a separate PDCCH in a search space indicated by an RRC message (e.g., recoverySearchSpaceId). The base station may configure the one or more beam failure recovery parameters, for example, in association with a beam failure recovery request. The separate time window for monitoring the PDCCH and/or an RAR may be configured to start after transmitting a beam failure recovery request (e.g., the window may start any quantity of symbols and/or slots after transmitting the beam failure recovery request). The wireless device may monitor for a PDCCH transmission addressed to a Cell RNTI (C-RNTI) on the search space. During the two-step (e.g., contention-free) random access procedure, the wireless device may determine that a random access procedure is successful, for example, after or in response to transmitting first message (e.g., Msg 1 1321) and receiving a corresponding second message (e.g., Msg 2 1322). The wireless device may determine that a random access procedure has successfully been completed, for example, if a PDCCH transmission is addressed to a corresponding C-RNTI. The wireless device may determine that a random access procedure has successfully been completed, for example, if the wireless device receives an RAR comprising a preamble identifier corresponding to a preamble sent/transmitted by the wireless device and/or the RAR comprises a MAC sub-PDU with the preamble identifier. The wireless device may determine the response as an indication of an acknowledgement for an SI request.

FIG. 13C shows an example two-step random access procedure. Similar to the random access procedures shown in FIGS. 13A and 13B, a base station may, prior to initiation of the procedure, send/transmit a configuration message 1330 to the wireless device. The configuration message 1330 may be analogous in some respects to the configuration message 1310 and/or the configuration message 1320. The procedure shown in FIG. 13C may comprise transmissions of multiple messages (e.g., two messages comprising: a first message (e.g., Msg A 1331) and a second message (e.g., Msg B 1332)).

Msg A 1320 may be sent/transmitted in an uplink transmission by the wireless device. Msg A 1320 may comprise one or more transmissions of a preamble 1341 and/or one or more transmissions of a transport block 1342. The transport block 1342 may comprise contents that are similar and/or equivalent to the contents of the third message (e.g., Msg 3 1313) (e.g., shown in FIG. 13A). The transport block 1342 may comprise UCI (e.g., an SR, a HARQ ACK/NACK, and/or the like). The wireless device may receive the second message (e.g., Msg B 1332), for example, after or in response to transmitting the first message (e.g., Msg A 1331). The second message (e.g., Msg B 1332) may comprise contents that are similar and/or equivalent to the contents of the second message (e.g., Msg 2 1312) (e.g., an RAR shown in FIG. 13A), the contents of the second message (e.g., Msg 2 1322) (e.g., an RAR shown in FIG. 13B) and/or the fourth message (e.g., Msg 4 1314) (e.g., shown in FIG. 13A).

The wireless device may start/initiate the two-step random access procedure (e.g., the two-step random access procedure shown in FIG. 13C) for a licensed spectrum and/or an unlicensed spectrum. The wireless device may determine, based on one or more factors, whether to start/initiate the two-step random access procedure. The one or more factors may comprise at least one of: a radio access technology in use (e.g., LTE, NR, and/or the like); whether the wireless device has a valid TA or not; a cell size; the RRC state of the wireless device; a type of spectrum (e.g., licensed vs. unlicensed); and/or any other suitable factors.

The wireless device may determine, based on two-step RACH parameters comprised in the configuration message 1330, a radio resource and/or an uplink transmit power for the preamble 1341 and/or the transport block 1342 (e.g., comprised in the first message (e.g., Msg A 1331)). The RACH parameters may indicate an MCS, a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the wireless device to determine a reception timing and a downlink channel for monitoring for and/or receiving second message (e.g., Msg B 1332).

The transport block 1342 may comprise data (e.g., delay-sensitive data), an identifier of the wireless device, security information, and/or device information (e.g., an International Mobile Subscriber Identity (IMSI)). The base station may send/transmit the second message (e.g., Msg B 1332) as a response to the first message (e.g., Msg A 1331). The second message (e.g., Msg B 1332) may comprise at least one of: a preamble identifier; a timing advance command; a power control command; an uplink grant (e.g., a radio resource assignment and/or an MCS); a wireless device identifier (e.g., a UE identifier for contention resolution); and/or an RNTI (e.g., a C-RNTI or a TC-RNTI). The wireless device may determine that the two-step random access procedure is successfully completed, for example, if a preamble identifier in the second message (e.g., Msg B 1332) corresponds to, or is matched to, a preamble sent/transmitted by the wireless device and/or the identifier of the wireless device in second message (e.g., Msg B 1332) corresponds to, or is matched to, the identifier of the wireless device in the first message (e.g., Msg A 1331) (e.g., the transport block 1342).

A wireless device and a base station may exchange control signaling (e.g., control information). The control signaling may be referred to as L1/L2 control signaling and may originate from the PHY layer (e.g., layer 1) and/or the MAC layer (e.g., layer 2) of the wireless device or the base station. The control signaling may comprise downlink control signaling sent/transmitted from the base station to the wireless device and/or uplink control signaling sent/transmitted from the wireless device to the base station.

The downlink control signaling may comprise at least one of: a downlink scheduling assignment; an uplink scheduling grant indicating uplink radio resources and/or a transport format; slot format information; a preemption indication; a power control command; and/or any other suitable signaling. The wireless device may receive the downlink control signaling in a payload sent/transmitted by the base station via a PDCCH. The payload sent/transmitted via the PDCCH may be referred to as downlink control information (DCI). The PDCCH may be a group common PDCCH (GC-PDCCH) that is common to a group of wireless devices. The GC-PDCCH may be scrambled by a group common RNTI.

A base station may attach one or more cyclic redundancy check (CRC) parity bits to DCI, for example, in order to facilitate detection of transmission errors. The base station may scramble the CRC parity bits with an identifier of a wireless device (or an identifier of a group of wireless devices), for example, if the DCI is intended for the wireless device (or the group of the wireless devices). Scrambling the CRC parity bits with the identifier may comprise Modulo-2 addition (or an exclusive-OR operation) of the identifier value and the CRC parity bits. The identifier may comprise a 16-bit value of an RNTI.

DCIs may be used for different purposes. A purpose may be indicated by the type of an RNTI used to scramble the CRC parity bits. DCI having CRC parity bits scrambled with a paging RNTI (P-RNTI) may indicate paging information and/or a system information change notification. The P-RNTI may be predefined as "FFFE" in hexadecimal. DCI having CRC parity bits scrambled with a system information RNTI (SI-RNTI) may indicate a broadcast transmission of the system information. The SI-RNTI may be predefined as "FFFF" in hexadecimal. DCI having CRC parity bits scrambled with a random access RNTI (RA-RNTI) may indicate a random access response (RAR). DCI having CRC parity bits scrambled with a cell RNTI (C-RNTI) may indicate a dynamically scheduled unicast transmission and/or a triggering of PDCCH-ordered random access. DCI having CRC parity bits scrambled with a temporary cell RNTI (TC-RNTI) may indicate a contention resolution (e.g., a Msg 3 analogous to the Msg 3 1313 shown in FIG. 13A). Other RNTIs configured for a wireless device by a base station may comprise a Configured Scheduling RNTI (CS RNTI), a Transmit Power Control-PUCCH RNTI (TPC PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C RNTI), and/or the like.

A base station may send/transmit DCIs with one or more DCI formats, for example, depending on the purpose and/or content of the DCIs. DCI format 0_0 may be used for scheduling of a PUSCH in a cell. DCI format 0_0 may be a fallback DCI format (e.g., with compact DCI payloads). DCI format 0_1 may be used for scheduling of a PUSCH in a cell (e.g., with more DCI payloads than DCI format 0_0). DCI format 1_0 may be used for scheduling of a PDSCH in a cell. DCI format 1_0 may be a fallback DCI format (e.g., with compact DCI payloads). DCI format 1_1 may be used for scheduling of a PDSCH in a cell (e.g., with more DCI payloads than DCI format 1_0). DCI format 2_0 may be used for providing a slot format indication to a group of wireless devices. DCI format 2_1 may be used for informing/notifying a group of wireless devices of a physical resource block and/or an OFDM symbol where the group of wireless devices may assume no transmission is intended to the group of wireless devices. DCI format 2_2 may be used for transmission of a transmit power control (TPC) command for PUCCH or PUSCH. DCI format 2_3 may be used for transmission of a group of TPC commands for SRS transmissions by one or more wireless devices. DCI format(s) for new functions may be defined in future releases. DCI formats may have different DCI sizes, or may share the same DCI size.

The base station may process the DCI with channel coding (e.g., polar coding), rate matching, scrambling and/or QPSK modulation, for example, after scrambling the DCI with an RNTI. A base station may map the coded and modulated DCI on resource elements used and/or configured for a PDCCH. The base station may send/transmit the DCI via a PDCCH occupying a number of contiguous control channel elements (CCEs), for example, based on a payload size of the DCI and/or a coverage of the base station. The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
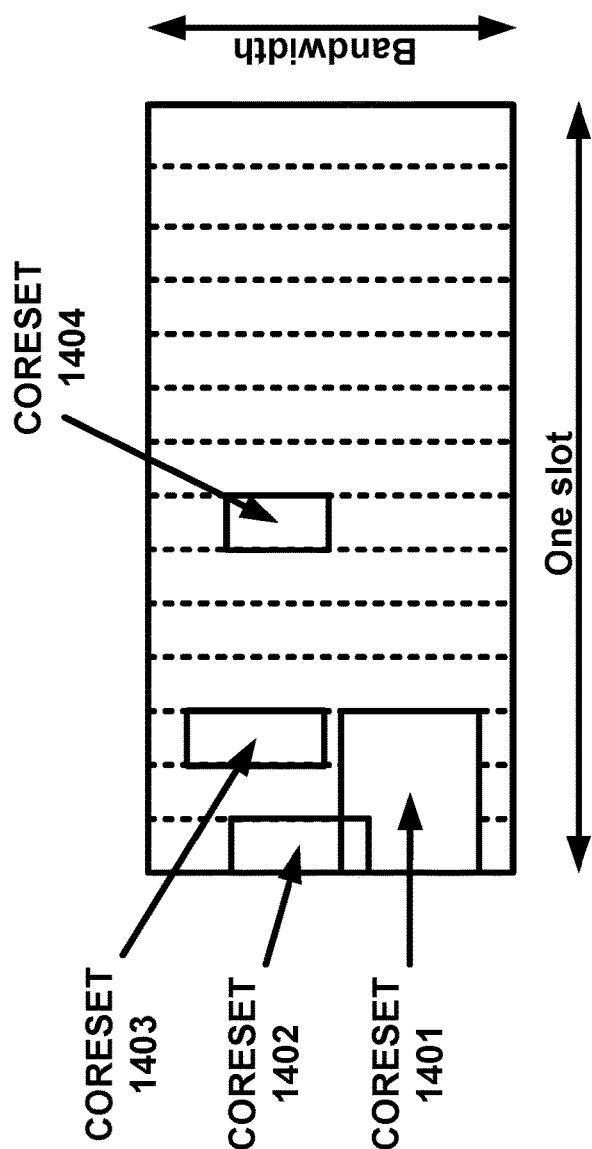
FIG. 14A shows an example of control resource set (CORESET) configurations.

FIG. 14A shows an example of CORESET configurations. The CORESET configurations may be for a bandwidth part or any other frequency bands. The base station may send/transmit DCI via a PDCCH on one or more control resource sets (CORESETs). A CORESET may comprise a time-frequency resource in which the wireless device attempts/tries to decode DCI using one or more search spaces. The base station may configure a size and a location of the CORESET in the time-frequency domain. A first CORESET 1401 and a second CORESET 1402 may occur or may be set/configured at the first symbol in a slot. The first CORESET 1401 may overlap with the second CORESET 1402 in the frequency domain. A third CORESET 1403 may occur or may be set/configured at a third symbol in the slot. A fourth CORESET 1404 may occur or may be set/configured at the seventh symbol in the slot. CORESETs may have a different number of resource blocks in frequency domain.

Figure 14B:
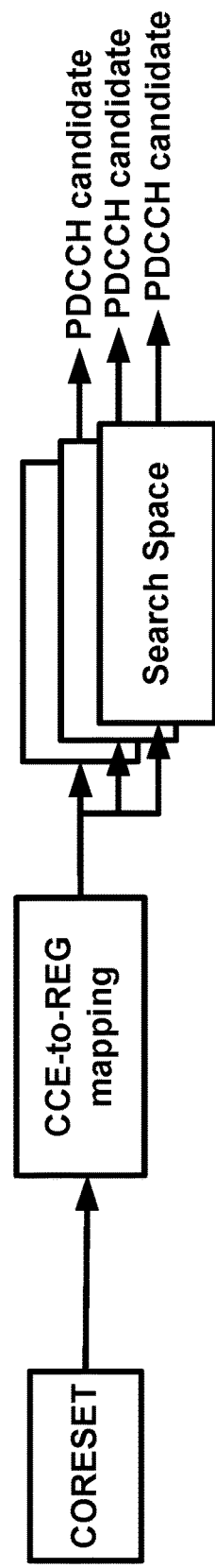
FIG. 14B shows an example of a control channel element to resource element group (CCE-to-REG) mapping.

FIG. 14B shows an example of a CCE-to-REG mapping. The CCE-to-REG mapping may be performed for DCI transmission via a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping (e.g., by an RRC configuration). A CORESET may be configured with an antenna port QCL parameter. The antenna port QCL parameter may indicate QCL information of a DM-RS for a PDCCH reception via the CORESET.

The base station may send/transmit, to the wireless device, one or more RRC messages comprising configuration parameters of one or more CORESETs and one or more search space sets. The configuration parameters may indicate an association between a search space set and a CORESET. A search space set may comprise a set of PDCCH candidates formed by CCEs (e.g., at a given aggregation level). The configuration parameters may indicate at least one of: a number of PDCCH candidates to be monitored per aggregation level; a PDCCH monitoring periodicity and a PDCCH monitoring pattern; one or more DCI formats to be monitored by the wireless device; and/or whether a search space set is a common search space set or a wireless device-specific search space set (e.g., a UE-specific search space set). A set of CCEs in the common search space set may be predefined and known to the wireless device. A set of CCEs in the wireless device-specific search space set (e.g., the UE-specific search space set) may be configured, for example, based on the identity of the wireless device (e.g., C-RNTI).

As shown in FIG. 14B, the wireless device may determine a time-frequency resource for a CORESET based on one or more RRC messages. The wireless device may determine a CCE-to-REG mapping (e.g., interleaved or non-interleaved, and/or mapping parameters) for the CORESET, for example, based on configuration parameters of the CORESET. The wireless device may determine a number (e.g., at most 10) of search space sets configured on/for the CORESET, for example, based on the one or more RRC messages. The wireless device may monitor a set of PDCCH candidates according to configuration parameters of a search space set. The wireless device may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding DCI content of one or more PDCCH candidates with possible (or configured) PDCCH locations, possible (or configured) PDCCH formats (e.g., the number of CCEs, the number of PDCCH candidates in common search spaces, and/or the number of PDCCH candidates in the wireless device-specific search spaces) and possible (or configured) DCI formats. The decoding may be referred to as blind decoding. The wireless device may determine DCI as valid for the wireless device, for example, after or in response to CRC checking (e.g., scrambled bits for CRC parity bits of the DCI matching an RNTI value). The wireless device may process information comprised in the DCI (e.g., a scheduling assignment, an uplink grant, power control, a slot format indication, a downlink preemption, and/or the like).

The may send/transmit uplink control signaling (e.g., UCI) to a base station. The uplink control signaling may comprise HARQ acknowledgements for received DL-SCH transport blocks. The wireless device may send/transmit the HARQ acknowledgements, for example, after or in response to receiving a DL-SCH transport block. Uplink control signaling may comprise CSI indicating a channel quality of a physical downlink channel. The wireless device may send/transmit the CSI to the base station. The base station, based on the received CSI, may determine transmission format parameters (e.g., comprising multi-antenna and beamforming schemes) for downlink transmission(s). Uplink control signaling may comprise scheduling requests (SR). The wireless device may send/transmit an SR indicating that uplink data is available for transmission to the base station. The wireless device may send/transmit UCI (e.g., HARQ acknowledgements (HARQ-ACK), CSI report, SR, and the like) via a PUCCH or a PUSCH. The wireless device may send/transmit the uplink control signaling via a PUCCH using one of several PUCCH formats.

There may be multiple PUCCH formats (e.g., five PUCCH formats). A wireless device may determine a PUCCH format, for example, based on a size of UCI (e.g., a quantity/number of uplink symbols of UCI transmission and a number of UCI bits). PUCCH format 0 may have a length of one or two OFDM symbols and may comprise two or fewer bits. The wireless device may send/transmit UCI via a PUCCH resource, for example, using PUCCH format 0 if the transmission is over/via one or two symbols and the quantity/number of HARQ-ACK information bits with positive or negative SR (HARQ-ACK/SR bits) is one or two. PUCCH format 1 may occupy a number of OFDM symbols (e.g., between four and fourteen OFDM symbols) and may comprise two or fewer bits. The wireless device may use PUCCH format 1, for example, if the transmission is over/via four or more symbols and the number of HARQ-ACK/SR bits is one or two. PUCCH format 2 may occupy one or two OFDM symbols and may comprise more than two bits. The wireless device may use PUCCH format 2, for example, if the transmission is over/via one or two symbols and the quantity/number of UCI bits is two or more. PUCCH format 3 may occupy a number of OFDM symbols (e.g., between four and fourteen OFDM symbols) and may comprise more than two bits. The wireless device may use PUCCH format 3, for example, if the transmission is four or more symbols, the quantity/number of UCI bits is two or more, and the PUCCH resource does not comprise an orthogonal cover code (OCC). PUCCH format 4 may occupy a number of OFDM symbols (e.g., between four and fourteen OFDM symbols) and may comprise more than two bits. The wireless device may use PUCCH format 4, for example, if the transmission is four or more symbols, the quantity/number of UCI bits is two or more, and the PUCCH resource comprises an OCC.

The base station may send/transmit configuration parameters to the wireless device for a plurality of PUCCH resource sets, for example, using an RRC message. The plurality of PUCCH resource sets (e.g., up to four sets in NR, or up to any other quantity of sets in other systems) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g., a maximum number) of UCI information bits the wireless device may send/transmit using one of the plurality of PUCCH resources in the PUCCH resource set. The wireless device may select one of the plurality of PUCCH resource sets, for example, based on a total bit length of the UCI information bits (e.g., HARQ-ACK, SR, and/or CSI) if configured with a plurality of PUCCH resource sets. The wireless device may select a first PUCCH resource set having a PUCCH resource set index equal to "0," for example, if the total bit length of UCI information bits is two or fewer. The wireless device may select a second PUCCH resource set having a PUCCH resource set index equal to "1," for example, if the total bit length of UCI information bits is greater than two and less than or equal to a first configured value. The wireless device may select a third PUCCH resource set having a PUCCH resource set index equal to "2," for example, if the total bit length of UCI information bits is greater than the first configured value and less than or equal to a second configured value. The wireless device may select a fourth PUCCH resource set having a PUCCH resource set index equal to "3," for example, if the total bit length of UCI information bits is greater than the second configured value and less than or equal to a third value (e.g., 1406, 1706, or any other quantity of bits).

The wireless device may determine a PUCCH resource from the PUCCH resource set for UCI (HARQ-ACK, CSI, and/or SR) transmission, for example, after determining a PUCCH resource set from a plurality of PUCCH resource sets. The wireless device may determine the PUCCH resource, for example, based on a PUCCH resource indicator in DCI (e.g., with DCI format 1_0 or DCI for 1_1) received on/via a PDCCH. An n-bit (e.g., a three-bit) PUCCH resource indicator in the DCI may indicate one of multiple (e.g., eight) PUCCH resources in the PUCCH resource set. The wireless device may send/transmit the UCI (HARQ-ACK, CSI and/or SR) using a PUCCH resource indicated by the PUCCH resource indicator in the DCI, for example, based on the PUCCH resource indicator.

Figure 15A:
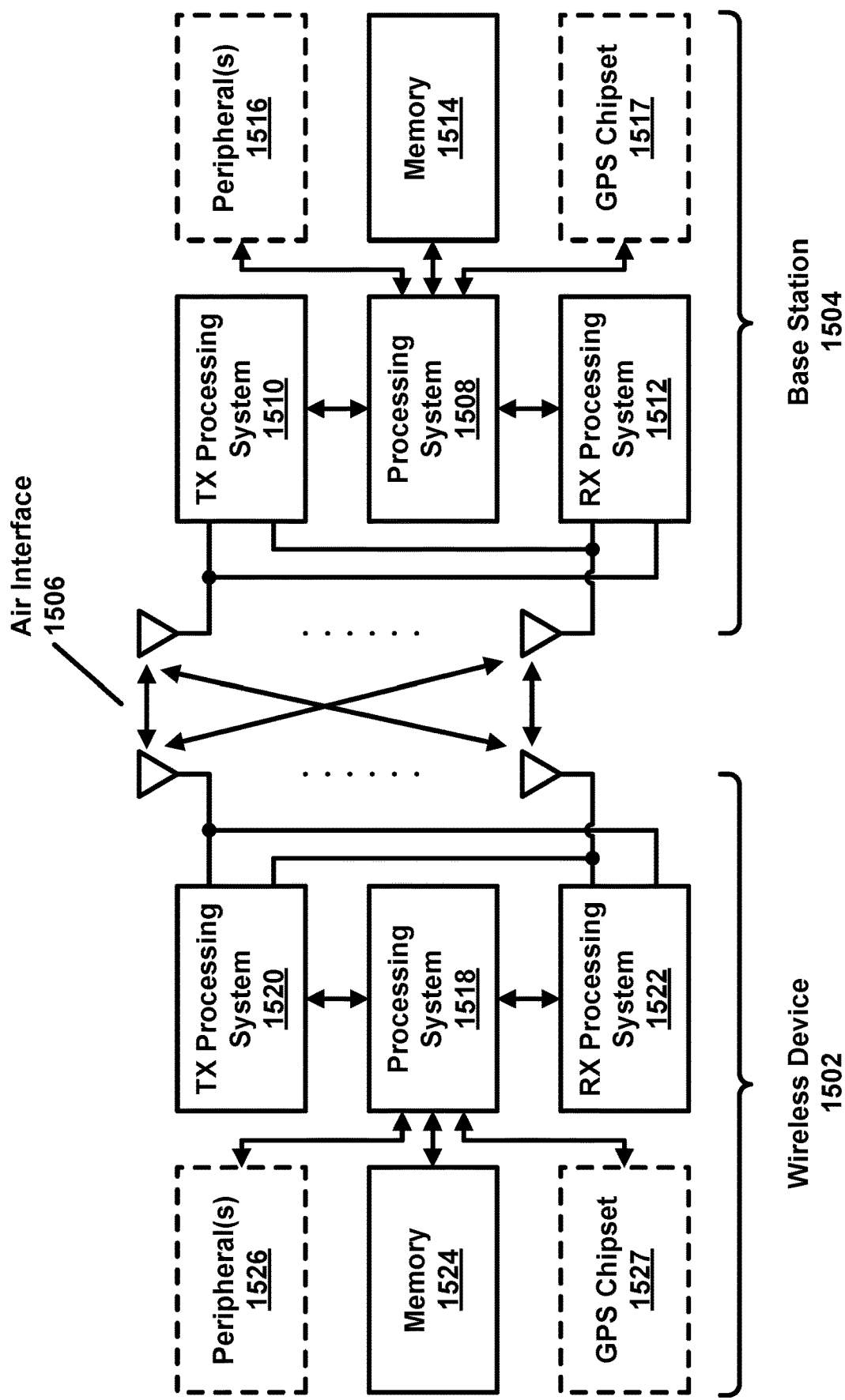
FIG. 15A shows an example of communications between a wireless device and a base station.

FIG. 15A shows an example communications between a wireless device and a base station. A wireless device 1502 and a base station 1504 may be part of a communication network, such as the communication network 100 shown in FIG. 1A, the communication network 150 shown in FIG. 1B, or any other communication network. A communication network may comprise more than one wireless device and/or more than one base station, with substantially the same or similar configurations as those shown in FIG. 15A.

The base station 1504 may connect the wireless device 1502 to a core network (not shown) via radio communications over the air interface (or radio interface) 1506. The communication direction from the base station 1504 to the wireless device 1502 over the air interface 1506 may be referred to as the downlink. The communication direction from the wireless device 1502 to the base station 1504 over the air interface may be referred to as the uplink. Downlink transmissions may be separated from uplink transmissions, for example, using various duplex schemes (e.g., FDD, TDD, and/or some combination of the duplexing techniques).

For the downlink, data to be sent to the wireless device 1502 from the base station 1504 may be provided/transferred/sent to the processing system 1508 of the base station 1504. The data may be provided/transferred/sent to the processing system 1508 by, for example, a core network. For the uplink, data to be sent to the base station 1504 from the wireless device 1502 may be provided/transferred/sent to the processing system 1518 of the wireless device 1502. The processing system 1508 and the processing system 1518 may implement layer 3 and layer 2 OSI functionality to process the data for transmission. Layer 2 may comprise an SDAP layer, a PDCP layer, an RLC layer, and a MAC layer, for example, described with respect to FIG. 2A, FIG. 2B, FIG. 3, and FIG. 4A. Layer 3 may comprise an RRC layer, for example, described with respect to FIG. 2B.

The data to be sent to the wireless device 1502 may be provided/transferred/sent to a transmission processing system 1510 of base station 1504, for example, after being processed by the processing system 1508. The data to be sent to base station 1504 may be provided/transferred/sent to a transmission processing system 1520 of the wireless device 1502, for example, after being processed by the processing system 1518. The transmission processing system 1510 and the transmission processing system 1520 may implement layer 1 OSI functionality. Layer 1 may comprise a PHY layer, for example, described with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

A reception processing system 1512 of the base station 1504 may receive the uplink transmission from the wireless device 1502. The reception processing system 1512 of the base station 1504 may comprise one or more TRPs. A reception processing system 1522 of the wireless device 1502 may receive the downlink transmission from the base station 1504. The reception processing system 1522 of the wireless device 1502 may comprise one or more antenna panels. The reception processing system 1512 and the reception processing system 1522 may implement layer 1 OSI functionality. Layer 1 may include a PHY layer, for example, described with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

The base station 1504 may comprise multiple antennas (e.g., multiple antenna panels, multiple TRPs, etc.). The wireless device 1502 may comprise multiple antennas (e.g., multiple antenna panels, etc.). The multiple antennas may be used to perform one or more MIMO or multi-antenna techniques, such as spatial multiplexing (e.g., single-user MIMO or multi-user MIMO), transmit/receive diversity, and/or beamforming. The wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518, respectively, to carry out one or more of the functionalities (e.g., one or more functionalities described herein and other functionalities of general computers, processors, memories, and/or other peripherals). The transmission processing system 1510 and/or the reception processing system 1512 may be coupled to the memory 1514 and/or another memory (e.g., one or more non-transitory computer readable mediums) storing computer program instructions or code that may be executed to carry out one or more of their respective functionalities. The transmission processing system 1520 and/or the reception processing system 1522 may be coupled to the memory 1524 and/or another memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and/or the base station 1504 to operate in a wireless environment.

The processing system 1508 may be connected to one or more peripherals 1516. The processing system 1518 may be connected to one or more peripherals 1526. The one or more peripherals 1516 and the one or more peripherals 1526 may comprise software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive input data (e.g., user input data) from, and/or provide output data (e.g., user output data) to, the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 may be connected to a Global Positioning System (GPS) chipset 1517. The processing system 1518 may be connected to a Global Positioning System (GPS) chipset 1527. The GPS chipset 1517 and the GPS chipset 1527 may be configured to determine and provide geographic location information of the wireless device 1502 and the base station 1504, respectively.

Figure 15B:
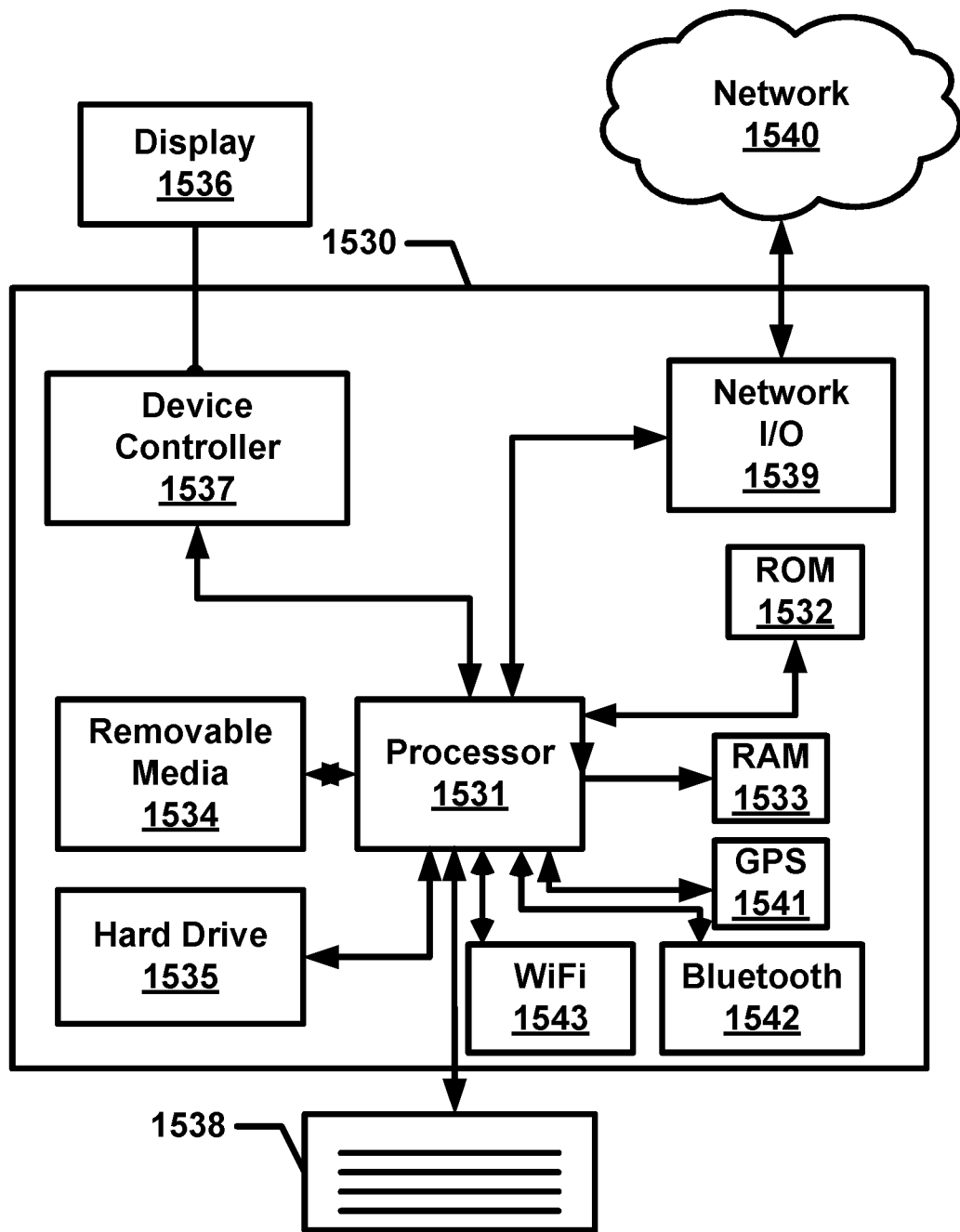
FIG. 15B shows example elements of a computing device that may be used to implement any of the various devices described herein

FIG. 15B shows example elements of a computing device that may be used to implement any of the various devices described herein, including, for example, the base station 160A, 160B, 162A, 162B, 220, and/or 1504, the wireless device 106, 156A, 156B, 210, and/or 1502, or any other base station, wireless device, AMF, UPF, network device, or computing device described herein. The computing device 1530 may include one or more processors 1531, which may execute instructions stored in the random-access memory (RAM) 1533, the removable media 1534 (such as a Universal Serial Bus (USB) drive, compact disk (CD) or digital versatile disk (DVD), or floppy disk drive), or any other desired storage medium. Instructions may also be stored in an attached (or internal) hard drive 1535. The computing device 1530 may also include a security processor (not shown), which may execute instructions of one or more computer programs to monitor the processes executing on the processor 1531 and any process that requests access to any hardware and/or software components of the computing device 1530 (e.g., ROM 1532, RAM 1533, the removable media 1534, the hard drive 1535, the device controller 1537, a network interface 1539, a GPS 1541, a Bluetooth interface 1542, a WiFi interface 1543, etc.). The computing device 1530 may include one or more output devices, such as the display 1536 (e.g., a screen, a display device, a monitor, a television, etc.), and may include one or more output device controllers 1537, such as a video processor. There may also be one or more user input devices 1538, such as a remote control, keyboard, mouse, touch screen, microphone, etc.

The computing device 1530 may also include one or more network interfaces, such as a network interface 1539, which may be a wired interface, a wireless interface, or a combination of the two. The network interface 1539 may provide an interface for the computing device 1530 to communicate with a network 1540 (e.g., a RAN, or any other network). The network interface 1539 may include a modem (e.g., a cable modem), and the external network 1540 may include communication links, an external network, an in-home network, a provider's wireless, coaxial, fiber, or hybrid fiber/coaxial distribution system (e.g., a DOCSIS network), or any other desired network. Additionally, the computing device 1530 may include a location-detecting device, such as a global positioning system (GPS) microprocessor 1541, which may be configured to receive and process global positioning signals and determine, with possible assistance from an external server and antenna, a geographic position of the computing device 1530.

The example in FIG. 15B may be a hardware configuration, although the components shown may be implemented as software as well. Modifications may be made to add, remove, combine, divide, etc. components of the computing device 1530 as desired. Additionally, the components may be implemented using basic computing devices and components, and the same components (e.g., processor 1531, ROM storage 1532, display 1536, etc.) may be used to implement any of the other computing devices and components described herein. For example, the various components described herein may be implemented using computing devices having components such as a processor executing computer-executable instructions stored on a computer-readable medium, as shown in FIG. 15B. Some or all of the entities described herein may be software based, and may co-exist in a common physical platform (e.g., a requesting entity may be a separate software process and program from a dependent entity, both of which may be executed as software on a common computing device).

FIG. 16A shows an example structure for uplink transmission. Processing of a baseband signal representing a physical uplink shared channel may comprise/perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA), CP-OFDM signal for an antenna port, or any other signals; and/or the like. An SC-FDMA signal for uplink transmission may be generated, for example, if transform precoding is enabled. A CP-OFDM signal for uplink transmission may be generated, for example, if transform precoding is not enabled (e.g., as shown in FIG. 16A). These functions are examples and other mechanisms for uplink transmission may be implemented.

FIG. 16B shows an example structure for modulation and up-conversion of a baseband signal to a carrier frequency. The baseband signal may be a complex-valued SC-FDMA, CP-OFDM baseband signal (or any other baseband signals) for an antenna port and/or a complex-valued Physical Random Access Channel (PRACH) baseband signal. Filtering may be performed/employed, for example, prior to transmission.

FIG. 16C shows an example structure for downlink transmissions. Processing of a baseband signal representing a physical downlink channel may comprise/perform one or more functions. The one or more functions may comprise: scrambling of coded bits in a codeword to be sent/transmitted on/via a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are examples and other mechanisms for downlink transmission may be implemented.

FIG. 16D shows an example structure for modulation and up-conversion of a baseband signal to a carrier frequency. The baseband signal may be a complex-valued OFDM baseband signal for an antenna port or any other signal. Filtering may be performed/employed, for example, prior to transmission.

A wireless device may receive, from a base station, one or more messages (e.g., RRC messages) comprising configuration parameters of a plurality of cells (e.g., a primary cell, one or more secondary cells). The wireless device may communicate with at least one base station (e.g., two or more base stations in dual-connectivity) via the plurality of cells. The one or more messages (e.g., as a part of the configuration parameters) may comprise parameters of PHY, MAC, RLC, PCDP, SDAP, RRC layers for configuring the wireless device. The configuration parameters may comprise parameters for configuring PHY and MAC layer channels, bearers, etc. The configuration parameters may comprise parameters indicating values of timers for PHY, MAC, RLC, PCDP, SDAP, RRC layers, and/or communication channels.

A timer may begin running, for example, if it is started. The timer may continue running until it is stopped or until it expires. A timer may be started, for example, if it is not running or restarted if it is running A timer may be associated with a value (e.g., the timer may be started or restarted from a value or may be started from zero and expire once it reaches the value). The duration of a timer may not be updated, for example, until the timer is stopped or expires (e.g., due to BWP switching). A timer may be used to measure a time period/window for a process. With respect to an implementation and/or procedure related to one or more timers or other parameters, it will be understood that there may be multiple ways to implement the one or more timers or other parameters. One or more of the multiple ways to implement a timer may be used to measure a time period/window for the procedure. A random access response window timer may be used for measuring a window of time for receiving a random access response. The time difference between two time stamps may be used, for example, instead of starting a random access response window timer and determine the expiration of the timer. A process for measuring a time window may be restarted, for example, if a timer is restarted. Other example implementations may be configured/provided to restart a measurement of a time window.

Random access (RA) procedures may be used to establish communications between a wireless device and a base station in a cell. A base station may send/transmit one or more messages (e.g., RRC messages) to configure the wireless device with one or more parameters of a RACH configuration, for example, prior to a start/trigger/initiation of a RA procedure. The base station may send/transmit (e.g., broadcast or multicast) the one or more RRC messages to one or more wireless devices. The one or more messages (e.g., RRC messages) may be wireless device-specific messages (e.g., dedicated RRC messages sent/transmitted to a wireless device in an RRC inactive state (e.g., RRC INACTIVE) or an RRC connected state (e.g., RRC CONNECTED)). The one or more messages (e.g., RRC messages) may comprise one or more parameters for transmitting at least one preamble via one or more random access resources. The one or more parameters may indicate at least one of: a PRACH resource allocation, a preamble format, SSB information (e.g., the total number/quantity of SSBs, downlink resource allocation of SSB transmission, a transmission power of SSB transmission, and/or other information), and/or uplink radio resources for one or more transport block transmissions.

A base station may send/transmit one or more downlink reference signals. One or more downlink reference signals may comprise one or more discovery reference signals or any other downlink reference signals, such as CSI-RSs. A wireless device may select a first downlink reference signal among the one or more downlink reference signals. The first downlink reference signal may comprise one or more synchronization signals (e.g., PSS and SSS) and a physical broadcast channel (SS/PBCH). The wireless device may determine/perform/adjust a downlink synchronization, for example, based on the one or more synchronization signals.

One or more messages (e.g., RRC messages) may comprise one or more parameters indicating one or more downlink control channels, such as PDCCHs. Each of the one or more downlink control channels may be associated with at least one of the one or more downlink reference signals. The first downlink reference signal may comprise system information (e.g., a MIB and/or a SIB). A base station may send/transmit the system information, for example, on/via a PBCH, a PDCCH, and/or a PDSCH.

System information may comprise at least one information element (e.g., PDCCH-Config, PDCCH-ConfigSIB1, PDCCH-ConfigCommon). The at least one information element may be used, for example, to configure a wireless device with, among other things, one or more control parameters. The one or more control parameters may comprise one or more parameters of one or more CORESETs. The one or more control parameters may comprise the parameters of a first common CORESET #0 (e.g., controlResourceSetZero), and/or a first common CORESET (e.g., commonControlResourceSet). The one or more control parameters may comprise one or more search space sets. The one or more control parameters may comprise the parameters of a first search space for a SIB (e.g., searchSpaceSIB1), and/or a first common search space #0 (e.g., searchSpaceZero), and/or a first random access search space (e.g., ra-SearchSpace), and/or a first paging search space (e.g., pagingSearchSpace). The wireless device may use the one or more control parameters to detect/receive/determine/obtain/acquire the one or more downlink control channels.

A wireless device may monitor a set of candidates for the one or more downlink control channels in the one or more control resource sets. The one or more control resource sets may be on a first active downlink frequency band (e.g., an active BWP) on a first activated serving cell. The first activated serving cell may be configured with the one or more control parameters, for example, according to the one or more search space sets. The wireless device may decode (e.g., blindly decode) each of the one or more downlink control channels in the set of candidates for the one or more downlink control channels, for example, according to a first format of first DCI. The set of candidates for the one or more downlink control channels may be defined in terms of the one or more search space sets. The one or more search space sets may comprise one or more common search space sets (e.g., Type0-PDCCH, Type0A-PDCCH, Type1-PDCCH, Type2-PDCCH, Type3-PDCCH), and/or one or more wireless device-specific search space sets.

A wireless device may monitor a set of candidates for the one or more downlink control channels in a common search space set (e.g., a Type0-PDCCH common search space set). The common search space set (e.g., Type0-PDCCH common search space set) may be configured by at least one information element (e.g., PDCCH-ConfigSIB1) in a MIB. The common search space set (e.g., Type0-PDCCH common search space set) may be configured by one or more search space sets (e.g., a searchSpaceSIB1 in PDCCH-ConfigCommon, or searchSpaceZero in PDCCH-ConfigCommon). The common search space set (e.g., Type0-PDCCH common search space set) may be configured for a first format of first DCI scrambled by a first radio network temporary identifier (e.g., a system information-radio network temporary identifier (SI-RNTI) or any other RNTI).

A wireless device may monitor a set of candidates for one or more downlink control channels in a common search space set (e.g., Type1-PDCCH common search space set). The common search space set (e.g., Type1-PDCCH common search space set) may be configured by one or more search space sets (e.g., a ra-searchSpace in a PDCCH-ConfigCommon). The common search space set (e.g., Type1-PDCCH common search space set) may be configured for a second format of second DCI scrambled by a second radio network temporary identifier (e.g., a random access-radio network temporary identifier (RA-RNTI), a temporary cell-radio network temporary identifier (TC-RNTI), or any other RNTI).

A wireless device may determine, for example during a cell search, that a first control resource set for a first common search space (e.g., Type0-PDCCH) is present. The first control resource set may comprise one or more resource blocks and one or more symbols. One or more messages (e.g., RRC messages) may comprise one or more parameters indicating one or more monitoring occasions of the one or more downlink control channels. The wireless device may determine a number/quantity of consecutive resource blocks and a number/quantity of consecutive symbols for the first control resource set of the first common search space. One or more bits (e.g., a four most significant bits) of the at least one information element (e.g., PDCCH-ConfigSIB1) may indicate the number/quantity of consecutive resource blocks and the number/quantity of consecutive symbols. The wireless device may determine the one or more monitoring occasions of the one or more downlink control channels from one or more bits (e.g., a four least significant bits) of the at least one information element (e.g., PDCCH-ConfigSIB1). The one or more monitoring occasions of the one or more downlink control channels associated with the first downlink reference signal may be determined, for example, based on one or more system frame numbers and one or more slot indexes of the first control resource set. The time resource for transmitting the first downlink reference signal with a first index may overlap with the first frame number and the first slot (e.g., with the first slot index).

A wireless device may determine a first downlink channel among the one or more downlink control channels, for example, based on a first downlink reference signal. The first downlink channel may be a first downlink control channel, or a first SIB (e.g., SIB1). The wireless device may assume/determine that a demodulation reference signal antenna port associated with a reception of the first downlink channel is quasi co-located (QCL) with the first downlink reference signal. The demodulation reference signal antenna port associated with the reception of the first downlink channel and the first downlink reference signal (e.g., the corresponding SS/PBCH block) may be quasi co-located with respect to at least one of: an average gain, QCL-TypeA, and/or QCL-TypeD.

A wireless device (e.g., a physical layer of the wireless device) may receive from higher layers, among other information, one or more SS/PBCH block indexes. The wireless device (e.g., the physical layer of the wireless device) may receive one or more configuration parameters of one or more PRACH transmission parameters (e.g., the one or more PRACH transmission parameters may indicate a PRACH preamble format, a preamble index, a corresponding RA-RNTI, time resources, and/or frequency resources for PRACH transmission), and/or parameters for determining one or more sequences and their shifts in the PRACH preamble sequence set (e.g., set type). The wireless device (e.g., the physical layer of the wireless device) may send/transmit/transfer/provide to higher layers one or more corresponding sets of reference signal received power (RSRP) measurements.

A random access procedure may comprise one or more transmissions of a random access preamble (e.g., Msg1, a preamble of MsgA, or any other preambles) in one or more PRACH occasions. The random access procedure may comprise one or more transmissions of one or more random access response (RAR) messages, for example, with one or more physical downlink channels (e.g., Msg2, an RAR of MsgB, or any other RAR). The random access procedure may comprise one or more transmissions of uplink data (e.g., Msg3, a PUSCH of MsgA, or any other uplink shared channels) in one or more physical uplink channels (e.g., PUSCH carrying one or more transport blocks), and one or more physical downlink channels (PDSCH) for contention resolution. The random access procedure may be triggered upon request of one or more PRACH transmissions, for example, by higher layers or by one or more control orders (e.g., a PDCCH order or any other control orders).

A wireless device (e.g., a MAC entity of the wireless device) may select/determine one or more random access resources for a random access procedure, for example, if the random access procedure is initiated. The wireless device (e.g., the MAC entity) may select/determine a first downlink reference signal. The wireless device (e.g., the MAC entity) may select/determine the first downlink reference signal (e.g., a first SSB or a first CSI-RS) with the first RSRP above a first RSRP threshold. The first RSRP threshold may be defined/determined, for example, based on (or per) a type of reference signal (e.g., rsrp-ThresholdSSB may be for a SSB and rsrp-ThresholdCSI-RS for a CSI-RS). The first RSRP threshold may be sent/transmitted (e.g., broadcast), semi-statically configured, and/or predefined. The wireless device (e.g., the MAC entity) may select/determine the first downlink reference signal for contention-free random access procedure, for example, for beam failure recovery, system information request, or any other purposes. The wireless device (e.g., the MAC entity) may select/determine the first downlink reference signal for contention-based random access procedure.

A wireless device may select/determine one or more random access resources. The one or more random access resources may, for example, comprise one or more random access preambles, one or more time resources, and/or one or more frequency resources for PRACH transmission. The one or more random access resources may be predefined/configured (e.g., by a base station or other network entities). The one or more random access resources may be configured/provided via/by one or more messages (e.g., higher layer signaling, such as one or more RRC messages). The one or more random access resources may be configured/provided via/by one or more downlink control orders (e.g., a PDCCH order or any other control orders). The one or more random access resources may be determined, for example, based on the first downlink reference signal. The wireless device may set a first preamble index to a parameter (e.g., ra-PreambleIndex) corresponding to the first downlink reference signal.

A wireless device may send/transmit at least one random access preamble in one or more random access resources. The wireless device may send/transmit a first preamble with a first preamble index. The first preamble may be sent/transmitted, for example, using a first PRACH format with a first transmission power, via/on one or more PRACH resources. The one or more PRACH resources may comprise one or more PRACH occasions (or RACH occasions) (ROs).

One or more messages (e.g., RRC messages) may comprise one or more random access parameters. A cell-specific random access configuration message (e.g., RACH-Config-Common and/or RACH-ConfigGeneric) may comprise, among other parameters, at least one of: a total number/quantity of random access preambles (e.g., totalNumberOfRA-Preambles), one or more PRACH configuration indexes (e.g., prach-ConfigurationIndex), a number/quantity of ROs that may be multiplexed in frequency domain (FDMed) in a time instance (e.g., msg1-FDM), an offset of a lowest PRACH occasion in frequency domain with respect to a first resource block (e.g., msg1-FrequencyStart), a power ramping step for PRACH (e.g., powerRampingStep), a target power level at the network receiver side (preambleReceivedTargetPower), a maximum number/quantity of random access preamble transmissions that may be performed (e.g., preambleTransMax), a window length (e.g., ra-ResponseWindow) for an RAR (e.g., Msg2, an RAR of MsgB, or any other RARs), a number/quantity of SSBs per RACH occasion and a number/quantity of contention-based preambles per SSB (e.g., ssb-perRACH-OccasionAndCB-PreamblesPerSSB). The total number/quantity of random access preambles may be a multiple of the number/quantity of SSBs per RACH occasion. The window length for an RAR may be in number/quantity of slots. A dedicated random access configuration message (e.g., RACH-ConfigDedicated) may comprise, among other parameters, one or more ROs for contention-free random access (e.g., occasions), and one or more PRACH mask index for random access resource selection (e.g., ra-ssb-OccasionMaskIndex).

One or more random access parameters (e.g., ssb-perRACH-OccasionAndCB-PreamblesPerSSB) may be sent/transmitted to a wireless device. The one or more random access parameters (e.g., ssb-perRACH-OccasionAndCB-PreamblesPerSSB) may indicate a first number (e.g., N) of one or more downlink reference signals (e.g., SS/PBCH blocks) that may be associated with a first PRACH occasion. The one or more random access parameters (e.g., ssb-perRACH-OccasionAndCB-PreamblesPerSSB) may indicate, to the wireless device, a second number (e.g., R) of the one or more random access preambles for a first downlink reference signal and for a first PRACH occasion. The one or more random access preambles may be contention-based preambles. The first downlink reference signal may be a first SSB. The first SSB may be mapped to at least one (e.g., 1/N) consecutive valid PRACH occasion, for example, according to the first number (e.g., if N<1). At least one preamble with consecutive indexes associated with the first SSB may start from the first preamble index for the first valid PRACH occasion, for example, according to the second number (e.g., R).

One or more PRACH configuration indexes (e.g., prach-ConfigurationIndex), may indicate, among other things, a preamble format, a periodicity for one or more PRACH time resources, one or more PRACH subframe numbers, a number/quantity of PRACH slots within the one or more PRACH subframes, a PRACH starting symbol number, and a number/quantity of time domain PRACH occasions within a first PRACH slot.

One or more random access parameters may comprise an association period for mapping one or more SSBs to one or more ROs. One or more SSB indexes may be mapped to the one or more ROs, for example, based on an order. The order may comprise at least one of: increasing/decreasing order of indexes of at least one preamble in a first PRACH occasion; increasing/decreasing order of indexes of one or more frequency resources (e.g., for frequency multiplexed ROs); increasing/decreasing order of indexes of one or more time resources (e.g., for time multiplexed PRACH occasions) in the first PRACH slot; and/or increasing/decreasing order of indexes for one or more PRACH slots.

A base station may trigger a PRACH transmission, for example, by sending/transmitting one or more control orders (e.g., a PDCCH order or any other control orders). One or more PRACH mask indexes (e.g., ra-ssb-OccasionMaskIndex) may indicate one or more ROs. The one or more ROs may be associated with a first SSB index indicated by the one or more control orders. The one or more ROs may be mapped (e.g., consecutively) for the first SSB index. The wireless device may select a first PRACH occasion indicated by a first PRACH mask index value for the first SSB index in the first association period. The first association period may be a first mapping cycle. The wireless device may reset the one or more indexes of the one or more ROs for the first mapping cycle.

A wireless device may determine a first PRACH occasion for sending/transmitting a first preamble. The wireless device may determine a random access-radio network temporary identifier (e.g., RA-RNTI) associated with the first PRACH occasion. The RA-RNTI may be a type of RNTI. The RA-RNTI may be, among other things, a function of at least one of: a PRACH symbol, a slot index of a PRACH occasion in a system frame, a frequency index of the PRACH occasion in frequency domain, and/or an uplink carrier index. The RA-RNTI may be computed/determined/calculated as: RA-RNTI=1+s_id+14×t_id+14×80×f_id+14×80×8×ul_carrier_id. s_id may be a PRACH starting symbol, t_id may be an index of a first slot of a first PRACH occasion in a system frame, f_id may be an index of the first PRACH occasion in frequency domain, and ul_carrier_id may be an uplink carrier index.

A wireless device may determine a parameter indicating a first preamble target power (e.g., PREAMBLE_RECEIVED_TARGET_POWER). The wireless device may send/transmit a first preamble via/using a first PRACH occasion, for example, with a first preamble transmission power (e.g., $P_{PRACH,b,f,c}(i)$). The first preamble transmission power may be determined, for example, based on the first preamble target power.

A wireless device may receive one or more RARs (e.g., Msg2, an RAR of MsgB, or any other RARs), for example, after or in response to a PRACH transmission. The one or more random access responses may be scrambled by a particular radio network temporary identifier (e.g., RA-RNTI). The wireless device may monitor a search space set (e.g., the Type1-PDCCH common search space) for first DCI (e.g., DCI format 1_0). The first DCI may comprise the one or more RARs. A base station may send/transmit the one or more RARs in a form of a DCI format (e.g., DCI format 1_0) for a random access procedure (e.g., initiated by a PDCCH order, a MAC layer, and/or an RRC layer). The DCI (e.g., the DCI format 1_0) may comprise at least one of the following fields: one or more random access preamble index, an SS/PBCH index (or an SSB index), a PRACH mask index, a UL/SUL indicator, frequency and time domain resource assignments, modulation and/or coding schemes (MCSs).

A wireless device may monitor for first DCI (e.g., DCI format 1_0) during a time window. The time window may be indicated by the one or more messages (e.g., RRC messages). The time window may start at or within a first symbol of a first control resource set. The wireless device may be configured by the one or more parameters of the one or more messages (e.g., RRC messages) to receive the first DCI via/on the first control resource set. The wireless device may determine a length of the time window, for example, based on the one or more parameters in the one or more messages (e.g., ra-ResponseWindow). The length of the time window may be in a number/quantity of slots.

A wireless device may stop monitoring for DCI in a time window, for example, after or in response to a reception of one or more RARs being determined as a successful reception. A reception of the one or more RARs may be determined as successful, for example, if the one or more RARs comprise a preamble index (e.g., a random access preamble identity: RAPID) corresponding to the preamble that the wireless device sent/transmitted to the base station. The RAPID may be associated with the PRACH transmission. The one or more RARs may comprise an uplink grant indicating one or more uplink resources granted for the wireless device. The wireless device may send/transmit one or more transport blocks (e.g., Msg3, transport blocks of MsgB, or any other transport blocks) via the one or more uplink resources.

A four-step contention-based RA procedure (e.g., as shown in FIG. 13A) may have an associated latency, which may be at least fourteen transmission time intervals (TTI). 3GPP TR 38.804 v14.0.0 indicates a minimum latency (e.g., a minimum latency of fourteen TTIs comprising 3 TTIs after a message from step 1 (e.g., Msg1) of a four-step RA procedure, 1 TTI for a message from step 2 (e.g., Msg2) of a four-step RA procedure, 5 TTIs after the message from step 2, 1 TTI for a message from step 3 (e.g., Msg3) of a four-step RA procedure, 3 TTIs after the message from step 3, and 1 TTI for a message from step 4 (e.g., contention Resolution) of a four-step procedure (e.g., 3+1+5+1+3+1=14)). Reducing the number/quantity of steps in an RA procedure may reduce latency. A four-step RACH procedure may be reduced to a two-step random access (RACH) procedure, for example, by using parallel transmissions (e.g., as shown in FIG. 13C). A two-step RACH procedure may have an associated latency (e.g., a minimum of four TTIs), which may be less than an associated latency for a four-step RA procedure. 3GPP TR 38.804 v14.0.0 indicates a minimum latency (e.g., a minimum latency of four TTIs comprising 3 TTIs after a message from step 1 of a two-step RACH procedure and 1 TTI for a message from step 2 of a two-step RACH procedure).

A random access procedure (e.g., a four-step RACH procedure) may comprise four steps comprising a preamble transmission (e.g., Msg1, which also may be referred to herein as Msg 1), an RAR reception (e.g., Msg2, which also may be referred to herein as Msg 2), an uplink data transmission with a wireless device identity (e.g., Msg3, which also may be referred to herein as Msg 3), and contention resolution (e.g., Msg4, which also may be referred to herein as Msg 4). A random access procedure may comprise fewer steps (e.g., only two steps, such as a two-step RACH). In a two-step RACH procedure, the wireless device may send/transmit a preamble sequence and a data signal (e.g., one or more transport blocks) in one transmission (or substantially simultaneous transmissions) (e.g., MsgA, which also may be referred to herein as Msg A; the first step). The base station may respond to the wireless device by sending/transmitting an RAR (e.g., MsgB, which also may be referred to herein as Msg B), for example, after or in response to detecting the transmission comprising the preamble sequence and the data signal. The RAR (e.g., MsgB) may comprise the detected preamble index, the wireless device identity/identifier, and/or a timing advance. A two-step RACH procedure (a two-step random access procedure) my result in reduced delay for RACH transmission and/or reduced signaling overhead, for example, for both licensed and unlicensed bands.

A two-step RACH procedure may comprise an uplink (UL) transmission (e.g., a two-step MsgA 1331 shown in FIG. 13C). The UL transmission may comprise a random access preamble (RAP) transmission (e.g., the preamble 1341) and one or more transport blocks transmission (e.g., the transport block 1342). A downlink (DL) transmission (e.g., a two-step MsgB 1332 shown in FIG. 13C) may comprise a response (e.g., an RAR) corresponding to the uplink transmission). The response may comprise contention resolution information. The base station may perform the DL transmission, for example, after or in response to receiving the UL transmission from the wireless device.

A two-step RACH procedure may be able to operate regardless of whether the wireless device has a valid timing advance (TA). A two-step RACH procedure may be applicable to any cell size. A two-step RACH procedure may be applied for an RRC inactive state (e.g., RRC_INACTIVE), an RRC connected state (e.g., RRC_CONNECTED) and/or an RRC idle state (e.g., RRC_IDLE). A two-step RACH procedure may support contention-based random access. The channel structure of an uplink transmission of a two-step RACH procedure (e.g., MsgA) may comprise a preamble and PUSCH carrying payload. PRACH preamble design in at least some types of communications (e.g., communications by wireless devices compatible with 3GPP Release 16, earlier/later 3GPP releases, and/or any other access technologies) may be used for a two-step RACH procedure. PUSCH including a DM-RS for transmission of payload of MsgA may be used for a two-step RACH procedure. The PRACH preamble and the PUSCH in a MsgA may be multiplexed in a time domain (TDMed). The gap between the preamble and PUSCH may need to be short enough such that the MsgA can be sent/transmitted using one listen-before-talk (LBT), for example, for wireless devices operating in unlicensed bands or any other bands. The PRACH preamble and/or a PRACH occasion and the time-frequency resource of PUSCH in MsgA and DM-RS may be mapped for the uplink transmission of the two-step RACH procedure. The MsgA configuration in a two-step RACH may be sent/transmitted (e.g., broadcast) by the base station to the wireless device (e.g., via system information) and/or configured using dedicated signaling (e.g., RRC signaling). A base station may send/transmit one or more messages (e.g., RRC messages) to configure a wireless device with one or more parameters of a two-step RACH configuration. The one or more messages (e.g., RRC messages) may comprise parameters for transmitting the uplink transmission of a two-step RACH (e.g., MsgA). The parameters may indicate at least one of: a PRACH resource allocation, a preamble format, SSB information (e.g., total number/quantity of SSBs, downlink resource allocation of SSB transmission, transmission power of SSB transmission, and/or other information), and uplink radio resources for one or more transport block transmissions (e.g., uplink radio resources indicated by a UL grant). The same PRACH resources may be shared for one or more four-step RACH procedures and one or more two-step RACH procedures. One or more four-step RACH resources may be configured regardless whether a two-step RACH is configured or not. The configuration of a two-step RACH procedure may reuse the configuration of a four-step RACH procedure with one or more additional information (e.g., a UL grant, and/or UL grant to SSB association, and/or UL grant to PRACH occasion mapping, and/or UL grant to preamble mapping, etc.), for example, to save duplicated signaling. One or more other procedures (e.g., RACH-less, RACH-skip, PUSCH-only, or RACH-less PUSCH transmission procedures) may be grouped into a first type of access procedure or a first type of random access procedure, for example, in addition to the two-step RACH procedure. One or more other procedures that may have longer latency than the first type of access procedure may be grouped into a second type of access procedure or a second type of random access procedure, for example, in addition to the four-step RACH procedure. Although the four-step RACH procedure and the two-step RACH procedure may be compared to each other in one or more examples described herein, one or more examples described herein with respect to the two-step RACH procedure may be applicable to any of the first type of access procedure or the first type of random access procedure, and/or one or more examples described herein with respect to the four-step RACH procedure may be applicable to any of the second type of access procedure or the second type of random access procedure.

Figure 17:
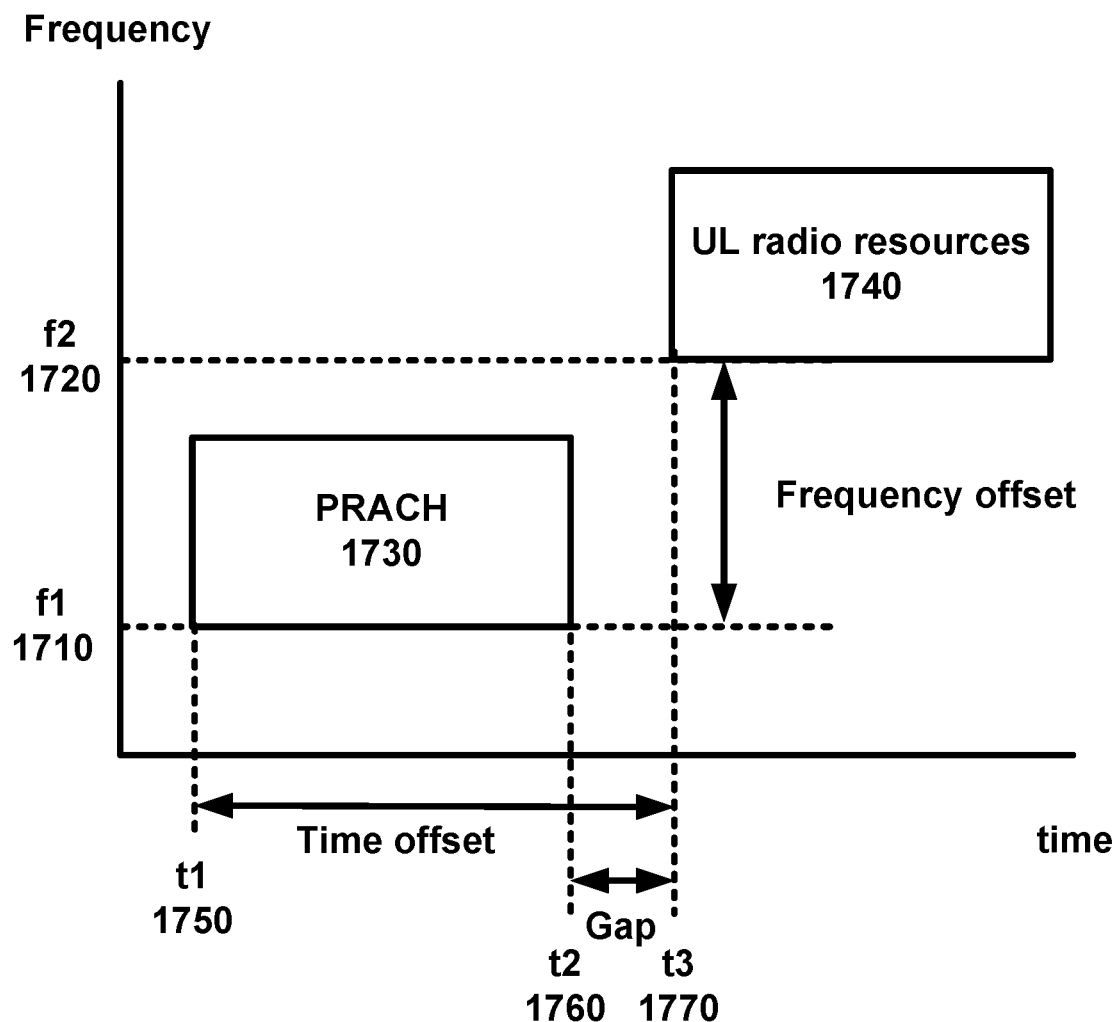
FIG. 17 shows an example of radio resource allocation for a random access procedure.

FIG. 17 shows an example radio resource allocation for a random access procedure. The radio resource allocation may be for a two-step RA procedure. PRACH 1730 and uplink (UL) radio resources 1740 may be time-multiplexed, for example, if a frequency offset 1750 in FIG. 17 is zero and/or if a frequency range for the PRACH 1730 and a frequency range for the UL radio resource 1740 overlap (e.g., partially or fully overlap). The PRACH 1730 and the UL radio resources 1740 may be frequency-multiplexed, for example, if a time offset 1760 in FIG. 17 is zero (e.g., if the gap between t3 1770 and t2 1760 is zero) and/or if a timing for the PRACH 1730 and a timing for the UL radio resources 1740 overlap (e.g., partially or fully overlap, such that t2 1760 may be greater than t3 1770). The PRACH 1730 and the UL radio resources 1740 may be time-multiplexed and/or frequency-multiplexed. The PRACH 1730 and the UL radio resources 1740 may not be time-multiplexed or frequency-multiplexed. The frequency offset (e.g., the difference of f2 1720 and f1 1710) in FIG. 17 may be an absolute quantity/number, for example, in terms of Hz, MHz, or GHz or any other frequency units, and/or a relative quantity/number, for example, one of the frequency indexes may be predefined/preconfigured. The time offset (e.g., the difference of t2 1760 and t1 1750) may be an absolute quantity/number, for example, in terms of micro-second(s), milli-second(s), or second(s) and/or a relative quantity/number, for example, in terms of subframe, slot, mini-slot, OFDM symbol, and/or any other duration.

A preamble and a payload may both be sent (e.g., transmitted) in a first message uplink transmission, such as a MsgA (e.g., MsgA 1320, MsgA 1331, or another MsgA as described above), in a random access procedure (e.g., a two-step RACH procedure or any other RACH procedure). A receiver sensitivity for the preamble and payload may be different (or the same). It is possible that the base station may detect the preamble successfully and fail to detect the payload (e.g., part or the entire portion of the payload). The base station may configure a payload transmission power to be offset to a preamble transmission power (and/or the base station may configure the preamble transmission power to be offset to the payload transmission power), for example, to compensate the different receiver sensitivity. There may be one or more (e.g., two) possible alternatives if the base station detects the preamble successfully and fails to detect the payload. The base station may fall back to a four-step RACH procedure or retransmit a payload in MsgA, for example, if the base station detects the preamble successfully and fails to detect the payload.

A random access procedure (e.g., a two-step RACH procedure or any other random access procedure) may fall back to an alternate procedure (e.g., a four-step RACH procedure or any other random access procedure), Fallback from a two-step RACH procedure to a four-step RACH procedure may be determined by a base station. Fallback from two-step RACH procedure to four-step RACH procedure may work as follows. A base station may send a message (e.g., content) identical to (or substantially the same as) a second message, such as a Msg2 (e.g., Msg2 1312, Msg2 1322, or another Msg2 as described above), to the wireless device at the second step, for example, if the base station only detects the preamble and does not successfully receive and/or decode the payload. The wireless device may use/perform the same (or substantially the same) operation on the reception of the message as the second step (e.g., the RAR of the four-step RACH procedure, such as a Msg2 reception) in a four-step RACH procedure (e.g., such as described above with respect to FIG. 13A). The wireless device may send (e.g., transmit) a third message, such as a Msg3 (e.g., Msg3 1313 or another Msg3 as described above) according to the UL grant in the received RAR, for example, if the MsgB (e.g., MsgB 1332 or another MsgB as described above) identical with (or substantially the same as) a Msg2 (e.g., Msg2 1322 or another Msg2 as described above) is received by the wireless device. The fallback mechanism may avoid the retransmission of a contention-based RA (CBRA) preamble and/or maintain the same (or substantially the same) latency as a four-step RA procedure.

A wireless device may resend (e.g., retransmit) a payload portion of a message. The wireless device may resend the payload portion of the message from the payload PHY layer buffer. The wireless device may resend (e.g., retransmit) the payload part from the payload PHY layer buffer, for example, if the base station only detects the preamble and not the payload. The wireless device may resend (e.g., retransmit) the payload part from the payload PHY layer buffer, for example, based on a NACK indication in MsgB. The retransmission of the payload may be treated as the HARQ of payload. The payload retransmission may involve/introduce the HARQ process for a payload. The payload retransmission may introduce a new message (e.g., MsgC or any other message). The payload retransmission may not introduce a new message, for example, if a Msg2 and/or a MsgB is transmitted. A RACH procedure may become more complicated without a benefit in terms of performance latency. Falling back to a fallback random access procedure (e.g., a four-step RACH procedure) may be easy and preferable than alternatives such as maintaining and/or repeating an existing random access procedure (e.g., a two-step RACH procedure) and/or declaring a failure. The wireless device may fall back to a fallback random access procedure (e.g., a four-step RACH procedure), for example, if a counter and/or timer of another random access procedure (e.g., a two-step RACH procedure using a MsgA failed transmission) expires.

A second message (e.g., a MsgB) may be sent if a preamble in a first message (e.g., a MsgA) is detected. The content of the second message (e.g., MsgB) may be different, for example, based on whether the payload in the first message (e.g., MsgA) is successfully decoded. A message of a second step in a random access procedure may be a MsgB for a two-step RACH contention resolution, for example, if both a MsgA preamble and payload are successfully detected and decoded. A preamble ID (RAPID) in an RAR may be redundant, such that it may be used as the contention resolution ID (e.g., C-RNTI used/in the payload may satisfy/ fulfill a contention resolution purpose). An UL grant may be optional. The UL grant may be used to schedule the possible uplink data packets after the RACH procedure, for example, if a buffer status report (BSR) is reported in the first message (e.g., MsgA). The wireless device may fall back to a fallback random access procedure (e.g., a four-step RACH procedure), for example, if the preamble is successfully detected and the payload is not successfully decoded. The message of a second step of the fallback random access procedure may be identical to (or substantially the same as) a second message in another random access procedure (e.g., Msg2 in a two-step random access procedure). The message may comprise an RAR that indicates a RAPID, a TC-RNTI, and/or an UL grant (e.g., for Msg3 in a four-step random access procedure). The wireless device may alternatively resend (e.g., retransmit) the payload in MsgA. An NACK may be indicated in the message of the second step, for example, if the wireless device resends/retransmits the payload (e.g., in MsgA). The message may further comprise an UL grant for retransmission, a timing advance (TA) command, a TC-RNTI, a power control command, and/or other HARQ information.

Triggers for a fallback random access procedure (e.g., a four-step RACH procedure) may be used for another random access procedure (e.g., a two-step RACH procedure). A random access procedure (e.g., a two-step RACH procedure) may be useful for one or more configurations (e.g., unlicensed bands, small cells, and handovers). A wireless device may be required and/or used to perform LBT, for example, before accessing the channel in an unlicensed band. There may be multiple LBT procedures at either the wireless device and/or the base station side, for example, if a fallback random access procedure (e.g., a four-step RACH procedure) is used. Performing multiple LBT procedures may result in higher channel access failure probability for an RA procedure. Simplifying the RACH procedure may reduce the quantity/number of LBT procedures, for example, in an unlicensed band. A two-step RACH procedure may use an unlicensed band. The simplified procedure of a two-step RACH procedure may be beneficial to complete a RACH procedure more quickly relative to a fallback random access procedure (e.g., a four-step RACH). The transmission propagation delay of the wireless devices may be small in certain configurations (e.g., in a small cell). The transmission propagation delay may be small, for example, because it may be compensated by normal cyclic prefix (CP) for data transmission. A two-step RACH procedure may be useful to reduce the signaling overhead of RACH procedure in a small cell. There may be no TA issue for the wireless devices operating in a small cell, for example, because TA may be zero/negligible. For at least some wireless devices, a two-step RACH procedure may be beneficial to quickly prepare for data transmission. Small cells may be more likely to be deployed in an unlicensed band than in a licensed band. A two-step RACH procedure may be advantageous for use in small cells and/or in an unlicensed band.

A handover (HO) may be performed for a wireless device. A wireless device may be informed by the network in a HO command about the TA of the target cell. A wireless device may be informed by the network in the HO command about the TA of the target cell, for example, if the wireless device performs handover from an SCell to a PCell. There may be no TA issue for the wireless device and/or TA may not be necessary to obtain by RACH procedure, for example, if the wireless device performs handover from an SCell to a PCell. A two-step RACH procedure may be beneficial to quickly complete the handover procedure. A two-step RACH procedure in which the wireless device sends/transmits PUSCH only in a first message (e.g., MsgA), for example, may be used/performed. The TA may be useful for the two-step RACH, for example, if the cell range may not be limited. The wireless device may omit the preamble in the first message (e.g., MsgA), for example, if the wireless device receives the TA value of the target cell in the handover. MsgA may comprise (or may only consist of) the PUSCH payload without comprising a preamble, for example, if the TA is acquired by the HO command. The design of two-step RACH may be reused for the two-step RACH without a preamble (e.g., RACH-less, RACH-skip, or PUSCH-only), which may retain a benefit of low latency. The first message (e.g., MsgA) in a two-step RACH procedure may comprise a PRACH preamble and a PUSCH transmission in certain configurations. The first message (e.g., MsgA) in a two-step RACH procedure may comprise a PUSCH transmission.

A base station may perform beam sweeping. The base station may perform beam sweeping, for example, to receive a PUSCH transmission of a first message (e.g., MsgA). Beam correspondence may be addressed, for example, to avoid beam sweeping for a PUSCH transmission of the first message (e.g., MsgA). A second frequency resource (e.g., FR2) may associate the PUSCH transmission of the first message (e.g., MsgA) and the received SSB. Association between the time and frequency resource of the PUSCH transmission (e.g., PUSCH occasion) and SSB may be beneficial for the base station for a first frequency resource (e.g., FR1), for example, because it may reduce the power consumption for beam sweeping. The PUSCH occasion may be associated with a particular SSB. The association between SSB and PUSCH occasion may be configured by SIB/MIB. The beam or SSB index information may be explicitly carried in the payload in a first message (e.g., MsgA). The base station may not be able to decide the right beam of a second message (e.g., Msg2, MsgB, etc.), for example, if the payload is not successfully decoded (e.g., by the base station).

A random access procedure (e.g., two-step RACH) may support short and/or long PRACH preamble formats. A two-step RACH procedure may support a PRACH configuration with multiple ROs within a PRACH slot. The two-step RACH procedure may support a PRACH preamble mapping to multiple PUSCH allocations. The PUSCH allocations may be FDM and/or TDM. The two-step RACH procedure may support a PRACH transmission (e.g., a PRACH preamble) and a PUSCH transmission in a single slot. One or more PRACH preambles may be mapped to one DM-RS. The base station may use a DM-RS of the PUSCH in a first message (e.g., MsgA) for channel estimation. The base station may use the PRACH preamble for channel estimation of the PUSCH transmission in the first message (e.g., MsgA), for example, if the PRACH and the PUSCH resources are close in time and/or frequency (e.g., within a particular time gap and/or within a particular frequency offset). The base station may detect/determine if the DM-RS collided and/or whether to use the DM-RS for the channel estimation, for example, based on the detected PRACH preamble. The ratio of the PRACH/DM-RS used in the mapping of the PRACH preambles to the PUSCH DM-RS may be selected, for example, based on the proximity of the PRACH and the PUSCH resources. One or more preambles may be mapped to a PUSCH transmission in a unique time and frequency resource. This mapping may reduce the likelihood of failed PUSCH decoding, for example, due to collision, and/or may increase the two-step RACH physical layer overhead in the uplink.

A wireless device may be configured with a fallback random access configuration (e.g., a four-step RACH configuration). A wireless device may be configured with a four-step RACH configuration, for example, regardless of whether a two-step RACH configuration exists. The wireless device may select which type of RACH procedure to use to initiate a RACH procedure, for example, if the base station configures the wireless device with a fallback random access procedure (e.g., a four-step RACH procedure) and another random access procedure (e.g., a two-step RACH procedure). The base station may indicate to the wireless device which type of PRACH to use. The wireless device may select which type of PRACH to use based on, for example, the trigger event, and/or prioritized rule, etc. It may not matter to the network which type of RACH procedure the wireless device selects, for example, because trigger events of random access procedures (e.g., two-step and four-step RACH procedures) may be the same and/or cell radiuses supported by random access procedures (e.g., two-step and four-step RACH procedures) may be the same. The wireless device may select/determine whether to initiate a two-step RACH procedure or a four-step RACH procedure (e.g., in initial access). The base station may provide information (e.g., give assistive guidance) and/or use some predefined rule to help the wireless device make the selection/determination. The wireless device supporting a two-step RACH procedure may always select the two-step RACH procedure, for example if a received target power for the preamble and PUSCH transmission may be achieved. The wireless device may select/determine between a two-step RACH procedure and a four-step RACH procedure (or any other random access procedure) based on an RSRP. The wireless device may select/determine two-step RACH, for example, if the measured RSRP exceeds a threshold (e.g., a pre-defined or a pre-configured threshold). The base station may select/determine four-step RACH, for example, if the measured RSRP is below the threshold. The base station may select any type of random access procedure, for example, based on the threshold.

Figure 18:
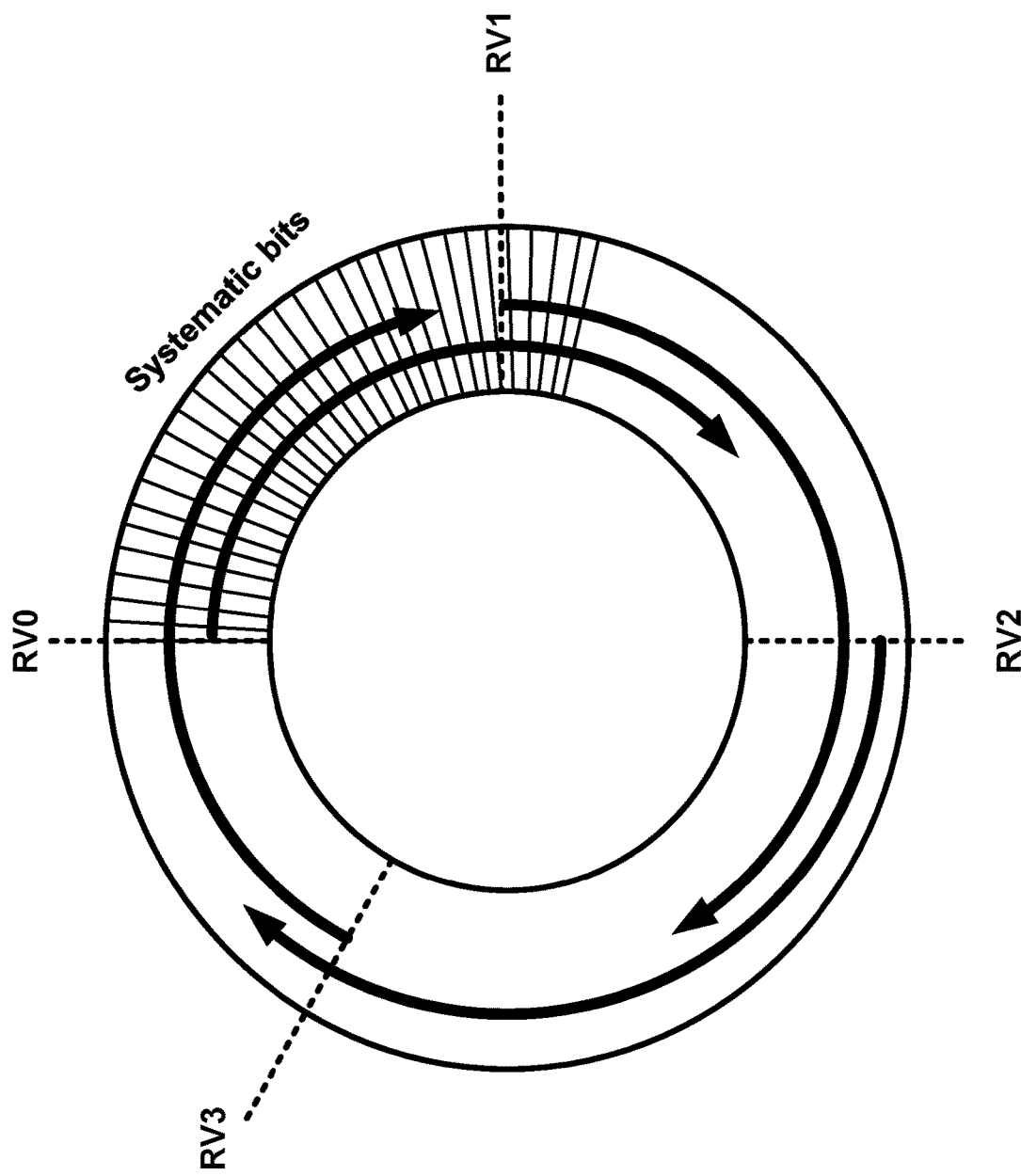
FIG. 18 shows an example of generating transmission bits from coded bits based on redundancy versions.

FIG. 18 shows an example of redundancy versions. Transmit bits may be generated from coded bits based on redundancy versions. A base station may perform rate matching for at least some code blocks. The base station may write coded bits into a circular buffer, for example, as shown in FIG. 18. The coded bits may start with non-punctured systematic bits and continue with parity bits. The base station may select transmit bits, for example, based on reading a required quantity/number of bits from the circular buffer. The exact selected bits for transmission may depend on a redundancy version (RV) (e.g., RV0, RV1, RV2, or RV3) corresponding to a different starting position in the circular buffer. The base station may generate (e.g., based on selecting a different RV) a different set of coded bits representing a same set of information bits. The different starting positions in the circular buffer may be defined such that both RV0 and RV3 may be self-decodable. For example, RV0 and RV3 may include systematic bits under typical examples.

HARQ functionality may comprise soft combining. A wireless device may perform soft combining to decode a transport block with retransmission via different RVs. Rate-matching functionality may comprise interleaving coded bits using a block interleaver and collecting coded bits from at least some code blocks. The coded bits from the circular buffer may be written row-by-row into a block interleaver. The coded bits from the circular buffer may be read out column-by-column. The quantity/number of rows in the interleaver may be determined by a modulation order. The coded bits in one column may correspond to one modulation symbol. The systematic bits may spread across the modulation symbols which may improve system performance Bit collection may concatenate coded bits for at least some code blocks.

A wireless device (e.g., supporting high reliability and low latency services) may be configured with repetition transmission. A wireless device may be configured with repetition transmission, for example, based on one or more repetition parameters (e.g., pusch-AggregationFactor or pdsch-AggregationFactor larger than 1). A same symbol allocation may be applied/used across the repetition transmission (e.g., the same symbol allocation may be applied/used across pusch-AggregationFactor or pdsch-AggregationFactor consecutive slots). The wireless device may determine and/or expect that a TB may be repeated within at least some symbol allocations among at least some of the slots (e.g., pusch-AggregationFactor or pdsch-AggregationFactor consecutive slots). The wireless device may expect that a TB may be repeated within each symbol allocation among each of the repetition transmissions in consecutive slots corresponding to the repetition parameter (e.g., the pusch-AggregationFactor or pdsch-AggregationFactor).

Figures 19A, 19B:
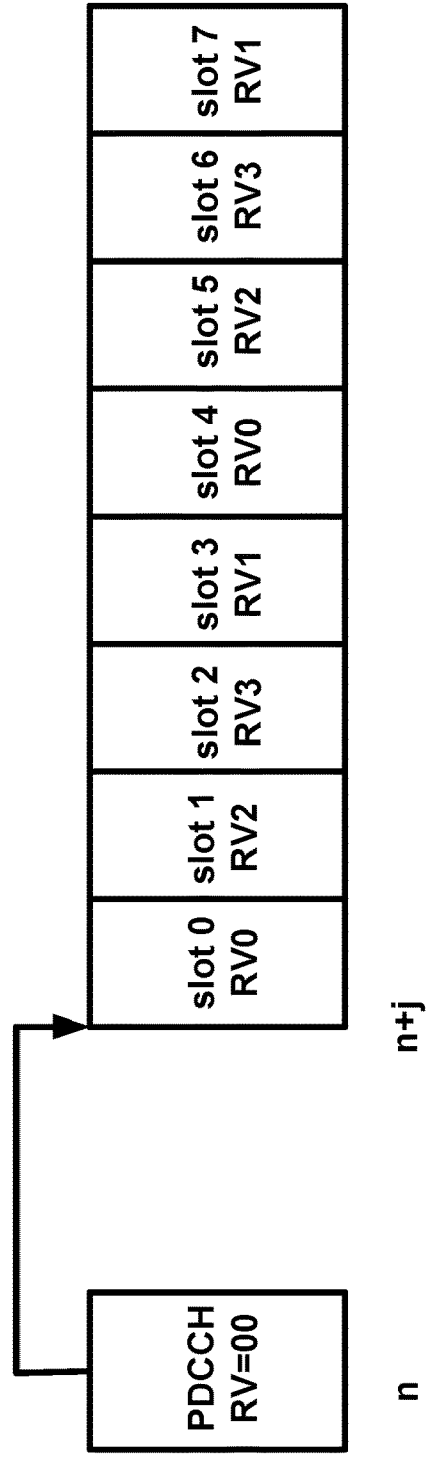
FIG. 19A and FIG. 19B show examples of applying redundancy versions.

FIG. 19A and FIG. 19B show examples of using redundancy versions for repetitions of a transmission. FIG. 19A and FIG. 19B show, for example, using redundancy versions for repetitions of a TB. The redundancy versions may be applied to repetitions of one or more transport blocks. A base station may send (e.g., transmit) the TB via/on a PDSCH with/using a single transmission layer. The base station may apply/use a redundancy version on an nth transmission occasion of the TB (e.g., according to FIG. 19A). The wireless device may determine that the redundancy version is 0, for example, if the base station indicates, to the wireless device, a redundancy version indication (e.g., $rv_{id}=0$) via DCI and if n modulo 4 is equal to 0. The wireless device may determine that the redundancy version is 2, for example, if the base station indicates, to the wireless device, a redundancy version indication (e.g., $rv_{id}=0$) via DCI and if n modulo 4 is equal to 1. The wireless device may determine that the redundancy version is 3, for example, if the base station indicates, to the wireless device, a redundancy version indication (e.g., $rv_{id}=0$) via DCI and if n modulo 4 is equal to 2. The wireless device may determine that the redundancy version is 1, for example, if the base station indicates, to the wireless device, a redundancy version indication (e.g., $rv_{id}=0$) via DCI and if n modulo 4 is equal to 3. The wireless device may determine that the redundancy version is 2, for example, if the base station indicates, to the wireless device, a redundancy version indication (e.g., $rv_{id}=2$) via DCI and if n modulo 4 is equal to 0. The wireless device may determine that the redundancy version is 3, for example, if the base station indicates, to the wireless device, a redundancy version indication (e.g., $rv_{id}=2$) via DCI and if n modulo 4 is equal to 1. The wireless device may determine that the redundancy version is 1, for example, if the base station indicates, to the wireless device, a redundancy version indication (e.g., $rv_{id}=2$) via DCI and if n modulo 4 is equal to 2. The wireless device may determine that the redundancy version is 0, for example, if the base station indicates, to the wireless device, a redundancy version indication (e.g., $rv_{id}=2$) via DCI and if n modulo 4 is equal to 3. The wireless device may determine that the redundancy version is 3, for example, if the base station indicates, to the wireless device, a redundancy version indication (e.g., $rv_{id}=3$) via DCI and if n modulo 4 is equal to 0. The wireless device may determine that the redundancy version is 1, for example, if the base station indicates, to the wireless device, a redundancy version indication (e.g., $rv_{id}=3$) via DCI and if n modulo 4 is equal to 1. The wireless device may determine that the redundancy version is 0, for example, if the base station indicates, to the wireless device, a redundancy version indication (e.g., $rv_{id}=3$) via DCI and if n modulo 4 is equal to 2. The wireless device may determine that the redundancy version is 2, for example, if the base station indicates, to the wireless device, a redundancy version indication (e.g., $rv_{id}=3$) via DCI and if n modulo 4 is equal to 3. The wireless device may determine that the redundancy version is 1, for example, if the base station indicates, to the wireless device, a redundancy version indication (e.g., $rv_{id}=1$) via DCI and if n modulo 4 is equal to 0. The wireless device may determine that the redundancy version is 0, for example, if the base station indicates, to the wireless device, a redundancy version indication (e.g., $rv_{id}=1$) via DCI and if n modulo 4 is equal to 1. The wireless device may determine that the redundancy version is 2, for example, if the base station indicates, to the wireless device, a redundancy version indication (e.g., $rv_{id}=1$) via DCI and if n modulo 4 is equal to 2. The wireless device may determine that the redundancy version is 3, for example, if the base station indicates, to the wireless device, a redundancy version indication (e.g., $rv_{id}=1$) via DCI and if n modulo 4 is equal to 3A same rule may be applied/used, for example, for other transmission occasions. The base station may configure the wireless device with a repetition quantity/number of slots. The repetition number/quantity of slots may be eight slots (e.g., the configured pdsch-AggregationFactor is eight slots), for example, as shown in FIG. 19B or any other number of slots. The wireless device may determine the redundancy versions in order of 0, 2, 3, 1, 0, 2, 3, 1 for the eight slots, for example, if the base station indicates to the wireless device a redundancy version indication (e.g., RV=00) via a PDCCH. The time gap (e.g., an offset) between the PDCCH reception and the first slot (e.g., slot 0 shown in FIG. 19B) of a plurality of slots (e.g., the eight slots shown in FIG. 19B) may be indicated by the base station. The time gap may be j number/quantity of symbols, j number/quantity of slots, or any other time gaps.

Semi-persistent scheduling (SPS) may be supported. SPS may be supported in the downlink. A wireless device may be configured with a periodicity of the data transmission using RRC signaling. Activation of SPS may be initiated and/or performed using a PDCCH, such as for dynamic scheduling, for example, scrambled by a CS-RNTI. The PDCCH may send/carry information (e.g., necessary information) in terms of time-frequency resources and/or other parameters. The HARQ process quantity/number may be derived from a time, for example, if the downlink data transmission starts according to a formula (e.g., a formula in accordance with 3GPP NR TS38.211 Release 16, earlier/later 3GPP releases, and/or any other access technologies). The wireless device may receive downlink data transmission periodically according to an RRC-configured periodicity using the transmission parameters indicated in the PDCCH activating the transmission, for example, based on activation of SPS. The control signaling may be used. Overhead may be reduced, for example, if the control signaling may be used a limited quantity of times (e.g., once, twice, or any other quantity in a duration). The wireless device may continue to monitor the set of candidate PDCCHs for uplink and downlink scheduling commands, for example, based on enabling the SPS. SPS may be performed, for example, for occasional transmission of large amounts of data and/or for HARQ retransmissions that may be dynamically scheduled.

One or more schemes for transmission without a dynamic grant may be supported, for example, in the uplink. A plurality of schemes may differ in the way they may be activated. The plurality of schemes may comprise at least: 1) configured grant type 1, in which an uplink grant is provided by RRC, including activation of the grant, and 2) configured grant type 2, in which the transmission periodicity is provided by RRC and L1/L2 control signaling is used to activate/deactivate the transmission in a similar way as in a downlink case. These two schemes may reduce control signaling overhead, and the latency before uplink data transmission, for example, as no scheduling request-grant cycle is needed prior to data transmission. Configured grant type 1 may set some or all transmission parameters, comprising periodicity, time offset, frequency resources, and/or MCS of possible uplink transmissions, using RRC signaling. The wireless device may start to use the configured grant for transmission in a time instant indicated by the periodicity and time offset, for example, based on receiving the RRC configuration. The time offset may be relative to a particular SFN (e.g., SFN=0). Configured grant type 2 may be similar to downlink SPS. Higher layer signaling (e.g., RRC signaling) may be used to configure the periodicity and PDCCH activation may provide transmission parameters. The wireless device may send (e.g., transmit) according to the preconfigured periodicity based on receiving the activation command, for example, if there is data in the buffer. The wireless device may, similar to configured grant type 1, not send (e.g., not transmit) anything, for example, if there is no data to send (e.g., transmit). No time offset may be required for configured grant type 2. The wireless device may acknowledge the activation/deactivation of configured grant type 2, for example, by sending a MAC control element in the uplink. Multiple wireless devices may be configured with overlapping time-frequency resources in the uplink in the above schemes. The network may differentiate between transmissions from different wireless devices (e.g., based on code domain resources (e.g., the DM-RS sequence/port).

A wireless device may receive, from a base station, parameters to semi-statically configure one or more resource allocations. The wireless device may receive, from the base station, parameters (e.g., higher layer parameters such as configuredGrantConfig in BWP-UplinkDedicated information element) that may semi-statically configure PUSCH resource allocation. A PUSCH transmission may correspond to a configured grant. For a first type of transmissions (e.g., type 1 PUSCH transmissions with a configured grant), one or more of the following parameters may be indicated: time domain resource allocation (e.g., timeDomainAllocation) that may provide a row index pointing to an allocated table, indicating a combination of start symbol and length and PUSCH mapping type; frequency domain resource allocation (e.g., frequencyDomainAllocation) for a given resource allocation type; the modulation order, target code rate and TB size (e.g., by mcsAndTBS); quantity/number of DM-RS CDM groups, DM-RS ports, an SRS resource indication and DM-RS sequence initialization; the antenna port value, the bit value for DM-RS sequence initialization, precoding information and quantity/number of layers, an SRS resource indicator; a frequency offset between two frequency hops if frequency hopping is enabled (e.g., frequencyHoppingOffset). For second type of transmissions (e.g., type 2 PUSCH transmissions with a configured grant), the resource allocation may follow a higher layer configuration and a UL grant received on the activation DCI. The wireless device may not send (e.g., transmit) anything via/on the resources configured by RRC (e.g., configuredGrantConfig), for example, if the higher layer did not deliver a TB to send (e.g., transmit) via/on the resources allocated for uplink transmission without a grant.

A wireless device may receive, from a base station, the higher layer parameters indicating a periodicity for a configured grant. The higher layer parameters may comprise a quantity/number of repetitions (e.g., repK) to be used for a sent (e.g., transmitted) TB. The higher layer parameters may comprise a redundancy version (RV) pattern/sequence (e.g., repK-RV) to be used for the repetitions, for example, if repetitions are used. The redundancy version for uplink transmissions with a configured grant may be set to 0, for example, if the parameter indicating the quantity/number of repetitions is not configured. The redundancy version may be associated with a $(\mod(n-1,4)+1)$th value in the configured RV sequence, for example, for an nth transmission occasion among K repetitions, n=1, 2, . . . , K. The wireless device may use a redundancy version on an nth transmission occasion of the TB according to FIG. 19A. The initial transmission of a TB may start at: the first transmission occasion of the K repetitions, for example, if the configured RV sequence is {0, 2, 3, 1}; any of the transmission occasions of the K repetitions that are associated with RV=0, for example, if the configured RV sequence is {0, 3, 0, 3}; any of the transmission occasions of the K repetitions, for example, if the configured RV sequence is {0, 0, 0, 0}, except for the last transmission occasion if K=8. FIG. 19B shows an example in which K=8 repetitions is configured with an RV sequence {0, 2, 3, 1}.

The repetitions may be terminated for any RV sequence. The repetitions may be terminated, for example, after sending (e.g., transmitting) K repetitions. The repetitions may be terminated, for example, at, during, or after the last transmission occasion among the K repetitions within a period P. The repetitions may be terminated, for example, from a starting symbol of the repetition that overlaps with a PUSCH with the same HARQ process scheduled by DCI format 0_0 or 0_1 (e.g., whichever is received first). The wireless device may not be expected to be configured with the time duration for the transmission of K repetitions larger than the time duration derived by the periodicity P. The wireless device may repeat the TB across the repK consecutive slots using the same symbol allocation in at least some of the slots, for example, for Type 1 and Type 2 PUSCH transmissions with a configured grant. The wireless device may repeat the TB across the repK consecutive slots using the same symbol allocation in at least some of the slots, for example, if the wireless device is configured with repK>1. A transmission on a slot allocated for PUSCH may be omitted for multi-slot PUSCH transmission, for example, if the wireless device determines symbols of the slot as downlink symbols (e.g., according to its procedure for determining a slot configuration).

A PUSCH occasion for a two-step RACH procedure may be the time-frequency resource for payload transmission of the two-step RACH procedure (e.g., the payload of MsgA). PUSCH occasions may be separately configured from PRACH occasions. A wireless device may derive a PUSCH occasion, for example, based on reusing the resource allocation for a configured grant in principle. A PUSCH occasion may be derived, for example, based on other potential configurations (e.g., reusing semi-static slot format indicator (SFI) and BWP, reusing PRACH occasion configuration, etc.). The PRACH occasion and the PUSCH occasion for the first uplink transmission of the two-step RACH procedure (e.g., MsgA transmission) may be associated/mapped. The base station may specify/configure a mapping ratio between MsgA PRACH occasions (MsgA ROs) and MsgA PUSCH occasions (MsgA POs). The base station may specify/configure the relative location of the PUSCH occasion with respect to the associated PRACH occasion. The time/frequency relation between PRACH occasion(s) and PUSCH occasions may be configured as a value (e.g., a predefined value, a valued configured by higher layer signaling, a semi-statically configured value, a dynamically configured value, a single specification fixed value, etc.). The time/frequency relation between each PRACH occasion to one or more PUSCH occasions may be configured as a value (e.g., a predefined value, a valued configured by higher layer signaling, a semi-statically configured value, a dynamically configured value, a single specification fixed value, etc.). Different preambles in different PRACH occasions may have different values. The time/frequency relation between PRACH occasion(s) and PUSCH occasions may be configured as a value (e.g., a single semi-statically configured value or any other value). The time/frequency relation between each PRACH occasion to the PUSCH occasion may be configured as a value (e.g., a semi-statically configured value or any other value). Different preambles in different PRACH occasions may have different values. The time and frequency relation may follow different alternatives.

A PRACH preamble may be mapped to one or more PUSCH resources (e.g., PUSCH DM-RS). The mapping between the preamble in a PRACH occasion and the PUSCH DM-RS in a PUSCH occasion may be one-to-one mapping, multiple-to-one mapping, or one-to-multiple mapping. A PUSCH resource unit for a two-step RACH procedure may be defined as the PUSCH occasion and DM-RS port and/or sequence used for a MsgA payload transmission. A configurable number/quantity of preambles (e.g., one or multiple) may be mapped to one or more PUSCH resource units.

Discrete Fourier transform-spread-OFDM (DFT-s-OFDM) and/or CP-OFDM may be supported for payload transmission of a two-step RACH procedure (e.g., transmission of payload of MsgA). A guard time may be configured between a PRACH occasion and a PUSCH occasion associated with an uplink transmission of a two-step RACH procedure (e.g., PUSCH occasion for transmitting payload of MsgA). A guard period may be configured within a PUSCH occasion. A guard band may be configured between a PRACH and a PUSCH of the two-step RACH procedure (e.g., PUSCH in MsgA). A PRACH occasion and a PUSCH occasion for MsgA transmission may be in different slots. The numerology for transmitting PUSCH of a two-step RACH procedure (e.g., MsgA PUSCH) may follow the numerology configured for the UL BWP (e.g., initial UL BWP or active UL BWP). A PRACH occasion and a PUSCH occasion for payload transmission of the two-step RACH procedure (e.g., MsgA transmission) may be in the same slot. The numerology for MsgA PUSCH may follow MsgA preamble numerology at least for some configurations (e.g., short preambles are configured). The base station may configure whether the numerology for MsgA PUSCH follows the numerology of MsgA preamble or UL BWP. A wireless device may not be expected to be configured with different numerology among a PRACH preamble, a MsgA PUSCH, and a UL BWP for MsgA transmission.

One or more PUSCH occasions may be configured within a PUSCH configuration period (e.g., a MsgA PUSCH configuration period). The PUSCH configuration period (e.g., MsgA PUSCH configuration period) may or may not be the same as PRACH configuration period, for example, for separate configuration of PRACH occasions and PUSCH occasions. The PUSCH configuration period (e.g., MsgA PUSCH configuration period) may be the same as PRACH configuration period, for example, for relative configuration of PUSCH occasions with respect to PRACH occasions. Separate PRACH occasions may be configured for different random access procedures. For example, separate PRACH occasions may be configured for a two-step RACH procedure and a four-step RACH procedure. Shared PRACH occasions and separate preambles may be configured for a two-step RACH procedure and a four-step RACH procedure. Shared PRACH occasions and shared preambles may be configured for a two-step RACH procedure and four-step RACH procedure. A message (e.g., MsgA) may support one or more formats. For example, a message may support some or all the preamble formats specified for 3GPP NR (e.g., Release 15) and/or any other generation, release, or access technology.

A beam association rule may be used. A beam association rule that may be used between an SSB and a PRACH occasion of a four-step RACH procedure may be used for a two-step RACH procedure (or any other random access procedure) The MsgA PRACH and MsgA PUSCH may use the same transmit beam (e.g., the same spatial filter). The MsgA PRACH and MsgA PUSCH may use the same or different transmit beam (e.g., the same or different spatial filter) up to the wireless device implementation (e.g., as in a four-step RACH procedure where the beams for Msg1 and Msg3 may be determined according to different wireless device implementations). The MsgA PRACH and MsgA PUSCH may use same or different transmit beam (e.g., the same or different spatial filter), for example, under network control/assistance.

Power control parameters associated with a preamble may be configured for different random access procedures. For example, power control parameters associated with a preamble may be separately configured for a two-step RACH procedure and a four-step RACH procedure. The power control parameters of a two-step RACH preamble may correspond to those of a four-step RACH preamble. Open loop power control may be applied/used for a PUSCH transmission in a message (e.g., MsgA). A power offset relative to the preamble received target power may be configured (e.g., for determination of the PUSCH transmit power). An offset relative to a PRACH transmission power (e.g., a MsgA PRACH transmission power) for a PUSCH transmission power (e.g., a MsgA PUSCH transmission power) may be configured for a random access procedure (e.g., a two-step RACH procedure).

A PUSCH transmission may be configuration with repetitions. For example, a MsgA PUSCH may be configured with repetitions. A MsgA PUSCH may comprise UCI, for example, if a PUCCH transmission overlaps the PUSCH part of the MsgA. The payload size may be dynamically adapted and indicated by the UCI in the MsgA PUSCH. The payload size may vary, for example, which may depend on a particular use/service/application and/or a resource utilization.

A retransmission (e.g., a MsgA retransmission) may comprise a PRACH transmission and a PUSCH transmission. For example, an uplink transmission of a two-step RACH procedure (e.g., MsgA transmission) may refer to a retransmission of a preamble of the two-step RACH procedure (e.g., MsgA PRACH transmission with a re-selection of preamble) and/or a payload of the two-step RACH procedure (e.g., MsgA PUSCH transmission). The wireless device may use the same or different payload for a MsgA PUSCH transmission if resending (e.g., retransmitting) MsgA. The wireless device may fall back from a two-step RACH procedure to a four-step RACH procedure, for example, if a maximum quantity/number of MsgA retransmissions are met. The wireless device may resend (e.g., retransmit) the PUSCH, for example, if the MsgA transmission fails, or if the MsgA PUSCH transmission fails and the MsgA preamble is successfully sent (e.g., transmitted) and decoded by the base station. The wireless device may resend (e.g., retransmit) the PRACH, for example, if the MsgA transmission fails, or if the MsgA PRACH transmission fails and the MsgA PUSCH is successfully sent (e.g., transmitted) and decoded by the base station. A network response to the uplink transmission of the two-step RACH procedure (e.g., MsgA) may comprise a downlink transmission of the two-step RACH procedure (e.g., MsgB) and/or a downlink transmission of a four-step RACH procedure (e.g., Msg2). The network response to the uplink transmission of the two-step RACH procedure (e.g., MsgA) may comprise one or more of the following: a successRAR; a fallbackRAR; and/or a backoff indication. The successRAR may comprise one or more of: a contention resolution ID; a C-RNTI; and/or a TA command. The fallbackRAR may be identical to (or substantially similar to) Msg2. The wireless device may proceed to Msg3 step of a four-step RACH procedure, for example, based on receiving the fallbackRAR. The fallbackRAR may comprise one or more of the following: a RAPID; a UL grant for retransmission of MsgA payload; a TC-RNTI; and/or TA command.

A PUSCH configuration may comprise a plurality of parameters. For example a PUSCH configuration (such as a MsgA PUSCH configuration) may comprise one or more of the following parameters: an MCS and/or a TBS; a quantity/number of FDMed PUSCH occasions (POs), wherein POs (e.g., including guard band and/or guard period, if existing) under the same MsgA PUSCH configuration may be consecutive in frequency domain; a quantity/number of TDMed POs; a quantity/number of PRBs per PO; a quantity/number of DM-RS symbols/ports/sequences per PO; a quantity/number of repetitions for MsgA PUSCH (if configured); a bandwidth of PRB level guard band and/or duration of guard time; a PUSCH mapping type. A MsgA PUSCH configuration, such as a MsgA PUSCH configuration with separate configuration from MsgA PRACH, may comprise one or more of the following parameters: a periodicity (e.g., MsgA PUSCH configuration period); an offset(s) (e.g., symbol, slot, subframe, etc.); a time domain resource allocation (e.g., in a slot for MsgA PUSCH: starting symbol, a quantity/number of symbols per PO, a quantity/number of time-domain POs, etc.); and/or a frequency starting point. A MsgA PUSCH configuration, such as a MsgA PUSCH with relative configuration with respect to MsgA PRACH, may comprise one or more of the following parameters: a time offset (e.g., a combination of slot-level and symbol-level indication) with respect to a reference point (e.g., a start or an end of each PRACH slot); a quantity/number of symbols per PO (e.g., explicit or implicit indication); and/or a frequency offset with respect to a reference point (e.g., start of the first RO or an end of the last RO in frequency domain). One or multiple MsgA PUSCH configurations may be provided to the wireless device. The frequency resource of a MsgA PUSCH may be limited, for example, to the bandwidth of MsgA PRACH.

Symbols (e.g., some or all of the symbols) within a subframe may be used as DL or UL, respectively, for example, if a subframe is configured for DL or UL in at least some types of communications (e.g., communications by wireless devices compatible with LTE, earlier/later 3GPP releases, and/or any other access technologies). One or more symbols within a slot may be configured in different directions (e.g., downlink, uplink, or flexible) to make scheduling flexible and more dynamic, for example, especially for TDD operation in at least some types of communications (e.g., communications by wireless devices compatible with 3GPP NR Release 16, earlier/later 3GPP releases, and/or any other access technologies). A slot format may be indicated to the wireless device, for example, using an RRC configuration and/or DCI (e.g., DCI format 2_0).

Each symbol in a slot may be: uplink ('U'/UL) in which uplink transmission/reception is allowed and downlink transmission/reception is not allowed; downlink ('D'/DL) in which downlink transmission/reception is allowed and uplink transmission/reception is not allowed; and/or flexible ('F') in which the slot format/direction may be determined later by other signaling (e.g., DCI format 2_0 and/or UL/DL grants). The format 'F' may be used by the network to control UL/DL transmission of each wireless device flexibly. A network may assign a symbol with a flexible indicator (e.g., 'F') for a wireless device not to transmit to or receive from a base station for interference control and/or power saving. The network may use a flexible slot format (e.g., 'F') on one or more symbols to selectively initiate a RACH procedure for a particular wireless device. Other wireless devices may not be allowed to send/transmit or receive information or data via/on the one or more symbols, which may result in reduced interference for a wireless device performing a random access procedure.

Figure 20:
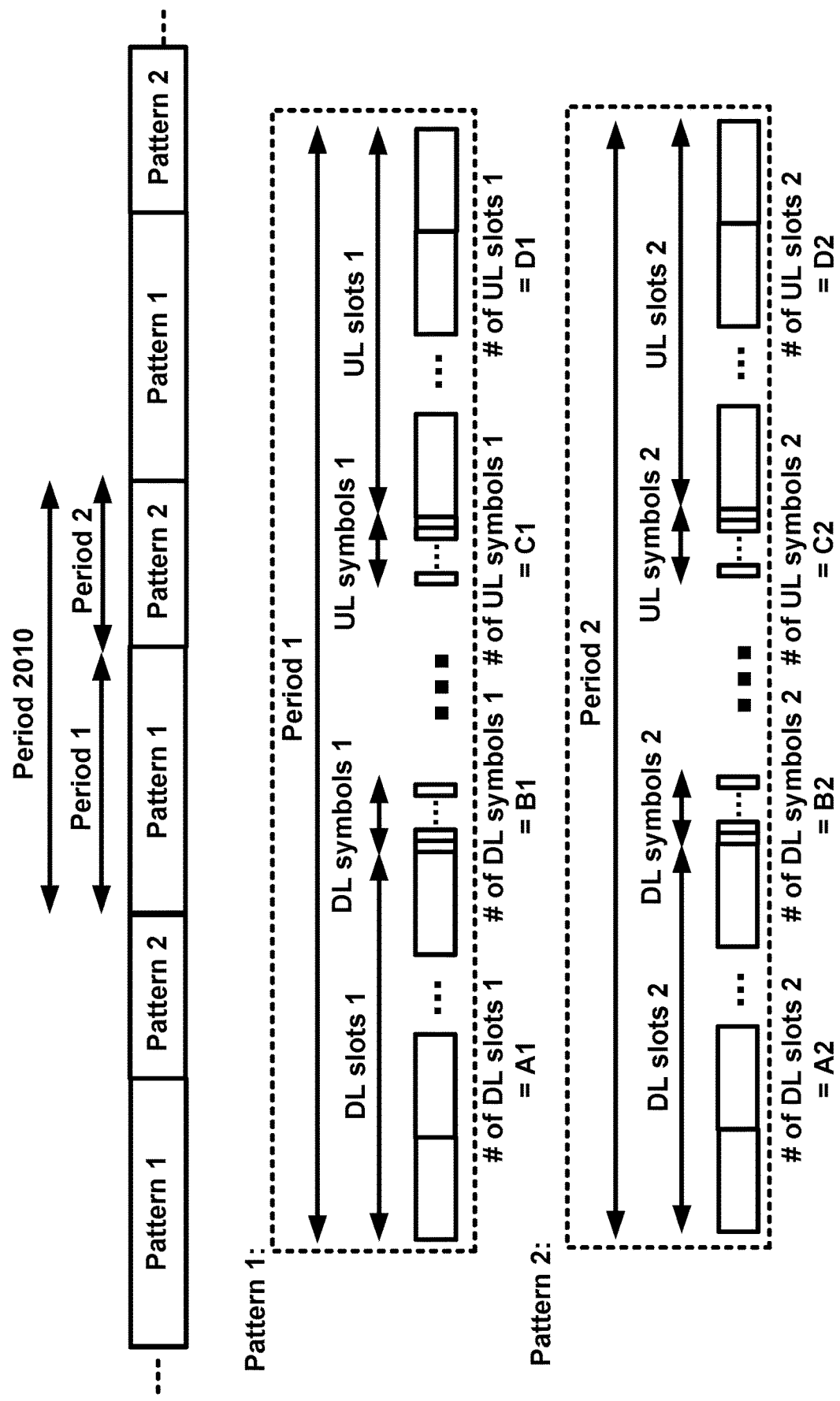
FIG. 20 shows an example of a slot format configuration using one or more patterns.

FIG. 20 shows an example of a slot format configuration using one or more patterns. A slot format may comprise downlink symbols, uplink symbols, and/or flexible symbols. For each serving cell, a wireless device may receive a common RRC configuration message (e.g., TDD-UL-DL-ConfigCommon) comprising one or more parameters that indicate, to the wireless device, to set the slot format of each slot of a number/quantity of one or more slots. The common RRC configuration message may comprise at least one of: a reference subcarrier spacing (SCS) $\mu_{ref}$; and/or at least one pattern. A first pattern of the at least one pattern may comprise at least one of: a slot configuration period (e.g., a period of P msec); a number/quantity of slots $d_{slots}$ with only downlink symbols; a number/quantity of downlink symbols $d_{sym}$; a number/quantity of uplink symbols $u_{sym}$; and/or a number/quantity of slots $u_{slots}$ with only uplink symbols. The slot configuration period (e.g., a period of P msec) may comprise $S=P \cdot 2^{\mu_{ref}}$ slots with SCS configuration $\mu_{ref}$. Among the slots in the slot configuration period, first $d_{slots}$ slots may comprise one or more downlink symbols and last $u_{slots}$ slots may comprise one or more uplink symbols. A number/quantity $d_{sym}$ of symbols after the first $d_{slots}$ slots may comprise one or more downlink symbols. A number/quantity $u_{sym}$ of symbols before the last $u_{slots}$ slots may comprise one or more uplink symbols. A number/quantity $(S-d_{slots}-u_{slots}) \cdot N_{symb}^{slot}-d_{sym}-u_{sym}$ of remaining symbols may comprise one or more flexible symbols. A second pattern of the at least one patterns may be configured. The wireless device may set the slot format of each slot of a first number/quantity of slots as indicated by the first pattern, and may set the slot format of each slot of a second number/quantity of slots as indicated by the second pattern. FIG. 20 shows such slot format configuration using two patterns. As shown in FIG. 20, a period 2010 comprising a first period (e.g., period 1) and a second period (e.g., period 2) may be repeated. A first pattern (e.g., pattern 1) may correspond to the first period (e.g., period 1). A second pattern (e.g., pattern 2) may correspond to the second period (e.g., period 2). Unlike FIG. 20, only the first pattern may repeat, for example, if only one pattern is configured by the base station (e.g., via an RRC configuration, such as TDD-UL-DL-ConfigCommon, TDD-UL-DL-Configdedicated, or other configurations).

Each pattern (e.g., configured by an RRC configuration) in a period may starts with a number/quantity of downlink slots followed by a number/quantity of downlink symbols. Each pattern (e.g., configured by an RRC configuration) in a period may ends with a number/quantity of uplink slots that follows a number/quantity of uplink symbols. Flexible symbols and/or flexible slots may be located between the number/quantity of downlink symbols and the number/quantity of uplink symbols.

The RRC configuration (e.g., TDD-UL-DL-ConfigCommon, TDD-UL-DL-Configdedicated, or other configurations) may indicate the number/quantity of downlink slots, the number/quantity of downlink symbols, the number/quantity of uplink symbols, and the number/quantity of uplink slots. The period 1 may comprise total N1 number/quantity of slots. The period 1 may comprise total A1 number/quantity of DL slots 1 and total D1 number/quantity of UL slots 1. A first transitioning slot following the total A1 number/quantity of DL slots 1 may comprise total B1 number/quantity of DL symbols 1 and flexible symbols that follow the total B1 number/quantity of DL symbols 1. A second transitioning slot preceding the total D1 number/quantity of UL slots 1 may comprise total C1 number/quantity of UL symbols 1 and flexible symbols that precede the total C1 number/quantity of UL symbols 1. Total F1(=N1−A1−D1−2) number/quantity of flexible slots may be the remaining slots between the first transitioning slot and the second transitioning slot. N1, A1, B1, C1, and D1 may be indicated by the RRC configuration or any other messages. Similarly, the period 2 may comprise total N2 number/quantity of slots. The period 2 may comprise total A2 number/quantity of DL slots 2 and total D2 number/quantity of UL slots 2. A first transitioning slot following the total A2 number/quantity of DL slots 2 may comprise total B2 number/quantity of DL symbols 2 and flexible symbols that follow the total B2 number/quantity of DL symbols 2. A second transitioning slot preceding the total D2 number/quantity of UL slots 2 may comprise total C2 number/ quantity of UL symbols 2 and flexible symbols that precede the total C2 number/quantity of UL symbols 2. Total F2(=N2−A2−D2−2) number/quantity of flexible slots may be the remaining slots between the first transitioning slot and the second transitioning slot. N2, A2, B2, C2, and D2 may be indicated by the RRC configuration or any other messages.

A wireless device may receive a dedicated RRC configuration message (e.g., TDD-UL-DL-Configdedicated) comprising one or more parameters that may overwrite one or more flexible symbols of each slot of a number/quantity of slots configured by a common RRC configuration message. The dedicated RRC configuration message may comprise one or more slot configurations. The dedicated RRC configuration message may comprise, for each slot configuration of the one or more slot configurations, at least one of: a slot index for a slot (slotIndex); one or more symbols of a slot (symbols) which indicates a first number of (e.g., zero or more) downlink first symbols in the slot, and a second number of (e.g., zero or more) uplink last symbols in the slot, and a remaining number of (e.g., zero or more) flexible symbols in the slot. The wireless device may determine a slot format for each slot with a corresponding slot index of the slot (slotIndex), for example, based on a format indicated by the one or more symbols of the slot (symbols).

Figure 21A:
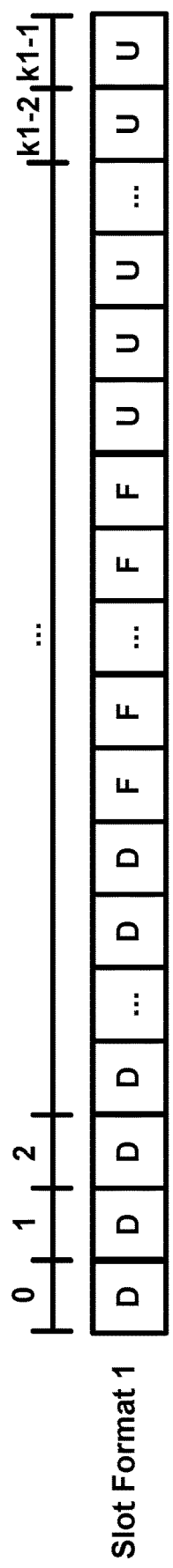
FIG. 21A.
Figure 21B:
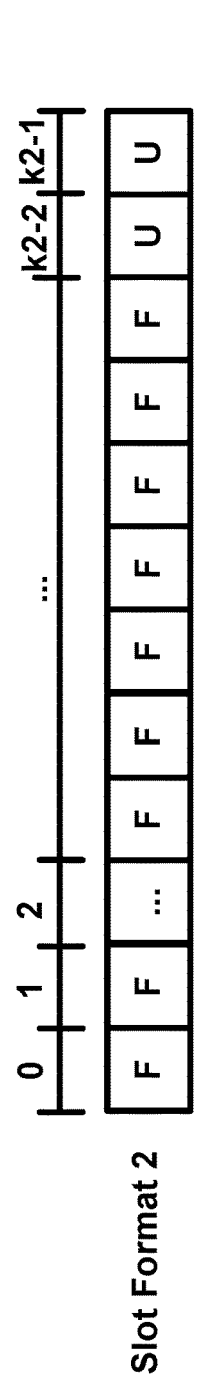
FIG. 21B, and FIG. 21C show example slot formats.
Figure 21C:
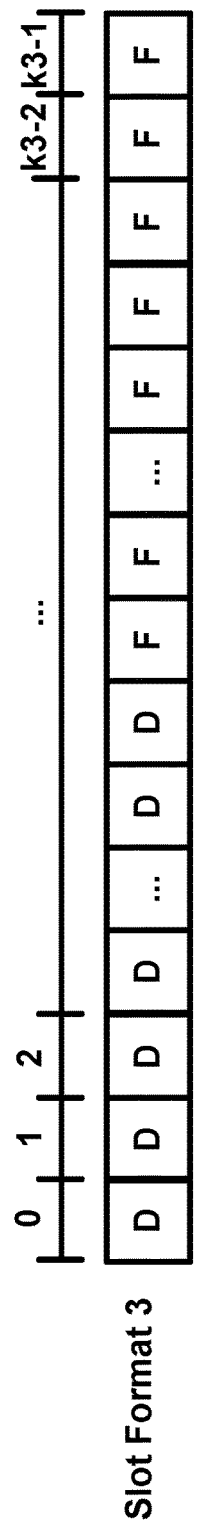

FIG. 21A, FIG. 21B, and FIG. 21C show example slot formats for one or more slots. The slot format 1 (e.g., shown in FIG. 21A) may indicate that a slot comprises total k1 symbols indicated as downlink symbols ("D"), uplink symbols ("U"), and/or flexible symbols ("F"). The slot format 2 (e.g., shown in FIG. 21B) may indicate that a slot comprises total k2 symbols indicated as uplink symbols ("U") and/or flexible symbols ("F"). The slot format 3 (e.g., shown in FIG. 21C) may indicate that a slot comprises total k3 symbols indicated as downlink symbols ("D") and/or flexible symbols ("F").

A wireless device may not expect/determine a dedicated RRC configuration message to indicate, as uplink, a symbol that a common RRC configuration message indicates as a downlink symbol. A wireless device may not expect/determine a dedicated RRC configuration message to indicate, as downlink, a symbol that a common RRC configuration message indicates as an uplink symbol. A reference SCS may be the reference SCS indicated by the common RRC configuration message, for example, for each slot configuration of one or more slot configurations indicated by the dedicated RRC configuration message. A slot configuration period and a number/quantity of downlink/uplink/flexible symbols in each slot of the one or more slot configuration period may be determined from the common/dedicated RRC configuration messages, and may be common to each one of one or more configured BWPs.

A wireless device may receive a common RRC configuration message and/or a dedicated RRC configuration message indicating one or more symbols in a slot as downlink. The wireless device may consider the one or more symbols (e.g., downlink symbols) to be available for reception. The wireless device may receive a common RRC configuration message and/or a dedicated RRC configuration message indicating one or more symbols in a slot as uplink. The wireless device may consider the one or more symbols (e.g., uplink symbols) to be available for transmission.

One or more symbols of a slot may be indicated as flexible symbols by one or more RRC configuration messages. The wireless device may not receive the one or more RRC configuration messages indicating a slot format configuration. The wireless device may receive one or more downlink control signals (e.g., DCI format 1_0, DCI format 1_1, DCI format 0_1, DCI format 0_0, and/or DCI format 2_3) scheduling downlink/uplink transmissions. The one or more downlink control signals (e.g., DCI format 1_0, DCI format 1_1, and/or DCI format 0_1) or an RRC message (e.g., SIB1) may indicate, to the wireless device, a reception of one or more downlink channels/signals (e.g., PDSCH, PDCCH, SSB, and/or CSI-RS) in the one or more symbols of the slot. The wireless device may receive the one or more downlink channels/signals in the one or more symbols, for example, based on the indication. The one or more downlink control signals (e.g., DCI format 1_0, DCI format 1_1, DCI format 0_0, DCI format 2_3, and/or DCI format 0_1) may indicate, to the wireless device, a transmission of one or more uplink channels/signals (e.g., PUSCH, PUCCH, PRACH, and/or SRS) in the one or more symbols of the slot. The wireless device may send/transmit the one or more uplink channels/signals in the one or more symbols, for example, based on the indication.

A wireless device may be configured (e.g., by higher layers, such as an RRC layer) to receive a PDCCH, a PDSCH, and/or a CSI-RS in one or more symbols of a slot. The wireless device may receive the PDCCH, the PDSCH, and/or the CSI-RS, for example, if the wireless device does not detect DCI (e.g., DCI format 0_0, DCI format 0_1, DCI format 1_0, DCI format 1_1, and/or DCI format 2_3) indicating, to the wireless device, to send/transmit a PUSCH, a PUCCH, a PRACH, and/or an SRS in at least one symbol of the one or more symbols of the slot. The wireless device may not receive the PDCCH, the PDSCH, and/or the CSI-RS, for example, if the wireless device detects the DCI (e.g., DCI format 0_0, DCI format 0_1, DCI format 1_0, DCI format 1_1, and/or DCI format 2_3) indicating, to the wireless device, to send/transmit a PUSCH, a PUCCH, a PRACH, and/or an SRS in the at least one symbol of the one or more symbols of the slot.

A wireless device may be configured (e.g., by higher layers, such as an RRC layer) to send/transmit an uplink signal (e.g., an SRS, a PUCCH, a PUSCH, and/or a PRACH) in one or more symbols of a slot. The wireless device may detect DCI (e.g., DCI format 1_0, DCI format 1_1, or DCI format 0_1) indicating, to the wireless device, to receive a CSI-RS and/or a PDSCH in at least one symbol of the one or more symbols of the slot. The wireless device may not expect to cancel the transmission of the uplink signal in the at least one symbol of the one or more symbols. The one or more symbols may occur, relative to the last symbol of a CORESET where the wireless device detects the DCI format 1_0 or the DCI format 1_1 or the DCI format 0_1, after a number/quantity of symbols that is smaller than a PUSCH preparation time (e.g., a preparation time for sending/transmitting a PUSCH) for the processing capability of the wireless device. The wireless device may cancel the SRS, the PUCCH, the PUSCH, and/or the PRACH transmission in remaining symbols from the one or more symbols.

A wireless device may not receive a PDCCH, a PDSCH, and/or a CSI-RS in one or more symbols of a slot indicated as uplink. The wireless device may not receive a PDCCH, a PDSCH, and/or a CSI-RS in one or more symbols of a slot indicated as uplink, for example, if the one or more symbols of the slot that are indicated, to the wireless device, as uplink by one or more RRC configuration messages (common and/or dedicated). The wireless device may not send/transmit a PUSCH, a PUCCH, a PRACH, and/or an SRS in one or more symbols of a slot indicated as downlink, for example, if the one or more symbols of the slot that are indicated, to the wireless device, as downlink by the one or more RRC configuration messages (e.g., common and/or dedicated). The wireless device may not (e.g., may not expect to) receive both dedicated configuring transmission from the wireless device in one or more symbols of a slot indicated as flexible and dedicated configuring reception by the wireless device in the one or more symbols of the slot indicated as flexible, for example, if the one or more symbols of the slot that are indicated, to the wireless device, as flexible by the one or more RRC configuration messages (e.g., common and/or dedicated).

The wireless device may not send/transmit a PUSCH, a PUCCH, and/or a PRACH in a slot, for example, if the one or more symbols of the slot that are indicated, to the wireless device, by one or more RRC parameters for reception of SS/PBCH blocks. The wireless device may not send/transmit a PUSCH, a PUCCH, and/or a PRACH in the slot, for example, if a transmission would overlap with at least one symbol from the one or more symbols. The wireless device may not send/transmit SRS in the one or more symbols of the slot. The wireless device may not expect the one or more symbols of the slot to be indicated as uplink (e.g., by RRC configuration messages (common/dedicated)).

For one or more symbols of a slot corresponding to a valid PRACH occasion (and/or a valid MsgA PUSCH occasion) and a number/quantity of symbols (e.g., $N_{gap}$ symbols) before the valid PRACH occasion (and/or the valid MsgA PUSCH occasion), the wireless device may not receive a PDCCH for Type1-PDCCH CSS set, a PDSCH, or a CSI-RS in the slot, for example, if a reception would overlap with at least one symbol from the one or more symbols. The wireless device may not expect the one or more symbols of the slot to be indicated as downlink, for example, by RRC configuration messages (common/dedicated).

The wireless device may not receive a downlink signal (e.g., a PDSCH) in a slot, for example, if the wireless device is scheduled by DCI format 1_1 to receive the downlink signal (e.g., the PDSCH) over a plurality of slots, and if one or more RRC configuration messages indicate that, for the slot in the plurality of slots, at least one symbol from one or more symbols where the wireless device is scheduled to receive the downlink signal (e.g., the PDSCH reception) in the slot is an uplink symbol. The wireless device may not send/transmit an uplink signal (e.g., a PUSCH) in a slot, for example, if the wireless device is scheduled by DCI format 0_1 to send/transmit the uplink signal (e.g., the PUSCH) over a plurality of slots, and if one or more RRC configuration messages indicates that, for the slot from the plurality of slots, at least one symbol from one or more symbols where the wireless device is scheduled to send/transmit the uplink signal (e.g., the PUSCH transmission) in the slot is a downlink symbol.

A wireless device may be configured (e.g., by higher layers, such as an RRC layer) with a parameter indicating one or more slot formats (e.g., SlotFormatIndicator). A DCI format (e.g., DCI format 2_0) may be used for indicating/notifying the one or more slot formats. The DCI format may comprise CRC bits scrambled by a first RNTI (e.g., SFI-RNTI). The first RNTI may be configured (e.g., by higher layers, such as an RRC layer), or may be predefined, or may be configured as a fixed value. A size of the DCI format may be configured, for example, by higher layers (e.g., up to 128 bits or any other bits). The DCI format may comprise at least one of one or more slot format indicators (SFIs). The wireless device may be configured to monitor a group common indication (e.g., a GC-PDCCH, group-common-DCI, etc.) for the one or more slot format indicators for each one of one or more serving cells (e.g., configured by the parameters indicating the one or more slot formats). The group common indication may be sent/transmitted from a base station to a group of wireless devices of the same group. The wireless device may receive, from the base station for each serving cell, at least one of: an identity/indicator of the serving cell; a location of an SFI-index field in the DCI format; and/or a set of slot format combinations comprising one or more slot format combinations (slotFormatCombinations). Each of the one or more slot format combinations may comprise: one or more slot formats (slotFormats) for the slot format combination; a mapping for the slot format to a corresponding SFI-index field value in the DCI format (slotFormatCombinationId); and/or at least one reference SCS configuration.

Figure 22A:
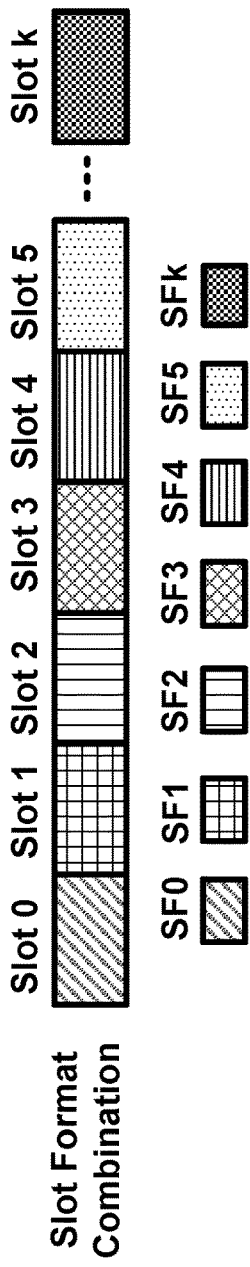
FIG. 22A and FIG. 22B show example slot format combinations.
Figure 22B:
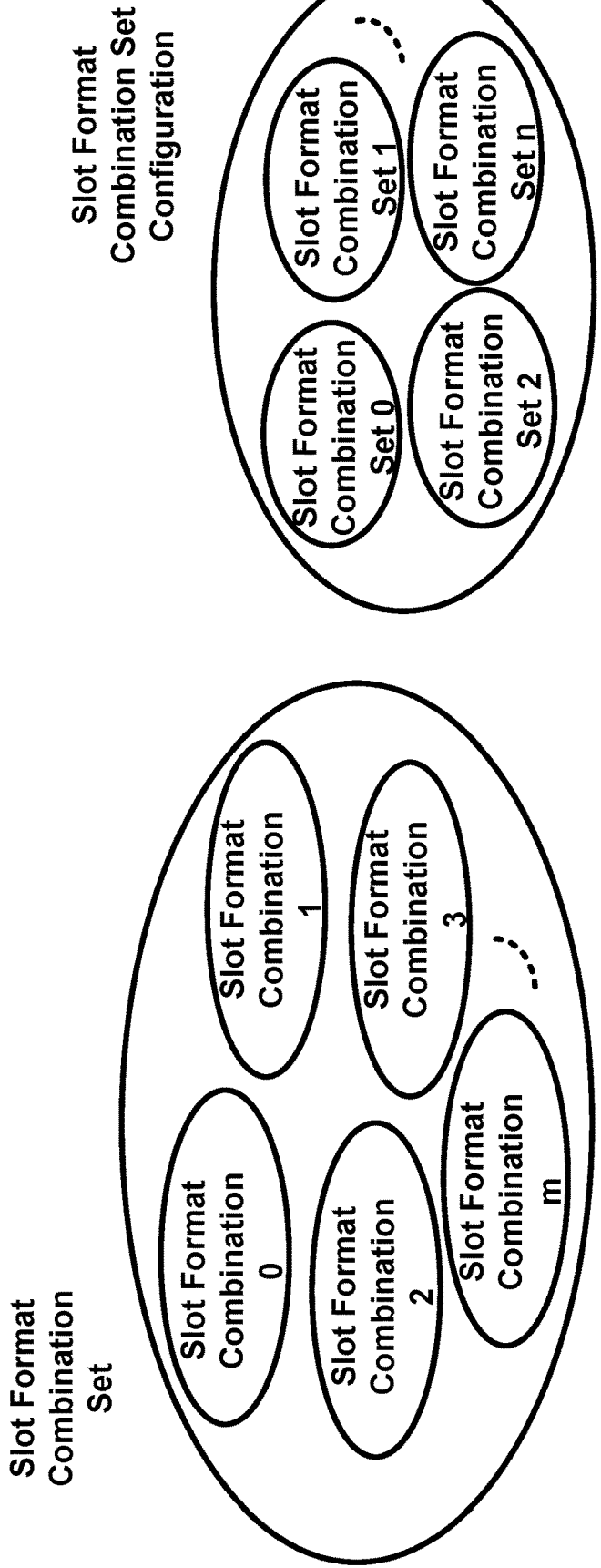

FIG. 22A shows an example slot format combination. The slot format combination may comprise k slots. Each slot of the slot format combination may have a slot format (e.g., slot0 may have slot format SF0, slot1 may have slot format SF1, slot2 may have slot format SF2, slot3 may have slot format SF3, slot4 may have slot format SF4, slot5 may have slot format SF5, . . . , and slot k may have slot format SFk). Two or more of SF0, SF1, SF2, SF3, SF4, SF5, . . . , and SFk may correspond to different slot formats. Two or more of SF0, SF1, SF2, SF3, SF4, SF5, . . . , and SFk may correspond to the same slot format. As shown in FIG. 22B, a plurality of slot format combinations of a cell (e.g., slot format combination 0, slot format combination 1, slot format combination 2, slot format combination 3, . . . , and slot format combination m) may be configured to a wireless device (e.g., via one or more RRC messages or any other messages). The plurality of slot format combinations may be slot format combinations in at least some types of communications (e.g., communications by wireless devices compatible with 3GPP NR Release 16, earlier/later 3GPP releases, and/or any other access technologies). The plurality of slot format combinations may be slot format combinations designed, for example, based on an interference condition in at least some types of communications (e.g., communications by wireless devices compatible with 3GPP NR Release 16, earlier/later 3GPP releases, and/or any other access technologies, such as an NR in unlicensed spectrum (NR-U) system). The plurality of slot format combinations may be slot format combinations designed, for example, based on a channel condition in at least some types of communications (e.g., communications by wireless devices compatible with 3GPP NR Release 16, earlier/later 3GPP releases, and/or any other access technologies, such as an NR-U system). A slot format combination may be indicated, to a wireless device, via a downlink control channel. The slot format combination may be indicated, to the wireless device, via a PDCCH. The slot format combination may be indicated, to the wireless device, via a GC-PDCCH.

The plurality of the slot format combinations may be parted into a plurality of slot format combination sets (e.g., slot format combination0, slot format combination set1, slot format combination set 2, . . . , and slot format combination set n). The plurality of slot format combination sets may be configured to a wireless device (e.g., via one or more RRC messages). The number/quantity of slot format combinations in each of the slot format combination sets may be different. The number/quantity of slot format combinations in each of the slot format combination sets may be the same. A time length of a slot format combination in each of the slot format combination sets may be equal to a time length of a channel occupancy time (COT). The time length of the slot format combination in each of the slot format combination sets may be larger than the time length of the COT.

FIG. 23 shows example slot formats for a slot. A slot format may be identified/indicated by a corresponding format index (e.g., as shown in the format indexes in the table in FIG. 23). Each symbol in a slot may be a downlink (D) symbol, an uplink (U) symbol, and/or a flexible (F) symbol. Each slot may comprise a number/quantity of symbols (e.g., 14 symbols or any other number/quantity of symbols). Slot format 0 may comprise only downlink (D) symbols (e.g., 14 downlink symbols). Slot format 1 may comprise only uplink (U) symbols (e.g., 14 uplink symbols). Slot format 55 may comprise two downlink (D) symbols, followed by three flexible (F) symbols, followed by three uplink (U) symbols, followed by six downlink (D) symbols. Slot format indexes 56 to 254 may be reserved (e.g., for additional slot formats or other purposes). Slot format index 255 may indicate that the wireless device determines the slot format for the slot, for example, based on tdd-UL-DL-ConfigurationCommon, or tdd-UL-DL-ConfigurationDedicated and, if any, on detected DCI formats.

An SFI-index field value in a DCI format may indicate, to a wireless device, a slot format for each of one or more slots in a number/quantity of slots for each DL BWP and/or each UL BWP starting from a slot in which the wireless device detects the DCI format. A slot format determination procedure may be defined for the wireless device. The wireless device may determine a slot format of one or more symbols, for example, based on a priority between a first slot format indicated by one or more higher layer parameters (e.g., TDD-UL-DL-ConfigCommon and/or TDD-UL-DL-ConfigDedicated) and a second slot format indicated by DCI (e.g., DCI format 2_0), if detected. The wireless device may determine the slot format, for example, based on whether the UL/DL grant is configured by higher layer or dynamically indicated by DCI. The second slot format may be prioritized over the first format, for example, if the DCI indicating the second slot format is received after receiving the one or more higher layer parameters indicating the first slot format. The first slot format may be prioritized over the second format, for example, if the DCI indicating the second slot format is received before receiving the one or more higher layer parameters indicating the first slot format.

A wireless device may not detect (or may not expect to detect) a DCI format (e.g., DCI format 2_0) with an SFI-index field value indicating one or more symbols of a slot as uplink. The wireless device may not detect (or may not expect to detect) a DCI format (e.g., DCI format 1_0, a DCI format 1_1, or DCI format 0_1) indicating, to the wireless device, to receive a downlink signal (e.g., a PDSCH or a CSI-RS) in the one or more symbols of the slot.

A wireless device may not detect (or may not expect to detect) a DCI format (e.g., DCI format 2_0) with an SFI-index field value indicating one or more symbols of a slot as downlink. The wireless device may not detect (or may not expect to detect) a DCI format (e.g., DCI format 0_0, DCI format 0_1, DCI format 1_0, DCI format 1_1, DCI format 2_3), or an RAR UL grant, indicating to the wireless device to send/transmit an uplink signal (e.g., a PUSCH, a PUCCH, a PRACH, or an SRS) in the one or more symbols of the slot.

The wireless device may not detect (or may not expect to detect) a DCI format (e.g., DCI format 2_0) with an SFI-index field value indicating one or more symbols of a slot as uplink or as flexible, for example, if the one or more symbols of the slot are indicated as downlink by one or more RRC configuration messages (e.g., TDD-UL-DL-ConfigurationCommon, or TDD-UL-DL-ConfigDedicated). The wireless device may not detect (or may not expect to detect) a DCI format (e.g., DCI format 2_0) with an SFI-index field value indicating one or more symbols of a slot as downlink or as flexible, for example, if the one or more symbols of the slot are indicated as uplink by one or more RRC configuration messages (e.g., TDD-UL-DL-ConfigurationCommon, or TDD-UL-DL-ConfigDedicated).

The wireless device may detect (or may not expect to detect) a DCI format (e.g., DCI format 2_0) with an SFI-index field value indicating one or more symbols of a slot as uplink, for example, if the one or more symbols of the slot are indicated, to the wireless device, for reception of SS/PBCH blocks by one or more RRC messages (e.g., ssb-PositionsInBurst in SystemInformationBlockType1 or ssb-PositionsInBurst in ServingCellConfigCommon). The wireless device may detect (or may not expect to detect) a DCI format (e.g., DCI format 2_0) with an SFI-index field value indicating one or more symbols of a slot as downlink, for example, if the one or more symbols of the slot are indicated, to the wireless device, for PRACH transmissions by one or more RRC messages (e.g., prach-Configuration-Index in RACH-ConfigCommon). The wireless device may detect (or may not expect to detect) a DCI format (e.g., DCI format 2_0) with an SFI-index field value indicating one or more symbols of a slot as uplink, for example, if the one or more symbols of the slot are indicated, to the wireless device, for a CORESET (e.g., for a CORESET for Type0-PDCCH CSS set) by one or more RRC messages (e.g., pdcch-ConfigSIB1 in MIB).

The wireless device may detect a DCI format (e.g., DCI format 2_0) indicating a slot format for the slot, for example, for one or more symbols of the slot indicated as flexible by one or more RRC configuration messages (e.g., TDD-UL-DL-ConfigurationCommon and TDD-UL-DL-ConfigDedicated), or if the one or more RRC configuration messages are not sent to the wireless device. The wireless device may receive a PDCCH via a CORESET, for example, if at least one symbol of the one or more symbols is a symbol in the CORESET configured, to the wireless device, for the PDCCH monitoring, and if an SFI-index field value in the DCI format indicates that the at least one symbol is a downlink symbol. The wireless device may receive a PDSCH or a CSI-RS via one or more symbols of a slot, for example, if the SFI-index field value in the DCI format indicates the one or more symbols of the slot as flexible and the wireless device detects a DCI format (e.g., DCI format 1_0, DCI format 1_1, or DCI format 0_1) indicating, to the wireless device, to receive the PDSCH or the CSI-RS mapped in the one or more symbols of the slot. The wireless device may send/transmit an uplink signal (e.g., a PUSCH, a PUCCH, a PRACH, or an SRS) via one or more symbols of a slot, for example, if the SFI-index field value in the DCI format indicates the one or more symbols of the slot as flexible and the wireless device detects a DCI format (e.g., DCI format 0_0, DCI format 0_1, DCI format 1_0, DCI format 1_1, DCI format 2_3), or an RAR UL grant, indicating to the wireless device to send/transmit the uplink signal (e.g., the PUSCH, the PUCCH, the PRACH, or the SRS) via the one or more symbols of the slot. The wireless device may not receive a downlink signal via one or more symbols of a slot, for example, if the SFI-index field value in the DCI format indicates the one or more symbols of the slot as flexible, and the wireless device does not detect a DCI format (e.g., DCI format 1_0, DCI format 1_1, or DCI format 0_1) indicating, to the wireless device, to receive the downlink signal (e.g., a PDSCH or a CSI-RS). The wireless device may not send/transmit an uplink signal via one or more symbols of a slot, for example, if the SFI-index field value in the DCI format indicates the one or more symbols of the slot as flexible, and the wireless device does not detect a DCI format (e.g., DCI format 0_0, DCI format 0_1, DCI format 1_0, DCI format 1_1, DCI format 2_3), or an RAR UL grant, indicating to the wireless device to send/transmit the uplink signal (e.g., a PUSCH, a PUCCH, a PRACH, or an SRS) via the one or more symbols of the slot. The wireless device may receive a downlink signal (e.g., a PDSCH or a CSI-RS) via one or more symbols of a slot, for example, if the wireless device is configured (e.g., by higher layers) to receive the downlink signal (e.g., the PDSCH or the CSI-RS) via the one or more symbols of the slot, and if an SFI-index field value in the DCI format indicates the one or more symbols of the slot as downlink. The wireless device may send/transmit an uplink signal (e.g., a PUCCH, a PUSCH, or a PRACH) via a slot, for example, if the wireless device is configured (e.g., by higher layers) to send/transmit the uplink signal (e.g., the PUCCH, the PUSCH, or the PRACH) via the one or more symbols of the slot, and if an SFI-index field value in the DCI format indicates the one or more symbols of the slot as uplink. The wireless device may send/transmit an SRS, for example, only in a subset of symbols from one or more symbols of a slot indicated as uplink symbols by an SFI-index field value in the DCI format if the wireless device is configured (e.g., by higher layers) to send/transmit the SRS in the one or more symbols of the slot. A wireless device may not expect to detect both an SFI-index field value in the DCI format indicating one or more symbols of a slot as downlink and a DCI format (e.g., DCI format 0_0, DCI format 0_1, DCI format 1_0, DCI format 1_1, DCI format 2_3), or an RAR UL grant, indicating to the wireless device to send/transmit an uplink signal (e.g., an SRS, a PUSCH, a PUCCH, or a PRACH) via at least one symbol of the one or more symbols of the slot. A wireless device may not expect to detect an SFI-index field value in the DCI format indicating one or more symbols of a slot as downlink or flexible, for example, if the one or more symbols of the slot comprise at least one symbol corresponding to any repetition of a PUSCH transmission (e.g., activated by an UL Type 2 grant PDCCH). A wireless device may not expect to detect both an SFI-index field value in the DCI format indicating one or more symbols of a slot as uplink and a DCI format (e.g., DCI format 1_0 or DCI format 1_1 or DCI format 0_1) indicating, to the wireless device, to receive a downlink signal (e.g., a PDSCH or a CSI-RS) via at least one symbol of the one or more symbols of the slot.

The wireless device may cancel a downlink signal reception (e.g., a CSI-RS reception, a PDSCH reception, or any other downlink signal receptions) via one or more symbols of a slot, for example, if the wireless device is configured (e.g., by higher layers) to receive the downlink signal (e.g., the CSI-RS or the PDSCH) via the one or more symbols of the slot and the wireless device detects a DCI format (e.g., DCI format 2_0) with a slot format value that indicates a slot format with a subset of symbols from the one or more symbols as uplink or flexible. The wireless device may cancel a downlink signal reception (e.g., a CSI-RS reception, a PDSCH reception, or any other downlink signal receptions) via one or more symbols of a slot, for example, if the wireless device is configured (e.g., by higher layers) to receive the downlink signal (e.g., the CSI-RS or the PDSCH) via the one or more symbols of the slot and the wireless device detects a DCI format (e.g., DCI format 0_0, DCI format 0_1, DCI format 1_0, DCI format 1_1, or DCI format 2_3) indicating, to the wireless device, to send/transmit an uplink signal (e.g., a PUSCH, a PUCCH, an SRS, or a PRACH) via at least one symbol of the one or more symbols.

A wireless device may be configured (e.g., by higher layers) to send/transmit an uplink signal (e.g., an SRS, a PUCCH, a PUSCH, or a PRACH) via one or more symbols of a slot and the wireless device may detect a DCI format (e.g., DCI format 2_0) with a slot format value that indicates a slot format with a subset of symbols from the one or more symbols as downlink or flexible. The wireless device may be configured (e.g., by higher layers) to send/transmit an uplink signal (e.g., an SRS, a PUCCH, a PUSCH, or a PRACH) via one or more symbols of a slot and the wireless device may detect a DCI format (e.g., DCI format 1_0, DCI format 1_1, or DCI format 0_1) indicating, to the wireless device, to receive a downlink signal (e.g., a CSI-RS or a PDSCH) in a subset of symbols from the one or more symbols. The wireless device may not expect to cancel the transmission in symbols from the subset of symbols that occur, relative to the last symbol of a CORESET in which the wireless device detects a DCI format (e.g., DCI format 2_0, DCI format 1_0, DCI format 1_1, or the DCI format 0_1), for example, after a duration of a number/quantity of symbols that is smaller than the PUSCH preparation time for the corresponding PUSCH processing capability. The wireless device may cancel at least one of the uplink transmission (e.g., the PUCCH, the PUSCH, or the PRACH transmission) in remaining symbols from the one or more symbols and may cancel at least one of the uplink transmission (e.g., the SRS transmission) in remaining symbols from the subset of symbols.

A wireless device may assume/determine that one or more flexible symbols in a CORESET configured for the wireless device for PDCCH monitoring are downlink symbols. The wireless device may assume/determine that one or more flexible symbols in a CORESET configured for the wireless device for PDCCH monitoring are downlink symbols, for example, if the wireless device does not detect an SFI-index field value in a DCI format (e.g., DCI format 2_0) indicating one or more symbols of a slot as flexible or uplink and the wireless device does not detect a DCI format (e.g., DCI format 0_0, DCI format 0_1, DCI format 1_0, DCI format 1_1, or DCI format 2_3) indicating, to the wireless device, to send/transmit an uplink signal (e.g., an SRS, a PUSCH, a PUCCH, or a PRACH) via the one or more symbols.

The wireless device may not detect a DCI format (e.g., DCI format 2_0) indicating a slot format for a slot, for example, if one or more symbols of the slot are indicated as flexible by one or more RRC configuration messages (e.g., TDD-UL-DL-ConfigurationCommon, and TDD-UL-DL-ConfigDedicated). The wireless device may not detect a DCI format (e.g., DCI format 2_0) indicating a slot format for the slot, for example, if one or more RRC configuration messages are not sent to the wireless device. The wireless device may receive a downlink signal (e.g., a PDSCH or a CSI-RS) via the one or more symbols of the slot, for example, if the wireless device receives a corresponding indication by a DCI format (e.g., DCI format 1_0, DCI format 1_1, or DCI format 0_1). The wireless device may send/transmit an uplink signal (e.g., a PUSCH, a PUCCH, a PRACH, or an SRS) via the one or more symbols of the slot, for example, if the wireless device receives a corresponding indication by a DCI format (e.g., DCI format 0_0, DCI format 0_1, DCI format 1_0, DCI format 1_1, or DCI format 2_3). The wireless device may receive a PDCCH via one or more downlink symbols. The wireless device may not receive a downlink signal (e.g., the PDSCH or the CSI-RS) via one or more symbols of a slot, for example, even if the wireless device is configured (e.g., by higher layers) to receive the downlink signal (e.g., the PDSCH or the CSI-RS) via the one or more symbols of the slot. The wireless device may not send/transmit at least one of one or more uplink signals (e.g., a PUCCH, a PUSCH, or a PRACH) via a slot, for example, even if the wireless device is configured (e.g., by higher layers) to send/transmit the one or more uplink signals (e.g., an SRS, or the PUCCH, or the PUSCH, or the PRACH) via one or more symbols of the slot. The wireless device may not send/transmit at least one of the uplink signals (e.g., the SRS), for example, in symbols from the one or more symbols in the slot, if any, starting from a symbol that is a number/quantity of symbols equal to the PUSCH preparation time for the corresponding PUSCH timing capability after the last symbol of a CORESET in which the wireless device is configured to monitor a downlink control channel (e.g., a PDCCH for DCI format 2_0). The wireless device may not expect to cancel the transmission of the SRS, the PUCCH, the PUSCH, or the PRACH, for example, in symbols from the one or more symbols in the slot, if any, starting before a symbol that is a number/quantity of symbols equal to the PUSCH preparation time for the corresponding PUSCH timing capability after the last symbol of a CORESET in which the wireless device is configured to monitor a downlink control channel (e.g., a PDCCH for DCI format 2_0).

The wireless device may not be required to perform radio resource management (RRM) measurements, for example, for unpaired spectrum operation for the wireless device on a cell (e.g., a cell in a frequency band of FR1), and if the scheduling restrictions due to RRM measurements are not applicable. The wireless device may not be required to perform the RRM measurements, for example, if the wireless device detects a DCI format (e.g., DCI format 0_0, DCI format 0_1, DCI format 1_0, DCI format 1_1, or DCI format 2_3) indicating, to the wireless device, to send/transmit an uplink signal via one or more symbols. The wireless device may not be required to perform the RRM measurements, for example, based on a SS/PBCH block or CSI-RS reception via a different cell in the frequency band and/or if the SS/PBCH block or CSI-RS reception comprises at least one symbol from the set of symbols.

Symbols may be indicated as flexible, for example, by semi-static UL/DL configuration (e.g., TDD-UL-DL-ConfigCommon and/or TDD-UL-DL-ConfigDedicated), which may be overwritten to 'U', 'D', or 'F' by one or more measurements (e.g., measurement related signals semi-statically configured by wireless device-specific RRC, such as, periodic/semi-persistent CSI-RS for CSI report, periodic CSI report, periodic/semi-persistent SRS, etc., where a DL or UL direction may be assumed), a dynamic SFI (e.g., DCI format 2_0), and/or wireless device-specific data (e.g., UE-specific data, such as UE-specific DCI triggering PDSCH, PUSCH, PUCCH, aperiodic CSI-RS, aperiodic SRS, etc.). Symbols may be indicated as DL and/or UL, for example, by a semi-static UL/DL configuration, which may not be overwritten to the other direction by one or more measurements, a dynamic SFI, and/or wireless device-specific data (e.g., UE-specific data). Symbols indicated as DL and/or UL by a semi-static UL/DL configuration may not be overwritten and may be indicated as flexible 'F' by a dynamic SFI.

Symbols may not be indicated as downlink (e.g., 'D') and/or uplink (e.g., IT) by a semi-static UL/DL configuration (e.g., a semi-static UL/DL configuration for the symbols is not received, or the semi-static UL/DL configuration may indicate the symbols as 'F'). The UL/DL direction that may be implied by one or more measurement signals in the symbols may be overwritten and/or may be indicated as flexible (e.g., 'F') by a dynamic SFI. The wireless device may cancel the measurement(s) and/or measurement related transmission(s). The UL/DL direction implied by one or more measurement signals in the symbols may be overwritten and may be indicated as uplink (e.g., 'U') and/or downlink (e.g., 'D') by a dynamic SFI. The UL/DL direction implied by one or more measurement signals in the symbols may be overwritten by the wireless device's own wireless device-specific data (e.g., DCI triggered data transmission and/or reception), for example, if the wireless device-specific data implies the other direction. The wireless device may cancel the measurement(s) and may follow the instructions indicated by the DCI for the wireless device-specific data transmission and/or reception.

Symbols indicated as UL and/or DL by a dynamic SFI may not be overwritten by wireless device-specific data (e.g., UE-specific data). The wireless device may consider/determine/declare an occurrence of an error, for example, if the wireless device-specific data and a dynamic SFI imply different transmit directions for the symbols. Symbols indicated as flexible by a dynamic SFI may be overwritten by wireless device-specific data (e.g., to change to DL or UL). The wireless device may follow instructions indicated by the DCI for the wireless device-specific data transmission and/or reception.

One or more transmission directions (e.g., implied by cell-specific RRC configured, such as, RMSI, and PRACH) may not be overwritten to a different direction. One or more transmission directions (e.g., implied by cell-specific RRC configuration for SCell/PSCell delivered in UE-specific manner) may not be overwritten by a dynamic SFI to a different direction.

The wireless device may follow instructions indicated by a DCI grant and transmit/receive data in a slot, for example, for DCI granted multi-slot transmission(s) (e.g., PDSCH/PUSCH/PUCCH), if a semi-static DL/UL configuration of the slot has no direction conflict with the scheduled symbols of the slot. The wireless device may cancel transmission/reception in a slot, for example, for DCI granted multi-slot transmission, if a semi-static DL/UL configuration of the slot from the multi-slot transmission grant has direction confliction with the scheduled symbols. The wireless device may follow instructions indicated by the scheduled multi-slot transmission/reception, for example, for DCI granted multi-slot transmission, if there is no semi-static DL/UL configuration and/or if the semi-static DL/UL configuration indicates flexible symbol(s).

Some transmission(s) of which transmission direction(s) (e.g., implied by wireless device-specific RRC configured) may be treated together as measurements (e.g., wireless device-specific RRC PRACH configuration per each BWP, type 1 grant-free (configured grant) UL transmission, type 2 grant-free (configured grant) UL transmission). The handling of the priorities for slot format determination (e.g., the priorities of wireless device-specific semi-statically configured transmissions, such as PRACH/CG type1/CG type2) may be similar to the handling of the priorities of the measurements signals. Some transmissions (e.g., type 2 grant-free UL transmission) at the first activated resource may be treated as wireless device-specific data.

Figure 24A:
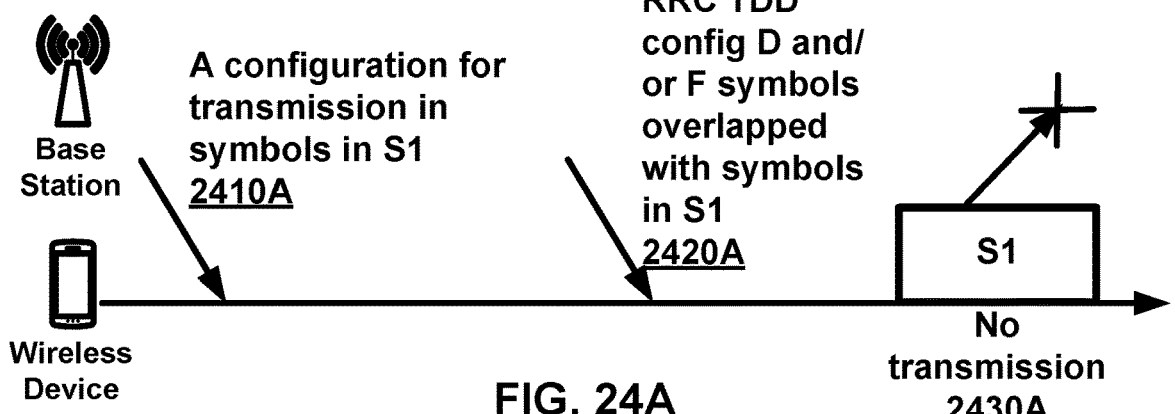
FIG. 24A and FIG. 24B show example communications based on a slot format determination.
Figure 24B:
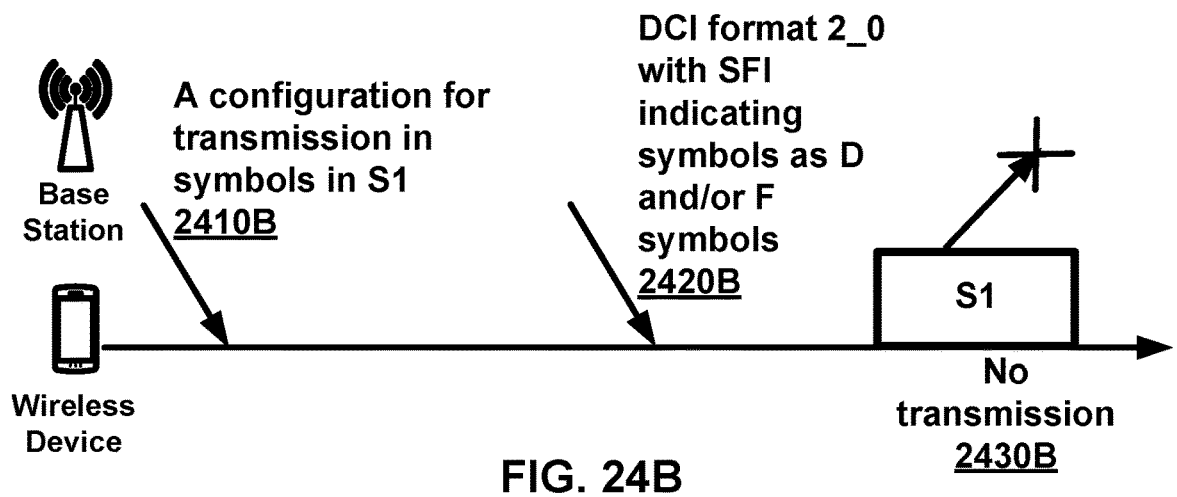
Figure 24C:
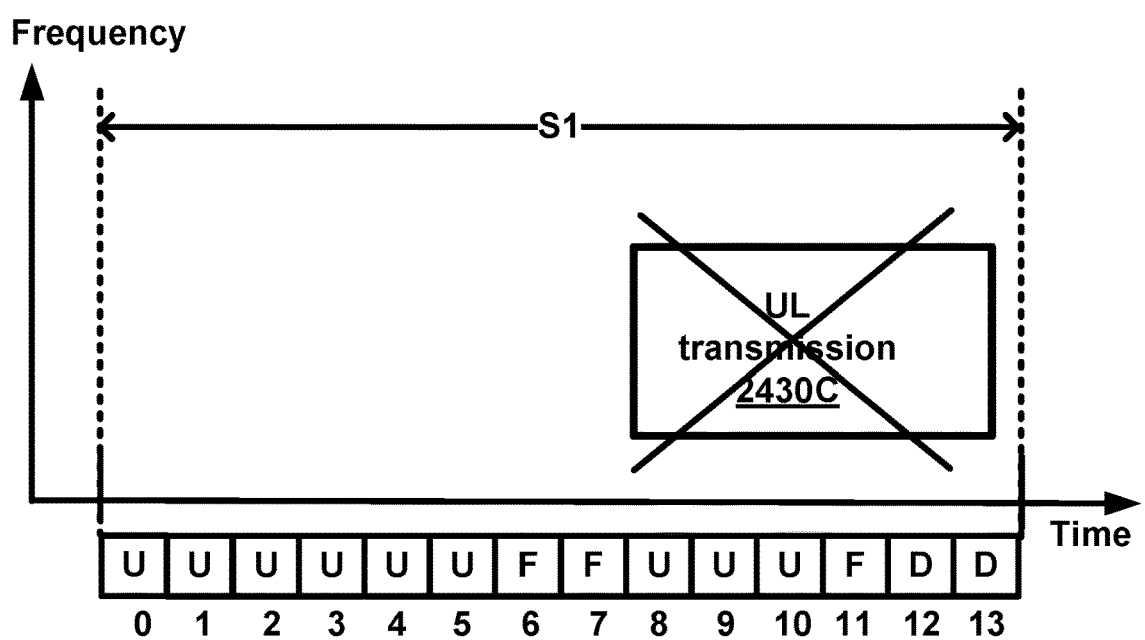
FIG. 24C shows an example resource configuration.

FIG. 24A shows example communications based on a slot format determination. The wireless device may receive one or more messages (e.g., by higher layer signaling) indicating a (e.g., semi-static) configuration for UL transmission in a set of symbols of slot S1 (e.g., at step 2410A). One or more symbols of the set of symbols may be configured by an RRC semi-static configuration (e.g., TDD-UL-DL-ConfigCommon and/or TDD-UL-DL-ConfigDedicated) as DL and/or flexible symbols (e.g., at step 2420A). The wireless device may cancel the UL transmission in the slot S1 (e.g., at step 2430A), for example, based on the one or more symbols of the set of symbols configured as DL and/or flexible symbols overlapping in time with one or more of the symbols in the slot S1. FIG. 24B shows example communications based on a slot format determination. A wireless device may receive one or more messages (e.g., by higher layer signaling) indicating a configuration for UL transmission in a set of symbols of slot S1 (e.g., at step 2410B). One or more symbols of the set of symbols may be indicated by a dynamic SFI (e.g., DCI format 2_0) as DL and/or flexible symbols (e.g., at step 2420B). The wireless device may cancel the UL transmission in the slot S1 (e.g., at step 2430B), for example, based on the one or more symbols of the set of symbols configured as DL and/or flexible symbols overlapping in time with one or more of the symbols in the slot S1. FIG. 24C shows an example resource configuration. The resource may be (e.g., semi-statically) configured (e.g., based on steps 2410A and 2420A shown in FIG. 24A and/or based on steps 2410B and 2420B shown FIG. 24B) for UL transmission. The resource may overlap with one or more DL symbols (e.g., semi-statically configured as DL and/or dynamically indicated as DL), and the UL transmission may be cancelled in that resource (e.g., the UL transmission 2430C may be canceled because the UL transmission 2430C overlaps in time with the last two DL symbols of the slot S1).

Figure 25A:
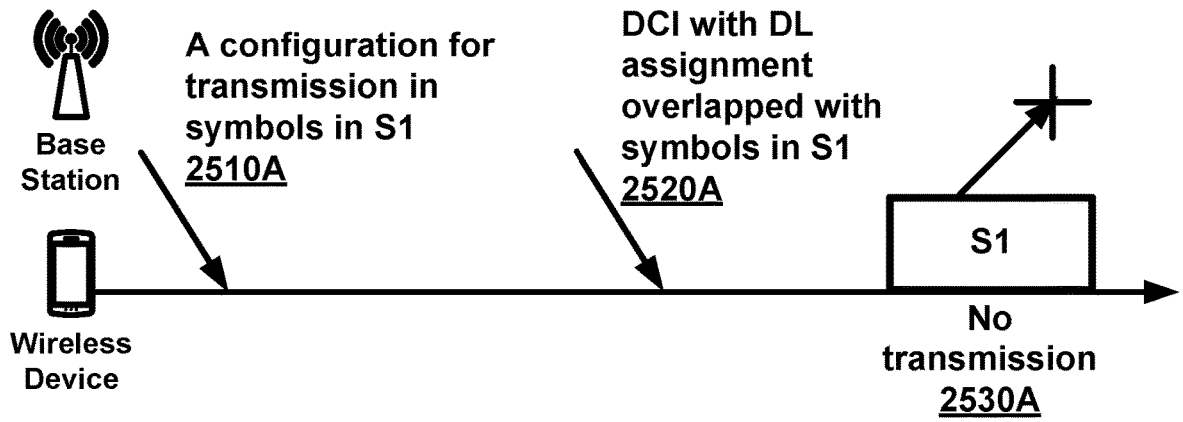
FIG. 25A shows example communications based on a slot format determination.
Figure 25B:
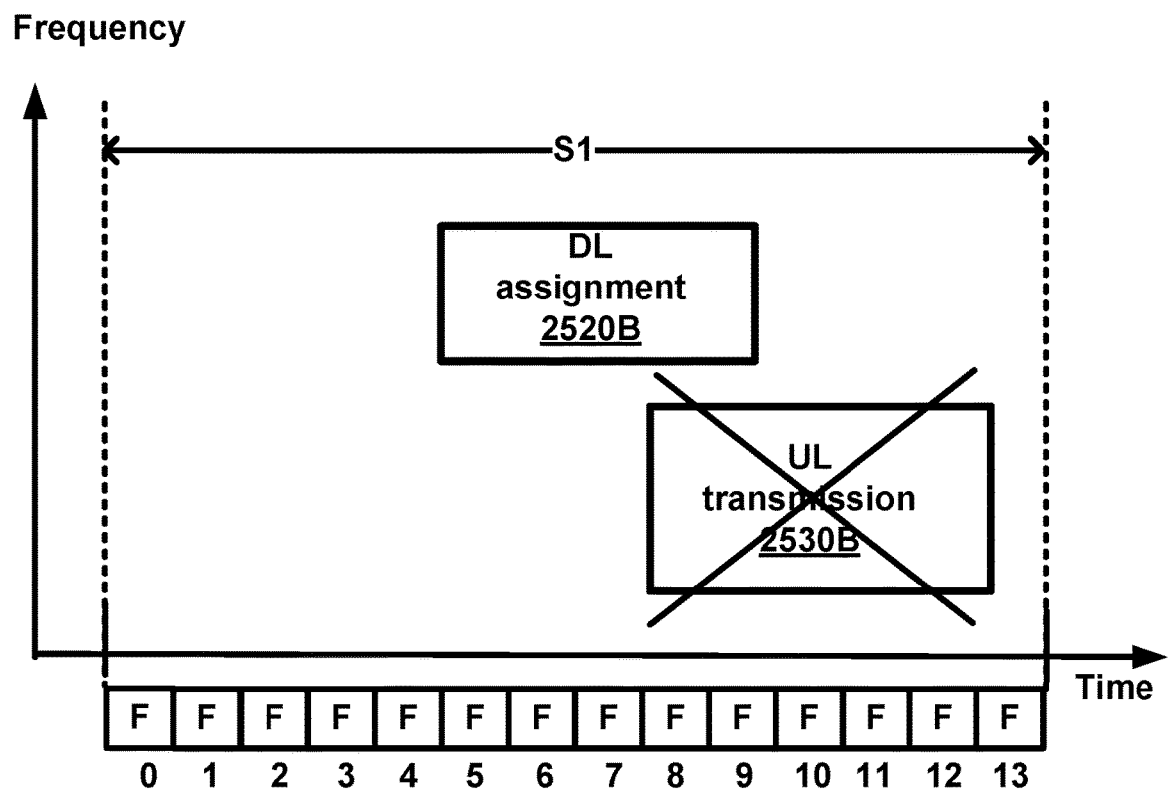
FIG. 25B shows an example resource configuration.

FIG. 25A shows example communications based on a slot format determination. A wireless device may receive one or more messages (e.g., by higher layer signaling) indicating a configuration for UL transmission in a set of symbols of slot S1 (e.g., at step 2510A). One or more symbols of the set of symbols may overlap with a DL assignment scheduled by received DCI (e.g., at step 2520A). The wireless device may cancel the UL transmission (e.g., at step 2530A), for example, based on the one or more symbols for the DL reception corresponding to the DL assignment overlapping in time with one or more of the symbols in the slot S1. FIG. 25B shows an example resource configuration. The resource may be (e.g., semi-statically) configured (e.g., based on steps 2510A and 2520A shown in FIG. 25A) for UL transmission. The resource may overlap with one or more symbols for the DL reception corresponding to the DL assignment 2520B, and the UL transmission 2530B may be cancelled in that resource (e.g., the UL transmission 2530B may be canceled because the UL transmission 2530B overlaps in time with the DL assignment 2520B).

FIG. 26A shows an example communications based on a slot format determination. The wireless device may receive one or more messages (e.g., comprising RRC TDD parameters) configuring a set of symbols in slot S1 as flexible symbols (e.g., at step 2610A). The wireless device may receive a DCI format (e.g., DCI format 2_0) that indicates the set of symbols as flexible symbols (e.g., at step 2620A). The wireless device may receive DCI comprising a UL grant (e.g., at step 2630A). The UL grant may schedule an uplink transmission in the set of symbols. The wireless device may send/transmit an uplink signal (e.g., a transport block) in slot S1 (e.g., at step 2640A), for example, according to the UL grant.

FIG. 26B shows an example communications based on a slot format determination. The wireless device may receive one or more messages (e.g., comprising RRC TDD parameters) configuring one or more symbols of a slot S2 as DL symbols (e.g., at step 2610B). The wireless device may receive a DCI format comprising a UL grant for repeated uplink transmissions via slots S1, S2, Sn (e.g., DCI with multi-slot UL grant scheduled on slots S1, S2, Sn at step 2620B). The wireless device may only cancel the UL transmission in slot S2 (e.g., at step 2630B), and may send/transmit uplink signals via the rest of the slots (e.g., at step 2640B), for example, according to the multi-slot UL grant.

A network may assign a PRACH occasion and/or a MsgA PUSCH occasion as flexible (e.g., 'F') symbols and/or flexible (e.g., 'F') slots, for example, based on one or more rules described herein. The network may assign a PRACH occasion and/or a MsgA PUSCH occasion as flexible (e.g., 'F') symbols and/or flexible (e.g., 'F') slots, for example, by using a combination of a DCI format (e.g., DCI format 2_0) and one or more higher layer parameters (e.g., TDD-UL-DL-ConfigCommon and/or TDD-UL-DL-ConfigDedicated), for one or more wireless devices in a cell. A wireless device may receive DCI (e.g., DCI format 2_0 indicating 'U' symbol(s) and/or DCI format 0_0, DCI format 0_1, DCI format 1_0, DCI format 1_1, and/or DCI format 2_3, comprising a UL grant) that may overwrite the flexible symbol(s) to change the flexible symbol(s) to uplink symbols. The wireless device may be able to perform a random access procedure via/on the PRACH occasion, for example, depending on whether the wireless device receives the DCI. The wireless device may perform RA via/on the PRACH occasion, for example, if the wireless device receives a PDCCH order indicating a PRACH transmission via/on the symbols of the PRACH occasion. The network may not send/transmit a dynamic UL grant and/or a DL assignment to other wireless devices in the cell on the symbols of the PRACH occasion.

One or more slot format determination rule/procedure may be defined for PRACH so that the wireless device may be able to select valid PRACH resources. A PRACH may be sent/transmitted using a selected PRACH format with a PRACH transmission power via/on an indicated PRACH resource. A wireless device may be configured with a number/quantity N of SSBs associated with one PRACH occasion and a number/quantity R of contention-based preambles per SSB per valid PRACH occasion (e.g., by ssb-perRACH-OccasionAndCB-PreamblesPerSSB). One SSB may be mapped to 1/N consecutive valid PRACH occasions, and R contention-based preambles, with consecutive indexes associated with the SSB per valid PRACH occasion, may start from preamble index 0 (e.g., if N<1). R contention-based preambles with consecutive indexes associated with SSB n, n=0, 1, ..., N−1, per valid PRACH occasion may start from preamble index $n \cdot N_{preamble}^{total}/N$ (e.g., if N>=1), where $N_{preamble}^{total}$ is provided by totalNumberOfRA-Preambles and is an integer multiple of N.

SSB indexes (e.g., provided by ssb-PositionsInBurst in SIB1 or in ServingCellConfigCommon) may be mapped to valid PRACH occasions. The SSB indexes may be mapped to valid PRACH occasions, for example, in the following order: 1) first, in increasing order of preamble indexes within a single PRACH occasion; 2) second, in increasing order of frequency resource indexes for frequency multiplexed PRACH occasions; 3) third, in increasing order of time resource indexes for time multiplexed PRACH occasions within a PRACH slot; 4) fourth, in increasing order of indexes for PRACH slots. A PRACH mask index field may indicate the PRACH occasion for a PRACH transmission, for example, for the PRACH transmission triggered by a PDCCH order, if the value of the random access preamble index field is not zero. The PRACH occasions may be associated with the SSB index indicated by the SSB index field of the PDCCH order. The PRACH occasions may be mapped consecutively per corresponding SSB index. The indexing of the PRACH occasion indicated by the mask index value may be reset per mapping cycle of consecutive PRACH occasions per SSB index. The wireless device may select, for a PRACH transmission, the PRACH occasion indicated by PRACH mask index value for the indicated SSB index in the first available mapping cycle. The ordering of the PRACH occasions (e.g., for the indicated preamble index) may be as follows: 1) first, in increasing order of frequency resource indexes for frequency multiplexed PRACH occasions; 2) second, in increasing order of time resource indexes for time multiplexed PRACH occasions within a PRACH slot; 3) third, in increasing order of indexes for PRACH slots.

All PRACH occasions may be valid, for example, for a paired spectrum. FIG. 27 shows an example PRACH resource configuration in a paired spectrum. The PRACH resource configuration may comprise 8 ROs in a PRACH slot. All ROs may be valid, for example, irrespective of whether the ROs overlap in time with SSB symbols or not (e.g., if the ROs and the SSBs are located in different frequency ranges as shown in FIG. 27).

FIG. 28A and FIG. 28B show example PRACH configurations in an unpaired spectrum. A PRACH occasion in a PRACH slot may be valid, for example, for an unpaired spectrum, if a wireless device is not provided/configured with TDD-UL-DL-ConfigurationCommon. The PRACH occasion in the PRACH slot may be valid, for example, if it does not precede an SSB in the PRACH slot and starts at least $N_{gap}$ symbols after the last SSB reception symbol. A PRACH occasion in a PRACH slot may be valid, for example, if the wireless device is provided/configured with TDD-UL-DL-ConfigurationCommon. The PRACH occasion in the PRACH slot may be valid, for example, if it is within UL symbols, or it does not precede an SSB in the PRACH slot and starts at least $N_{gap}$ symbols after the last downlink symbol and at least $N_{gap}$ symbols after the last SSB transmission symbol. $N_{gap}$ may be zero, for example, for one or more preamble formats (e.g., preamble format B4). $N_{gap}$ may be zero, for example, for preamble SCS of 1.25 kHz and/or 5 kHz. $N_{gap}$ may be two, for example, for preamble SCS of 15 kHz, 30 kHz, 60 kHz, 120 kHz, and/or any other frequency.

In FIG. 28A, RO1, RO2, RO3, and RO4 may be valid ROs, for example, because they do not overlap with downlink (e.g., 'D') symbols and/or SSB symbols, they do not precede SSB symbols, and they start after a gap longer than N_gap symbols from the last SSB symbol. The rest of configured resources/ROs may be invalid ROs and not indexed, for example, because they overlap with downlink (e.g., 'D') symbols, they overlap with SSB symbols, or they do not start at least after N_gap symbols from the last SSB symbol. Valid ROs may be indexed (e.g., RO1, RO2, RO3, and RO4). Invalid ROs may not be indexed. In FIG. 28B, RO1, RO2, RO3, RO4, RO5, and RO6 may be valid ROs, for example, because they are within UL symbols, they do not precede SSB symbols, they do not overlap with SSB symbols, and they start after a gap longer than N_gap symbols from the last SSB symbol. As shown in FIG. 28A and FIG. 28B, the network may not configure any ROs with downlink (e.g., 'D') symbols.

The wireless device (e.g., if requested by higher layers) may send/transmit a PRACH in the selected PRACH occasion, for example if a random access procedure is initiated by a PDCCH order. A time between the last symbol of the PDCCH order reception and the first symbol of the PRACH transmission may be larger than or equal to $N_{T,2}$+$\Delta_{BWPSwitching}$+$\Delta_{Delay}$ msec, where $N_{T,2}$ is a time duration of $N_2$ symbols corresponding to a PUSCH preparation time for wireless device processing capability (e.g., UE processing capability 1), $A_{BWPSwitching}$=0 if the active UL BWP does not change, and $\Delta_{BWPSwitchng}$ is defined otherwise, and $A_{Delay}$=0.5 msec for FR1 and $\Delta_{Delay}$=0.25 msec for FR2. The wireless device may determine $N_2$ assuming SCS configuration μ=0, for example, for a PRACH transmission using 1.25 kHz or 5 kHz SCS. A wireless device may not send/transmit a PRACH and an uplink transmission (e.g., a PUSCH, a PUCCH, and/or an SRS), for example, in a same slot or if a gap between the first or last symbol of a PRACH transmission in a first slot is separated by less than N symbols from the last or first symbol of the uplink transmission (e.g., the PUSCH, the PUCCH, and/or the SRS transmission) in a second slot, where N=2 for μ=0 or μ=1, N=4 for μ=2 or μ=3, and p is the SCS configuration for the active UL BWP.

A valid PRACH occasion may be indicated, for example, by one or more parameters (e.g., one or more higher layer parameters such as TDD-UL-DL-ConfigCommon) as one or more UL (e.g., IT) and/or flexible (e.g., 'F') symbols. A base station may guarantee that a PRACH occasion is not overwritten to one or more DL (e.g., 'D') symbols, and there may be no DL transmission on the PRACH occasion and/or no DL transmission overlapping with the PRACH occasion. Wireless devices (e.g., in RRC-CONNECTED state (connected mode UEs)) may not monitor search spaces in the resources overlapping with the PRACH occasion, which may reduce power consumption. The network may configure one or more symbols of the PRACH occasion as flexible symbols, for example, by one or more higher layer parameters (e.g., TDD-UL-DL-ConfigCommon) for a plurality of wireless device in a cell (cell-specific signaling). A first wireless device may not be configured to monitor PDCCH comprising a DCI format (e.g., DCI format 2_0). The first wireless device may be in an RRC idle state or an idle mode wireless device (e.g., RRC-IDLE state or idle mode UE). The first wireless device may receive one or more configuration parameters of the PRACH occasion and may determine that the PRACH occasion is valid (e.g., the PRACH occasion does not precede an SSB in the PRACH slot and starts at least N_gap symbols after the last DL symbol and at least N_gap symbols after the last SSB transmission symbol). The first wireless device may send/transmit a PRACH via/on the valid PRACH occasion. A second wireless device may be configured to monitor PDCCH comprising a DCI format (e.g., DCI format 2_0). The second wireless device may be in an RRC connected state or may be a connected mode wireless device (e.g., connected mode UE). The second wireless device may or may not detect a DCI format (e.g., DCI format 2_0). The second wireless device may detect a DCI format (e.g., DCI format 2_0) indicating the one or more symbols of the PRACH occasion as flexible 'F' symbols. The second wireless device may only send/transmit and/or receive data via the one or more symbols, for example, if it receives a wireless device-specific DL assignment (e.g., UE-specific DL assignment) and/or a UL grant for data and/or measurement transmission (e.g., UE-specific DCI triggering PDSCH, PUSCH, PUCCH, aperiodic CSI-RS, aperiodic SRS, etc.) scheduled to be transmitted via/on the one or more symbols. Otherwise, the second wireless device may not send/transmit and/or receive data, for example, based on higher layer (semi-statically) configured DL assignments and/or UL grants. The network may use this slot format combination to reserve the PRACH occasion for a guaranteed random access procedure, for example, for idle mode wireless devices (e.g., idle mode UEs). The network may not dynamically schedule transmissions and/or receptions, for connected mode wireless devices (e.g., connected mode UEs), via/on the one or more symbols.

A PRACH occasion of a two-step RACH procedure (e.g., MsgA PRACH occasion) and a PUSCH occasion of the two-step RACH procedure (e.g., MsgA PUSCH occasion) may be TDMed and may be located in different resources. The PRACH occasion of the two-step RACH procedure (e.g., MsgA PRACH occasion) and the PUSCH occasion of the two-step RACH procedure (e.g., MsgA PUSCH occasion) may be in different time slots. The PRACH occasion of the two-step RACH procedure (e.g., MsgA PRACH occasion) and the PUSCH occasion of the two-step RACH procedure (e.g., MsgA PUSCH occasion) may be located in non-contiguous time slots. In a TDD operation, UL slot(s) may be isolated, and a PUSCH transmission of the two-step RACH procedure (e.g., MsgA PUSCH transmission) may not be able to follow a PRACH transmission of the two-step RACH procedure (e.g., MsgA preamble transmission) within the slot or in the following slot, and there may be one or more TDD DL slots between the PRACH occasion of the two-step RACH procedure (e.g., the MsgA PRACH occasion) and the PUSCH occasion of the two-step RACH procedure (e.g., the MsgA PUSCH occasion). The PUSCH transmission of the two-step RACH procedure (e.g., the MsgA PUSCH transmission) may not be able to follow the PRACH transmission of the two-step RACH procedure (e.g., the MsgA PRACH transmission) in contiguous slots (e.g., in an unlicensed band operation), due to one or more LBT failures.

One or more rules for mapping the PRACH occasion(s) of the two-step RACH procedure (e.g., MsgA PRACH occasion(s)) and the PUSCH occasion(s) of the two-step RACH procedure (e.g., MsgA PUSCH occasion(s)) may be used. A mapping order for a preamble of the two-step RACH procedure (e.g., MsgA preamble) and a PUSCH occasion and/or resource unit of the two-step RACH procedure (e.g., MsgA PUSCH occasion/resource unit) may be determined. The mapping rule may be, for example, based on code domain, followed by frequency domain, followed by time domain (e.g., similar to SSB-to-RO mapping). The mapping order for a preamble (e.g., MsgA preamble) and a PUSCH (e.g., MsgA PUSCH) may be as follows: 1) first, in increasing order of code domain (e.g., MsgA PUSCH DM-RS port/sequence per MsgA PUSCH occasion and/or MsgA preamble index per MsgA PRACH occasion); 2) second, in increasing order of frequency domain resource; and 3) third, in increasing order of time domain resource. The preambles (e.g., MsgA preambles transmitted in a MsgA PRACH occasion) may be differentiated by different preamble indexes. The PUSCHs (e.g., MsgA PUSCHs transmitted in a MsgA PUSCH occasion) may be differentiated by different DM-RS ports or sequences. The mapping between the preambles (e.g., MsgA preambles) in each RO and associated PUSCH resource units (e.g., MsgA PUSCH resource units) may be one-to-one or multiple-to-one or one-to-multiple mapping.

One or more rules for determining valid/invalid PRACH occasions may be determined in at least some types of communications (e.g., communications by wireless devices compatible with 3GPP NR Release 16, earlier/later 3GPP releases, and/or any other access technologies), for example, based on TDD configuration and/or SSB location. Similar rule(s) for determining valid/invalid PRACH occasions (e.g., MsgA PRACH occasions) may be used. Similar rule(s) for determining valid/invalid PUSCH occasions (e.g., valid/invalid MsgA PUSCH occasions) may be used such that the PUSCH occasion (e.g., MsgA PUSCH occasion) may not overlap with DL symbols and/or an SSB. A PUSCH occasion (e.g., a MsgA PUSCH occasion) may be invalid, for example, if one or more symbols of the PUSCH occasion (e.g., the MsgA PUSCH occasion) overlap with DL symbols in a TDD configuration and/or SSB symbols. A PUSCH occasion (e.g., a MsgA PUSCH occasion) may be invalid, for example, if one or more symbols of the PUSCH occasion (e.g., the MsgA PUSCH occasion) overlap with a PRACH occasion (e.g., MsgA PRACH occasion). The wireless device may not be able to send/transmit a preamble (e.g., a MsgA preamble) and a PUSCH (e.g., a MsgA PUSCH) simultaneously (e.g., due to wireless device complexity and increased power consumption), for example, if the PUSCH occasion (e.g., MsgA PUSCH occasion) is associated with the overlapped PRACH occasion (e.g., MsgA PRACH occasion). The base station may not be able to use appropriate receive (Rx) beam to receive a PRACH and a PUSCH from different wireless device (e.g., due to analogue beam forming), for example, if the PUSCH occasion (e.g., MsgA PUSCH occasion) is not associated with the overlapped PRACH occasion (e.g., MsgA PRACH occasion).

Repetition may be used for transmission of a preamble (e.g., MsgA PRACH preamble), for example, for some PRACH formats, such as format 2), for coverage enhancement in larger cells. It may be desirable to use repetition (e.g., multi-slot transmission) for a PUSCH transmission (e.g., MsgA PUSCH transmission), for example, to match the coverage level/status of the associated preamble (e.g., MsgA PRACH preamble). The repetition level/factor may be configured as part of PUSCH occasion and/or PUSCH resource configuration (e.g., MsgA PUSCH occasion and/or MsgA PUSCH resource configuration). Transmitting multiple/repetitions of a preamble and/or transport block (TB) may result in aggregated received power at the base station, which may be helpful for successful reception and/or decoding of the preamble/TB. The wireless device located at the edge of the cell with limited Tx power may be able to successfully send/transmit the preamble and/or TB, for example, by using repetition.

Availability of multiple PUSCH resources (e.g., MsgA PUSCH resources) may be used in several ways. It may reduce a probability of PUSCH collision, for example, if multiple wireless devices select the same preamble. A wireless device may use more than one resource for a PUSCH transmission (e.g., MsgA PUSCH transmission) to increase the reliability of successful PUSCH transmission through repetition. The wireless device may use different uplink transmit beams for transmission of the repeated PUSCH (e.g., the MsgA PUSCH repetition).

A PUSCH transmission (e.g., MsgA PUSCH transmission) may be repeated in an initial access, for example, for the PUSCH (e.g., the MsgA PUSCH) to have comparable/similar coverage of a PRACH (e.g., MsgA PRACH), and/or to improve the reliability of the PUSCH transmission (e.g., the MsgA PUSCH transmission reliability). Power control and/or HARQ process may be used to extend the coverage of the PUSCH transmission (e.g., MsgA PUSCH transmission coverage) and/or to improve the reliability of the PUSCH transmission (e.g., MsgA PUSCH transmission reliability).

In at least some types of wireless communications (e.g., compatible with 3GPP Release 16, earlier/later 3GPP releases or generations, and/or other access technology), at least some uplink channel resources for a first type of access procedure may not be valid. At least some uplink channel resources may not be valid, for example, if the uplink channel resources overlap with one or more downlink slots and/or one or more downlink symbols. Invalid uplink channel resources may cause failure of the first type of access procedure and/or may cause a fallback to a second type of access procedure. The fallback may cause undesirable results, such as increased latency, repeated transmissions, and/or inefficiencies that may frustrate goals and/or purposes of the first type of access procedure. PUSCH occasions (e.g., MsgA PUSCH occasions for a two-step RACH procedure) may overlap (e.g., partially or fully overlap) with one or more DL symbols in at least some types of communications (e.g., communications by wireless devices compatible with 3GPP Release 16, earlier/later 3GPP releases, and/or any other access technologies). A wireless device may consider/determine that some PUSCH occasions (e.g., a MsgA PUSCH occasion) that overlaps (e.g., partially or fully overlaps) with one or more DL symbols are not available for UL transmission. The unavailability of the PUSCH occasions (e.g., a MsgA PUSCH occasion) may result in increased latency of an initial access procedure and/or degraded performance. As described further herein, a network may configure one or more PUSCH occasions (e.g., MsgA PUSCH occasions) such that they do not overlap with DL symbols. Such configuration of PUSCH occasions may enhance initial access, such as by increasing available resources reserved for a first type of access procedure (e.g., a two-step RACH procedure).

As described herein, a first type of access procedure may be improved using one or more valid uplink channel resource configurations. A base station may determine one or more uplink channel resources associated with the first type of access procedure. The base station may configure uplink channel resources such that one or more reserved uplink channel resources associated with the first type of access procedure do not overlap with a downlink symbol and/or a downlink slot. One or more messages may indicate one or more parameters (e.g., TDD-UL-DL-ConfigCommon, TDD-UL-DL-ConfigDedicated, and/or any other parameter) such that downlink slots and/or downlink symbols do not overlap with the at least some reserved uplink channel resources associated with the first type of access procedure. The base station may reduce the quantity of the downlink slots and/or the downlink symbols such that the downlink slots and the downlink symbols do not overlap with the one or more reserved uplink channel resources associated with the first type of access procedure. The base station may send/transmit DCI comprising a slot format indicator. The slot format indicator may indicate a slot format index that is associated with a slot format that does not comprise downlink symbols, and/or a slot format that comprises one or more downlink symbols that are distanced apart from the one or more reserved uplink channel resources associated with the first type of access procedure (e.g., distanced apart by at least a gap, such as an N_gap or a T_gap).

A network may configure RACH resources/occasions (e.g., a RACH occasion) such that they overlap with flexible and/or uplink resources in at least some types of communications (e.g., communications by wireless devices compatible with 3GPP Release 16, earlier/later 3GPP releases, and/or any other access technologies). The flexible and/or uplink resources may be indicated, for example, based on semi-static slot format configurations, such as RRC signaling of TDD-UL-DL-ConfigCommon and/or TDD-UL-DL-ConfigDedicated. The network may not assign downlink resources using semi-static cell-specific configuration (TDD-UL-DL-ConfigCommon) to one or more symbols and/or slots assigned for PRACH transmission. A base station may configure one or more configured grants for PUSCH transmission, and a configured grant occasion (e.g., a MsgA PUSCH occasion) may partially or fully overlap with downlink resources in at least some types of communications (e.g., communications by wireless devices compatible with 3GPP Release 16, earlier/later 3GPP releases, and/or any other access technologies). As configured grants may be used for RRC-connected wireless devices, this may not degrade performance of initial access based on a four-step RACH procedure. Unlike the four-step RACH procedure for RRC-connected wireless devices, a PUSCH occasion that overlaps with downlink resources may not be available for a PUSCH transmission of a two-step RACH procedure (e.g., a MsgA PUSCH transmission), for example, if a two-step RACH procedure is used. This unavailability of a PUSCH occasion may result in longer latency in an initial access procedure and/or degrade performance benefits of the two-step RACH procedure over a four-step RACH procedure. Resource unavailability of MsgA PUSCH resources/occasions may be reduced or eliminated, for example, to achieve an effective two-step RACH procedure. As described further herein, a base station may configure some PUSCH occasions (e.g., a MsgA PUSCH occasion) that do not partially or fully overlaps with downlink resources. The base station may configure some PUSCH occasions (e.g., a MsgA PUSCH occasion) such that the PUSCH occasions (e.g., the MsgA PUSCH occasion) overlap with flexible or uplink resources (e.g., at least based on semi-static slot format configurations and/or DCI-based slot format indications). This configuring may reduce resource unavailability in selecting a preamble (e.g., a MsgA preamble) and/or a PUSCH (e.g., a MsgA PUSCH), for example, based on a RACH-less and/or a two-step RACH procedure for an initial access of a wireless device.

The network may configure slot formats of one or more PRACH and/or PUSCH resources (e.g., for an RRC CONNECTED mode wireless device) as uplink (e.g., 'U'), downlink (e.g., 'D'), or flexible (e.g., 'F') symbols. This configuring may result in increased flexibility for the network in resource allocation and/or load control. One or more wireless devices (e.g., a connected mode UE) may receive a DCI format (e.g., DCI format 2_0) indicating one or more symbols of a (e.g., semi-statically) configured PRACH occasion as flexible (e.g., 'F') symbols. The one or more wireless devices (e.g., a connected mode UE) may determine not to send/transmit a PRACH via the PRACH occasion, for example, if the one or more symbols do not start at least N_gap symbols after the last symbol of an SSB. The one or more wireless devices (e.g., a connected mode UE) may receive a PDCCH order indicating a PRACH transmission in one or more symbols of a PRACH occasion that may be indicated as flexible (e.g., 'F') symbols, for example, by a DCI format (e.g., DCI format 2_0). The one or more wireless devices (e.g., a connected mode UE) may send/transmit a PRACH via the PRACH occasion, for example, because symbols indicated as flexible (e.g., 'F') symbols may be overwritten by wireless device-specific data (e.g., UE-specific data) to one or more of the flexible symbols to one or more uplink (e.g., IT) symbols. The one or more wireless devices (e.g., a connected mode wireless device)

may not send/transmit via a (e.g., semi-statically) configured PUSCH occasion, for example, if a DCI format (e.g., DCI format 2_0) indicates one or more symbols of the PUSCH occasion as downlink (e.g., 'D') symbols and/or flexible (e.g., 'F') symbols. The one or more wireless devices (e.g., a connected mode UE) may send/transmit via a dynamically scheduled PUSCH occasion, for example, if the DCI format (e.g., DCI format 2_0) indicates one or more symbols of the PUSCH occasion as uplink (e.g., 'U') symbols and/or flexible (e.g., 'F') symbols. The one or more wireless devices (e.g., a connected mode UE) may not send/transmit via one or more semi-statically configured PUSCH occasions comprising repetition (e.g., multi-slot PUSCH transmissions), for example if a DCI format (e.g., DCI format 2_0) indicates one or more symbols of the one or more PUSCH occasions as downlink (e.g., 'D') symbols and/or flexible (e.g., 'F') symbols. The one or more wireless devices (e.g., a connected mode UE) may send/transmit via the rest of the PUSCH occasions comprising symbols indicated as 'U' symbols (e.g., by the DCI format 2_0). A symbol of a PUSCH resource with repetition (e.g., dynamically scheduled by DCI format 0_1) may be assigned to uplink (e.g., 'U'), downlink (e.g., 'D'), or flexible (e.g., 'F') symbols. The one or more wireless devices (e.g., a connected mode UE) may not send/transmit a PUSCH repetition, for example, if the symbols/slot of the PUSCH repetition overlap with downlink (e.g., 'D') symbols. The one or more wireless devices (e.g., a connected mode UE) may send/transmit the rest of the PUSCH repetitions with uplink (e.g., 'U') or flexible (e.g., 'F') symbols/slots.

One or more rules for a PRACH slot format in at least some types of communications (e.g., communications by wireless devices compatible with 3GPP Release 16, earlier/later 3GPP releases, and/or any other access technologies) may be used. The one or more rules may be used, for example, for determining a slot format of an uplink channel transmission of a first type of access procedure (e.g., a PUSCH of a two-step RACH, such as MsgA PUSCH), so that uplink resources may be reserved for initial access for one or more wireless devices (e.g., an idle mode UE). One or more of uplink resources for repetitions of uplink channel transmissions may be invalid, for example, if the uplink channel transmission of the first type of access procedure is configured with repetitions. The invalid uplink resources may cause a failure of the first type of access procedure. The PUSCH of a two-step RACH (e.g., MsgA PUSCH) may be configured with one or more repetitions for transport block transmissions. For the PUSCH of the two-step RACH (e.g., MsgA PUSCH) configured with transport block repetition (e.g., over multiple slots), the network may need to reserve an increased number/quantity of uplink resources, for example, by assigning an uplink slot format (e.g., 'U') or flexible symbols (e.g., 'F' symbols), and/or by not assigning downlink symbols (e.g., 'D' symbols), to the resources associated with all or part of the repetitions. This assigning may result in a resource waste and reduced network flexibility for resource allocation and load control. One or more rules for determining a slot format of a configured PUSCH (e.g., a semi-statically configured PUSCH) in at least some types of communications (e.g., communications by wireless devices compatible with 3GPP Release 16, earlier/later 3GPP releases, and/or any other access technologies) may be applied in determining one or more slot formats of PUSCH occasions/resources of a two-step RACH procedure (e.g., MsgA PUSCH occasions). A network may assign slot format (e.g., 'F', and/or 'D'), for example, based on the one or more rules for determining a slot format of a configured PUSCH, which may not guarantee UL resources available for initial access.

Various examples described herein may implement enhanced resource configurations for one or more access procedures. A network may reserve at least a portion of uplink channel resources associated with a first type of access procedure, for example, based on one or more criteria. A minimum number/quantity of valid uplink channel resources in an uplink resource group may be set in association with one or more repetitions of the uplink channel transmission of the first type of access procedure. One or more RVs may be used to determine valid uplink channel resources.

A wireless device may fail to successfully send/transmit one or more PUSCH (e.g., a MsgA PUSCH). The one or more PUSCH (e.g., the MsgA PUSCH) may be configured with one or more repetition transmissions. There may not be enough UL resources available for the PUSCH transmissions with repetition (e.g., MsgA PUSCH transmission with the one or more repetitions). One or more of the PUSCH transmissions (e.g., MsgA PUSCH transmissions) may collide/overlap with DL transmissions and/or UL transmissions of other wireless devices. This may result in a re-transmission of the uplink transmission of a two-step RACH procedure (e.g., MsgA and/or MsgA PUSCH), a two-step RACH procedure failure, and/or a fall back to a four-step RACH procedure, which may increase random access latency. It may be beneficial if the network may reserve (e.g., guarantees the availability of) UL resources for one or more PUSCH transmissions of a two-step RACH procedure (e.g., MsgA PUSCH transmission), which may comprise one or more repetitions.

As described further herein, one or more rules for determining a slot format for one or more PUSCH transmissions (e.g., MsgA PUSCH transmissions) may increase available resources for initial access by assigning 'U' and/or 'F' symbols to the resources for the one or more PUSCH transmissions. The PUSCH transmission of a two-step RACH procedure (e.g., MsgA PUSCH transmission) may be configured with one or more repetition. The one or more rules for determining a slot format of PUSCH resources of a two-step RACH procedure (e.g., MsgA PUSCH resources) may effectively reduce the amount of reserved resources that may be assigned for other purposes.

The network may configure a slot format of at least one symbol of a PUSCH resource of a two-step RACH procedure (e.g., MsgA PUSCH resource) as IT and/or flexible (e.g., 'F') symbols, and not as DL (e.g., 'D') symbols. The PUSCH resource of a two-step RACH procedure (e.g., MsgA PUSCH resource) may comprise one or more occasions for one or more transport block repetitions. The network may reserve or make available at least a portion of the PUSCH resource of the two-step RACH procedure (e.g., MsgA PUSCH resources) for uplink transmission. The network may select the slot format of at least one symbol/slot/occasion of the PUSCH resource (e.g., MsgA PUSCH resource) as uplink (e.g., 'U') and/or flexible (e.g., 'F') symbols, and not as downlink (e.g., 'D') symbols.

The at least a portion of the PUSCH resource of the two-step RACH procedure may comprise a percentage of symbols allocated to the PUSCH of the two-step RACH procedure (e.g., the MsgA PUSCH) that may comprise repetitions. The symbols may be allocated to a first PUSCH repetition instance/occasion (e.g., MsgA PUSCH repetition instance/occasion), such as, n-th repetition. The at least a portion of the PUSCH resource of the two-step RACH procedure may comprise a number/quantity of PUSCH occasions (e.g., MsgA PUSCH occasions) from a plurality of PUSCH occasions (e.g., MsgA PUSCH occasions) allocated to the PUSCH (e.g., MsgA PUSCH) with one or more repetitions. The at least a portion of the PUSCH resource of the two-step RACH procedure may be a pre-defined number/quantity of symbols/slots/occasions. The at least a portion of the PUSCH resource of the two-step RACH procedure may be a configurable parameter that may depend on the location/channel status/RSRP or one or more wireless devices associated with the network.

The network may reserve uplink resources for the at least a portion of the PUSCH resource of the two-step RACH procedure by assigning the slot format of the at least a portion of uplink resources to be assigned as 'U' and/or 'F' symbols, and not as 'D' symbols. The network may guarantee that the at least a portion of the uplink resources do not overlap with 'D' symbols. The network may guarantee that the at least a portion of the uplink resources are separated from (e.g., do not precede and/or follow) an SSB. The network may guarantee that the at least a portion of the uplink resources starts at least N_gap symbols after the last downlink symbol. The network may guarantee that the at least a portion of the uplink resources ends at least N_gap symbols before the first downlink symbol. The network may guarantee that the at least a portion of the uplink resources starts at least N_gap symbols after the last SSB transmission symbol. The network may guarantee that the at least a portion of the uplink resources ends at least N_gap symbols before the first SSB transmission symbol. The network may guarantee that the at least a portion of the uplink resources does not overlap with a PRACH (e.g., MsgA PRACH of a two-step RACH procedure) symbols. The network may guarantee that the at least a portion of the uplink resources is separated from (e.g., does not precede and/or follow) PRACH (e.g., MsgA PRACH of a two-step RACH procedure) symbols.

It may be beneficial for the network to guarantee that the at least a portion of the uplink resources allocated to the PUSCH transmission (e.g., MsgA PUSCH transmission) is reserved/available. The initial access with the PUSCH of a two-step RACH procedure (e.g., MsgA PUSCH) may be enhanced (e.g., the probability of a successful initial access may increase; the likelihood of MsgA PUSCH collision with DL and/or UL transmissions of other wireless devices may decrease). The PUSCH transmission of a two-step RACH procedure (e.g., MsgA PUSCH transmission) may be configured with one or more repetitions for enhanced coverage. A wireless device may not expect to receive a PUSCH resource configuration (e.g., MsgA PUSCH resource configuration), for example, if at least a portion of the PUSCH resources of the two-step RACH procedure (e.g., MsgA PUSCH resources) are not available for UL transmission (e.g., overlap with DL symbols).

As described further herein, one or more rules for determining the slot format configuration of symbols allocated to a PUSCH resource (e.g., MsgA PUSCH resource) may enhance the network efficiencies and resource management. The network and/or the wireless device may determine the slot format of one or more symbols allocated for one or more PUSCH transmissions (e.g., MsgA PUSCH transmission) according to the one or more rules, for example, to increase the likelihood of successful MsgA PUSCH transmission and/or to reduce the likelihood of MsgA PUSCH collision and/or latency due to MsgA PUSCH re-transmission, thereby resulting in an enhanced two-step random access performance as well as enhanced battery consumption of the wireless device. The network may dynamically determine the PUSCH transmission (e.g., the MsgA PUSCH transmission) that may comprise one or more repetitions for a coverage enhancement scenario.

A base station may send/transmit one or more messages (e.g., one or more RRC messages) to one or more wireless devices (e.g., via broadcast or multicast messages). The one or more messages (e.g., one or more RRC messages) may comprise first configuration parameters of one or more uplink transmissions via a first radio resource. The base station may determine the first configuration parameters. The first configuration parameters may indicate one or more frequency resources, one or more time resources, one or more time offsets, and a periodicity of the first radio resource. The first configuration parameters may indicate one or more configured grant types (e.g., a configured grant type 1). The base station may determine one or more slot formats indicating transmission directions of a plurality of symbols of the first radio resource. The base station may determine the one or more slot formats, for example, based on whether the first radio resource is allocated for a transport block transmission associated with a first type of random access (e.g., a two-step RACH procedure, a RACH-less procedure, or any other similar procedures) or not. The base station may determine the slot format of at least one symbol of the plurality of symbols to be uplink and/or flexible, for example, based on the first radio resource being allocated for a transport block transmission associated with the first type of random access (e.g., MsgA PUSCH of a two-step RACH procedure). The base station may determine the slot format of one or more symbols of the plurality of symbols to be uplink, flexible, and/or downlink, for example, based on the first radio resource not being allocated for a transport block transmission associated with the first type of random access (e.g., MsgA PUSCH of a two-step RACH procedure). The base station may determine second configuration parameters of one or more downlink transmissions via the first radio resource. The base station may configure one or more symbols of the first radio resource with a downlink direction, for example, if the first radio resource is not allocated to a PUSCH transmission of a two-step RACH procedure (e.g., MsgA PUSCH transmission). The first radio resource may be allocated to a regular PUSCH transmission and/or a PUCCH transmission and/or an SRS transmission. The base station may send/transmit a downlink signal (e.g., DCI format 2_0), to one or more wireless devices, indicating a downlink transmission direction for the one or more symbols, for example, based on the one or more symbols of the first radio resource being configured with a flexible slot format (e.g., comprising 'F' symbols). The base station may allocate the one or more symbols of the first radio resource to one or more downlink transmissions. The base station may send/transmit, to at least one wireless device, a message indicating the one or more downlink transmissions via the one or more symbols of the first radio resource. The slot format of the one or more symbols may be flexible. The base station may send/transmit, to one or more wireless devices, one or more messages (e.g., one or more RRC messages) comprising the first configuration parameters and the one or more slot formats.

Figure 29:
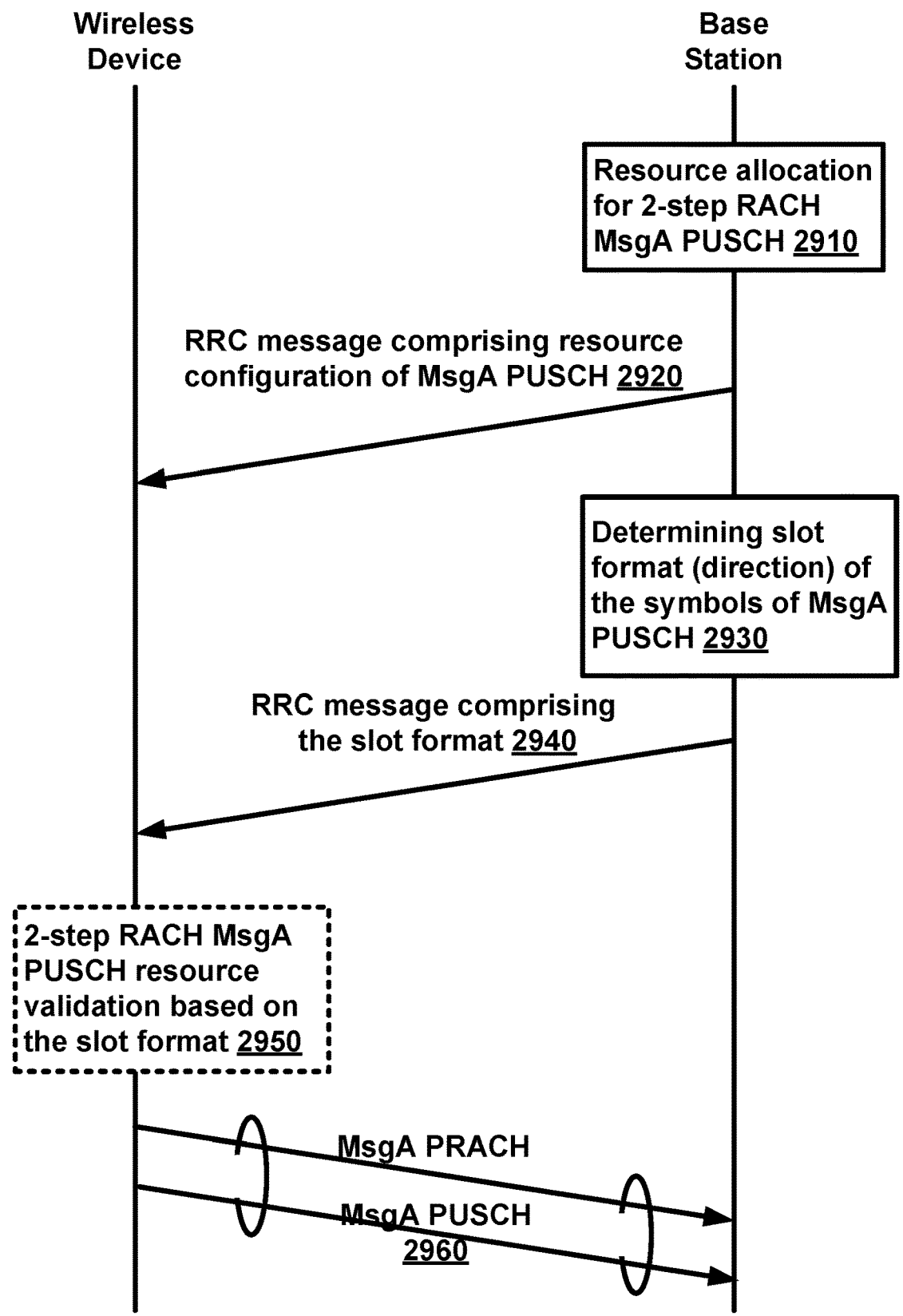
FIG. 29 shows example communications between a wireless device and a base station for a first type of access procedure.

FIG. 29 shows example communications between a wireless device and a base station for a first type of access procedure (e.g., a two-step RACH procedure). A base station may allocate one or more resources for uplink transmission (e.g., PRACH, PUSCH, PUCCH, and/or SRS transmission(s)). The one or more resources may comprise one or more time domain resources and/or one or more frequency domain resources. The one or more resources may comprise an uplink radio resource.

The base station may schedule a PUSCH transmission of a first type of access procedure (e.g., MsgA PUSCH transmission of a two-step RACH procedure) via/on the uplink radio resource (e.g., at step at 2910). The base station may send/transmit one or more messages (e.g., an RRC message) comprising configuration parameters of the uplink radio resource to one or more wireless devices (e.g., at step 2920). The one or more messages (e.g., the RRC message) may comprise parameters indicating time domain resources and frequency domain resources of the uplink radio resource. The one or more messages (e.g., the RRC message) may comprise parameters of the first type of access procedure (e.g., a two-step RACH procedure). The parameters may indicate one or more PRACH slots (e.g., MsgA PRACH slots), and/or one or more preambles (e.g., MsgA preambles), and/or one or more time offsets indicating one or more ROs in the one or more PRACH slots, and/or one or more POs in PUSCH slots (e.g., MsgA PUSCH slots), and/or one or more second time offsets indicating one or more POs (e.g., MsgA PUSCH occasions in the one or more MsgA PUSCH slots) in one or more PUSCH slots, and/or a number/quantity of ROs per slot, and/or a number/quantity of POs per slot, and/or a frequency offset indicating a start of the ROs in frequency domain, and/or a second frequency offset indicating a start of the POs in frequency domain, and/or a number/quantity of FDMed ROs, and/or a number/quantity of FDMed POs, and/or a third frequency offset indicating a location of POs with respect to ROs in frequency domain, and/or a third time offset indicating a location of POs with respect to ROs in time domain, and/or a mapping ratio indicating a number/quantity of POs associated with a single RO, and or a second mapping ratio indicating a number/quantity of DM-RS ports/sequences associated with a number/quantity of preambles, and/or power control parameters for transmission of the preamble (e.g., MsgA PRACH) and/or the PUSCH (e.g., MsgA PUSCH), and/or a number/quantity of the PUSCH (e.g., MsgA PUSCH) repetitions, etc.

The base station may determine one or more slot formats indicating transmission directions of a plurality of symbols of the uplink radio resource (e.g., at step 2930). The plurality of symbols may be allocated for one or more transport block transmission. The plurality of symbols may be allocated for the PUSCH transmission (e.g., MsgA PUSCH transmission). The PUSCH transmission (e.g., the MsgA PUSCH transmission) may be configured with one or more repetitions. The base station may send/transmit a second message (e.g., a second RRC message) to one or more wireless devices (e.g., at step 2940). The second message may comprise configuration parameters of the one or more slot formats. Alternatively, or additionally, the first RRC message may comprise the configuration parameters of the one or more slot formats.

The uplink radio resource may be allocated to a PRACH transmission. The uplink radio resource may be allocated to a preamble transmission of the first type of access procedure (e.g., a two-step MsgA PRACH transmission). The uplink radio resource may be allocated to a regular PUSCH transmission (e.g., a PUSCH transmission not associated with random access). The uplink radio resource may be allocated to a PUSCH transmission of the first type of access procedure (e.g., a two-step MsgA PUSCH transmission). The base station may determine the one or more slot formats differently, for example, based on whether the uplink radio resource being allocated for the first type of access procedure (e.g., a first type of random access procedure). The base station may determine the one or more slot formats such that at least a portion of the uplink radio resource is available/reserved for UL transmission, for example, based on the uplink radio resource being allocated for a two-step RACH MsgA PUSCH transmission, a two-step RACH MsgA PRACH transmission, a PUSCH transmission in a RACH-less (e.g., RACH-skip) procedure, and/or a PUSCH-only transmission as part of a two-step RACH procedure. The base station may select at least one of the transmission directions of the plurality of symbols from a first format group. The first format group may comprise a first slot format indicating UL direction and/or a second slot format indicating flexible direction (e.g., the transmission direction of the flexible direction is to be determined later). The base station may not reserve the availability of the uplink radio resource for UL transmission, for example, based on the uplink radio resource not being allocated for the first type of random access procedure (e.g., two-step RACH MsgA PUSCH transmission, and/or RACH-less PUSCH transmission). The base station may select the at least one of the transmission directions from a second format group. The second format group may comprise a first slot format indicating UL direction, a second slot format indicating flexible direction, and a third slot format indicating DL direction. The one or more wireless devices may perform validation of the configured uplink resource for the first type of access procedure (e.g., at step 2950). The configured uplink resource for the first type of access procedure may comprise PUSCH resources of the two-step RACH procedure or RACH-less procedure. The one or more wireless devices may send/transmit one or more uplink signals of the first type of access procedure (e.g., at step 2960). The one or more uplink signals of the first type of access procedure may comprise a preamble and a PUSCH (e.g., MsgA PRACH and/or MsgA PUSCH). The one or more uplink signals of the first type of access procedure may comprise PUSCH without comprising a preamble.

Figure 30:
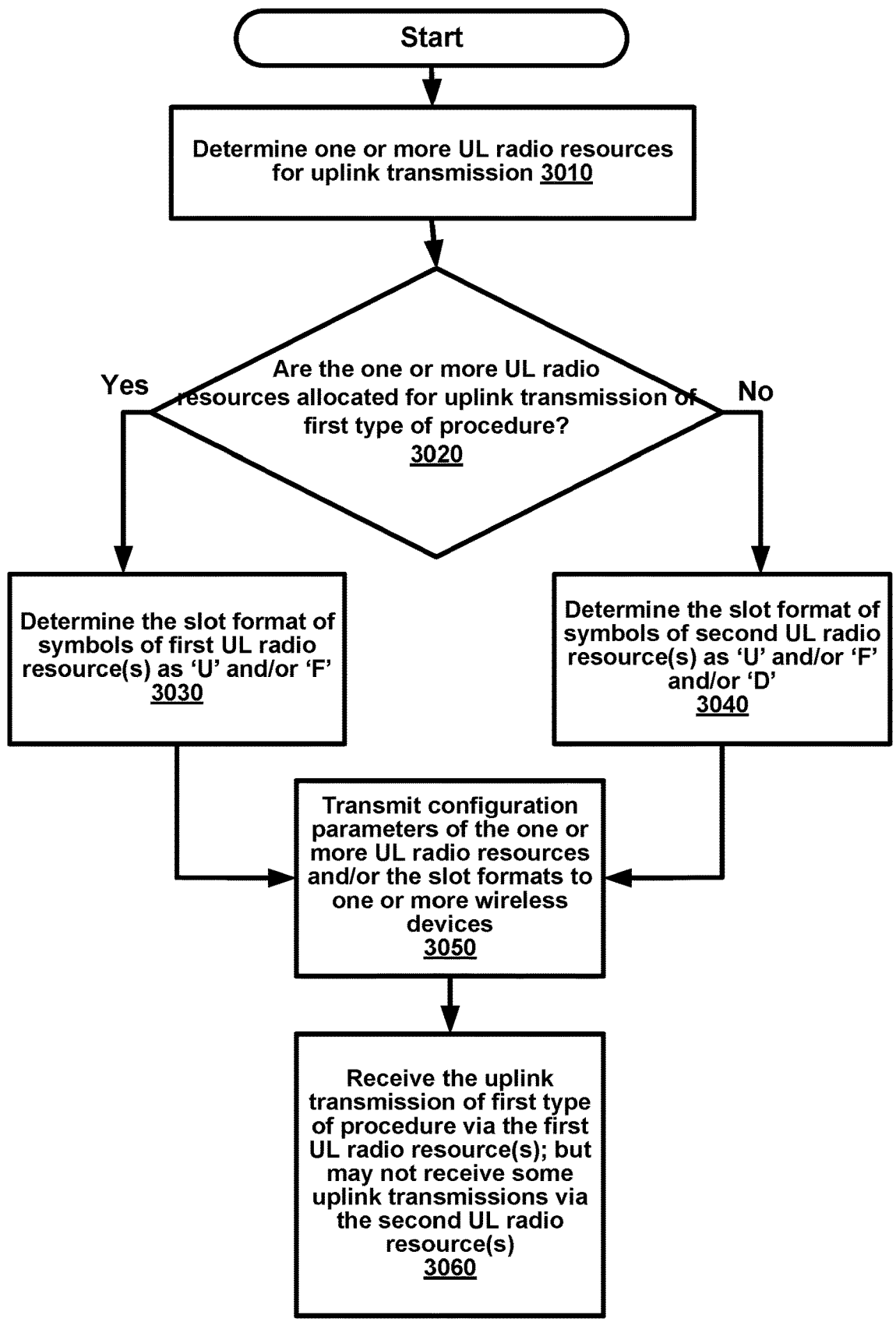
FIG. 30 shows a method for determining a slot format for a plurality of symbols of an uplink radio resource.

FIG. 30 shows a method for determining a slot format of a plurality of symbols of an uplink radio resource. A base station may determine the slot format, for example, based on whether the uplink radio resource is allocated for a first type of access procedure (e.g., MsgA PUSCH transmission of a two-step RACH procedure). The base station may determine one or more uplink radio resources for uplink transmissions (e.g., at step 3010). The one or more uplink radio resources for uplink transmissions may comprise uplink transmissions for a first type of access procedure (e.g., MsgA PUSCH transmission of a two-step RACH procedure or a PUSCH transmission of a RACH-less procedure, etc.) and uplink transmissions for a second type of transmission (e.g., a regular PUSCH transmission, a Msg3 PUSCH transmission of a four-step RACH procedure, etc.). The base station may determine whether each of the one or more uplink radio resources are allocated for an uplink transmission (e.g., a PUSCH transmission) of the first type of access procedure (e.g., at step 3020). The uplink transmission of the first type of access procedure may comprise at least a portion of the uplink transmission of the first type of access procedure (e.g., a first number/quantity of MsgA PUSCH transmissions with repetition). Some uplink transmission may comprise remaining portion of the uplink transmission of the first type of access procedure (e.g., the remaining repetition(s) of MsgA PUSCH transmissions with repetition, which is after completing the first number/quantity of MsgA PUSCH transmissions with repetition). The first number/quantity of MsgA PUSCH transmissions with repetition may be one (or any other number).

The base station may determine the slot format of symbols of first uplink radio resource(s) as uplink (e.g., 'U') symbols and/or flexible (e.g., 'F') symbols (e.g., at step 3030), for example, based on determining that the first uplink radio resource(s) are allocated for the uplink transmission (e.g., a PUSCH transmission) of the first type of access procedure. The base station may configure the slot format of symbols of the first PUSCH occasion (e.g., the first MsgA PUSCH occasion) as uplink (e.g., 'U') symbols and/or flexible (e.g., 'F') symbols. A wireless device may send/transmit the first PUSCH of the first type of access procedure (e.g., the first MsgA PUSCH transmission) via the symbols of the first PUSCH occasion.

The base station may determine the slot format of symbols of second uplink radio resource(s) as 'U' symbols and/or 'F' symbols and/or 'D' symbols (e.g., at step 3040), for example, based on determining that the second uplink radio resource(s) are allocated for uplink transmissions different from the uplink transmission of the first type of access procedure. The base station may configure the slot format of symbols of the remaining POs (e.g., MsgA POs following the first MsgA PUSCH occasion) as 'U' symbols and/or 'F' symbols and/or 'D' symbols. The base station may configure the slot format of symbols of uplink transmission of a second type of access procedure (e.g., a regular PUSCH transmission, a Msg3 PUSCH transmission of a four-step RACH procedure, etc.) as 'U' symbols and/or 'F' symbols and/or 'D' symbols. A wireless device may not send/transmit some PUSCH transmission (e.g., repetitions) of the first type of access procedure and/or the uplink transmission of the second type of access procedure via the symbols of the second uplink radio resource(s). The base station may configure a guaranteed reception of the uplink transmission of the first type of access procedure via the first uplink radio resource(s) (e.g., at step 3060). The base station may or may not receive some uplink transmission of the first type of access procedure via the second uplink radio resource (e.g., at step 3060). The base station may or may not receive the uplink transmission of the second type of access procedure via the second uplink radio resource.

A wireless device may receive one or more messages (e.g., one or more RRC messages) comprising configuration parameters indicating the transmission directions of the plurality of symbols of the first uplink radio resource(s) being selected from the first format group (e.g., 'U' and 'F' symbols) and/or configuration parameters indicating the transmission directions of the plurality of symbols of the second uplink radio resource(s) being selected from the second format group (e.g., 'U', 'F', and 'D' symbols). The base station may receive one or more transport blocks from one or more wireless devices via the plurality of symbols of the one or more uplink radio resources, for example, after or in response to sending/transmitting the one or more messages (e.g., one or more RRC messages) comprising configuration parameters indicating the transmission directions of the plurality of symbols of the uplink radio resources being selected from the first format group and/or the second format group. The one or more transport blocks received via the first radio resource(s) may be associated with the first type of procedure (e.g., MsgA PUSCH transmission(s) of a two-step RACH procedure).

A wireless device may determine that the first uplink radio resource(s) is valid/available for transmission of the one or more transport blocks of the first type of access procedure, for example, after or in response to receiving, from the base station, the one or more messages comprising configuration parameters indicating the transmission directions of the plurality of symbols of the first uplink radio resource(s) being selected from the first format group. The wireless device may determine that the first uplink radio resource(s) is valid/available for transmission of the one or more transport blocks of the first type of access procedure (for example, for MsgA PUSCH transmission of a two-step RACH procedure and/or a RACH-less PUSCH transmission). The wireless device may validate PUSCH occasion(s) of the first radio resource(s) (e.g., MsgA PUSCH occasion of a two-step RACH procedure). The valid PUSCH occasion(s) of the first radio resource(s) may be configured on the uplink radio resource based on the transmission directions of the plurality of symbols of the first radio resource(s). The wireless device may send/transmit the one or more transport blocks, to the base station, via the plurality of symbols of the valid PUSCH occasion. As shown in FIG. 29, the wireless device may send/transmit MsgA PRACH and/or MsgA PUSCH, for example, via the first uplink radio resource(s).

Figure 31:
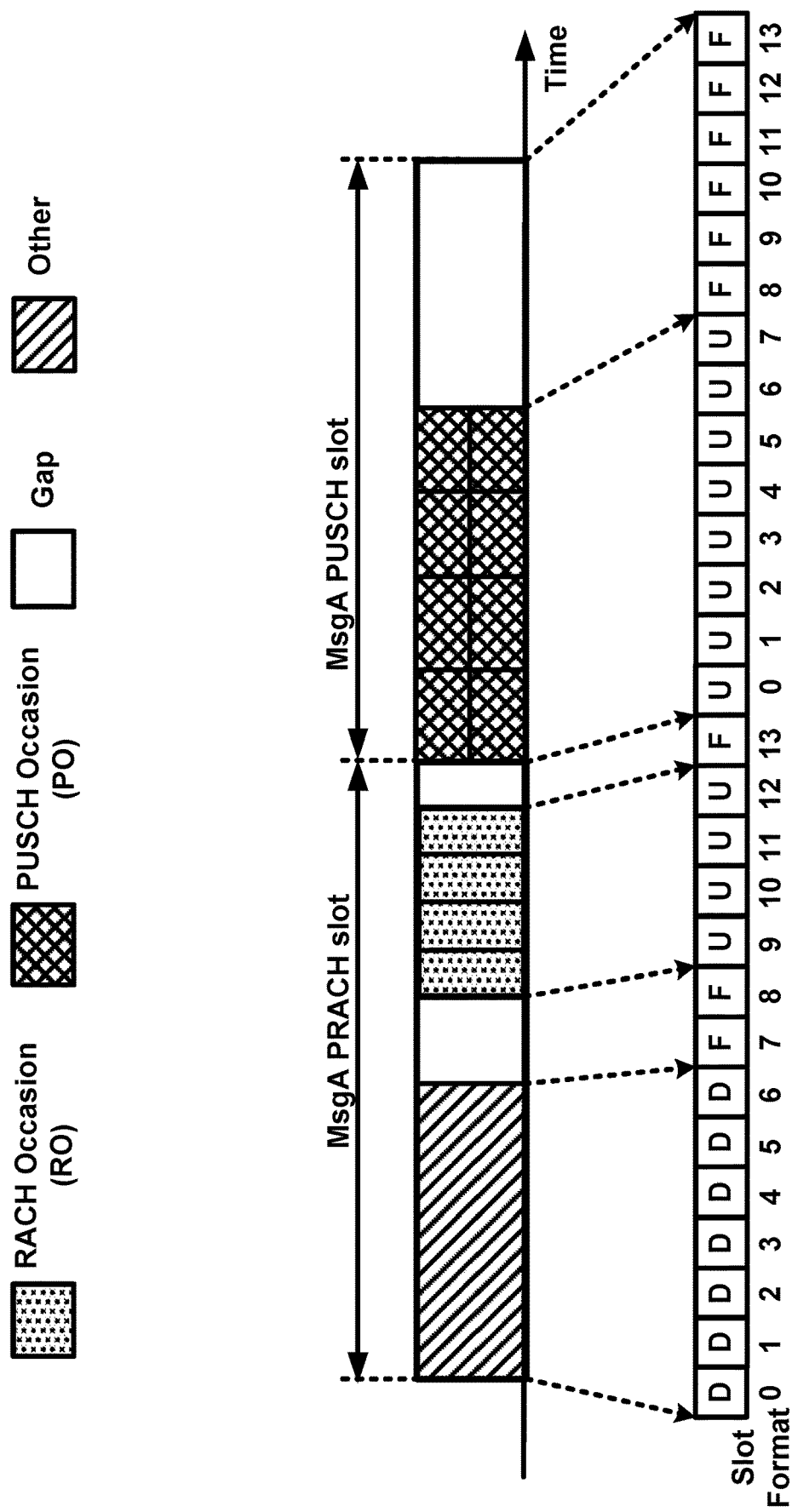
FIG. 31 shows an example resource configuration for a two-step RACH procedure.

FIG. 31 shows an example resource configuration for a two-step RACH procedure. ROs (e.g., MsgA ROs may be configured in a PRACH slot (e.g., a MsgA PRACH slot) and associated POs (e.g., MsgA POs) may be configured in a PUSCH slot (e.g., a MsgA PUSCH slot) following the PRACH slot. The slot format of the symbols allocated to MsgA POs (e.g., symbols 0, 1, 2, 3, 4, 5, 6, 7 of the MsgA PUSCH slot shown in FIG. 31) indicate 'U' (UL direction), similar to the symbols allocated to MsgA ROs (e.g., symbols 9, 10, 11, 12 of the MsgA PRACH slot shown in FIG. 31). A base station may configure one or more ROs overlapping with flexible and/or uplink resources. The base station may configure one or more MsgA POs overlapping with flexible and/or uplink resources. The base station may not configure RO(s) and/or MsgA PO(s) (e.g., MsgA POs) overlapping with downlink resources.

Figure 32:
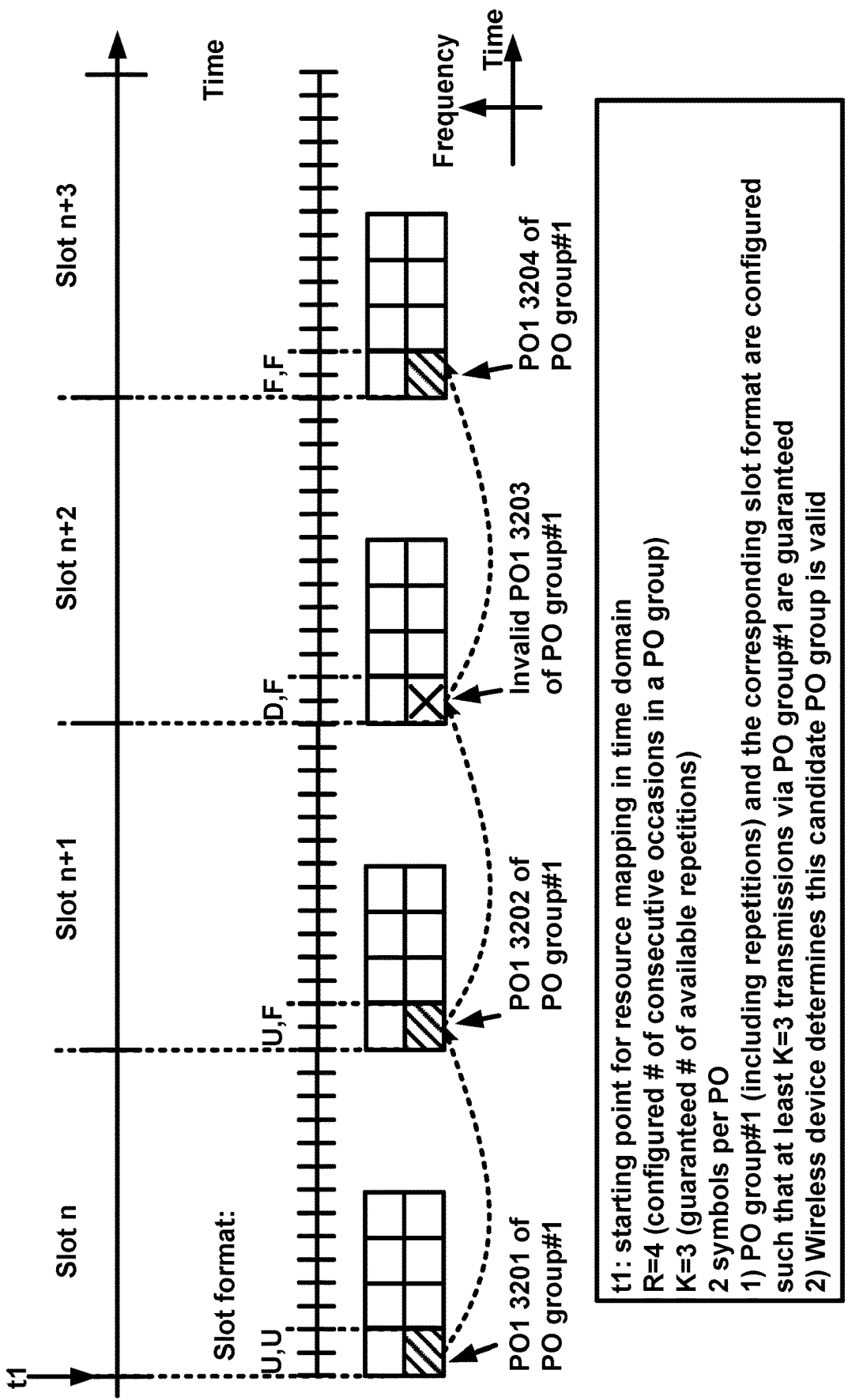
FIG. 32 shows an example of valid PUSCH occasion allocation with repetitions.

FIG. 32 shows an example of valid PUSCH occasion allocation with repetitions. The base station may configure uplink resources (e.g., MsgA PUSCH resources) comprising one or more PUSCH occasion groups (PO groups) with the number/quantity of repetitions (R)=4 PUSCH occasions (POs) associated with repetitions across R=4 consecutive slots (e.g., slots n, n+1, n+2, and n+3), starting from time t1. Each PO may comprise two symbols in time domain. Each PO of the same PO group (e.g., PO1 3201, PO1 3202, PO1 3203, and PO1 3204 of PO group #1 shown in FIG. 32) may be allocated on the same symbols (and frequency resources) of the corresponding R consecutive slots. The PO1 3201 of PO group #1 shown in FIG. 32 may be allocated on the first two symbols of the slot n. The PO1 3202 of PO group #1 shown in FIG. 32 may be allocated on the first two symbols of the slot n+1. The PO1 3203 of PO group #1 shown in FIG. 32 may be allocated on the first two symbols of the slot n+2. The PO1 3204 of PO group #1 shown in FIG. 32 may be allocated on the first two symbols of the slot n+3. FIG. 32 shows eight different PO groups. The configuration parameters may indicate a number/quantity K<=R representing a minimum number/quantity of guaranteed/reserved POs for UL transmission. The base station may configure at least three guaranteed PUSCH occasions (e.g., K=3 MsgA PUSCH occasions) to be available for UL transmission. As shown in FIG. 32, the PO1 3201 in slot n, the PO1 3202 in slot n+1, and the PO1 3204 in slot n+3 are valid and available for UL transmission, for example, because they are assigned with 'U' and/or 'F' symbols. The PO1 3203 in slot n+2 is invalid and not available for UL transmission, for example, because it overlaps with a 'D' symbol. The base station may dynamically allocate one or more 'D' symbols for some DL transmissions (e.g., for URLLC applications). The base station may configure resources and the corresponding slot formats such that at least K POs out of R MsgA POs in a PO group are guaranteed to be available for UL transmission (e.g., MsgA PUSCH). A wireless device may determine that at least K POs out of R POs in the PO group are available for UL transmission, and determine that the PO group is valid. The wireless device may determine that a PO group may not be available for MsgA PUSCH transmission, for example, if there are less than K POs out of R POs in the PO group that are valid and available. The wireless device may consider only valid PO group(s) for indexing and may index the valid PO groups (e.g., index the first valid PO group as PO group #1 shown in FIG. 32) and map it to associated RO(s) and/or SSB(s). The POs located in earlier symbols (e.g., PO1 3201, PO1 3202, PO1 3203, PO1 3204) may be evaluated to determine whether the corresponding PO group is valid or not, for example, before evaluating the POs located in later symbols (e.g., POs located at later symbols in each slot). Among the POs located in the same symbols, the POs located in a lower frequency range (e.g., PO1 3201, PO1 3202, PO1 3203, PO1 3204) may be evaluated to determine whether the corresponding PO group is valid or not, for example, before evaluating the POs located in a higher frequency range (e.g., POs located above PO1 3201, PO1 3202, PO1 3203, and PO1 3204).

Figure 33:
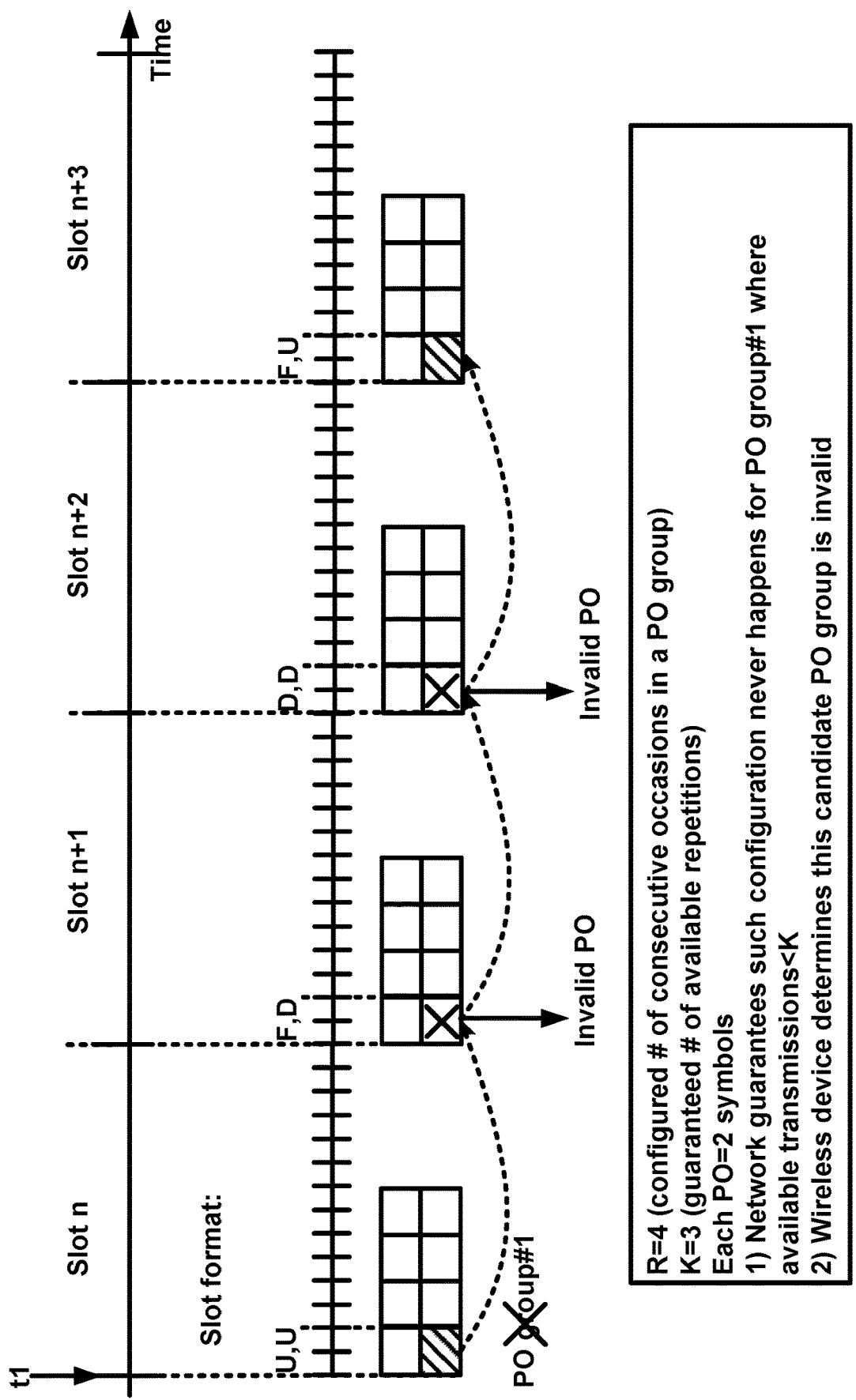
FIG. 33 shows an example of invalid PUSCH occasion allocation with repetitions.

FIG. 33 shows and example of invalid PUSCH occasion allocation with repetitions. FIG. 33 shows one or more configuration parameters similar to configuration parameters shown in FIG. 32. Unlike FIG. 32, FIG. 33 shows each of two POs in the first two symbols of slot n+1 and the first two symbols of slot n+2 overlaps with at least one 'D' symbol and is not available for UL transmission. The network may guarantee that such a configuration does not occur (e.g., guarantee that the minimum of K available POs out of R POs in a PO group is satisfied), for example, for a PUSCH transmission of a first type of access procedure (e.g., MsgA PUSCH transmission). The wireless device may determine that a PO group is not valid, for example, if the base station configures the PO group that does not comprise the minimum of K available POs out of R POs. The wireless device may not index the invalid PO group (and the POs of the invalid PO group). The wireless device may not map the invalid PO group (and the POs of the invalid PO group) to RO(s) and/or to SSB(s). The invalid PO group #1 shown in FIG. 33 may not be mapped to a PO group index and POs of the invalid PO group #1 may not be mapped to a PO index. The wireless device may not consider such an invalid PO group in a mapping of one or more PO groups and MsgA PUSCH occasions.

Figure 34:
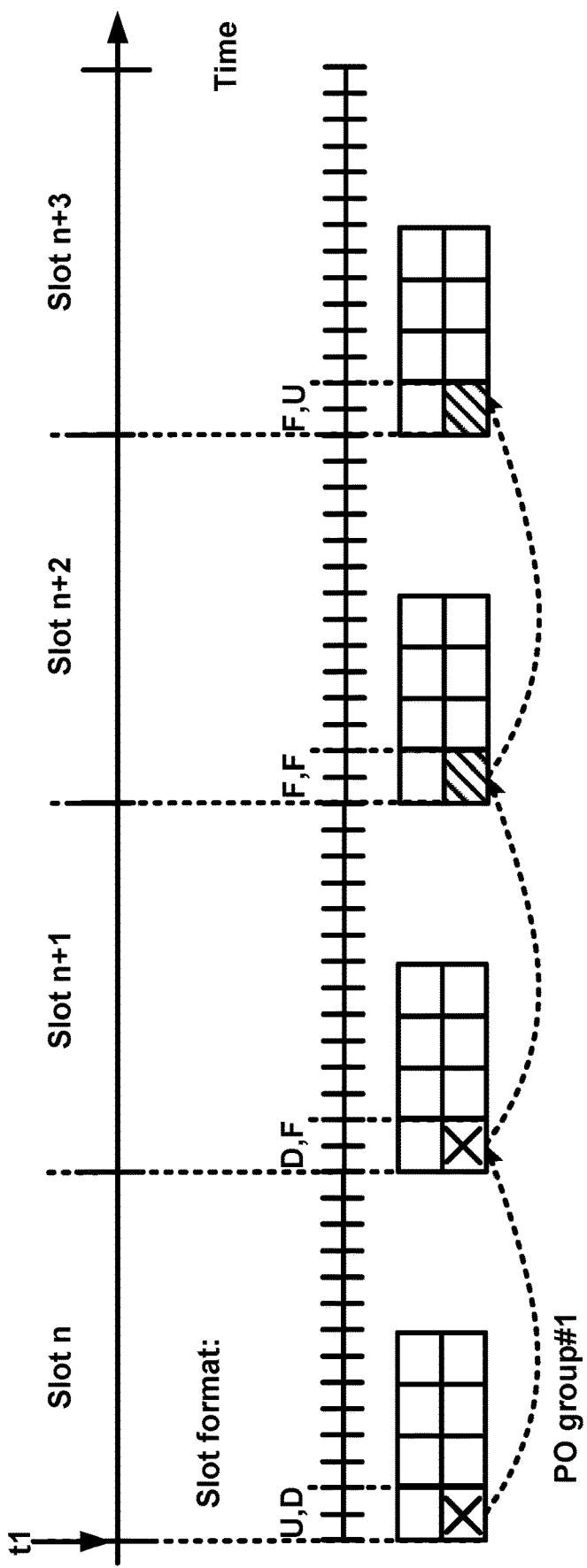
FIG. 34 shows an example of valid PUSCH occasion allocation with repetitions.

FIG. 34 shows an example of valid PUSCH occasion allocation with repetitions. At least K=2 POs out of R POs in each PO group need to be available to make the corresponding PO group to be valid (e.g., as shown in FIG. 34). FIG. 34 shows two invalid POs in slot n and slot n+1 and two valid POs in slot n+2 and slot n+3, for example, for PO group #1. The base station may guarantee that at least K POs out of R POs in each PO group are available for UL transmission. The wireless device may determine that the configured PO group (e.g., PO group #1) comprising at least K available POs (e.g., at least two valid POs) is valid and may index the POs and the corresponding PO group. The wireless device may map the valid PO group to RO(s) and/or to SSB(s).

A wireless device may not expect to receive (or may not receive) one or more configuration parameters indicating, as downlink, one or more symbols of one or more slots that are allocated to one or more transmissions of a transport block during a first type of random access procedure. The first type of random access procedure may comprise a two-step random access procedure. The one or more transmissions may correspond to one or more transport block repetitions. The one or more transmissions of the transport block may correspond to one or more repetitions of PUSCH of the first type of random access procedure (e.g., a MsgA PUSCH). The wireless device may not expect at least one symbol of a first slot allocated to the one or more transmissions of the transport block to be indicated as downlink. The wireless device may not expect the one or more symbols (e.g., the at least one symbol) to precede the first SSB reception symbol and/or follow the last SSB reception symbol. The one or more symbols may be separated from the SSB reception symbols by at least a number/quantity of symbols (e.g., N_gap symbols).

A PUSCH transmission of a first type of random access procedure (e.g., a MsgA PUSCH transmission) comprising one or more repetitions may fail. The PUSCH transmission of the first type of random access procedure comprising one or more repetitions may fail, for example, in at least some types of communications (e.g., communications by wireless devices compatible with 3GPP Release 16, earlier/later 3GPP releases, and/or any other access technologies). A PUSCH transmission of a first type of random access procedure (e.g., a MsgA PUSCH transmission) comprising one or more repetitions may fail, for example, because one or more of the repetitions collide with DL resources (e.g., 'D' symbols). The collision may require a re-transmission of the PUSCH of a first type of random access procedure (e.g., MsgA for a two-step RACH procedure), may result in a failure of the first type of random access procedure (e.g., failure of the two-step RACH procedure), and/or may require a fallback to a second type of random access procedure (e.g., a four-step RACH procedure). This may reduce the reliability of the first type of random access procedure (e.g., low reliability of a MsgA PUSCH transmission). This may lead to increased latency and inefficient performance in an initial access via the first type of random access procedure (e.g., a two-step RACH procedure). To increase the likelihood of success for the first type of random access procedure (e.g., MsgA PUSCH transmission of the two-step RACH procedure), a wireless device may determine and/or select a valid PO group and/or valid POs (e.g., valid MsgA PUSCH occasions) from one or more candidate PO group and/or candidate POs (e.g., the selected valid MsgA PUSCH occasions may not overlap with DL resources). The wireless device may not select some of candidate resources as a valid PO, for example, if the candidate resources are overlapped with at least one DL resource. The wireless device may use only valid POs and/or valid PO groups for the first type of random access procedure (e.g., one or more MsgA PUSCH transmissions of a two-step RACH procedure). This may enhance an initial access success rate by increasing available resources (e.g., for a latency-reduced two-step RACH procedure).

A base station may not reserve some MsgA PUSCH resources to be available for UL transmission (e.g., 'D' symbols may be assigned for some MsgA PUSCH resources). Reservation of all of the MsgA PUSCH resources for UL transmission may result in reduced flexibility for network resource allocation and may not be efficient, for example, if the MsgA PUSCH resources comprise a plurality of PUSCH occasions for repetition and occupy a large amount of symbols. The base station may configure multiple repetition levels/factors (e.g., via SIB), and the wireless device may select one of the multiple repetition levels/factors, for example, based on a pathloss-specific criterion (e.g., RSRP). The network may need to reserve an increased amount of resources for MsgA PUSCH comprising repetitions based on a worst-case scenario (e.g., worst RSRP resulting in the maximum number/quantity of repetitions), for example, if the base station reserve all of the MsgA PUSCH resources for UL transmission.

A threshold number/quantity (e.g., minimum number/quantity) of transport block transmissions via a MsgA PUSCH occasion group (e.g., a MsgA resource group comprising one or more MsgA PUSCH occasions for one or more repetitions) may be determined for the base station to be able to successfully receive and decode the MsgA PUSCH sent from the wireless device. The threshold (e.g., minimum) number/quantity of transport block transmissions may not be guaranteed depending on the network load/condition, for example, because the base station may not be able to reserve a minimum number/quantity of valid MsgA PUSCH occasions available for UL transmission. The wireless device may receive MsgA PUSCH resource configuration in which a number/quantity of POs associated with one or more repetitions of the MsgA PUSCH are not valid/available (e.g., overlap with 'D' symbols). The number/quantity of invalid POs may be larger than the threshold (e.g., minimum) number/quantity (e.g., not enough POs for transmission of MsgA PUSCH repetition may be valid/available). A PO associated with one or more transport block repetition with RV=0 may not be valid/available. As a result, the base station may not be able to successfully receive and/or decode the MsgA PUSCH sent from a wireless device, for example, due to lack of decodable and/or received data. As a result, the MsgA transmission of the 2-step RACH procedure may fail, a MsgA re-transmission may be needed, a MsgA PUSCH re-transmission may be needed, and/or a fallback to a four-step RACH procedure may follow. The rate of success for a random access procedure may be reduced and/or latency of the random access may be increased and/or a battery consumption of the wireless device may be increased.

Similar to the one or more rules for the slot format determination for a regular PUSCH (e.g., wireless device-specific PUSCH, configured grant type 1 and/or type 2), the base station may configure the slot format of symbols allocated for a MsgA PUSCH resource with DL and/or UL and/or flexible symbols, for example, for simplicity and/or flexibility of resource allocation. The MsgA PUSCH resource may comprise one or more MsgA PUSCH occasions for one or more repetitions. Each wireless device may determine whether the configured MsgA PUSCH resource/occasion(s) is valid/available (e.g., available for UL transmission) or not, for example, based on the slot format of the symbols allocated to the configured MsgA PUSCH resource/occasion(s).

As described further herein, one or more validation rules for MsgA PUSCH occasions may be implemented. The wireless device may determine whether a MsgA PUSCH occasion and/or a MsgA PUSCH occasion group (e.g., a MsgA PUSCH resource comprising one or more MsgA PUSCH occasions for one or more repetitions) is valid or not, for example, according to a multi-state validation procedure (e.g., a two-stage validation procedure). The first stage may refer to a PO validation based on slot formats, and the second stage may refer to a PO group validation based on the first stage. MsgA PUSCH occasions and/or a MsgA PUSCH occasion group may be valid, for example, if it comprises at least a first number/quantity of symbols/occasions/resources that are available for UL transmission. The wireless device may determine that a MsgA PUSCH occasion/occasion group is invalid, for example, if one or more symbols of the MsgA PUSCH occasion/occasion group is assigned as downlink (e.g., 'D') symbols. The wireless device may not index the invalid MsgA PUSCH occasion/occasion group, and/or may not map the invalid MsgA PUSCH occasion/occasion group to a valid RO and/or to an SSB. The wireless device may not send/transmit a transport block via the invalid MsgA PUSCH occasion/occasion group. The base station may not be able to successfully receive and/or decode the transport block sent/transmitted via the invalid MsgA PUSCH occasion/occasion group, for example, if a number/quantity of valid symbols/occasions/resources in the MsgA PUSCH occasion/occasion group is less than the first number/quantity. The base station may be able to successfully receive and/or decode the transmitted transport block via the MsgA PUSCH occasion/occasion group, for example, if the number/quantity of valid symbols/occasions/resources in the MsgA PUSCH occasion/occasion group is equal to or greater than the first number/quantity.

A wireless device may receive one or more messages (e.g., one or more RRC messages) comprising parameters that configure a plurality of resource groups for a two-step RACH procedure. MsgA PUSCH transmission may be performed via the plurality of resource groups. Each resource group of the plurality of resource groups may comprise one or more MsgA PUSCH transmission occasions. Each resource group may be referred to as a MsgA PO group. The one or more MsgA POs may be allocated for sending/transmitting one or more repetitions of the transport block of the MsgA PUSCH. The one or more POs of a MsgA PO group may be associated with each other. The one or more POs of a MsgA PO group may be allocated with the same symbol allocation across one or more slots. The one or more slots may be consecutive. The parameters may indicate a number/quantity of the one or more POs (e.g., R) configured per PO group. R POs of a PO group may be FDMed. R POs of the PO group may be TDMed. R POs of the PO group may be repeated across R consecutive slots. R POs of the PO group may be located in the same slot. R POs of the PO group may be located in different slots. Each of the one or more POs in each PO group may be associated with one or more redundancy version (RV) of the transport block.

The one or more POs of each PO group may be associated with one or more valid MsgA PRACH occasion (RO) and/or one or more MsgA preambles and/or one or more SSB(s). Each PO may comprise one or more DM-RS ports/sequences. The one or more DM-RS ports/sequences may be associated with one or more MsgA preambles. The parameters may indicate one or more time/frequency offsets and/or a mapping ratio to map/associate the one or more POs in each PO group and/or the one or more DM-RS ports/sequences of each PO to one or more valid ROs (e.g., RACH occasions of a two-step RACH procedure and/or RACH occasions of a four-step RACH procedure) and/or one or more preambles (e.g., RACH preambles of a two-step RACH procedure and/or RACH preambles of a four-step RACH procedure) and and/or one or more SSBs/CSI-RSs. The mapping/association rule/order may be pre-defined.

The wireless device may consider all the POs configured for MsgA PUSCH transmission comprising one or more repetitions within a given resource boundary as a candidate resource group (or a candidate PO group). One or more parameters may indicate a slot-level and/or symbol-level time offset with respect to a reference point in time domain to indicate the starting point (e.g., t1 shown in FIG. 32, FIG. 33, and FIG. 34) of the resources configured for a candidate PO group. The wireless device may determine whether one or more POs in each candidate PO group is available and valid, for example, if the wireless device receives a configuration of resources for a plurality of PO groups, and identifies each candidate PO group comprising one or more POs for one or more MsgA PUSCH repetition. The wireless device may determine whether a threshold (e.g., minimum) number/quantity of POs and/or at least a certain PO of the one or more POs in each candidate PO group is available/valid. The one or more parameters may indicate the threshold (e.g., minimum) number/quantity (e.g., K<=R described above with respect to FIG. 32, FIG. 33, and FIG. 34). K may be predefined. The certain PO may be associated with a first RV of the transport block. The wireless device may determine that the PO group is valid, for example, after or in response to the determining that the minimum number/quantity of POs and/or the at least a certain PO of the one or more POs in each candidate PO group is available/valid. The wireless device may index the valid PO group and map the valid PO group to valid RO(s) and/or to SSB(s). The wireless device may consider/determine the PO group to be invalid and may skip the invalid PO group (and the POs of the invalid PO group), for example, after or in response to the determining that the threshold (e.g., minimum) number/quantity of POs and/or the at least a certain PO of the one or more POs in each candidate PO group is not available and/or invalid. The wireless device may determine whether each configured PO group is valid or not, for example, based on the availability of at least one PO. The wireless device may determine that a PO group is valid, for example, if at least one PO is available for UL transmission (e.g., does not overlap with 'D' symbols).

The wireless device may receive (e.g., via one or more RRC messages) one or more parameters of one or more slot formats. The slot formats may indicate transmission directions of symbols of the plurality of resource groups (e.g., PO groups). The transmission directions may be indicated as UL, DL, or flexible. For each PO of the plurality of PO groups, the wireless device may determine whether the PO is valid, for example, based on the transmission directions of symbols allocated to the PO. A PO may be valid, for example, if it is available for UL transmission. A PO may be valid, for example, if the transmission directions of at least a number/quantity of symbols from the symbols allocated to the PO are indicated as UL and/or flexible. A PO may be valid, for example, if none of the symbols of the PO are indicated as DL by the one or more slot formats. A PO may be valid, for example, if the symbols of the PO do not overlap with SSB symbols. A PO may be valid, for example, if the symbols of the PO are separated from SSB symbols, DL symbols, and/or ROs at least by a number/quantity of symbols (e.g., N_gap and/or T_gap symbols as shown in FIGS. 35A and 35B).

FIG. 35A shows an example of resource allocation for PRACH occasions. Eight ROs may be configured in the PRACH slot. RO1 to RO8 may be valid ROs, for example, because they do not overlap with DL symbols and they start at least N_gap symbols after the last symbol in which an SSB is mapped. FIG. 35B shows an example of resource allocation for PRACH occasions and PUSCH occasions. A MsgA PRACH slot (comprising eight valid ROs) may be followed by a MsgA PUSCH slot that comprises four valid POs. The PO1 to PO4 may be valid, for example, because they do not overlap with DL symbols and they are separated in time domain by at least N_gap symbols from SSB symbols and by at least T_gap symbols from ROs.

The wireless device may determine that a PO group from the plurality of PO groups is valid, for example, based on the transmission direction. The wireless device may determine that a PO group is valid, for example, after or in response to determining whether one or more of the POs comprised in the PO group are valid. The wireless device may determine that the PO group is valid, for example, if the PO group comprises at least one valid PO. The wireless device may determine that the PO group is valid, for example, if the PO group comprises at least a first number/quantity of valid POs. The first number/quantity may be indicated by one or more parameters (e.g., in one or more RRC message). The wireless device may determine that the PO group is valid, for example, if at least a certain PO in the PO group is valid. The wireless device may determine that the PO group is valid, for example, if at least the first PO of the PO group is valid. The wireless device may determine that the PO group is valid, for example, if at least the first half of POs of the PO group are valid. The wireless device may determine that the PO group is valid, for example, if all the POs of the PO group are valid. The wireless device may determine that the PO group is valid, for example, if one or more POs associated with a first RV are valid. The wireless device may determine that the PO group is valid, for example, if one or more POs associated with RV=0 are valid. The wireless device may determine that the PO group is valid, for example, if one or more POs associated with one or more first RVs are valid. The wireless device may determine that the PO group is valid, for example, if the PO group comprises a number/quantity of valid POs equal to or greater than the first number/quantity. One or more first valid POs in a valid PO group may be associated with one or more first RVs. The PO group may not be valid, for example, if the one or more first valid POs in the PO group are not associated with one or more first RVs (e.g., RV=0, and/or RV=3, etc.). The first valid PO in each valid PO group may be associated with a first RV. A PO may be valid, for example, if the transmission directions indicate a number/quantity of UL symbols and/or flexible symbols in the PO being larger than a second value. The one or more parameters may indicate the second value. The second value may be pre-defined.

The wireless device may receive one or more downlink reference signals. The wireless device may select a first downlink reference signal from the one or more downlink reference signals, for example, based on a received signal strength (e.g., RSRP) of the one or more downlink reference signals. The first downlink reference signal may have a received signal strength above a threshold. The one or more parameters in the one or more messages (e.g., one or more RRC messages) may indicate the threshold. The one or more parameters may indicate one or more PO groups and/or POs mapped to the first downlink reference signal. At least one of the valid PO groups may be mapped to the first downlink reference signal. The at least one of the valid PO groups may be mapped to one or more valid MsgA ROs.

Figure 36:
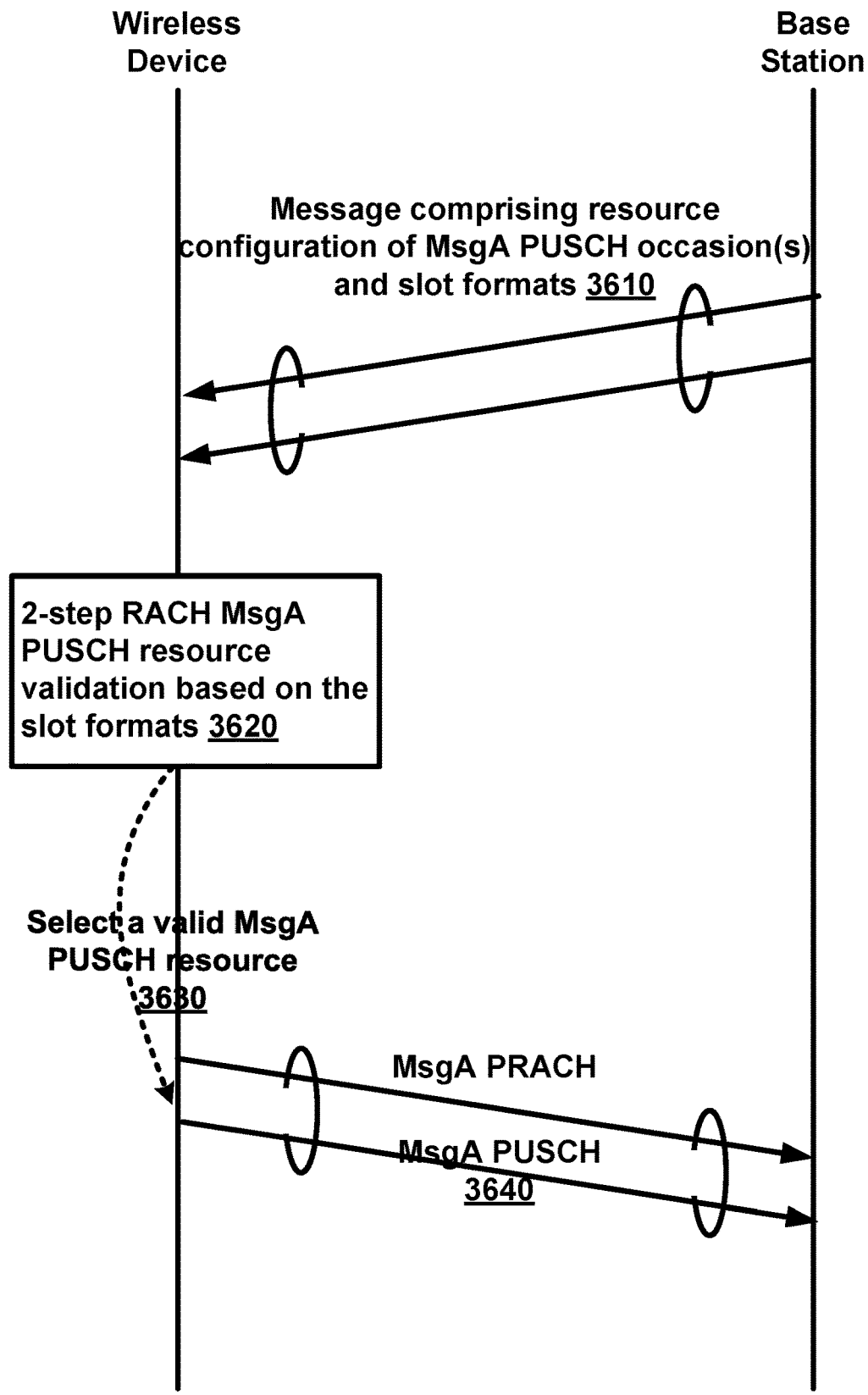
FIG. 36 shows example communications between a wireless device and a base station for a RACH procedure with validation.

FIG. 36 shows example communications between a wireless device and a base station for a RACH procedure with validation. The RACH procedure with validation may be for a two-step RACH procedure with MsgA PUSCH validation. The wireless device may receive one or more messages (e.g., one or more RRC messages) from a base station comprising resource configuration parameters of MsgA PUSCH resources (e.g., MsgA POs and/or MsgA PO groups) and slot formats (e.g., at step 3610). Each of the MsgA PO groups may comprise one or more MsgA POs for one or more transport block repetition. The slot formats may indicate transmission directions of symbols of the MsgA PUSCH resources. The wireless device may validate the MsgA PUSCH resources, for example, based on the slot formats (e.g., at step 3620). The wireless device may determine a valid MsgA PUSCH resource (e.g., at step 3630). The valid MsgA PUSCH resource may be a MsgA PO group comprising one or more MsgA POs. The valid MsgA PUSCH resource may comprise at least a first number/quantity of valid MsgA POs. The valid MsgA POs may be available for UL transmission (e.g., not assigned with DL symbols). The wireless device may send/transmit an uplink transmission of a first type of access procedure (e.g., at step 3640). The uplink transmission of a first type of access procedure may comprise a MsgA comprising MsgA PRACH and MsgA PUSCH. The wireless device may send/transmit a transport block with one or more repetitions via at least one of the valid MsgA PUSCH resources. The wireless device may send/transmit the transport block via at least one of the valid MsgA POs of the at least one of the valid MsgA PUSCH resources.

Figure 37:
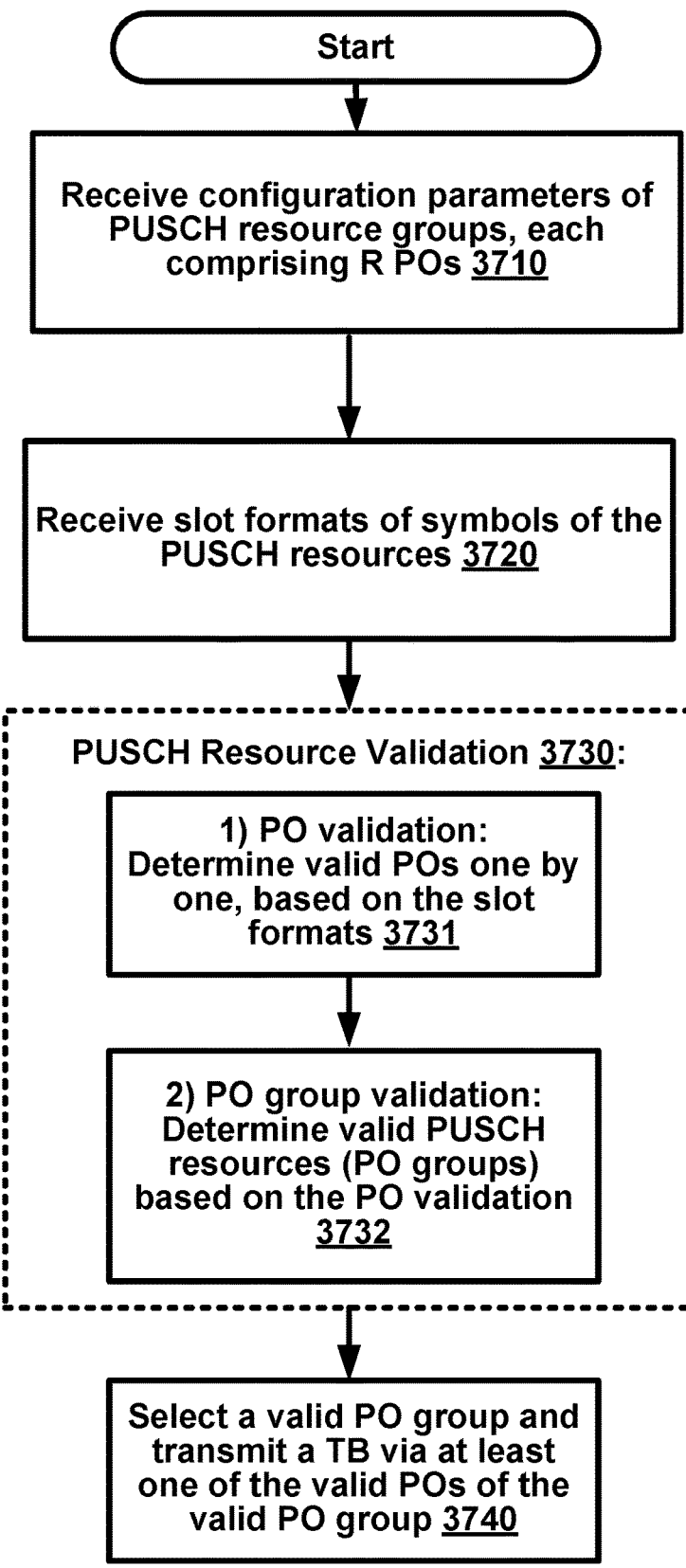
FIG. 37 shows a method for validating a PUSCH resource.

FIG. 37 shows a method for validating a PUSCH resource. The PUSCH resource may comprise MsgA PUSCH resource of the first type of access procedure. The wireless device may receive configuration parameters of a plurality of resources (e.g., one or more PUSCH resource groups) for PUSCH transmission of a first type of access procedure (e.g., at step 3710). The first type of access procedure may comprise a two-step RACH procedure, RACH-less procedure, etc. The plurality of resources may comprise one or more PO groups. Each PO group may comprise one or more POs for one or more repetitions of a transport block transmission. The wireless device may receive configuration parameters of slot formats of symbols of the plurality of resources (e.g., at step 3720). The wireless device may validate the plurality of resources (e.g., at steps 3730). The wireless device may validate each PO group of the one or more PO groups. The validation may comprise a PO validation and a PO group validation. The wireless device may first validate each PO, for example, one by one (e.g., at step 3731). The wireless device may determine that a PO is valid, for example, based on the slot formats. The wireless device may validate each PO group (e.g., at step 3732), for example, after validating each PO of the corresponding PO group. The wireless device may determine that a PO group is valid, for example, after identifying a minimum number/quantity of valid POs. The wireless device may determine a PO group is valid, for example, if it comprises at least a first number/quantity of valid POs satisfying a threshold. Each PO group may comprise R POs. A valid PO group may comprise at least K valid POs out of R POs. The wireless device may select a valid PO group that may be associated with a first downlink reference signal (e.g., at step 3740). The wireless device may send/transmit a transport block via the selected valid PO group (e.g., at step 3740). The wireless device may send/transmit the transport block via at least one of the valid POs of the selected valid PO group. The wireless device may send/transmit the transport block with one or more repetitions via the at least one of the valid POs of the selected valid PO group.

The configuration parameters may indicate a number/quantity of the one or more repetitions (e.g., K). The number/quantity of one or more repetitions may be configured, for example, based on an RSRP measured by the wireless device. The number/quantity of one or more repetitions may be pre-defined. The number/quantity of valid POs in each PO group may be equal to or greater than the number/quantity of one or more repetitions. The first number/quantity of valid POs per valid PO group, required for the successful reception/decoding of the PUSCH, may be equal to the half the number/quantity of the one or more repetitions.

A wireless device may receive configuration parameters for MsgA PUSCH transmission resources (e.g., as shown in FIG. 32). Each PO group may be configured with multiple POs (e.g., R=4 POs), occurring at the same symbol allocation in multiple (e.g., four or any other number) consecutive slots, starting from the reference starting point (e.g., t1). The required number/quantity of valid POs in each valid PO group may be configured (e.g., as K=3 or any other number/quantity). Assuming the base station does not guarantee the availability of the required number/quantity of valid POs (e.g., K=3 POs) in each PO group, the wireless device may need to determine the validity of each PO group. The wireless device may determine that the PO group #1, comprising the four POs (PO1 3201, PO1 3202, PO1 3203, and PO1 3204) in the four slots, is valid. The wireless device may index the PO group as PO group #1, for example, if the PO group is determined to be valid. The wireless device may map the PO group #1 to one or more valid ROs and/or to one or more downlink reference signals.

The wireless device may determine that the PO group (e.g., indicated in FIG. 33) is not valid, for example, because the number/quantity of valid POs in the PO group (e.g., 2 valid POs) is less than the required number/quantity of valid POs in each valid PO group (e.g., K=3). The wireless device may skip this invalid PO group and the POs of the invalid PO group, may not index the invalid PO group, and/or may not map the invalid PO group to valid ROs and/or to SSBs.

Figure 38:
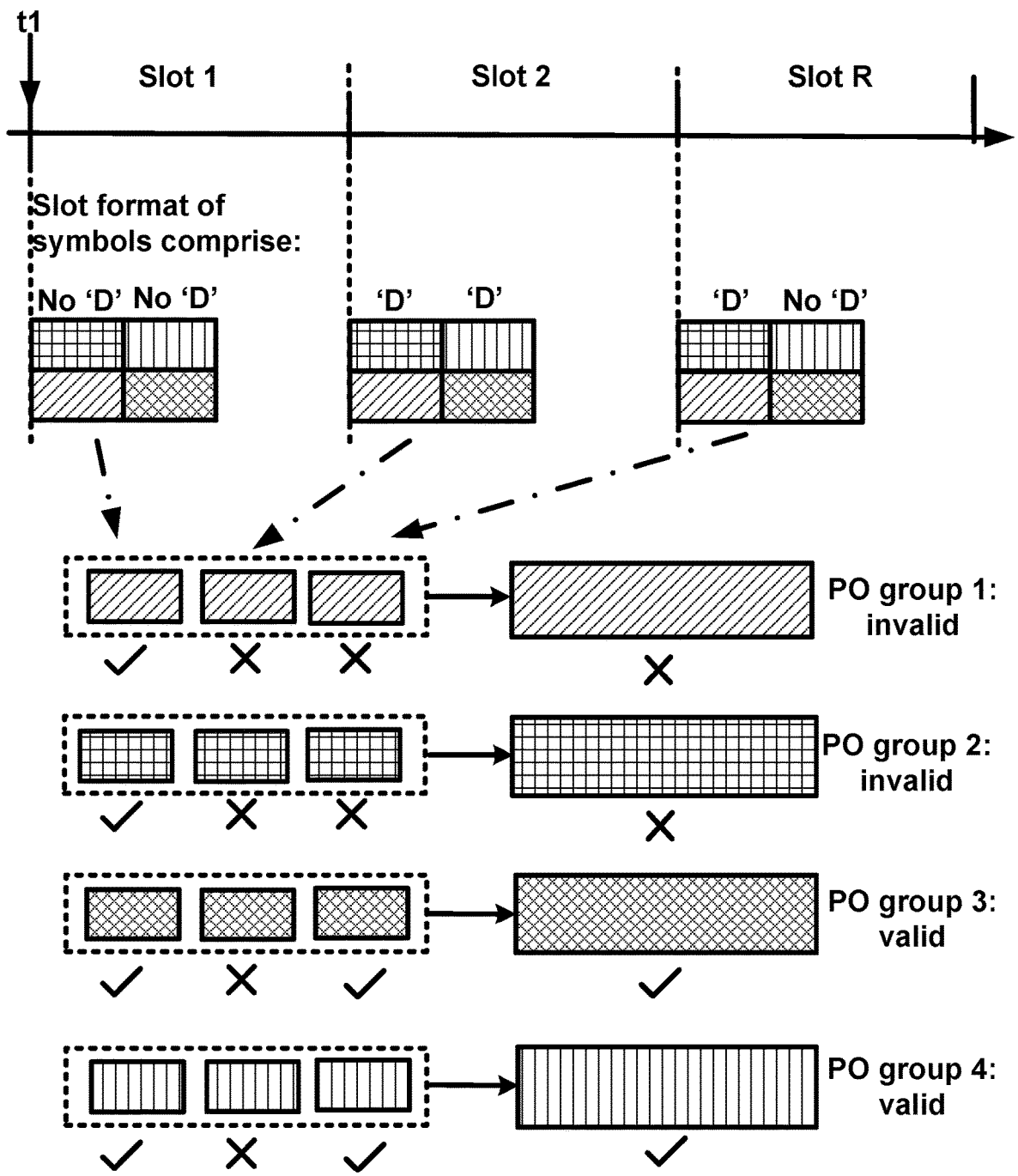
FIG. 38 shows an example PUSCH resource validation.

FIG. 38 shows an example PUSCH resource validation. The PUSCH resource validation may comprise MsgA PUSCH resource validation for the first type of access procedure. Multiple PO groups (e.g., four or any other number of PO groups) may be configured, each comprising multiple (e.g., R=3 or any other number of) POs across multiple (e.g., three or any other number of) consecutive slots. For PO group 1, the wireless device may determine that the first PO in slot 1 is valid but the second and third POs in slot 2 and slot 3 are invalid (the slot format indicates 'D' symbols overlapping with the POs). The wireless device may determine that PO group 1 is invalid, for example, because the number/quantity of valid POs is less than the required number/quantity of repetitions (e.g., K=2). PO group 2 may be invalid, for example, because the number/quantity of valid POs is less than the required number/quantity of repetitions (e.g., K=2). For each of PO group 3 and PO group 4, the wireless may determine that the first and the third PO are valid but the second PO is invalid (e.g., the second PO overlaps with 'D' symbols). The wireless device may determine that the PO group 3 and the PO group 4 are valid, for example, because they comprise at least K=2 valid POs.

Figure 39:
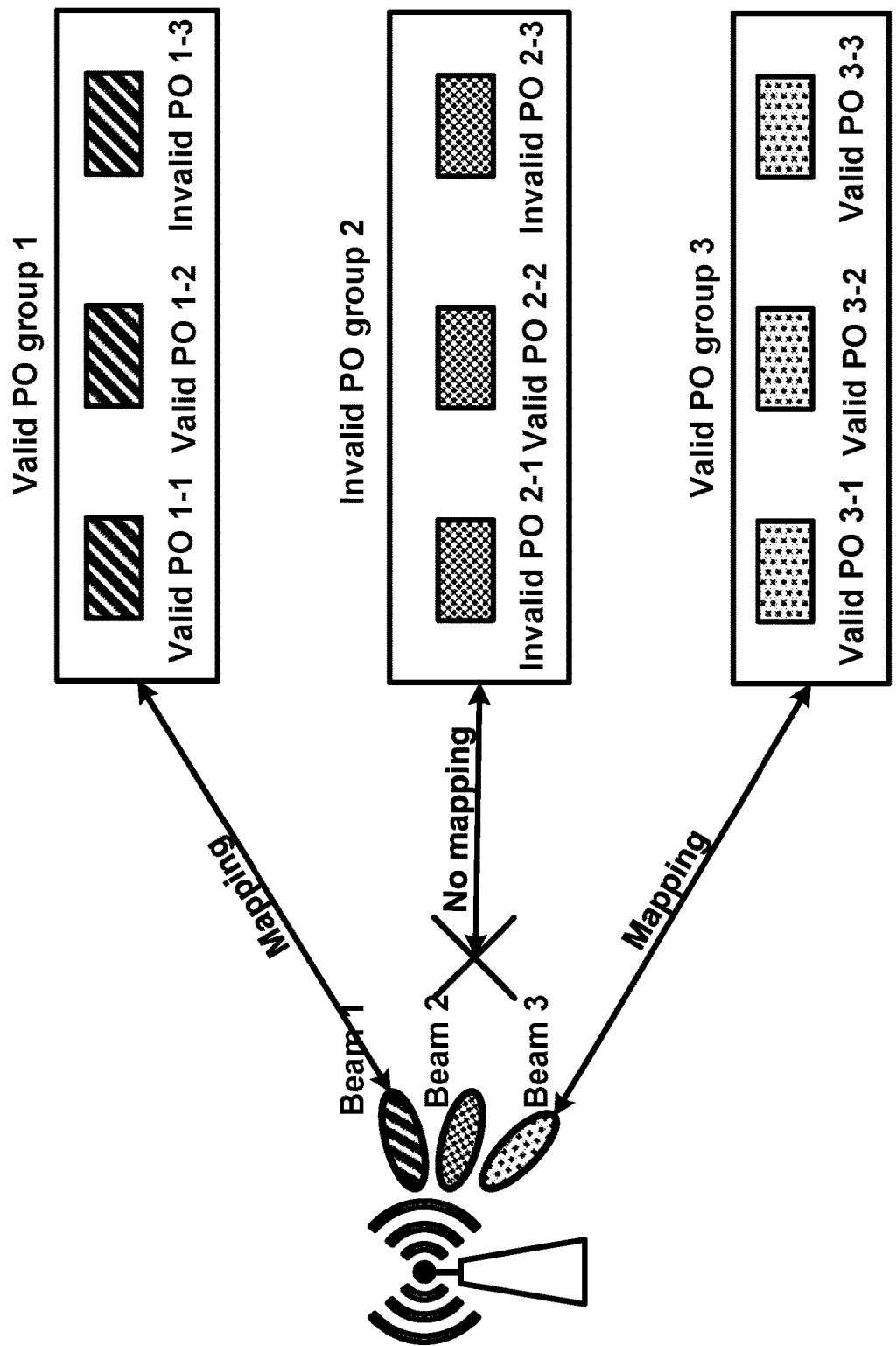
FIG. 39 shows an example mapping of valid PUSCH resources to downlink reference signals.

FIG. 39 shows an example mapping of valid PUSCH resources to downlink reference signals. The valid PUSCH resources may comprise valid MsgA PUSCH resources for the first type of access procedure. The wireless device may determine a mapping between valid PO groups and downlink reference signals, for example, after or in response to validating MsgA PO groups. The wireless device may map valid PO group 1 to beam 1 (e.g., SSB 1 is also mapped to beam 1). The valid PO group 1 may be indexed (e.g., PO group #1). The wireless device may not map PO group 2 to any SSBs, for example, because it is invalid (e.g., the PO group 2 does not comprise enough valid POs). The invalid PO group 2 may not be indexed. The wireless device may map valid PO group 3 to beam 3, which may be mapped to SSB 3. The PO group 3 may be indexed (e.g., PO group #2). The base station may operate based on the same validation and mapping rules, and the base station may be able to identify/determine that each of the received MsgA PUSCH transmissions, received via a first beam, is associated with a first SSB/CSI-RS and/or a first preamble (e.g., first MsgA preamble) and/or a first valid RO. The bases station may determine an association between a preamble (e.g., MsgA preamble) and PUSCH data, for example, via the preamble-PUSCH resource unit mapping, the preamble-SSB mapping and/or the PUSCH resource unit-SSB mapping.

Each of the plurality of resources (e.g., PO groups) may comprise a frequency resource identifier, indicating a frequency resource allocation to each of the plurality of resources. Each of the POs of a PO group may comprise a time resource identifier, indicating a time resource/symbol allocation to each of the POs. At least two of POs in a PO group may be FDMed. At least two of the POs in a PO group may be TDMed. One or more SSBs/CSI-RSs may be mapped to one or more valid PO groups. The one or more messages (e.g., one or more RRC message) may comprise one or more parameters indicating a mapping ratio between the plurality of downlink reference signals and the valid PO groups. The one or more POs in each PO group may comprise a reference PO, for example, the PO associated with a first RV (e.g., the first instance of RV=0), and/or a first PO with a smallest time resource identifier and/or a smallest frequency resource identifier. The wireless device may map the validated (e.g., valid) PO groups to the plurality of downlink reference signals, for example, based on the mapping ratio, and/or the reference transmission occasion (e.g., the reference PO) of each valid PO group, and/or one or more DM-RSs of each valid resource group, and/or identifiers of the plurality of downlink reference signals.

The wireless device may order valid PO groups, for example, based on the frequency resource identifier of each valid PO group, and/or the time resource identifier and/or slot number/index of the reference PO of each valid PO group. Each valid PO may comprise one or more DM-RS ports/sequences, each with a DM-RS index. The wireless device may order the DM-RS ports/sequences of each PO, for example, based on an increasing order of DM-RS indexes. The wireless device may determine a mapping/association between the DM-RS ports/sequences of each valid PO in a valid PO group and preambles (e.g., MsgA preambles) and/or SSBs/CSI-RSs. The determination may be based on a configured mapping ratio. The wireless may order the valid PO groups in each PUSCH slot (e.g., MsgA PUSCH slot), for example, based on an increasing order of frequency resource identifier followed by an increasing order of time resource identifier of the reference PO of the valid PO group. The indexing/ordering of PO groups (e.g., PO groups shown in FIG. 38) may be based on the same rules described above or similar rules. The wireless device may skip indexing one or more invalid PO groups. The wireless device may map one or more valid PO groups to one or more SSBs/CSI-RSs, for example, based on a mapping ratio, indexes (identifiers) of the ordered valid PO groups, and indexes of the one or more downlink reference signals. The one or more downlink reference signals may be indexed with one or more consecutive identifiers (indexes). The mapping ratio may be one-to-one (e.g., as shown in FIG. 39), one-to-many, or many-to-one.

The wireless device may indirectly map a valid PO group to a downlink reference signal (or an SSB, a beam, etc.) via a valid RO. The wireless device may determine a mapping between a valid PO group and a downlink reference signal, for example, based on mapping the valid PO group to a valid RO and mapping the valid RO to the downlink reference signal (e.g., an indirect mapping via the valid RO). At least one of the valid PO groups may be mapped to a first RO, which may be valid. The first RO may be mapped to a first downlink reference signal. A configuration message (e.g., an RRC configuration message) may indicate a mapping ratio between one or more ROs and the valid POs. The one or more ROs may be valid. The wireless may order the valid PO groups in each PUSCH slot (e.g., MsgA PUSCH slot), for example, based on an increasing order of frequency resource identifier followed by an increasing order of time resource identifier of the reference PO of the valid PO group. The wireless device may map one or more valid PO groups to one or more valid ROs, for example, based on the mapping ratio, indexes (identifiers) of the ordered valid PO groups, and indexes of the one or more valid ROs. The one or more valid ROs may be indexed with one or more consecutive identifiers (e.g., indexes) in an increasing order of frequency resource identifiers followed by time resource identifiers.

Figure 40:
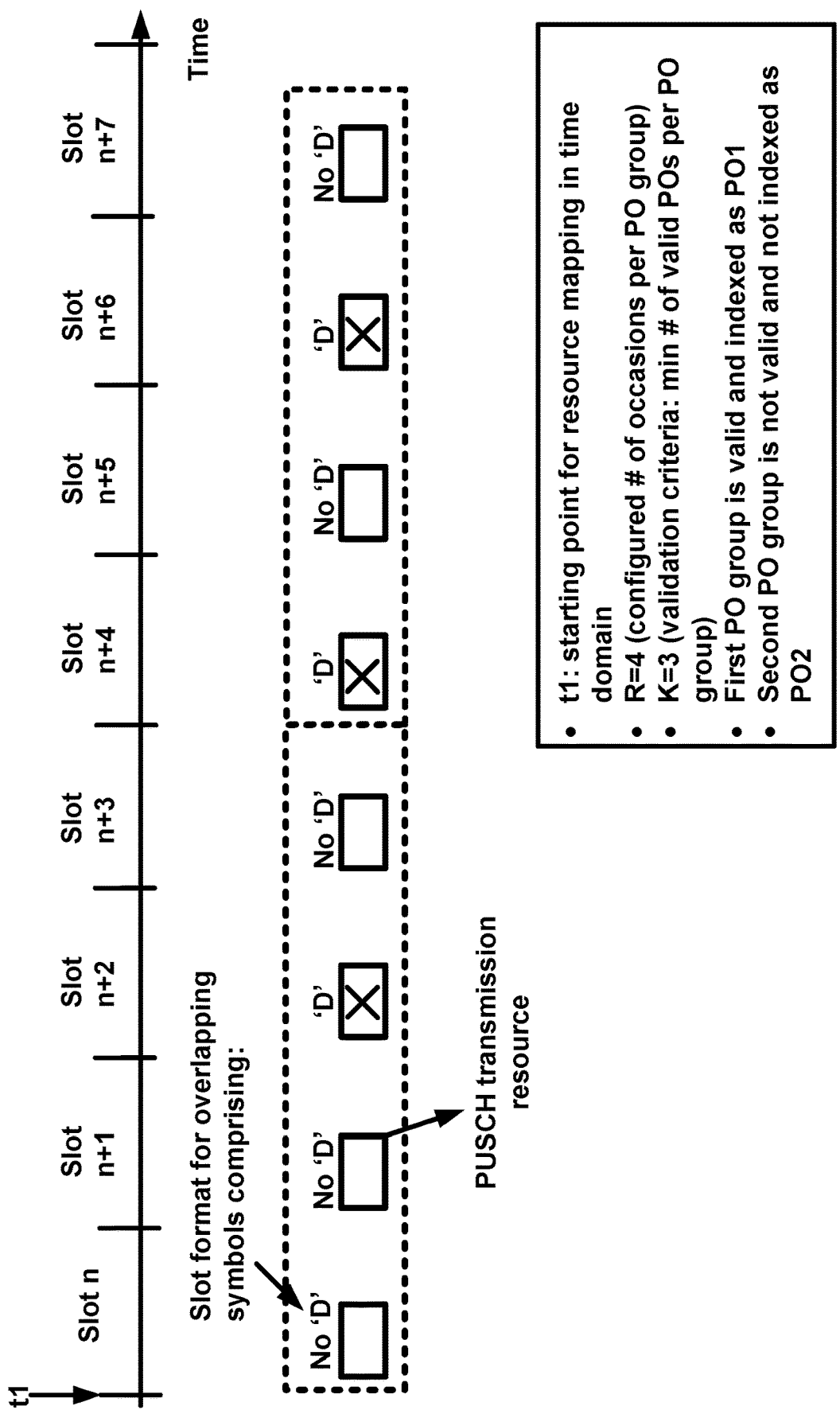
FIG. 40 shows an example of valid and invalid PUSCH resources.

FIG. 40 shows an example of valid and invalid PUSCH resources. The PUSCH resources may comprise MsgA PUSCH resources for the first type of access procedure. PO groups may be configured with multiple (e.g., R=4 or any other number of) POs per PO group across multiple (e.g., 4 or any other number of) consecutive slots. The validation criteria (e.g., the minimum repetitions, the minimum required number/quantity of valid POs per PO group) may be configured (e.g., as K=3 or any other number). The wireless device may determine that the first PO group (e.g., POs in slot n to slot n+3) is valid, for example, because it comprises 3 (>=K) valid POs (e.g., K=3). The wireless device may index the resources (the first PO group) as PO group 1 and/or map the resources to a downlink reference signal and/or a valid RO. The wireless device may determine that the second PO group (e.g., POs in slot n+4 to slot n+7) is invalid, for example, because it comprises less than 3 valid POs (e.g., only two valid POs in the second PO group). The wireless device may not index the resources (the second PO group) as PO group 2 and/or may not map the resources to a downlink reference signal and/or a valid RO.

Figure 41:
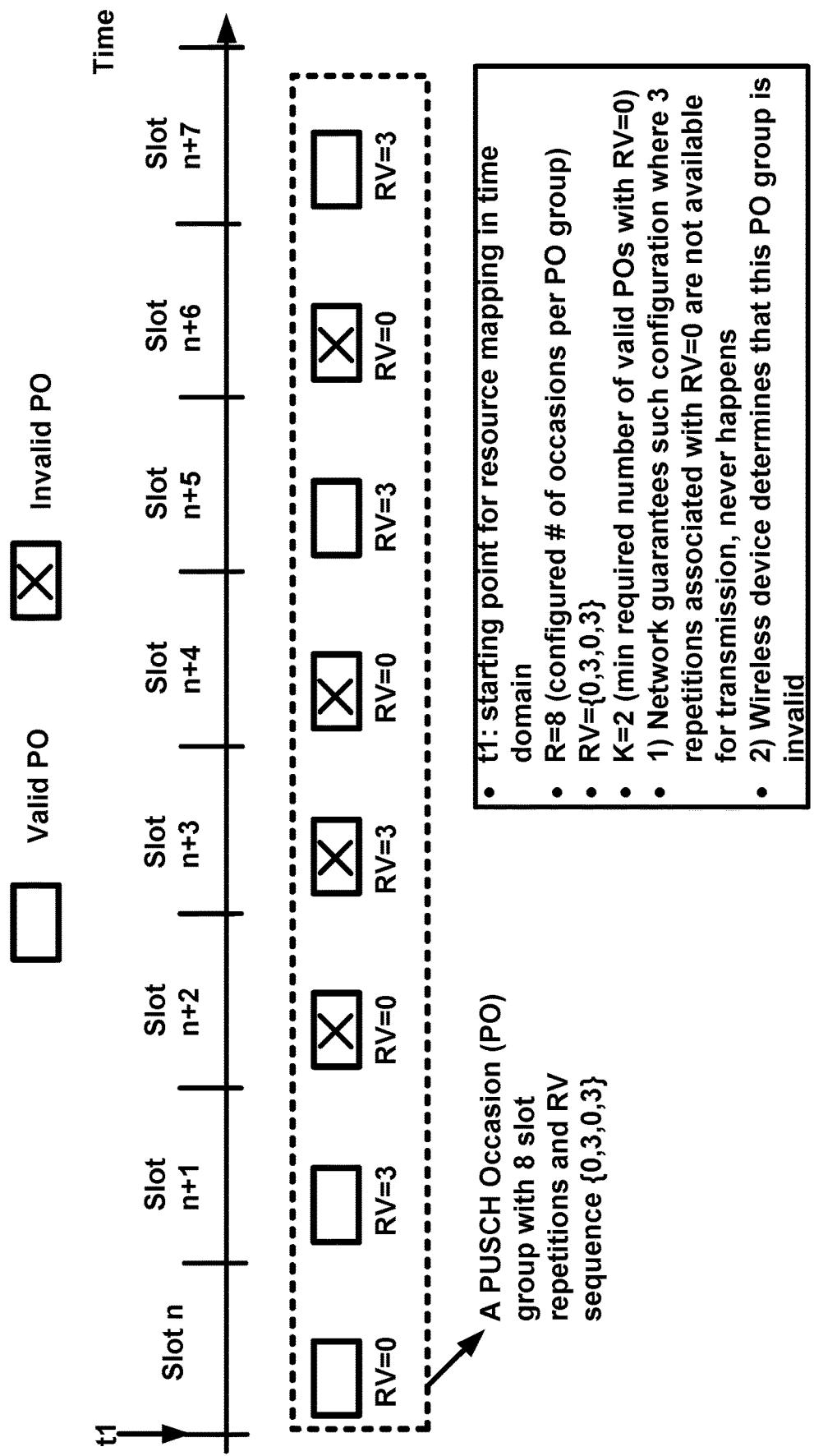
FIG. 41 shows an example of invalid PUSCH resources configured with repetition.

FIG. 41 shows an example of invalid PUSCH resources configured with repetition. The PUSCH resources may comprise MsgA PUSCH resources for the first type of access procedure. The wireless device may receive one or more messages (e.g., an RRC message) indicating a plurality of resource groups (e.g., PO groups) for a random access procedure (e.g., a two-step RACH procedure and/or a RACH-less procedure). Each of the plurality of resource groups may comprise one or more transmission occasions (e.g., POs). The one or more POs may be mapped to one or more RVs of a transport block. A PO group may be configured with multiple (e.g., R=8 or any other number of) transmission occasions (POs) across multiple (e.g., 8 or any other number of) consecutive slots for one or more repetitions of the transport block with an RV sequence (e.g., RV sequence={0, 3, 0, 3}). The one or more messages (e.g., the RRC message) may indicate one or more slot formats indicating transmission directions of symbols of the plurality of resource groups.

The wireless device may determine valid PO groups of the plurality resource groups, for example, based on the transmission directions. Each valid PO group may comprise one or more valid POs. A valid PO may not overlap with any DL symbols. A valid PO may comprise at least one symbol indicated as UL and/or flexible symbol(s) by the transmission directions. The one or more valid POs may be associated with one or more first RVs of the one or more RVs. A valid PO group may comprise at least a number/quantity of (e.g., K) valid POs mapped to an RV value (e.g., RV=0). The wireless device may determine that the POs in slot n+2 and slot n+3 and slot n+4 and slot n+6 are not valid (e.g., due to overlap with one or more DL symbols). The wireless device may determine that this PO group is not valid, for example, because one or more POs associated with RV=0 are not valid. The wireless device may determine that the PO group is invalid, for example, because it does not comprise at least K=2 valid POs mapped to RV=0.

Figure 42:
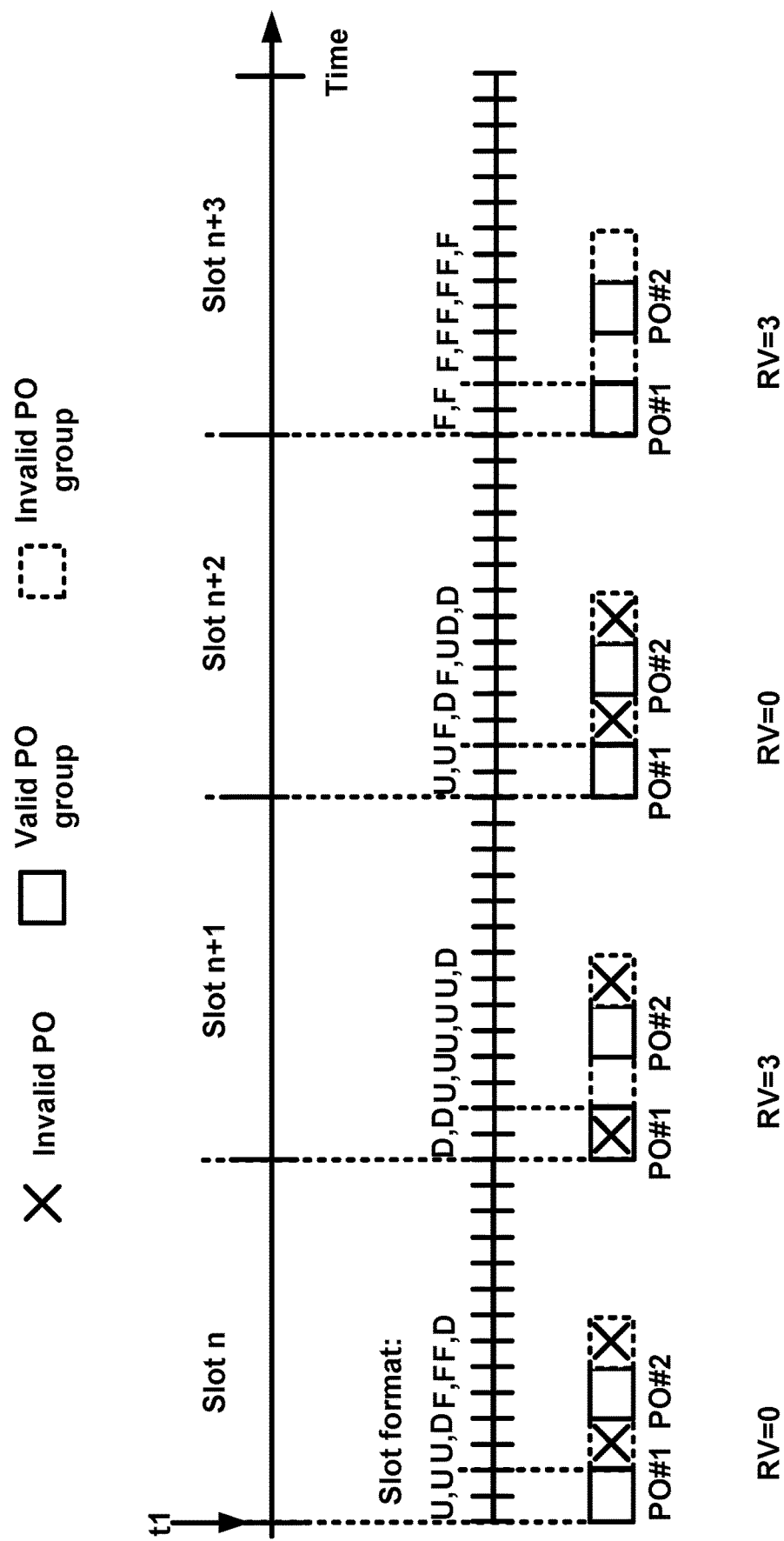
FIG. 42 shows an example of valid and invalid PUSCH resources configured with repetitions.

FIG. 42 shows an example of valid and invalid PUSCH resources configured with repetitions. The PUSCH resources may comprise MsgA PUSCH resources of the first type of access procedure. PO group 1 and PO group 2 may be valid, for example, because one or more of the POs of PO group 1 and PO group 2 mapped to RV=0 are valid (e.g., no overlap with 'D' symbols). The other two PO groups (shown with dashed lines) may be invalid PO groups, for example, because they do not comprise at least one valid PO mapped to RV=0.

Each of the valid PO groups may comprise one or more second valid PO occasions mapped to a second RV. The wireless device may determine that a PO group is valid, for example, if it comprises a first number/quantity of valid POs mapped to a first RV (e.g., RV=0 or any other RV value) and/or a second number/quantity of valid POs mapped to a second RV (e.g., RV=3 or any other RV value). The valid PO group may comprise a total number/quantity of valid POs equal to or greater than a third number/quantity. The RRC message may indicate the third number/quantity or it may be pre-defined.

A base station may perform a method comprising multiple operations. The base station may determine first configuration parameters of one or more uplink channel resources for transmission of one or more transport blocks. The base station may determine, based on whether the one or more uplink channel resources are associated with a first type of access (e.g., a first type of random access), one or more slot formats indicating transmission direction of symbols of the one or more uplink channel resources. The base station may transmit, to one or more wireless devices, one or more messages. The one or more messages may comprise the first configuration parameters and second configuration parameters indicating the one or more slot formats. The first configuration parameters may comprise one or more parameters indicating frequencies of the one or more uplink channel resources. The one or more uplink channel resources for transmission of one or more transport blocks may comprise one or more first uplink channel resources for the first type of access and one or more second uplink channel resources. The one or more slot formats may comprise one or more first slot formats for symbols of the one or more first uplink channel resources and one or more second slot formats for symbols of the one or more second uplink channel resources. The one or more uplink channel resources may comprise one or more valid physical uplink shared channel (PUSCH) resources for the first type of access. A slot format may indicate a transmission direction comprising at least one of: uplink, downlink, or flexible. A flexible transmission direction may be capable of uplink and downlink. The one or more uplink channel resources may be associated with the first type of access, and the one or more uplink channel resources may comprise no downlink symbols. The one or more uplink channel resources may not be associated with the first type of access, and the one or more uplink channel resources may comprise one or more downlink symbols. The base station may determine, based on the one or more uplink channel resources being associated with the first type of access, one or more slot formats indicating transmission direction of a first quantity of symbols that precedes the symbols of the one or more uplink channel resources. The first quantity may be pre-defined. The base station may receive, from a wireless device, a first random access transmission. The first random access transmission may comprise a random access preamble associated with the first type of access via a random access resource, and a transport block associated with the first type of access via the one or more uplink channel resources. The one or more uplink channel resources may comprise a plurality of physical uplink shared channel (PUSCH) occasions for one or more repetitions of a transport block transmission. The first type of access may comprise at least one of: a two-step random access procedure; a random access channel (RACH)-less procedure; or a RACH-less handover. The base station may transmit, to the one or more wireless devices, a downlink signal in at least one symbol of the symbols of the one or more uplink channel resources. The one or more uplink channel resources may not be associated with the first type of access. The first configuration parameters may indicate at least one of: resource blocks of a plurality of physical uplink shared channel (PUSCH) occasions; at least one slot for the plurality of PUSCH occasions; symbols of the plurality of PUSCH occasions; or a quantity of repetitions of transmitting the one or more transport blocks. At least one physical uplink shared channel (PUSCH) occasion may be associated with the first type of access. The one or more slot formats indicate transmission direction of symbols of the at least one PUSCH occasion. The at least one PUSCH occasion may correspond to one or more first repetitions of transmitting the one or more transport blocks. The at least one PUSCH occasion may correspond to one or more first redundancy versions of transmission of the one or more transport blocks. The one or more first redundancy versions may be pre-defined. The first configuration parameters may indicate a plurality of redundancy versions for one or more repetitions of transmitting the one or more transport blocks. A quantity of the one or more uplink channel resources may be equal to a quantity of repetitions of transmitting the one or more transport blocks. A quantity of the one or more uplink channel resources may be equal to a half of a quantity of repetitions of transmitting the one or more transport blocks. A quantity of the one or more uplink channel resources may be pre-defined. The quantity of the one or more uplink channel resources may be one. The first configuration parameters may indicate a quantity of one or more physical uplink shared channel (PUSCH) occasions. A base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements; and a wireless device configured to send/transmit the one or more transport blocks. A computer-readable medium may store instructions that, when executed, cause performance of the described method, additional operations and/or include the additional elements.

A base station may perform a method comprising multiple operations. The base station may determine first configuration parameters of one or more uplink channel resources for transmission of one or more transport blocks. The base station may determine, based on the one or more first uplink channel resources being associated with a type of access, determining one or more first slot formats for the one or more first uplink channel resources different from one or more second slot formats for second uplink channel resources. The base station may transmit, to one or more wireless devices, one or more messages. The one or more messages may comprise the first configuration parameters and second configuration parameters indicating the one or more first slot formats. The one or more first slot formats may indicate transmission direction of symbols of the one or more first uplink channel resources. The type of access may comprise at least one of: a two-step random access procedure; a random access channel (RACH)-less procedure; or a RACH-less handover. The second configuration parameters may indicate: a first quantity of downlink slots in a period; a second quantity of downlink symbols in the period; a third quantity of uplink symbols in the period; and a fourth quantity of uplink symbols in the period. The first quantity of downlink slots and the second quantity of downlink symbols may not overlap, in time, with the one or more first uplink channel resources. The base station may transmit downlink control information comprising a slot format indicator indicating a slot format of one or more slots associated with the one or more uplink first channel resources. The slot format indicated by the slot format indicator may indicate either an uplink symbol or a flexible symbol. A base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements; and a wireless device configured to send/transmit the one or more transport blocks. A computer-readable medium may store instructions that, when executed, cause performance of the described method, additional operations and/or include the additional elements.

A base station may perform a method comprising multiple operations. The base station may determine a plurality of uplink channel resources, for transmission of one or more transport blocks, comprising: one or more first uplink channel resources for a type of access; and one or more second uplink channel resources (e.g., for a second type of access or transmission). The base station may determine one or more first slot formats for symbols of the one or more first uplink channel resources and one or more second slot formats for symbols of the one or more second uplink channel resources. The base station may transmit, to one or more wireless devices, one or more messages. The one or more messages may comprise the one or more first slot formats for symbols of the one or more first uplink channel resources and the one or more second slot formats for symbols of the one or more second uplink channel resources. The type of access may comprise at least one of: a two-step random access procedure; a random access channel (RACH)-less procedure; or a RACH-less handover. The base station may transmit one or more configuration parameters that indicates: a first quantity of downlink slots in a period; a second quantity of downlink symbols in the period; a third quantity of uplink symbols in the period; and a fourth quantity of uplink symbols in the period. The first quantity of downlink slots and the second quantity of downlink symbols may not overlap, in time, with the one or more first uplink channel resources. The one or more messages may comprise downlink control information comprising a slot format indicator indicating a slot format of one or more slots associated with the one or more first uplink channel resources, and the slot format indicated by the slot format indicator may indicate either an uplink symbol or a flexible symbol. A base station may comprise one or more processors; and memory storing instructions that, when executed by the one or more processors, cause the base station to perform the described method, additional operations and/or include the additional elements. A system may comprise a base station configured to perform the described method, additional operations and/or include the additional elements; and a wireless device configured to send/transmit the one or more transport blocks. A computer-readable medium may store instructions that, when executed, cause performance of the described method, additional operations and/or include the additional elements.

A wireless device may perform a method comprising multiple operations. The wireless device may receive one or more messages indicating: one or more uplink channel resources for transmission of one or more transport blocks with one or more repetitions for access (e.g., random access); and one or more slot formats indicating transmission direction of symbols of the one or more uplink channel resources. The wireless device may determine, based on each symbol of at least one uplink channel resource of the one or more uplink channel resources being either a flexible symbol or an uplink symbol, that the one or more uplink channel resources are valid. The wireless device may transmit, based on the determining, the one or more transport blocks with the one or more repetitions via the one or more uplink channel resources. A slot format may indicate that one or more symbols are an uplink symbol, a downlink symbol, or a flexible symbol. Transmission direction of the flexible symbol may be capable of uplink and downlink. The one or more uplink channel resources may comprise one or more physical uplink shared channel (PUSCH) occasions for transmission of the one or more transport blocks with the one or more repetitions, and one or more demodulation reference signal (DM-RS) resources associated with the one or more PUSCH occasions. The one or more messages may indicate at least one of: resource blocks of the one or more PUSCH occasions; at least one slot for the one or more PUSCH occasions; symbols of the one or more PUSCH occasions; or a first quantity of the one or more repetitions. The at least one uplink channel resource may correspond to at least one first redundancy version associated with the one or more transport blocks. The at least one first redundancy version may be pre-defined. The one or more messages may indicate a plurality of redundancy versions for the one or more repetitions. A quantity of the at least one uplink channel resource may be greater than or equal to a quantity of the one or more repetitions. A quantity of the one or more repetitions may be pre-defined. The one or more messages may indicate a quantity of the one or more repetitions. The wireless device may determine, based on a quantity of the one or more uplink channel resources, a quantity of the one or more repetitions. A quantity of the one or more repetitions may be equal to a half of a quantity of the one or more uplink channel resources. A quantity of the one or more repetitions may be equal to a quantity of the one or more uplink channel resources. The at least one uplink channel resource may comprise at least one valid physical uplink shared channel (PUSCH) occasion. The wireless device may map DM-RS resources associated with the at least one uplink channel resource to preamble indexes of at least one random access channel (RACH) occasion. The at least one RACH occasion may be valid. A valid uplink channel resource may comprise at least one symbol associated with transmission direction of uplink or flexible. The mapping may be based on at least one of: a mapping ratio; or a reference timing of the one or more uplink channel resources. The wireless device may determine, based on a time offset and at least one random access channel (RACH) occasion, a reference timing. The wireless device may map, based on the reference timing, DM-RS resources associated with the at least one uplink channel resource to preamble indexes of the at least one RACH occasion. The one or more messages may indicate the time offset. The wireless device may determine, based on at least one symbol of symbols of one or more second uplink channel resources being a downlink symbol, that the one or more second uplink channel resources are invalid. The wireless device may skip transmission, of the one or more transport blocks, associated with the one or more second uplink channel resources. A wireless device may comprise one or more processors; and memory storing instructions that, when executed by the one or more processors, cause the wireless device to perform the described method, additional operations and/or include the additional elements. A system may comprise a wireless device configured to perform the described method, additional operations and/or include the additional elements; and a base station configured to send/transmit the one or more messages. A computer-readable medium may store instructions that, when executed, cause performance of the described method, additional operations and/or include the additional elements.

One or more of the operations described herein may be conditional. For example, one or more operations may be performed if certain criteria are met, such as in a wireless device, a base station, a radio environment, a network, a combination of the above, and/or the like. Example criteria may be based on one or more conditions such as wireless device and/or network node configurations, traffic load, initial system set up, packet sizes, traffic characteristics, a combination of the above, and/or the like. If the one or more criteria are met, various examples may be used. It may be possible to implement any portion of the examples described herein in any order and based on any condition.

A base station may communicate with one or more of wireless devices. Wireless devices and/or base stations may support multiple technologies, and/or multiple releases of the same technology. Wireless devices may have some specific capability(ies) depending on wireless device category and/or capability(ies). A base station may comprise multiple sectors, cells, and/or portions of transmission entities. A base station communicating with a plurality of wireless devices may refer to a base station communicating with a subset of the total wireless devices in a coverage area. Wireless devices referred to herein may correspond to a plurality of wireless devices compatible with a given LTE, 5G, or other 3GPP or non-3GPP release with a given capability and in a given sector of a base station. A plurality of wireless devices may refer to a selected plurality of wireless devices, a subset of total wireless devices in a coverage area, and/or any group of wireless devices. Such devices may operate, function, and/or perform based on or according to drawings and/or descriptions herein, and/or the like. There may be a plurality of base stations and/or a plurality of wireless devices in a coverage area that may not comply with the disclosed methods, for example, because those wireless devices and/or base stations may perform based on older releases of LTE, 5G, or other 3GPP or non-3GPP technology.

One or more parameters, fields, and/or Information elements (IEs), may comprise one or more information objects, values, and/or any other information. An information object may comprise one or more other objects. At least some (or all) parameters, fields, IEs, and/or the like may be used and can be interchangeable depending on the context. If a meaning or definition is given, such meaning or definition controls.

One or more elements in examples described herein may be implemented as modules. A module may be an element that performs a defined function and/or that has a defined interface to other elements. The modules may be implemented in hardware, software in combination with hardware, firmware, wetware (e.g., hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or Lab VIEWMathScript. Additionally or alternatively, it may be possible to implement modules using physical hardware that incorporates discrete or programmable analog, digital and/or quantum hardware. Examples of programmable hardware may comprise: computers, microcontrollers, microprocessors, application-specific integrated circuits (ASICs); field programmable gate arrays (FPGAs); and/or complex programmable logic devices (CPLDs). Computers, microcontrollers and/or microprocessors may be programmed using languages such as assembly, C, C++ or the like. FPGAs, ASICs and CPLDs are often programmed using hardware description languages (HDL), such as VHSIC hardware description language (VHDL) or Verilog, which may configure connections between internal hardware modules with lesser functionality on a programmable device. The above-mentioned technologies may be used in combination to achieve the result of a functional module.

One or more features described herein may be implemented in a computer-usable data and/or computer-executable instructions, such as in one or more program modules, executed by one or more computers or other devices. Generally, program modules include routines, programs, objects, components, data structures, etc. that perform particular tasks or implement particular abstract data types when executed by a processor in a computer or other data processing device.

The computer executable instructions may be stored on one or more computer readable media such as a hard disk, optical disk, removable storage media, solid state memory, RAM, etc. The functionality of the program modules may be combined or distributed as desired. The functionality may be implemented in whole or in part in firmware or hardware equivalents such as integrated circuits, field programmable gate arrays (FPGA), and the like. Particular data structures may be used to more effectively implement one or more features described herein, and such data structures are contemplated within the scope of computer executable instructions and computer-usable data described herein.

A non-transitory tangible computer readable media may comprise instructions executable by one or more processors configured to cause operations of multi-carrier communications described herein. An article of manufacture may comprise a non-transitory tangible computer readable machine-accessible medium having instructions encoded thereon for enabling programmable hardware to cause a device (e.g., a wireless device, wireless communicator, a wireless device, a base station, and the like) to allow operation of multi-carrier communications described herein. The device, or one or more devices such as in a system, may include one or more processors, memory, interfaces, and/or the like. Other examples may comprise communication networks comprising devices such as base stations, wireless devices or user equipment (wireless device), servers, switches, antennas, and/or the like. A network may comprise any wireless technology, including but not limited to, cellular, wireless, WiFi, 4G, 5G, any generation of 3GPP or other cellular standard or recommendation, any non-3GPP network, wireless local area networks, wireless personal area networks, wireless ad hoc networks, wireless metropolitan area networks, wireless wide area networks, global area networks, satellite networks, space networks, and any other network using wireless communications. Any device (e.g., a wireless device, a base station, or any other device) or combination of devices may be used to perform any combination of one or more of steps described herein, including, for example, any complementary step or steps of one or more of the above steps.

Although examples are described above, features and/or steps of those examples may be combined, divided, omitted, rearranged, revised, and/or augmented in any desired manner Various alterations, modifications, and improvements will readily occur to those skilled in the art. Such alterations, modifications, and improvements are intended to be part of this description, though not expressly stated herein, and are intended to be within the spirit and scope of the descriptions herein. Accordingly, the foregoing description is by way of example only, and is not limiting.

The invention claimed is:

1. A method comprising:
transmitting, by a base station to one or more wireless devices, one or more configuration parameters indicating a plurality of physical uplink shared channel (PUSCH) occasion groups, each of the plurality of PUSCH occasion groups comprising a plurality of PUSCH occasions associated with transport block repetition; and
receiving, via a valid PUSCH occasion group selected from the plurality of PUSCH occasion groups based on a quantity of valid PUSCH occasions in the PUSCH occasion group, one or more repetitions of a transport block.

2. The method of claim 1, wherein the one or more configuration parameters comprise one or more parameters indicating frequencies of a plurality of PUSCH resources.

3. The method of claim 1, wherein the plurality of PUSCH occasion groups comprise:
a plurality of first PUSCH resources associated with a first type of access; and
a plurality of second PUSCH resources associated with a second type of access.

4. The method of claim 3, further comprising:
transmitting one or more second configuration parameters indicating one or more slot formats of a plurality of symbols associated with the plurality of PUSCH occasion groups, wherein the one or more slot formats comprises:
one or more first slot formats for symbols of the plurality of first PUSCH resources associated with the first type of access; and
one or more second slot formats for symbols of the plurality of second PUSCH resources associated with the second type of access.

5. The method of claim 1, further comprising:
transmitting one or more second configuration parameters indicating one or more slot formats of a plurality of symbols associated with the plurality of PUSCH occasion groups, wherein a slot format, of the one or more slot formats, indicates a transmission direction comprising at least one of:
uplink;
downlink; or
flexible, and
wherein a flexible transmission direction is capable of uplink and downlink.

6. The method of claim 1, further comprising:
transmitting one or more second configuration parameters indicating one or more slot formats of a plurality of symbols associated with the plurality of PUSCH occasion groups, wherein one or more slot formats associated with the valid PUSCH occasion group comprises one or more non-downlink symbols, and wherein a quantity of the one or more non-downlink symbols is greater or equal to a quantity of repetitions.

7. The method of claim 1, further comprising:
transmitting one or more messages indicating a plurality of PUSCH resources, wherein the plurality of PUSCH resources comprise one or more downlink symbols.

8. The method of claim 1, further comprising:
based on a plurality of uplink channel resources, determining one or more slot formats indicating transmission direction of a first quantity of symbols that precedes the plurality of uplink channel resources.

9. The method of claim 1, further comprising:
receiving, from a wireless device, a random access transmission comprising:
a random access; and
the one or more repetitions of the transport block, wherein the one or more repetitions is received via a plurality of uplink channel resources of the valid PUSCH occasion group.

10. The method of claim 1, further comprising:
receiving, via a random access channel resource, a preamble; and
transmitting, based on the received preamble and the transport block, a random access response.

11. The method of claim 1, wherein the quantity of valid PUSCH occasions in the PUSCH occasion group comprises at least two valid PUSCH occasions.

12. A method comprising:
receiving, from a base station by a wireless device, one or more configuration parameters indicating a plurality of physical uplink shared channel (PUSCH) occasion groups, each of the plurality of PUSCH occasion groups comprising a plurality of PUSCH occasions for transport block repetition;
determining, by the wireless device, a quantity of valid PUSCH occasions in a PUSCH occasion group from the plurality of PUSCH occasion groups;
selecting, based on the quantity of valid PUSCH occasions in the PUSCH occasion group, the PUSCH occasion group; and
transmitting, via the selected PUSCH occasion group, one or more repetitions of a transport block.

13. The method of claim 12, wherein one or more slots associated with the PUSCH occasion group are flexible symbols, uplink symbols, or a combination of flexible symbols and uplink symbols, and wherein a quantity of the flexible symbols and uplink symbols is greater or equal to a threshold.

14. The method of claim 12, wherein the plurality of PUSCH occasion groups are associated with a type of access, and
wherein the type of access comprises at least one of:
a two-step random access procedure;
a random access channel (RACH)-less procedure; or
a RACH-less handover.

15. The method of claim 12, further comprising receiving one or more radio resource control (RRC) configuration parameters indicating:
a first quantity of downlink slots in a period;
a second quantity of downlink symbols in the period;
a third quantity of uplink symbols in the period; and
a fourth quantity of uplink slots in the period,
wherein one or more slots associated with the valid PUSCH occasions are valid uplink channel resources.

16. The method of claim 12, further comprising receiving downlink control information comprising a slot format indicator indicating a slot format of one or more slots associated with a plurality of uplink channel resources of the plurality of PUSCH occasions.

17. The method of claim 16, wherein the slot format indicated by the slot format indicator indicates either an uplink symbol or a flexible symbol.

18. The method of claim 12, wherein the quantity of valid PUSCH occasions in the PUSCH occasion group comprises at least two valid PUSCH occasions.

19. A method comprising:
receiving, from a base station by a wireless device, one or more configuration parameters indicating a plurality of physical uplink shared channel (PUSCH) occasion groups, each of the plurality of PUSCH occasion groups comprising a plurality of PUSCH occasions for transport block repetition;
determining, by the wireless device, a quantity of valid PUSCH occasions in a PUSCH occasion group from the plurality of PUSCH occasion groups;
validating, based on the quantity of valid PUSCH occasions in a PUSCH occasion group from the plurality of PUSCH occasion groups, PUSCH occasion group of the plurality of PUSCH occasion groups; and
transmitting, via the validated PUSCH occasion group, one or more repetitions of a transport block.

20. The method of claim 19, further comprising:
receiving an indication of one or more slot formats, for a plurality of symbols associated with the plurality of PUSCH occasion groups, that indicate a transmission direction comprising at least one of: downlink, uplink, or flexible.

21. The method of claim 19, wherein the plurality of PUSCH occasion groups are associated with a type of access, and wherein the type of access comprises at least one of:
a two-step random access procedure;
a random access channel (RACH)-less procedure; or
a RACH-less handover.

22. The method of claim 19, further comprising receiving one or more radio resource control (RRC) configuration parameters that indicate:
a first quantity of downlink slots in a period;
a second quantity of downlink symbols in the period;
a third quantity of uplink symbols in the period; and
a fourth quantity of uplink slots in the period,
wherein one or more slots associated with the validated PUSCH occasion group are valid uplink channel resources.

23. The method of claim 19, further comprising:
receiving downlink control information comprising a slot format indicator indicating a slot format of one or more slots associated with a plurality of uplink channel resources of the plurality of PUSCH occasions, and wherein the slot format indicated by the slot format indicator indicates either an uplink symbol or a flexible symbol.

24. The method of claim 19, wherein the quantity of valid PUSCH occasions in the PUSCH occasion group comprises at least two valid PUSCH occasions.

* * * * *